US011853526B2

(12) United States Patent
Niu et al.

(10) Patent No.: US 11,853,526 B2
(45) Date of Patent: Dec. 26, 2023

(54) WINDOW DISPLAY METHOD, WINDOW SWITCHING METHOD, ELECTRONIC DEVICE, AND SYSTEM

(71) Applicant: Huawei Technologies Co., Ltd., Shenzhen (CN)

(72) Inventors: Siyue Niu, Shenzhen (CN); Hejin Gu, Shenzhen (CN); Guoqiang Qi, Shenzhen (CN); Yang Bai, Shenzhen (CN); Shicong Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/180,548

(22) Filed: Mar. 8, 2023

(65) Prior Publication Data
US 2023/0259246 A1    Aug. 17, 2023

Related U.S. Application Data

(63) Continuation of application No. PCT/CN2021/110295, filed on Aug. 3, 2021.

(30) Foreign Application Priority Data

Sep. 9, 2020    (CN) .......................... 202010945665.5

(51) Int. Cl.
  *G06F 3/048*    (2013.01)
  *G06F 3/0481*   (2022.01)
  (Continued)

(52) U.S. Cl.
  CPC .......... *G06F 3/0481* (2013.01); *G06F 3/0486* (2013.01); *G06F 3/1438* (2013.01); *G06F 3/1454* (2013.01); *G06F 2203/04803* (2013.01)

(58) Field of Classification Search
  CPC .... G06F 3/0481; G06F 3/0486; G06F 3/1454; G06F 3/13438
  See application file for complete search history.

(56) References Cited

U.S. PATENT DOCUMENTS 8,468,459 B2\*    6/2013   Jeong ................. H04N 1/00408
                                                              455/566
10,853,019 B1\*  12/2020   Schwabacher ...... H04L 67/1095
(Continued)

OTHER PUBLICATIONS

Klapperstuck et al., ContextuWall: Peer collaboration using (large) displays, 2016, IEEE, 8 pages.\*

(Continued)

*Primary Examiner* — Linh K Pham
(74) *Attorney, Agent, or Firm* — Slater Matsil, LLP

(57) ABSTRACT

This application provides a window display method, a window switching method, an electronic device, and a system. The method is applied to multi-screen collaboration between a mobile phone and a PC, and a plurality of application interfaces of the mobile phone are displayed in a form of tabs in a multi-screen collaboration window. In the multi-screen collaboration process, a background of the mobile phone may obtain user operations, distinguish between operation objects according to the user operations, and then determine a running status of an application and a window display status, so as to obtain an operation result that better meets user's expectation. The method may further implement file sharing between the mobile phone and the PC and between different applications of the mobile phone.

20 Claims, 78 Drawing Sheets

(51) Int. Cl.
  *G06F 3/14* (2006.01)
  *G06F 3/0486* (2013.01)

(56) References Cited

U.S. PATENT DOCUMENTS

| | | | | |
|---|---|---|---|---|
| 2002/0075250 | A1* | 6/2002 | Shigeta | G06F 3/1454 |
| | | | | 345/204 |
| 2005/0015731 | A1* | 1/2005 | Mak | G06F 3/0486 |
| | | | | 715/764 |
| 2007/0279485 | A1* | 12/2007 | Ohba | G06F 3/017 |
| | | | | 345/519 |
| 2008/0195979 | A1* | 8/2008 | Souza | G09G 5/08 |
| | | | | 715/856 |
| 2009/0075697 | A1* | 3/2009 | Wilson | B66F 9/18 |
| | | | | 455/557 |
| 2009/0199095 | A1* | 8/2009 | Nicol, II | G06Q 10/10 |
| | | | | 715/767 |
| 2010/0115458 | A1* | 5/2010 | Marano | G06F 3/0485 |
| | | | | 715/781 |
| 2012/0088548 | A1* | 4/2012 | Yun | G08C 23/04 |
| | | | | 455/557 |
| 2012/0117498 | A1* | 5/2012 | Kapila | H04N 21/4316 |
| | | | | 715/764 |
| 2013/0141331 | A1* | 6/2013 | Shiu | H04N 21/43637 |
| | | | | 345/158 |
| 2014/0089847 | A1* | 3/2014 | Seo | G06F 3/0488 |
| | | | | 715/781 |
| 2014/0181686 | A1* | 6/2014 | Shin | G06F 3/0485 |
| | | | | 715/748 |
| 2015/0082058 | A1* | 3/2015 | Hahm | G06F 3/1423 |
| | | | | 713/320 |
| 2015/0082241 | A1* | 3/2015 | Kang | H04N 7/15 |
| | | | | 715/803 |
| 2017/0235435 | A1* | 8/2017 | Sohn | G06F 3/0481 |
| | | | | 715/738 |
| 2022/0147228 | A1* | 5/2022 | Yi | H04M 1/72412 |

OTHER PUBLICATIONS

Lee et al., Remote Collaboration Screen Control Using Mobile Multi-Touch Interface, 2012, IEEE, 2 pages.*

* cited by examiner

WINDOW DISPLAY METHOD, WINDOW SWITCHING METHOD, ELECTRONIC DEVICE, AND SYSTEM

CROSS-REFERENCE TO RELATED APPLICATIONS

This application is a continuation of International Application No. PCT/CN2021/110295, filed on Aug. 3, 2021, which claims priority to Chinese Patent Application No. 202010945665.5, filed on Sep. 9, 2020. The disclosures of the aforementioned applications are hereby incorporated by reference in their entireties.

TECHNICAL FIELD

This application relates to the field of electronic technologies, and in particular, to a window display method, a window switching method, an electronic device, and a system.

BACKGROUND

With the development of electronic devices, types of electronic devices used by users are increasing. A user may have a plurality of types of electronic devices such as a mobile phone and a personal computer (PC). The electronic devices have different use scenarios and functions, and the electronic devices may install different applications and store different personal data. Therefore, different electronic devices may need to share data in more scenarios.

To share data between different electronic devices more conveniently, one possible manner may be multi-screen collaboration. Multi-screen collaboration between a mobile phone and a PC is used as an example. After the mobile phone and the PC are connected in a wired or wireless manner, a window that displays a mobile phone interface is displayed on the PC, which is referred to as a "mobile phone window" in this application. Screen content of the mobile phone is displayed in the mobile phone window in a mirror manner. A user may use, in the mobile phone window of the PC through a keyboard, a mouse, a touchscreen, or the like of the PC, an application installed on the mobile phone, to implement collaboration between the mobile phone and the PC. Moreover, the user may further drag a file, a photo, or the like into or out of the mobile phone window to implement file transfer between the mobile phone and the PC.

In the multi-screen collaboration process described above, users such as white collars and students who often use both a PC and a mobile phone may focus only on a screen of the PC and access data of the mobile phone through the PC in a use process, without frequently switching between the PC and the mobile phone. This greatly improves user's working and learning efficiency.

In the multi-screen collaboration process, in an initial status, the PC may display a running interface of the mobile phone through a mobile phone window; or the PC may further simultaneously run a plurality of mobile phone applications in a multi-window form, and display different application interfaces by using a plurality of windows, so as to facilitate user's operations such as data comparison and drag transfer. For example, a user may open a memo application of the mobile phone in one window, and open a gallery application of the mobile phone in another window. In this process, there is no simple and efficient manner currently of switching from one mobile phone window to a plurality of windows on the PC to better use a large screen of the PC.

SUMMARY

This application provides a window display method, a window switching method, an electronic device, and a system. The window display method may display interfaces of a plurality of applications in one window in a manner of tabs, which can implement quick switching from "a single window" to "a plurality of windows", better use a large screen of a PC, and provide a user with experience of using mobile phone applications on the PC.

According to a first aspect, a window display method is provided. The method includes: A first electronic device displays a first window, where the first window includes a first tab and a second tab; the first electronic device receives first interface information of a first application that is sent by a second electronic device; the first electronic device displays a first interface in the first window according to the first interface information; when displaying the first interface in the first window, the first electronic device receives a first operation on the second tab; in response to the first operation on the second tab, the first electronic device receives second interface information of a second application that is sent by the second electronic device; and the first electronic device displays a second interface in the first window according to the second interface information, where the first application and the second application run in the second electronic device.

Optionally, the first operation may be an operation of clicking the second tab.

Optionally, in this embodiment of this application, a PC is used as the first electronic device, a mobile phone is used as the second electronic device, and one or more windows of the mobile phone are displayed on the PC as an example to describe a multi-screen collaboration process. It should be understood that, in this embodiment of this application, a connection has been established between the mobile phone and the PC. For example, the connection between the mobile phone and the PC may include a plurality of different connections such as a wired connection or a wireless connection. Optionally, the mobile phone and the PC may be connected by a USB data cable, or the mobile phone and the PC may be connected by establishing a Wi-Fi. Alternatively, through a function that the mobile phone and the PC support near field communication (NFC), the mobile phone and the PC are connected to each other through a "touch" function. Alternatively, the mobile phone and the PC are connected by scanning a code through Bluetooth and the like. Alternatively, with development of communications technologies, communication bandwidths and rates increase gradually, and data may be transferred between the mobile phone and the PC without establishing a near field communication connection. This is not limited in this embodiment of this application.

In a possible display manner, a plurality of application interfaces may be displayed in a form of tabs in a multi-screen collaboration window.

In another possible manner, different running interfaces of a same application may also be distinguished by using tabs. That is, an interface corresponding to a first tab is a memo main interface, and an interface corresponding to a second tab is a secondary interface entered by a user clicking the memo main interface.

Specifically, one tab corresponds to one application as an example. That is, different running interfaces of a same application are all displayed in an interface corresponding to one tab. In this embodiment of this application, one tab corresponds to one application as an example for description. This is not limited in this embodiment of this application.

Optionally, the first application and the second application may be applications running in a background of the mobile phone, or one of the applications may run in a foreground of the mobile phone. This is not limited in this embodiment of this application.

It should be noted that, in this embodiment of this application, the user operation may be an operation performed by the user through a peripheral input device of the PC such as a mouse or a keyboard, for example, an operation of click, double-click, right-click, or the like performed by the user through a mouse. Alternatively, for a PC having a touch display, the user operation may be a touch operation, a click operation, a slide operation, or the like on the display. A type and a manner of the user operation are not limited in this embodiment of this application.

According to the foregoing solution, in multi-screen collaboration between a mobile phone and a PC, a window, namely, a multi-screen collaboration window, is displayed on a display of the PC, and one or more applications installed in the mobile phone are enabled and run in the multi-screen collaboration window. In addition, a plurality of applications of the mobile phone may be displayed in the multi-screen collaboration window in a form of tabs, and a user may click a tab of any application, so that the multi-screen collaboration window skips to display a running interface of the application. When a lot of applications run in the background of the mobile phone, tabs of some of the plurality of applications may be alternatively signed in a more button, and the user may click the more button to further display a list of all applications running in the background. A user may quickly switch, through a tab, the list of applications in the more button, or the like, from a currently used application to any other application running in the background, and a running interface of the application selected by the user may be displayed in the multi-screen collaboration window. The method is easy to operate, and a user may quickly switch from a currently used application to another application running in the background, thereby improving operation efficiency and enhancing user experience. With reference to the first aspect, in some implementations of the first aspect, the method further includes: When displaying the second interface in the first window, the first electronic device receives a second operation on the first tab; in response to the second operation on the first tab, the first electronic device receives the first interface information sent by the second electronic device; and the first electronic device displays the first interface in the first window according to the first interface information.

Optionally, the second operation may be an operation of clicking the first tab.

For example, a user may click a tab of each application, so that a current area that displays a mobile phone interface displays an application interface corresponding to the tab, and the application tab clicked by the user is displayed in a highlighted status, which is alternatively referred to as a "selected status", a "focus status", or the like.

With reference to the first aspect and the foregoing implementations, in some implementations of the first aspect, the method further includes: When displaying the first interface in the first window, the first electronic device receives a third operation on the first tab; and in response to the third operation on the first tab, the first electronic device displays the second interface in the first window, and displays the first interface in a second window, where the first window and the second window are different windows displayed on the first electronic device. Optionally, the third operation may be an operation of selecting the first tab and dragging the first tab.

With reference to the first aspect and the foregoing implementations, in some implementations of the first aspect, after the first interface is displayed in the second window, the first window does not include the first tab.

According to the foregoing solution, a user may switch, in a manner of selecting and dragging any application tab in a tab area, an application corresponding to the tab from a main window to an independent sub-window, and a running interface of the application may be displayed in the independent sub-window. The method is easy to operate, and may quickly implement switching from "a single window" to "a plurality of windows", better use a large screen of the PC in a display manner of "a main window+a plurality of sub-windows" on the PC, and provide a user with experience of using mobile phone applications on the PC. Moreover, during switching of a window, a process of a running application is not interrupted, thereby improving user experience.

With reference to the first aspect and the foregoing implementations, in some implementations of the first aspect, the method further includes: When displaying the first interface in the first window, the first electronic device receives a fourth operation on the second tab; and in response to the fourth operation on the second tab, the first electronic device displays the first interface in the first window, and displays the second interface in a second window, where the first window and the second window are different windows displayed on the second electronic device.

Optionally, the fourth operation may be an operation of selecting the second tab and dragging the second tab.

With reference to the first aspect and the foregoing implementations, in some implementations of the first aspect, after the second interface is displayed in the second window, the first window does not include the second tab.

With reference to the first aspect and the foregoing implementations, in some implementations of the first aspect, the first window includes a close button, and the method further includes: The first electronic device receives a click operation on the close button, and the first electronic device closes the first window in response to the click operation on the close button.

It should be understood that a user may switch, in a manner of selecting and dragging any application tab in a tab area, an application corresponding to the tab from a main window to an independent sub-window, and a running interface of the application may be displayed in the independent sub-window. The tab may be a tab in a selected status that is being displayed in the multi-screen collaboration window, or may be a tab in a non-selected status. That is, the application of the tab may run in the foreground, or may run in the background.

With reference to the first aspect and the foregoing implementations, in some implementations of the first aspect, when the first window is closed, the method further includes: The first electronic device closes the second window.

It should be understood that, before the close button of the multi-screen collaboration window is clicked, a user may be inquired through pop-up windows whether to close other windows except the operated window. When the user agrees, all the windows are closed.

Optionally, a same button included in function areas of the main window and the sub-window may have different functions or a same function.

In a possible manner, some buttons in the main window may have functions of controlling the main window and the sub-window, and the buttons in the sub-window have only functions of controlling the sub-window. Alternatively, for a same button, the button in the main window and the button in the sub-window have a same function.

With reference to the first aspect and the foregoing implementations, in some implementations of the first aspect, the method further includes: The first electronic device receives a fifth operation of moving a first file to a target window, where the first file is a file stored in the first electronic device, and the target window is the first window or the second window; and if an interface displayed in the target window is the first interface, the first electronic device copies the first file to the first application in response to the fifth operation; or if an interface displayed in the target window is the second interface, the first electronic device copies the first file to the second application in response to the fifth operation.

Optionally, the fifth operation may be an operation of selecting the first file and dragging the first file to the first window or the second window.

In conclusion, through the file sharing method provided in this embodiment of this application, file sharing may be implemented between a mobile phone and a PC and between different applications of the mobile phone, and the process is easy to operate. A file, a photo, or the like may be transferred by a simple drag operation. Users such as white collars and students who often use both a PC and a mobile phone may focus only on a screen of the PC and access data of the mobile phone through the PC in a use process, without frequently switching between the PC and the mobile phone. This greatly improves user's working and learning efficiency.

It should be understood that the first file selected by the user above may include a plurality of photos, and a drag operation may be performed on the plurality of photos at the same time; or the user may select different types of files such as a photo, a document, and a table, and perform a drag operation at the same time. A type and a quantity of files selected by the user are not limited in this embodiment of this application. With reference to the first aspect and the foregoing implementations, in some implementations of the first aspect, when the first electronic device displays the first window and the second window, the method further includes: The first electronic device receives a sixth operation of moving a second file displayed in the first window to the second window; and if an interface displayed in the second window is the first interface, the first electronic device copies the first file to the first application in response to the sixth operation; or if an interface displayed in the second window is the second interface, the first electronic device copies the first file to the second application in response to the sixth operation.

Optionally, the sixth operation may be an operation of selecting the second file and dragging the second file to the second window.

With reference to the first aspect and the foregoing implementations, in some implementations of the first aspect, the method further includes: The first electronic device displays a multi-task interface in the first window, where the multi-task interface includes at least one application card, the application card includes a third application card, and the third application card corresponds to a third application; the first electronic device receives a seventh operation on the third application card; in response to the seventh operation, the first electronic device receives third interface information of the third application that is sent by the second electronic device; and the first electronic device displays a third interface of the third application in a third window according to the third interface information, where the third window and the first window are different windows on the second electronic device.

Optionally, the seventh operation may be an operation of selecting the third application card and dragging the third application card.

With reference to the first aspect and the foregoing implementations, in some implementations of the first aspect, when the first electronic device displays the third interface in the first window or the second window, the method further includes: The first electronic device displays prompt information in response to the seventh operation on the third application card, where the prompt information is used for prompting a user that the third application has been displayed.

On a multi-task interface, by selecting and dragging any application card on the multi-task interface, an application corresponding to the card is switched from a main window to an independent sub-window, and a running interface of the application is displayed in the independent sub-window. The method is easy to operate, and may quickly implement switching from "a single window" to "a plurality of windows", better use a large screen of the PC in a display manner of "a main window+a plurality of sub-windows" on the PC, and provide a user with experience of using mobile phone applications on the PC. Moreover, during switching of a window, a process of a running application is not interrupted, thereby improving user experience.

In a possible scenario, when a user places a mouse again on a music application card in a multi-task switching interface, another reminder window may be automatically displayed, to prompt the user that "the music application card has been opened in a new window". That is, for an application that has been opened in an independent sub-window, when a user opens the application again by using a same method, the user may be prompted, in a manner of a reminder window, that the window has been displayed in a new window. The method may avoid a misoperation of a user, thereby improving user experience.

With reference to the first aspect and the foregoing implementations, in some implementations of the first aspect, the first window includes a shortcut button, and when the second tab and the second interface corresponding to the second tab are displayed in the first window, the method further includes: If the second electronic device detects a click operation on the shortcut button, the second electronic device automatically displays the second interface in the third window in response to the click operation, where the first window does not include the first tab, and the first window and the third window are different windows on the second electronic device.

With reference to the first aspect and the foregoing implementations, in some implementations of the first aspect, when the first window displays a main interface of the first electronic device, the shortcut button is displayed in a gray unavailable status.

With reference to the first aspect and the foregoing implementations, in some implementations of the first aspect, the method further includes: The first electronic device receives a user's operation of enabling the third application, and in response to the operation, enables the third application and displays the third interface of the third application; the first electronic device determines display content information of the third interface and sends the display content information to the second electronic device; and the second electronic device displays a third tab and the third interface corresponding to the third tab in the first window according to the received display content information of the third interface.

In conclusion, embodiments of this application describe a plurality of methods for displaying a multi-screen collaboration window. Through the multi-screen collaboration window, a user may enable one or more applications on a mobile phone, a plurality of applications of the mobile phone may be displayed in the multi-screen collaboration window in a form of tabs, and the user may click a tab of any application, so that the multi-screen collaboration window skips to display an application interface corresponding to the tab. Compared with an existing multi-screen collaboration process, only a currently running application may be displayed in a multi-screen collaboration window, and if a user needs to switch from a current application to another application of a background, the user may enter a multi-task page of a mobile phone through a multi-task button, and then select a target application desired to be switched, so operation steps are complex and user experience is poor in this process. The method provided in this embodiment of this application is easy to operate, and a user may quickly switch from a currently used application to another application running in a background, thereby improving operation efficiency and enhancing user experience.

Moreover, this embodiment of this application further provides a window switching method. A user may select and drag a tab in a tab area, or select and drag an application name hidden in a "more" button, or select and drag any application card on a multi-task interface, to display any application of a mobile phone on an interface of a PC in a form of an independent sub-window The method is easy to operate, and may quickly implement switching from "a single window" to "a plurality of windows", better use a large screen of the PC in a display manner of "a main window+a plurality of sub-windows" on the PC, and provide a user with experience of using mobile phone applications on the PC. Moreover, during switching of a window, a process of a running application is not interrupted, thereby improving user experience.

Furthermore, in a multi-screen collaboration process, for a plurality of different scenarios in which a user performs an operation on a mobile phone and a PC separately, the background of the mobile phone may obtain the operation of the user, distinguish, according to the operation of the user, an operation object, namely, an application which performs the corresponding operation, and then determine a running status of the application and a window display status, so as to obtain an operation result that better conforms to an expectation of the user.

Finally, this embodiment of this application further provides a file sharing method. The method may implement file sharing between a mobile phone and a PC and between different applications of the mobile phone, and the process is easy to operate. A file, a photo, or the like may be transferred by a simple drag operation. Users such as white collars and students who often use both a PC and a mobile phone may focus only on a screen of the PC and access data of the mobile phone through the PC in a use process, without frequently switching between the PC and the mobile phone. This greatly improves user's working and learning efficiency.

According to a second aspect, a window display method is provided. The method includes: A first electronic device receives interface information of a main interface that is sent by a second electronic device; the first electronic device displays the main interface in a first window according to the interface information of the main interface, where the main interface includes an application icon of at least one application, and the at least one application is installed on the second electronic device; the first electronic device receives a first operation on a first application icon, where the application icon of the at least one application includes the first application icon; in response to the first operation, the first electronic device displays an option used for enabling a first application in a second window; the first electronic device receives a second operation on the option; and in response to the second operation, the first electronic device displays an interface of the first application in the second window, where the first window and the second window are different windows on the second electronic device.

With reference to the second aspect, in some implementations of the second aspect, a maximum quantity of windows displayed by the first electronic device is N, where N is an integer greater than or equal to 2. The method further includes: When a quantity of windows displayed by the first electronic device is N, the first electronic device displays prompt information in response to the second operation, where the prompt information is used for prompting a user that the quantity of windows displayed in a display area of the first electronic device has reached the maximum quantity.

According to a third aspect, a window display system is provided. The system includes a first electronic device and a second electronic device that communicate with each other. The first electronic device is configured to: display a first window, where the first window includes a first tab and a second tab; receive first interface information of a first application that is sent by the second electronic device; display a first interface in the first window according to the first interface information; when displaying the first interface in the first window, receive a first operation on the second tab; in response to the first operation on the second tab, receive second interface information of a second application that is sent by the second electronic device; and display a second interface in the first window according to the second interface information, where the first application and the second application run in the second electronic device. The second electronic device is configured to: send the first interface information of the first application to the first electronic device; and send the second interface information of the second application to the first electronic device.

With reference to the third aspect, in some implementations of the third aspect, the first electronic device is further configured to: when displaying the second interface in the first window, receive a second operation on the first tab; in response to the second operation on the first tab, receive the first interface information sent by the second electronic device; and display the first interface in the first window according to the first interface information. The second electronic device is configured to send the first interface information to the first electronic device.

With reference to the third aspect and the foregoing implementations, in some implementations of the third aspect, the first electronic device is further configured to:

when displaying the first interface in the first window, receive a third operation on the first tab; and in response to the third operation on the first tab, display the second interface in the first window, and display the first interface in a second window, where the first window and the second window are different windows displayed on the first electronic device.

With reference to the third aspect and the foregoing implementations, in some implementations of the third aspect, after the first interface is displayed in the second window, the first window does not include the first tab.

With reference to the third aspect and the foregoing implementations, in some implementations of the third aspect, the first electronic device is further configured to: when displaying the first interface in the first window, receive a fourth operation on the second tab; and in response to the fourth operation on the second tab, display the first interface in the first window, and display the second interface in a second window, where the first window and the second window are different windows displayed on the first electronic device.

With reference to the third aspect and the foregoing implementations, in some implementations of the third aspect, after the second interface is displayed in the second window, the first window does not include the second tab.

With reference to the third aspect and the foregoing implementations, in some implementations of the third aspect, the first window includes a close button, and the first electronic device is further configured to: receive a click operation on the close button, and close the first window in response to the click operation on the close button.

With reference to the third aspect and the foregoing implementations, in some implementations of the third aspect, when closing the first window, the first electronic device is further configured to close the second window.

With reference to the third aspect and the foregoing implementations, in some implementations of the third aspect, the first electronic device is further configured to: receive a fifth operation of moving a first file to a target window, where the first file is a file stored in the first electronic device, and the target window is the first window or the second window; and if an interface displayed in the target window is the first interface, copy the first file to the first application in response to the fifth operation; or if an interface displayed in the target window is the second interface, copy the first file to the second application in response to the fifth operation.

With reference to the third aspect and the foregoing implementations, in some implementations of the third aspect, when the first electronic device displays the first window and the second window, the first electronic device is further configured to: receive a sixth operation of moving a second file displayed in the first window to the second window; and if an interface displayed in the second window is the first interface, copy the first file to the first application in response to the sixth operation; or if an interface displayed in the second window is the second interface, copy the first file to the second application in response to the sixth operation.

With reference to the third aspect and the foregoing implementations, in some implementations of the third aspect, the first electronic device is further configured to: display a multi-task interface in the first window, where the multi-task interface includes at least one application card, the application card includes a third application card, and the third application card corresponds to a third application; receive a seventh operation on the third application card; in response to the seventh operation, receive third interface information of the third application that is sent by the second electronic device; and display a third interface of the third application in a third window according to the third interface information, where the third window and the first window are different windows on the second electronic device. The second electronic device is configured to send the third interface information of the third application to the first electronic device.

With reference to the third aspect and the foregoing implementations, in some implementations of the third aspect, when the first electronic device displays the third interface in the first window or the second window, the first electronic device is further configured to display prompt information in response to the seventh operation on the third application card, where the prompt information is used for prompting a user that the third application has been displayed.

According to a fourth aspect, a window display system is provided. The system includes a first electronic device and a second electronic device that communicate with each other. The first electronic device is configured to: receive interface information of a main interface that is sent by the second electronic device; display the main interface in a first window according to the interface information of the main interface, where the main interface includes an application icon of at least one application, and the at least one application is installed on the second electronic device; receive a first operation on a first application icon, where the application icon of the at least one application includes the first application icon; in response to the first operation, display an option used for enabling a first application in a second window; receive a second operation on the option; and in response to the second operation, display an interface of the first application in the second window, where the first window and the second window are different windows on the second electronic device. The second electronic device is configured to send the interface information of the main interface to the first electronic device.

With reference to the fourth aspect, in some implementations of the fourth aspect, a maximum quantity of windows displayed by the first electronic device is N, where N is an integer greater than or equal to 2. The first electronic device is further configured to: when a quantity of displayed windows is N, display prompt information in response to the second operation, where the prompt information is used for prompting a user that the quantity of windows displayed in a display area of the first electronic device has reached the maximum quantity.

According to a fifth aspect, a window display method is provided. The method is applied to a system including a first electronic device and a second electronic device that communicate with each other. The method includes: The first electronic device runs a first application and determines a first interface of the first application; the first electronic device sends display content information of the first interface to the second electronic device; the second electronic device displays the first interface in a first window according to the received display content information of the first interface; if the second electronic device detects an operation of enabling a second application, the second electronic device sends, in response to the operation, an instruction for enabling the second application to the first electronic device; the first electronic device enables the second application according to the instruction and determines a second interface of the second application; the first electronic device sends display content information of the second interface to the second electronic device; and the second electronic device displays a second tab and the second interface corresponding to the second tab in the first window according to the received display content information of the second interface, where the first window further includes a first tab, and the first tab corresponds to the first interface running in a background.

With reference to the fifth aspect, in some implementations of the fifth aspect, the method further includes: if the second electronic device detects a click operation on the first tab, displaying, in response to the click operation, the first tab and the first interface corresponding to the first tab in the first window, where the first window further includes the second tab, and the second tab corresponds to the second interface running in the background.

With reference to the fifth aspect and the foregoing implementations, in some implementations of the fifth aspect, the method further includes: If the second electronic device detects a long-press operation on the first tab, a floating window of the first interface is displayed in response to the long-press operation; and if the second electronic device detects a user's operation of dragging the first tab to a first position for release, in response to the operation, the floating window of the first interface moves to the first position along with a trajectory of dragging the first tab by the user, the second electronic device displays the first interface in a second window, and the first window does not include the first tab, where the first window and the second window are different windows on the second electronic device, and the first position is any position on the second electronic device except an area where the first window is located.

With reference to the fifth aspect and the foregoing implementations, in some implementations of the fifth aspect, the method further includes: If the second electronic device detects a user's operation of enabling the first application, in response to the operation, the second electronic device switches the second window to an uppermost layer for display, or the second electronic device displays the second window in a flicker status; or if the second electronic device detects a user's operation of enabling the second application, in response to the operation, the second electronic device switches the first window to an uppermost layer for display and the first window displays the second interface, or the second electronic device displays the first window in a flicker status and the first window displays the second interface.

With reference to the fifth aspect and the foregoing implementations, in some implementations of the fifth aspect, the first window includes a first display area and a first function area, the first function area includes one or more buttons used for controlling the first window, the second window includes a second display area and a second function area, the second function area includes one or more buttons used for controlling the second window, and the method further includes: The first electronic device receives a user's screen lock operation, and in response to the screen lock operation, enters a screen lock status and displays a screen lock interface; the first electronic device determines display content information of the screen lock interface and sends the display content information to the second electronic device; and the second electronic device switches, according to the received display content information of the screen lock interface, both the first display area and the second display area on the second electronic device to a locked and unavailable status.

With reference to the fifth aspect and the foregoing implementations, in some implementations of the fifth aspect, the first function area includes a first close button, the second function area includes a second close button, and the method further includes: If the second electronic device detects a click operation on the first close button, the second electronic device displays second prompt information in response to the click operation, where the second prompt information is used for prompting the user to authorize the second electronic device to close the first window and the second window; when detecting a user's authorized operation, the second electronic device closes both the first window and the second window in response to the authorized operation; or if the second electronic device detects a click operation on the second close button, the second electronic device closes the second window and continues to display the first window in response to the click operation.

With reference to the fifth aspect and the foregoing implementations, in some implementations of the fifth aspect, the method further includes: if the second electronic device detects a user's operation of selecting a target file and dragging the target file to the first window for release, copying the target file to the second application in response to the operation, where the target file is a file displayed on the first interface in the second window, or the target file is a file locally stored in the second electronic device.

With reference to the fifth aspect and the foregoing implementations, in some implementations of the fifth aspect, a maximum quantity of windows displayed in the display area of the second electronic device is N, where N is an integer greater than or equal to 2. When the display area of the second electronic device displays the first window and N−1 second windows, and the first window displays a third tab and a third interface corresponding to the third tab, the method further includes: if the second electronic device detects a first operation on the third tab, displaying first prompt information in response to the first operation, where the first prompt information is used for prompting the user that the quantity of windows displayed in the display area of the second electronic device has reached the maximum quantity.

With reference to the fifth aspect and the foregoing implementations, in some implementations of the fifth aspect, the method further includes: If the second electronic device detects a user's operation of enabling a multi-task interface in the first window, the first window displays the multi-task interface in response to the operation of enabling the multi-task interface, where the multi-task interface includes at least a card of the second application; or if the second electronic device detects a long-press operation on the card of the second application, a floating window of the second interface is displayed in response to the long-press operation; if the second electronic device detects a user's operation of dragging the card of the second application to a second position for release, in response to the operation, a floating window of the second interface moves to the second position along with a trajectory of dragging the card of the second application by the user, the second electronic device displays the second interface in a third window, and the first window does not include the second tab, where the first window and the third window are different windows on the second electronic device, and the second position is any position on the second electronic device except an area where the first window is located.

With reference to the fifth aspect and the foregoing implementations, in some implementations of the fifth aspect, when the second electronic device displays the second interface in the third window, the method further includes: if the second electronic device detects a second operation on the card of the second application on the multi-task interface of the first window, displaying the second prompt information in response to the second operation, where the second prompt information is used for prompting the user that the second application has been displayed in the third window.

With reference to the fifth aspect and the foregoing implementations, in some implementations of the fifth aspect, the first window includes a shortcut button, and when the second tab and the second interface corresponding to the second tab are displayed in the first window, the method further includes: If the second electronic device detects a click operation on the shortcut button, the second electronic device automatically displays the second interface in the third window in response to the click operation, where the first window does not include the first tab, and the first window and the third window are different windows on the second electronic device.

With reference to the fifth aspect and the foregoing implementations, in some implementations of the fifth aspect, when the first window displays a main interface of the first electronic device, the shortcut button is displayed in a gray unavailable status.

With reference to the fifth aspect and the foregoing implementations, in some implementations of the fifth aspect, the method further includes: The first electronic device receives a user's operation of enabling a third application, and in response to the operation, enables the third application and displays the third interface of the third application; the first electronic device determines display content information of the third interface and sends the display content information to the second electronic device; and the second electronic device displays the third tab and the third interface corresponding to the third tab in the first window according to the received display content information of the third interface.

According to a sixth aspect, a window display method is provided. The method is applied to a system including a first electronic device and a second electronic device that communicate with each other. The method includes: The first electronic device determines display content of a main interface, the main interface including one or more application icons; the first electronic device sends display content information of the main interface to the second electronic device; the second electronic device displays the main interface in a first window according to the received display content information of the main interface; if the second electronic device detects a first operation on a first application icon, an operation menu is displayed in response to the first operation, where the operation menu includes an interface used for prompting a user to authorize the second electronic device to display a first application through a second window, the first window and the second window are different windows on the second electronic device, and the first application icon is any application icon on the main interface; and when detecting a user's authorization operation, the second electronic device displays an interface of the first application in the second window in response to the authorization operation.

With reference to the sixth aspect, in some implementations of the sixth aspect, a maximum quantity of windows displayed in a display area of the second electronic device is N, where N is an integer greater than or equal to 2. When the display area of the second electronic device displays the first window and N−1 second windows, the method further includes: if the second electronic device detects a first operation on a second application icon, displaying first prompt information in response to the first operation, where the first prompt information is used for prompting the user that the quantity of windows displayed in the display area of the second electronic device has reached the maximum quantity.

According to a seventh aspect, this application provides an apparatus. The apparatus is included in an electronic device, and the apparatus has a function of implementing behavior of the electronic device in the foregoing aspects and the possible implementations of the foregoing aspects. The function may be implemented by hardware, or may be implemented by executing corresponding software by hardware. The hardware or the software includes one or more modules or units corresponding to the foregoing function, for example, a display module or unit, a detection module or unit, and a processing module or unit.

According to an eighth aspect, this application provides an electronic device, including a touchscreen. The touchscreen includes a touch-sensitive surface, a display, a camera, one or more processors, a memory, a plurality of applications, and one or more computer programs. The one or more computer programs are stored in the memory. The one or more computer programs include instructions. When the instructions are executed by the electronic device, the electronic device is enabled to perform the window display method in any possible implementation of any one of the foregoing aspects.

According to a ninth aspect, this application provides an electronic device, including one or more processors and one or more memories. The one or more memories are coupled to the one or more processors. The one or more memories are configured to store a computer program code. The computer program code includes computer instructions. When the one or more processors execute the computer instructions, the electronic device is enabled to perform the window display method in any possible implementation of any one of the foregoing aspects.

According to a tenth aspect, a system is provided. The system includes a first electronic device and a second electronic device that perform the window display method in any possible implementation of any one of the foregoing aspects.

According to an eleventh aspect, this application provides a computer storage medium, including computer instructions. When the computer instructions run on an electronic device, the electronic device is enabled to perform the window display method in any possible implementation of any one of the foregoing aspects.

According to a twelfth aspect, this application provides a computer program product. When the computer program product is run on an electronic device, the electronic device is enabled to perform the window display method in any possible implementation of any one of the foregoing aspects.

DETAILED DESCRIPTION OF ILLUSTRATIVE EMBODIMENTS

Figure 1:
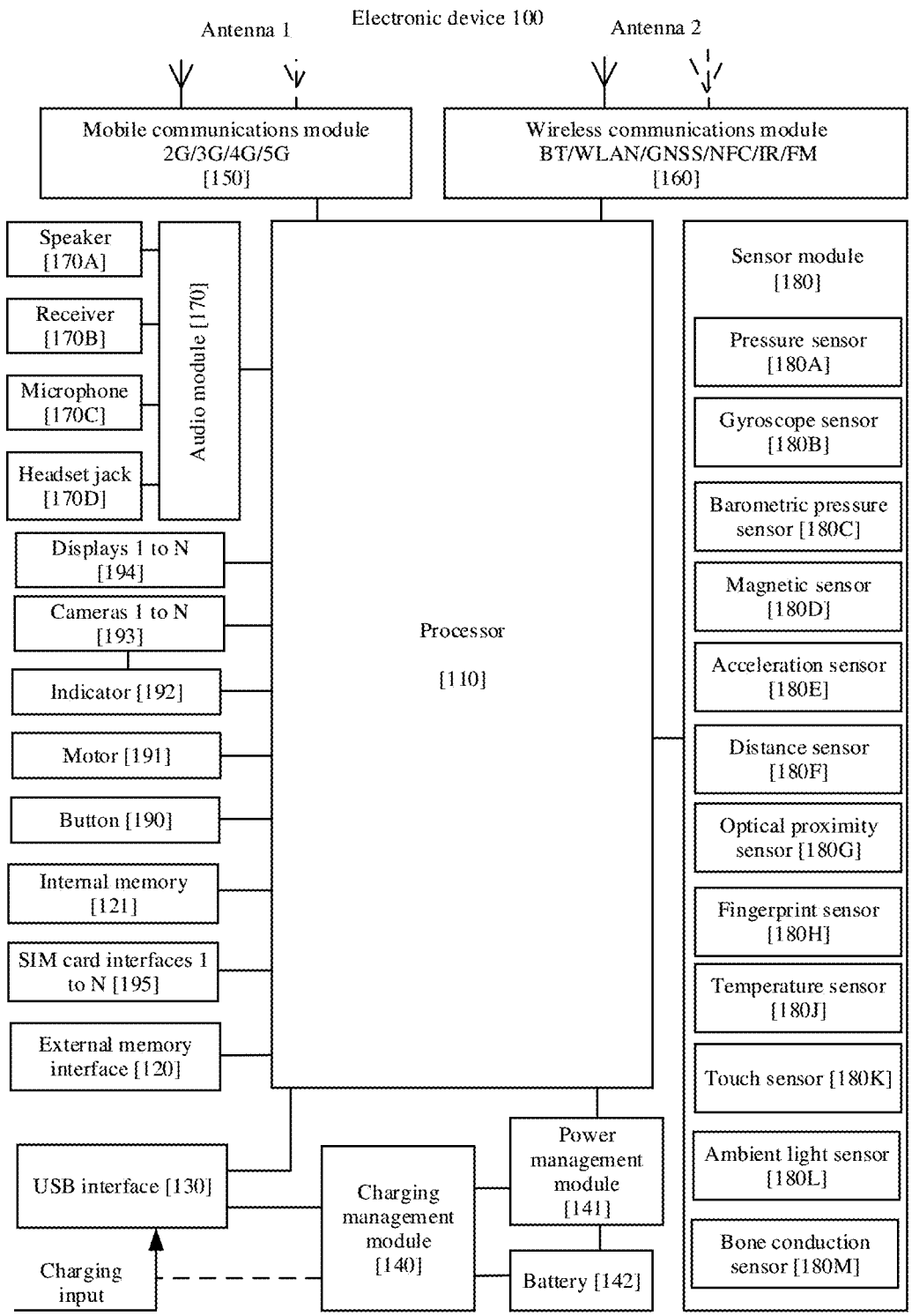
FIG. 1 is a schematic diagram of a structure of a mobile phone according to an embodiment of this application.

The following describes technical solutions in embodiments of this application with reference to accompanying drawings in embodiments of this application.

In the description of embodiments of this application, unless otherwise specified, "/" represents an "or" relationship. For example, A/B may represent A or B. "and/or" in this specification is merely an association relationship for describing associated objects, and represents that three relationships may exist. For example, A and/or B may represent the following three cases: only A exists, both A and B exist, and only B exists. In addition, in the description of embodiments of this application, "a plurality of" means "two or more".

In the following description, terms "first" and "second" are only used for distinguishing. For example, "a first electronic device" and "a second electronic device" are only used for indicating different electronic devices, "a first window" and "a second window" are only used for indicating different display windows, and "a first operation" and "a second operation" are only used for indicating operations performed at different moments or for different purposes.

Embodiments of this application provide a window display method and a window switching method. The methods may be applied to a system including two electronic devices that communicate with each other. In this application, the two electronic devices are respectively referred to as a first electronic device and a second electronic device for distinguishing, where the second electronic device may display an interface of the first electronic device. For example, the second electronic device displays a main interface of the first electronic device through one window, or the second electronic device displays interfaces of a plurality of applications of the first electronic device through a plurality of windows.

In embodiments of this application, the first electronic device may be an electronic device such as a mobile phone, a smart terminal, or a wearable device. The second electronic device may be an electronic device with a display function such as a PC, a tablet computer, a mobile phone, a smart terminal, a vehicle-mounted device, an augmented reality (AR)/virtual reality (VR) device, a notebook computer, an ultra-mobile personal computer (UMPC), a netbook, a personal digital assistant (PDA), a display, or a television. No limitation is imposed on specific types of the first electronic device and the second electronic device in embodiments of this application.

Optionally, the first electronic device and the second electronic device may be electronic devices of a same type or different types. In embodiments of this application, a mobile phone 100 is used as the first electronic device, a PC 200 is used as the second electronic device, and one or more windows of the mobile phone are displayed on the PC as an example for description.

Specifically, the method may display a plurality of windows of the mobile phone on the PC through an application (for example, a multi-screen collaboration assistant, an EMUI desktop, or the like).

For example, the application may be installed only on the PC; or the application is installed on both the mobile phone and the PC; or the application is embodied as a first application (for example, a multi-screen collaboration assistant) on the mobile phone, and is embodied as a second application (for example, an EMUI desktop) on the PC, where the first application adapts to the mobile phone, and the second application adapts to the PC; or the first application is a program code preset on the mobile phone and may not have a corresponding desktop application icon, and the second application may be embodied in a form of a desktop application icon on the PC. The method may be implemented based on a plurality of possible cases, so that on the PC, an interface of the mobile phone is displayed through one window, or a plurality of application interfaces of the mobile phone are displayed through a plurality of windows.

For example, FIG. 1 is a schematic diagram of a structure of a mobile phone 100 according to an embodiment of this application. The mobile phone 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the mobile phone 100. In some other embodiments of this application, the mobile phone 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors. The controller may be a nerve center and a command center of the mobile phone 100. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or data again, the processor may directly invoke the instructions or data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronous serial bus, and includes a serial data line (SDA) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the mobile phone 100.

The I2S interface may be configured to perform audio communication. The PCM interface may also be configured to perform audio communication, and sample, quantize, and code an analog signal. The UART interface is a universal serial data bus, and is configured to perform asynchronous communication. The bus may be a two-way communications bus. The bus converts to-be-transmitted data between serial communication and parallel communication. The MIPI interface may be configured to connect the processor 110 to a peripheral component such as the display 194 or the camera 193. The MIPI interface includes a camera serial interface (CSI), a display serial interface (DSI), and the like. The GPIO interface may be configured by software. The GPIO interface may be configured as a control signal or a data signal. The USB interface 130 is an interface that conforms to a USB standard specification, and may be specifically a mini USB interface, a micro USB interface, a USB type-C interface, or the like. The USB interface 130 may be configured to connect to another electronic device, for example, the USB interface may be configured to connect to a PC.

It may be understood that an interface connection relationship between the modules shown in this embodiment of this application is merely an example for description, and does not constitute a limitation on the structure of the mobile phone 100. In some other embodiments of this application, the mobile phone 100 may alternatively use an interface connection manner different from that in the foregoing embodiment, or use a combination of a plurality of interface connection manners.

The charging management module 140 is configured to receive a charging input from the charger.

A wireless communication function of the mobile phone 100 may be implemented through the antenna 1, the antenna 2, the mobile communications module 150, the wireless communications module 160, the modem processor, the baseband processor, and the like. The antenna 1 and the antenna 2 are configured to transmit and receive an electromagnetic wave signal. The mobile communications module 150 may provide a solution, applied to the mobile phone 100, to wireless communication including 2G, 3G, 4G, 5G, and the like. The wireless communications module 160 may provide a solution to wireless communication applied to the mobile phone 100, for example, a wireless local area network (WLAN) (for example, a wireless fidelity (Wi-Fi) network), Bluetooth (BT), a global navigation satellite system (GNSS), frequency modulation (FM), near field communication (NFC), and an infrared (IR) technology. The wireless communications module 160 may be one or more components integrating at least one communications processor module. The wireless communications module 160 receives an electromagnetic wave by the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave through the antenna 2 for radiation.

The mobile phone 100 implements a display function through the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flex light-emitting diode (fFLED), a mini-LED, a micro-LED, a micro-OLED, a quantum dot light emitting diode (QLED), or the like. In some embodiments, the mobile phone 100 may include one or N displays 194, where N is a positive integer greater than 1.

The mobile phone 100 may implement a photographing function through the ISP, the camera 193, the video codec, the GPU, the display 194, the application processor, and the like. The ISP is configured to process data fed back by the camera 193. The camera 193 is configured to capture a static image or a video. An optical image of an object is generated through the lens, and is projected onto a photosensitive element. In some embodiments, the mobile phone 100 may include one or N cameras 193, where N is a positive integer greater than 1.

The external memory interface 120 may be configured to connect to an external storage card, for example, a micro SD card, to extend a storage capability of the mobile phone 100. The internal memory 121 may be configured to store a computer-executable program code. The executable program code includes instructions. The processor 110 runs the instructions stored in the internal memory 121, to perform various function applications of the mobile phone 100 and data processing. The internal memory 121 may include a program storage area and a data storage area. The program storage area may store an operating system, an application required by at least one function (for example, a voice playing function or an image playing function), and the like.

The data storage area may store data (such as audio data and an address book) and the like created during use of the mobile phone 100.

The mobile phone 100 may implement an audio function, such as music playing or recording, through the audio module 170, the speaker 170A, the receiver 170B, the microphone 170C, the headset jack 170D, the application processor, and the like.

In addition, the mobile phone 100 further includes a plurality of sensors, such as a plurality of sensors shown in FIG. 1. The pressure sensor 180A is configured to sense a pressure signal, and may convert the pressure signal into an electrical signal. The gyroscope sensor 180B may be configured to determine a motion posture of the mobile phone 100. The barometric pressure sensor 180C is configured to measure barometric pressure. The magnetic sensor 180D includes a Hall sensor. The acceleration sensor 180E may detect a magnitude of acceleration of the mobile phone 100 in various directions (usually on three axes). When the mobile phone 100 is static, the acceleration sensor 180E may detect a value and a direction of gravity, may be further configured to recognize a posture of the mobile phone 100, and is applied to an application such as switching between landscape orientation and vertical orientation and a pedometer. The distance sensor 180F is configured to measure a distance. The optical proximity sensor 180G may include, for example, a light-emitting diode (LED) and an optical detector, for example, a photodiode. The ambient light sensor 180L is configured to sense ambient light brightness. The fingerprint sensor 180H is configured to collect a fingerprint. The temperature sensor 180J is configured to detect a temperature. The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor to determine a type of a touch event. A visual output related to the touch operation may be provided through the display 194. In some other embodiments, the touch sensor 180K may alternatively be disposed on a surface of the mobile phone 100, and is located on a position different from that of the display 194. The bone conduction sensor 180M may obtain a vibration signal. The button 190 includes a power button, a volume button, and the like. The button 190 may be a mechanical button, or may be a touch button. The mobile phone 100 may receive a key input, and generate a key signal input related to a user setting and function control of the mobile phone 100. The motor 191 may generate a vibration prompt. The indicator 192 may be an indicator light, and may be configured to indicate a charging status and a power change, or may be configured to indicate a message, a missed call, a notification, and the like. The SIM card interface 195 is configured to connect to a SIM card.

The foregoing describes a possible schematic diagram of a hardware structure when the mobile phone 100 is used as a first electronic device. As a second electronic device, the PC 200 may have all or some hardware structures shown in FIG. 1, or include more hardware structures than those shown in FIG. 1. This is not limited in this embodiment of this application.

Figure 2:
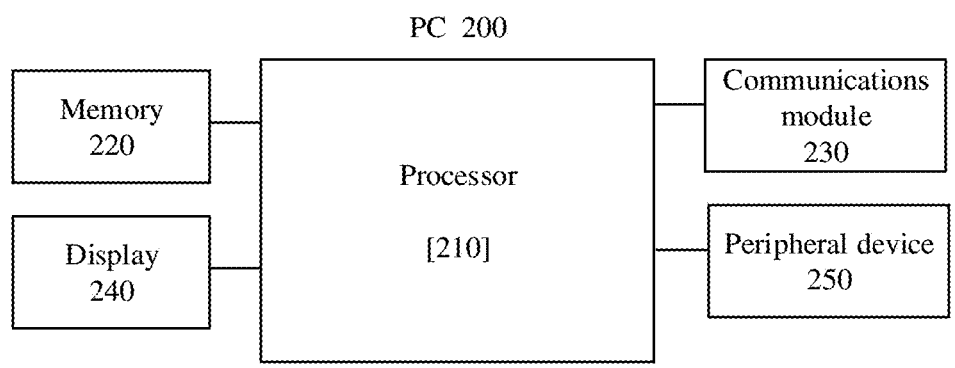
FIG. 2 is a schematic diagram of a structure of a PC according to an embodiment of this application.

For example, FIG. 2 is a schematic structural diagram of a PC 200 according to an embodiment of this application.

The PC 200 may include at least a processor 210, a memory 220, a communications module 230, a display 240, and the like.

It may be understood that the structure of the PC 200 shown in this embodiment of this application does not constitute a specific limitation on the PC 200. In some other embodiments of this application, the PC 200 may include more or fewer components than those shown in the figure, or combine some components, or split some components, or have different component arrangements. The components shown in the figure may be implemented by hardware, software, or a combination of software and hardware.

The processor 210 may include one or more processing units, and the processor 210 may be configured to control and manage an action of the PC 200. The memory 220 is configured to store program code and data. The communications module 230 may be configured for communication between the internal modules of the PC 200, communication between the PC 200 and another external device, or the like. For example, if the PC 200 communicates with another electronic device in a wired connection manner, the communications module 230 may include an interface such as a USB interface. For the USB interface, refer to the description of the USB interface 130 in FIG. 1. Alternatively, the communications module 230 may include an audio component, a radio frequency circuit, a Bluetooth chip, a wireless fidelity (wireless fidelity, Wi-Fi) chip, a near field communication (near field communication, NFC) module, and the like, and may implement interaction between the PC 200 and another electronic device. The display 240 is configured to display an image, a video, and the like.

Optionally, the PC 200 may further include a peripheral device 250 such as a mouse, a keyboard, a speaker, and a microphone.

In this embodiment of this application, the processor 210 may execute computer executable instructions stored in the memory 220, so that the PC 200 and the mobile phone 100 can form a system including electronic devices that communicate with each other, thereby displaying one or more windows of the mobile phone 100 through the display 240 of the PC 200.

Figure 3A:
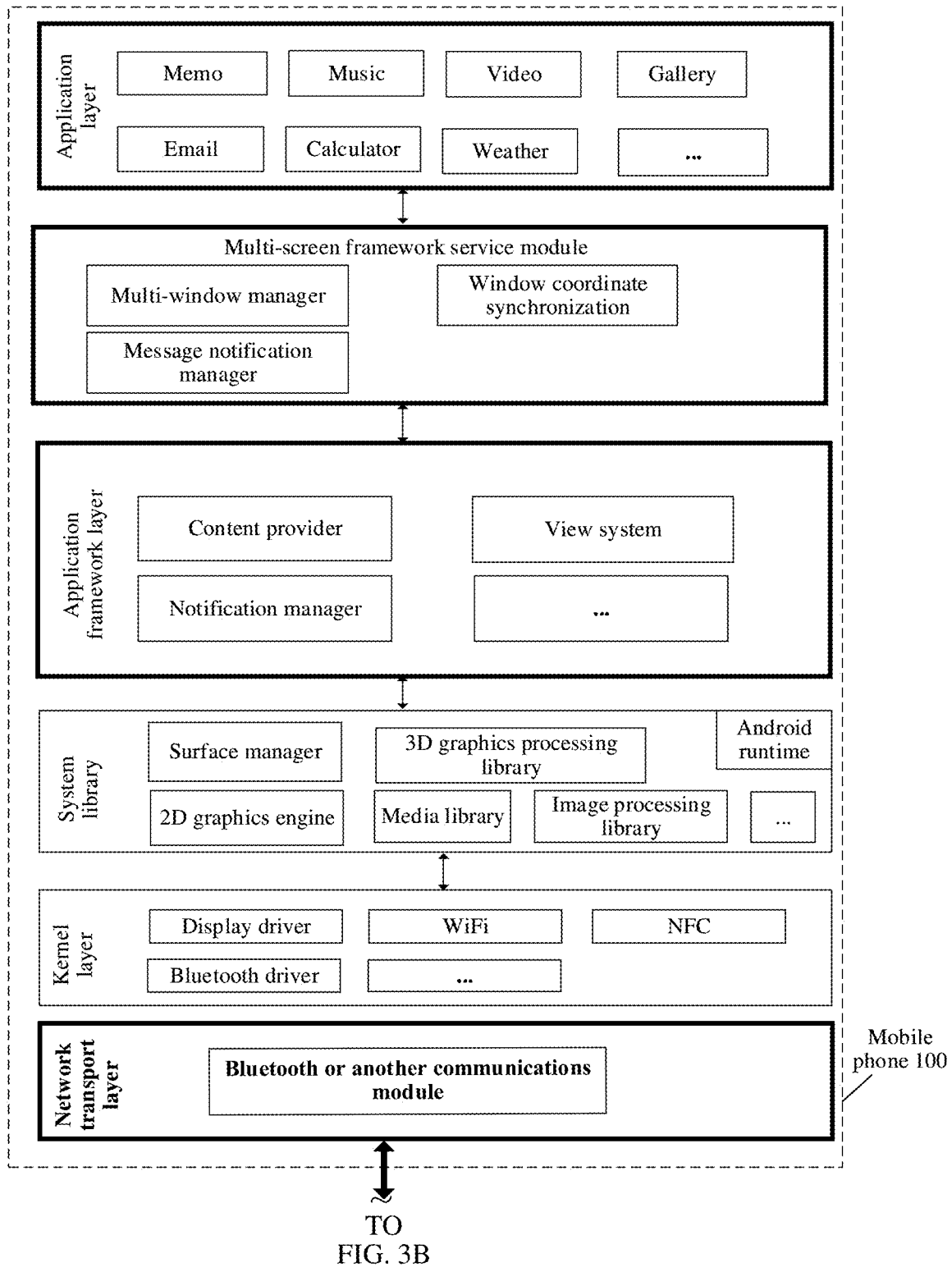
FIG. 3A and FIG. 3B are a block diagram of software structures of a mobile phone and a PC according to an embodiment of this application.
Figure 3B:
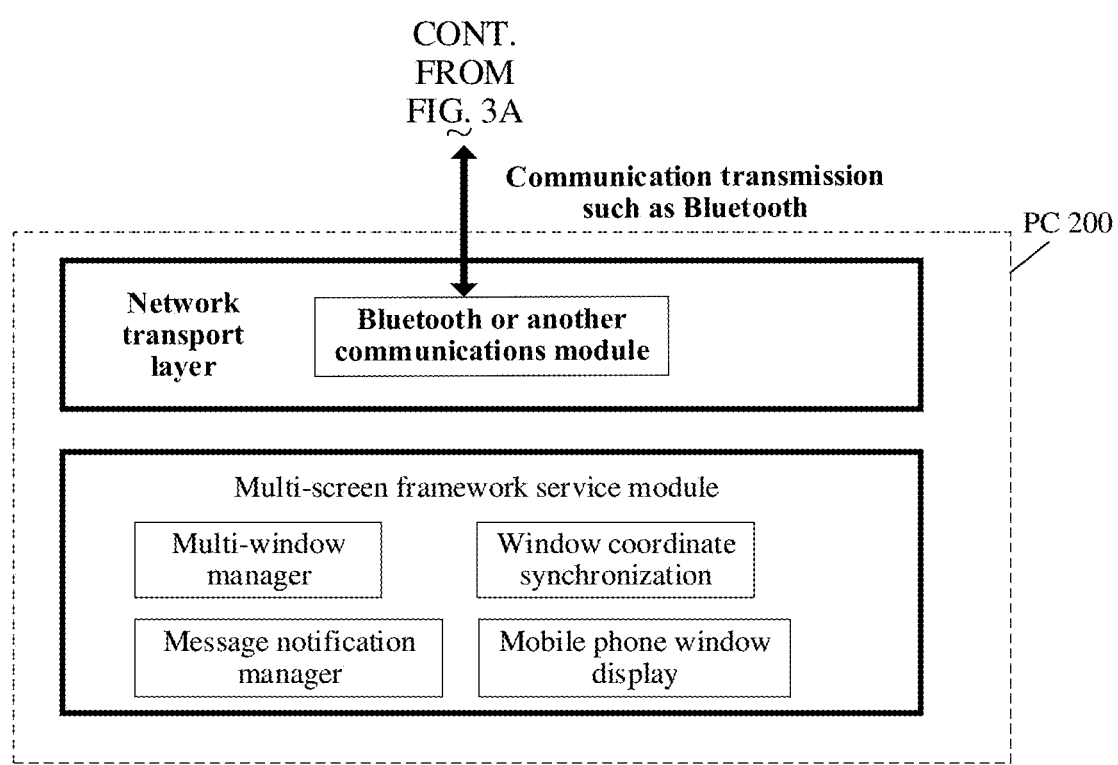

FIG. 3A and FIG. 3B are a block diagram of software structures of a mobile phone 100 and a PC 200 according to an embodiment of this application. The block diagrams include a software structure of the mobile phone 100 and a software structure of a multi-screen collaboration window module of the PC 200.

The software structure of the mobile phone 100 may use a software system such as a layered architecture, a harmony system (Harmony OS) architecture, an event-driven architecture, a microkernel architecture, a microservice architecture, or a cloud architecture of an Android® system. The software structure of the PC 200 may be a software system such as a Windows® system, a Linux® system, or a Mac® system. This is not limited in this embodiment of this application.

For example, in this embodiment of this application, a possible software structure shown in FIG. 3A and FIG. 3B is described by using an example in which the mobile phone 100 has an Android® system of a layered architecture and the PC 200 has a Windows® system.

Specifically, for the software structure of the mobile phone 100, the Android® system is used as an example. In the layered structure, software is divided into several layers, and each layer has a clear role and task. The layers communicate with each other through a software interface. In some embodiments, the Android® system includes an application (application, app) layer, an application framework (framework) layer, a system library, a kernel layer, a network transport layer, and the like from top down.

The application layer may include a series of application packages. For example, in the mobile phone 100 shown in FIG. 3A and FIG. 3B, the application layer may include applications such as Messages, Music, Videos, and Navigation. This is not limited in this embodiment of this application.

In this embodiment of this application, a multi-screen framework service layer, alternatively referred to as a "multi-screen framework service module", may be disposed at the application layer and the application framework layer. It should be understood that the multi-screen framework service module may also be divided into the application framework layer. This is not limited in this embodiment of this application.

For example, as shown in FIG. 3A, the multi-screen framework service module may include a multi-window manager, a window coordinate synchronization module, a message notification manager, and the like.

The multi-window manager is configured to manage a window program of the mobile phone 100. For example, the multi-window manager may obtain a size of a to-be-displayed window on the mobile phone 100, and determine content of the to-be-displayed window. It should be understood that the to-be-displayed window of the mobile phone 100 may include a window that is being displayed on an interface of the mobile phone 100, and may further include a window of one or more applications running in a background of the mobile phone 100.

The message notification manager may transfer a message between different applications of the mobile phone 100, a message between the mobile phone 100 and the PC 200, or the like. Details are not described in this embodiment of this application.

The window coordinate synchronization module may determine coordinates of the to-be-displayed window of the mobile phone 100 on the display of the PC 200. When a window displayed on the PC 200 is zoomed in or zoomed out, the coordinates of the window synchronously obtain new position coordinates updated after the window is zoomed in or zoomed out on the PC 200 and the like.

The application framework layer may include a plurality of service programs or some predefined functions. The application framework layer provides an application programming interface (application programming interface, API) and a programming framework for an application at the application layer.

In this embodiment of this application, as shown in FIG. 3A, the application framework layer may include a content provider, a view system, a notification manager, and the like. The content provider is configured to store and obtain data, and enable the data to be accessed by an application. The data may include different types of data such as a video, an image, and an audio. The view system includes visual controls provided for a user, for example, a control for displaying a text and a control for displaying a photo. The view system may be configured to construct an application. A display interface may include one or more views. For example, a display interface including icons of different applications may include a text display view and a photo display view. The notification manager enables an application to display notification information in a status bar, and may be configured to transfer a notification-type message. The displayed notification information may automatically disappear after a short pause and require no user interaction, accept a close operation of a user, or the like.

The system library may include a plurality of function modules, for example, a surface manager, a media library (media libraries), a 3D graphics processing library (for example, OpenGL ES), and a 2D graphics engine (for example, SGL). The surface manager is configured to manage a display subsystem of the mobile phone 100, and provide fusion of 2D and 3D graphics layers for a plurality of applications. The media library supports playback and recording in a plurality of commonly used audio and video formats, and static image files. The media library may support a plurality of audio and video encoding formats, for example, MPEG-4, H.264, MP3, AAC, AMR, JPG, and PNG. The 3D graphics processing library is configured to implement 3D graphics drawing, image rendering, composition, layer processing, and the like. The 2D graphics engine is a drawing engine for 2D drawing.

An Android runtime includes a kernel library and a virtual machine. The Android runtime is responsible for scheduling and management of the Android system.

The kernel layer is a layer between hardware and software. The kernel layer includes at least a display driver, a Bluetooth driver, a wireless fidelity (Wi-Fi) driver, a near distance communication technology (NFC) driver, and the like.

The network transport layer may be configured for communication, data transmission, and the like between different devices. For example, a Bluetooth module builds a Bluetooth channel between the mobile phone 100 and the PC 200, and transmits data, a message, an instruction, or the like through the Bluetooth channel. Details are not described herein again.

In this embodiment of this application, the mobile phone 100 and the PC 200 may communicate with each other in a plurality of different manners. For example, a connection between the mobile phone 100 and the PC 200 may include a plurality of different connection manners such as a wired connection or a wireless connection.

Optionally, a wired connection between the mobile phone 100 and the PC 200 may be a connection by using a USB data cable, or a wireless connection between the mobile phone 100 and the PC 200 may be a manner of establishing a Wi-Fi connection. In this embodiment of this application, when the connection between the mobile phone 100 and the PC 200 are a wireless connection, the kernel layer of the mobile phone 100 may include a wireless fidelity (Wi-Fi) module configured for the wireless connection of the mobile phone 100.

Alternatively, through a function that the mobile phone 100 and the PC 200 support near field communication (NFC), the mobile phone 100 and the PC 200 are connected to each other through a "touch" function. When the connection between the mobile phone 100 and the PC 200 is an NFC connection, the kernel layer may further include a near-field wireless communication technology (NFC) module, configured to implement the connection between the mobile phone 100 and the PC 200 through NFC.

Alternatively, the mobile phone 100 and the PC 200 are connected by scanning a code through Bluetooth and the like.

Alternatively, with development of communications technologies, communication bandwidths and rates increase gradually, and data may be transmitted between the mobile phone 100 and the PC 200 without establishing a near-field communication connection. For example, with popularization of a high-speed communications manner such as a future 5th generation (5G) mobile communications system, for the mobile phone 100 and the PC 200, a window of the mobile phone 100 may be displayed on the PC 200 through 5G communication. For example, data is transmitted through a 5G communications network by installing different applications or a same application on the mobile phone 100 and the PC 200.

It should be understood that a manner of establishing a connection between the mobile phone 100 and the PC 200 is not limited in this embodiment of this application.

In conclusion, the application framework layer may implement functions such as link discovery and MSDP service invoking between the PC 200 and the mobile phone 100. In addition, a multi-screen framework service at the application framework layer may further implement functions such as file dragging and sharing between the PC 200 and the mobile phone 100, display in a single windowed mode, and coordinated application lifecycle management. For file dragging and sharing between the PC 200 and the mobile phone 100 and display of one window of the mobile phone 100 by the PC 200, refer to an existing solution. Details are not described herein. Coordinated application lifecycle management is a software tool used to configure and manage an application, and specifies a lifecycle of the application and the like.

FIG. 3A and FIG. 3B further show a network transport layer and a multi-screen framework service module of the PC 200 that participate in this embodiment of this application. After the PC 200 is connected to the mobile phone 100, the network transport layer is configured to establish a connection to the mobile phone 100, and the multi-screen framework service module is configured to display one or more windows of the mobile phone 100.

It should be understood that the PC 200 may include a multi-layer architecture, such as a pre-research layer, a PC software layer, an operating system (OS) layer, and a basic read only memory (ROM) multi-screen framework layer. An executable file (exe) may run at the PC software layer. For example, in this application, an exe program used for the multi-screen framework service module may be preset in the PC 200. The exe program of the multi-screen framework service module may be embodied in a form of an app on the PC 200, or the exe program of the multi-screen framework service module is run, so that the PC 200 has a function of displaying a window of the mobile phone 100. In this application, a function module provided by the PC 200 for displaying a window of the mobile phone 100 is referred to as the "multi-screen framework service module". The following focuses on the multi-screen framework service module configured for displaying a window of the mobile phone 100 on the PC 200.

The multi-screen framework service module of the PC 200 may provide a function of a related service corresponding to the multi-screen framework service module of the mobile phone 100. The multi-screen framework service module may also include a multi-window manager, a message notification manager, a mobile phone window display, and the like. The multi-window manager may receive information of a mobile phone window and display one or more mobile phone windows. The information of the mobile phone window may include coordinate information of the mobile phone window, display content information of the mobile phone window, and the like. The multi-window manager may determine, according to the coordinate information of the mobile phone window, to display one or more windows of the mobile phone 100 on the display of the PC 200.

The mobile phone window display performs display on the display of the PC 200 according to the display content information of the mobile phone window, and the mobile phone window display may be configured to display one or more windows of the mobile phone 100.

The message notification manager may be configured to display notification information on the PC 200, for example, display the notification information in a manner of a message pop-up window, an alert tone, or the like.

The window coordinate synchronization module may be configured to determine coordinates and an area on the display of the PC 200 for the multi-screen collaboration window.

It should be understood that, after a link is established between the PC 200 and the mobile phone 100, a data transmission process may be performed. The transmitted data may include related data of interface content, and may further include an intent-type instruction, for example, an operation instruction of a "touch event" (for example, an instruction of an event such as start, close, move, drag, click, double-click, right-click, or zoom in/out). The transmitted data may further include a resolvable data format defined between the Pc 200 and the mobile phone 100 and the like. This is not limited in this embodiment of this application.

It should be further understood that, in addition to the plurality of layers shown in FIG. 3A and FIG. 3B and the plurality of function modules included, the mobile phone 100 and the PC 200 may further have different division manners or include more function modules. This is not limited in this embodiment of this application.

For ease of understanding, the mobile phone 100 having the hardware structure shown in FIG. 1 and the software architecture shown in FIG. 3A and FIG. 3B, and the PC 200 having the software structures shown in FIG. 2 and FIG. 3A and FIG. 3B are used as an example in the following embodiment to describe a window display method in this embodiment of this application. The following specifically describes the method with reference to the accompanying drawings and an application scenario.

FIG. 4A to FIG. 4G are a schematic diagram of an interface of a PC according to an embodiment of this application.

It should be understood that, in this embodiment of this application, the mobile phone 100 and the PC 200 may establish a connection or transmit data in any communication manner described in the foregoing related content in FIG. 3A and FIG. 3B. Details are not described herein again.

It should be further understood that, in this embodiment of this application, a window, displayed on the PC 200, of a main interface of the mobile phone may be referred to as a "main window", a "multi-screen collaboration window", or a "mobile phone window". In the main window, an application window may also be opened. Another window that is independent of the "main window" on the PC 200 and is used for displaying an interface of an application running on the mobile phone is referred to as a "sub-window" or a "XXX application window".

In addition, it should be further understood that "collaboration" in the "multi-screen collaboration window" in this embodiment of this application does not impose the following limitation: Display of the main window on the PC 200 is consistent with display of the main interface of the mobile phone 100. That is, display content of the multi-screen collaboration window may be the same as or different from that of the main interface of the mobile phone 100. When a user runs any application of the mobile phone 100 on the PC 200, the application runs in the background of the mobile phone 100, and display content of the screen of the mobile phone 100 is not affected. Content displayed on the mobile phone 100 is not limited in this embodiment of this application.

Figure 4A:
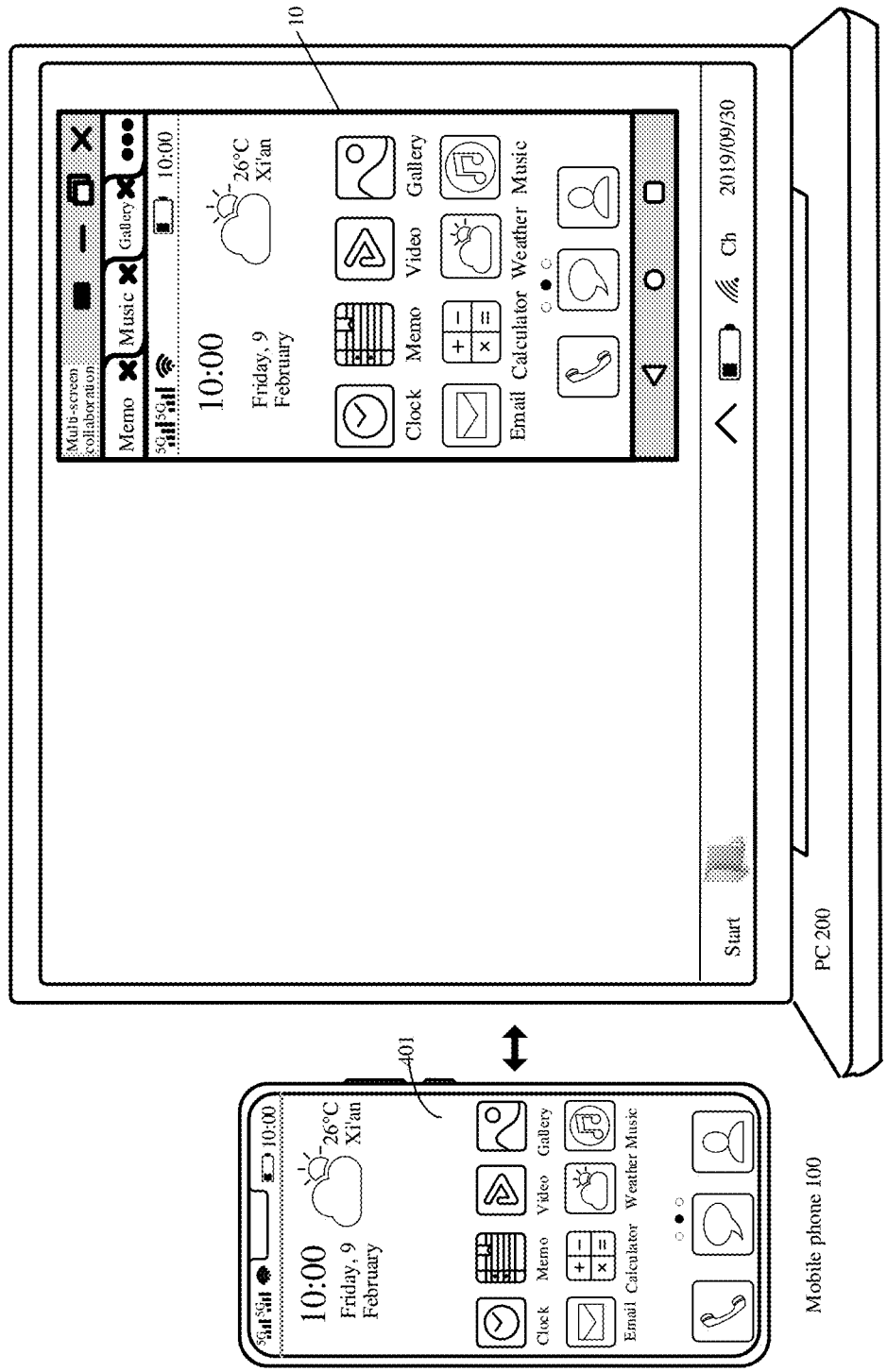
FIG. 4A to FIG. 4G are a schematic diagram of an interface of a PC according to an embodiment of this application.

Herein, FIG. 4A shows a main interface 401 of the mobile phone 100 after unlocking. The main interface 401 displays a plurality of applications (application, App), such as Clock, Memo, Video, Gallery, Email, Calculator, Weather, and Music. It should be understood that the main interface 401 may further include icons of more applications. This is not limited in this embodiment of this application.

Moreover, FIG. 4A further shows an interface of the PC 200, and a multi-screen collaboration window 10 is displayed on the interface of the PC 200. As shown in FIG. 4A, after the mobile phone 100 is connected to the PC 200, the multi-screen collaboration window 10 of the PC 200 may display a same interface as the mobile phone 100, for example, the main interface 401 of the mobile phone 100.

In a possible display manner, in addition to an area used for displaying an interface of the mobile phone 100, the multi-screen collaboration window 10 may further include different buttons and function menus. A user may switch a display status of the multi-screen collaboration window 10 on the PC 200 by using the different buttons and function menus.

In still another possible display manner, the multi-screen collaboration window 10 may display a plurality of application windows in a form of tabs.

Figure 4B:
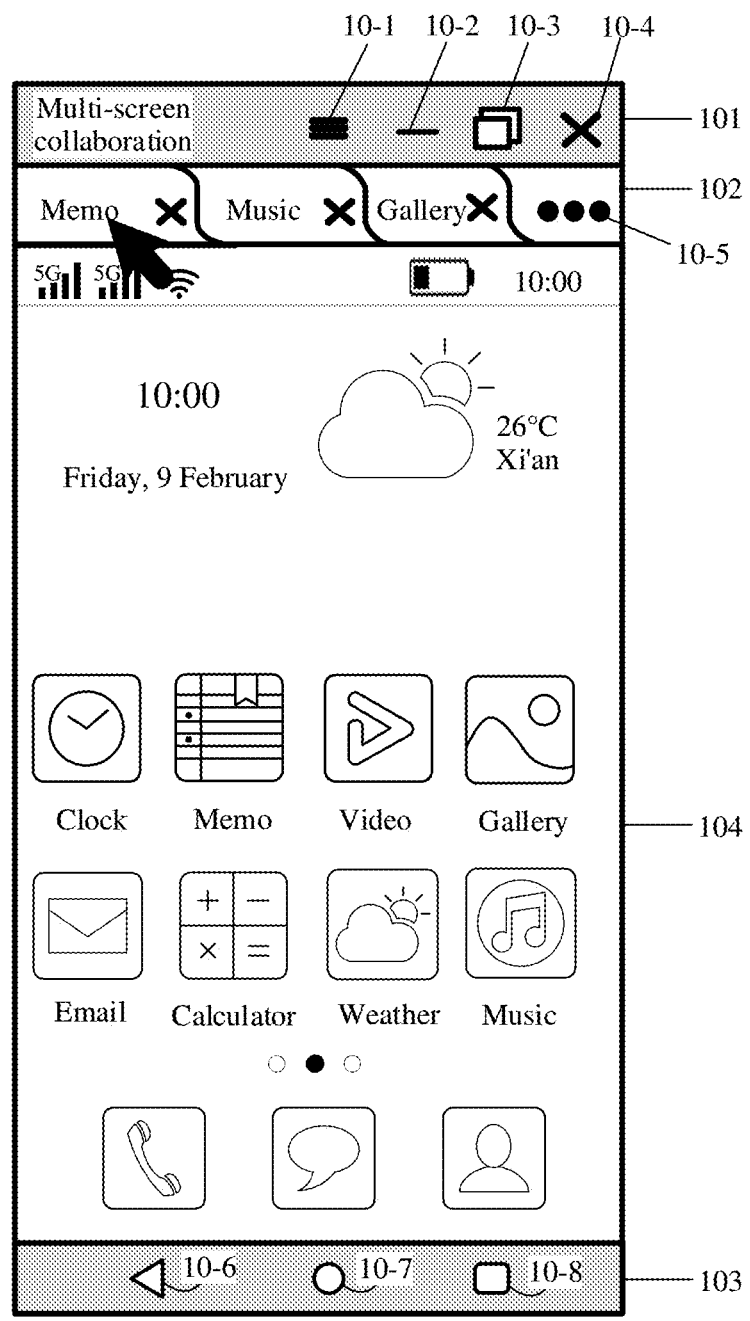

For example, as shown in FIG. 4B, the multi-screen collaboration window 10 may be divided into a top function area 101, a tab area 102, a bottom area 103, and a middle area 104 used for displaying a mobile phone interface.

Specifically, the top function area 101 may include:

(1) A button 10-1 configured to set the window, for example, set a size, set a display level, and the like. For example, the user may set, by using the button 10-1, the multi-screen collaboration window 10 to be displayed on top, that is, regardless of how many windows are displayed on the PC 200, the multi-screen collaboration window 10 is always displayed at the uppermost layer.

(2) A minimize button 10-2 configured to minimize and display the multi-screen collaboration window 10 to a menu area at the bottom of the PC 200.

(3) A maximize button 10-3 configured to display the multi-screen collaboration window 10 in a maximum size on the display of the PC 200.

Optionally, the maximum size of the multi-screen collaboration window 10 may be adapted to a size of the display of the PC 200. For example, a length-width ratio of the multi-screen collaboration window 10 is a constant value, and may be in a proportional relationship with a length-width ratio of the screen of the mobile phone 100. When the multi-screen collaboration window 10 is displayed in a maximum size, a height may be the same as a width of a short side of the display of the PC 200, and a horizontal width may be adapted based on the constant length-width ratio, thereby ensuring that the multi-screen collaboration window 10 displayed on the PC 200 has a same length-width ratio as an interface of the mobile phone 100. When a user uses an application of the mobile phone 100 on the PC 200, a visual effect closer to a screen display effect of the mobile phone can be obtained, thereby improving user experience.

Alternatively, the maximum size of the multi-screen collaboration window 10 may be the same as a maximum size of the display of the PC 200, so as to better use a large screen of the PC 200. This is not limited in this embodiment of this application.

(4) A close button 10-4. The user may click the close button 10-4 to close the multi-screen collaboration window 10.

The tab area 102 of the multi-screen collaboration window 10 may include:

(1) Tabs of one or more application interfaces.

A user may click a tab of each application, so that the current area 104 that displays a mobile phone interface displays an application interface corresponding to the tab, and the application tab clicked by the user is displayed in a highlighted status, which is alternatively referred to as a "selected status", a "focus status", or the like.

Optionally, different running interfaces of a same application may also be distinguished by using tabs. That is, an interface corresponding to a first tab is a memo main interface, and an interface corresponding to a second tab is a secondary interface entered by a user clicking the memo main interface. This is not limited in this embodiment of this application.

Alternatively, one tab corresponds to one application as an example. That is, different running interfaces of a same application are all displayed in an interface corresponding to one tab. In this embodiment of this application, one tab corresponds to one application as an example for description.

In a possible display manner, when a user enables an application of a mobile phone by using the multi-screen collaboration window 10, a running interface of the application may be displayed in the multi-screen collaboration window 10, and is not displayed in a form of a tab. That is, the multi-screen collaboration window 10 may not include the tab area 102. When the user enables two or more applications of the mobile phone, the multi-screen collaboration window 10 may automatically display the tab area 102, and the tab area 102 includes tabs of a plurality of applications enabled by the user. This is not limited in this embodiment of this application.

Optionally, an arrangement order of the tabs of the plurality of applications in the tab area 102 is consistent with an order of multi-task applications running in the background of the mobile phone.

For example, as shown in FIG. 4B, if the user sequentially opens, in the multi-screen collaboration window 10 of the PC 200, a memo application, a music application, a gallery application, a video application, an email application, and a calculator application that run in the mobile phone 100, a memo tab, a music tab, and a gallery tab are sequentially displayed in the tab area 102 according to a sequence in which the user opens each application.

Optionally, each application tab in the tab area 102 includes a close button. The user may click the close button of the application tab to close the application, and the tab area 102 does not include the application tab. This is not limited in this embodiment of this application.

(2) A "more" button 10-5. Limited by a width size of the multi-screen collaboration window 10, some applications that cannot be displayed are hidden in the "more" button 105 in the tab area 102.

For example, as shown in FIG. 4B, limited by a width size of the multi-screen collaboration window 10, a video application, an email application, and a calculator application that cannot be displayed are hidden in the "more" button 105 in a form of a list. A quantity of application tabs displayed in the multi-screen collaboration window 10 is not limited in this embodiment of this application.

As shown in FIG. 4B, when the multi-screen collaboration window 10 displays the main interface 401 of the mobile phone 100, the memo tab, the music tab, and the gallery tab in the tab area 102 are all unselected, which is referred to as a "non-selected status".

Optionally, when the multi-screen collaboration window 10 displays the main interface 401 of the mobile phone 100, an application corresponding to each tab in the tab area 102 is an application running in the background of the mobile phone 100.

Optionally, when the multi-screen collaboration window 10 displays the memo application of the mobile phone 100, the memo application may also be an application running in the background of the mobile phone 100. For example, when the interface of the mobile phone 100 does not display the interface of the memo, even if the multi-screen collaboration window 10 currently displays the interface of the memo application, the memo application still runs in the background of the mobile phone 100. Details are not described below.

Figure 4C:
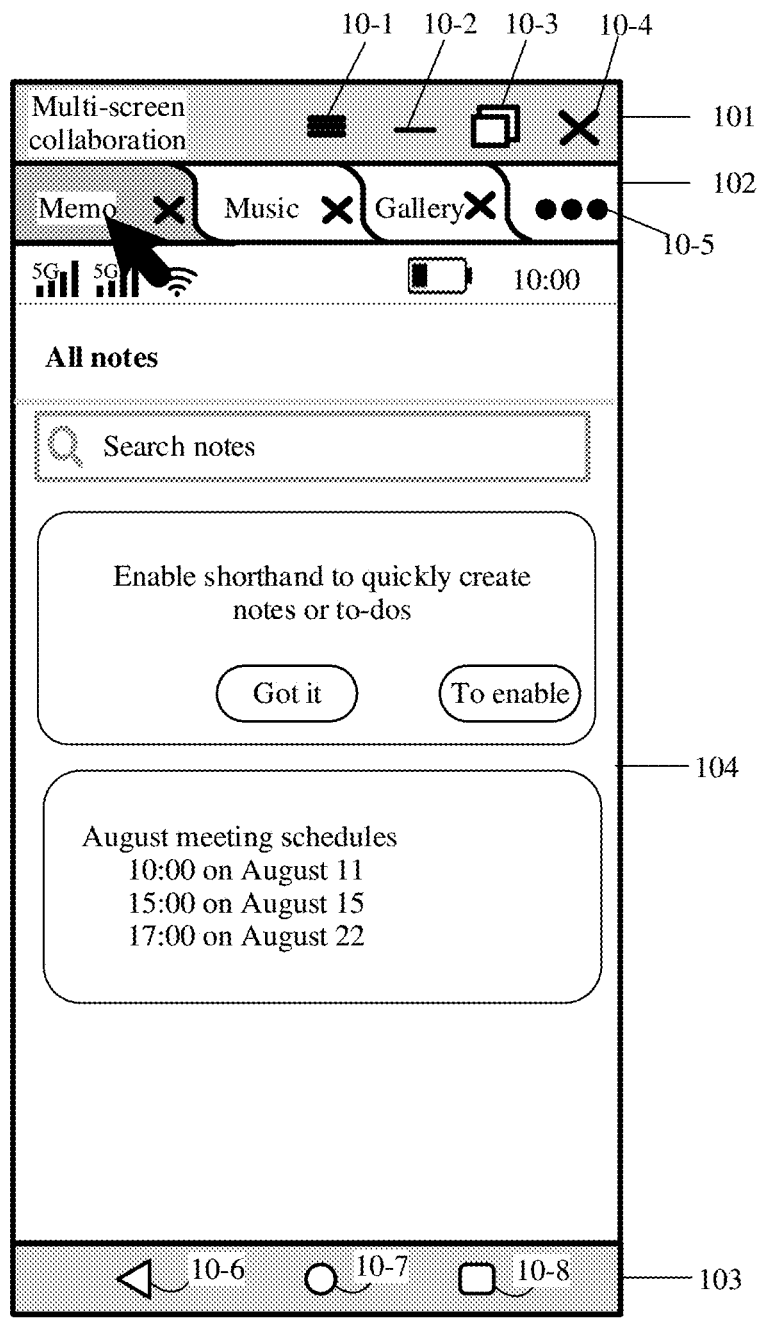

When the user performs an operation shown in FIG. 4B, that is, clicks the memo tab, in response to the click operation of the user, as shown in FIG. 4C, the multi-screen collaboration window 10 skips to display a main interface of the memo application, and at the same time, the memo tab is displayed in a highlighted status (or referred to as a "selected status") shown in gray. Optionally, the main interface of the memo application includes a meeting schedules recorded by the user and the like. Content of the main interface of the memo application is not described herein again.

Figure 4D:
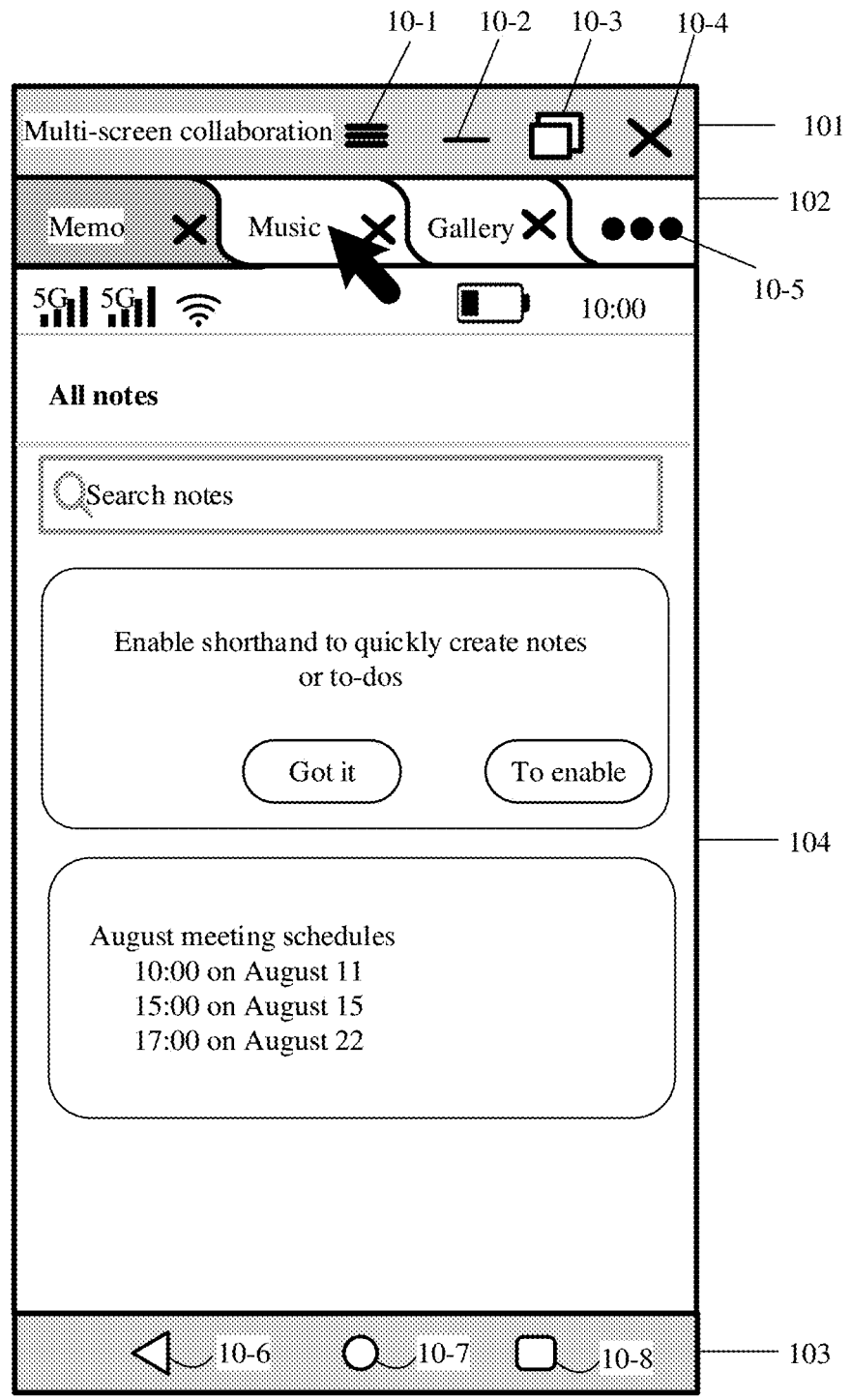
Figure 4E:
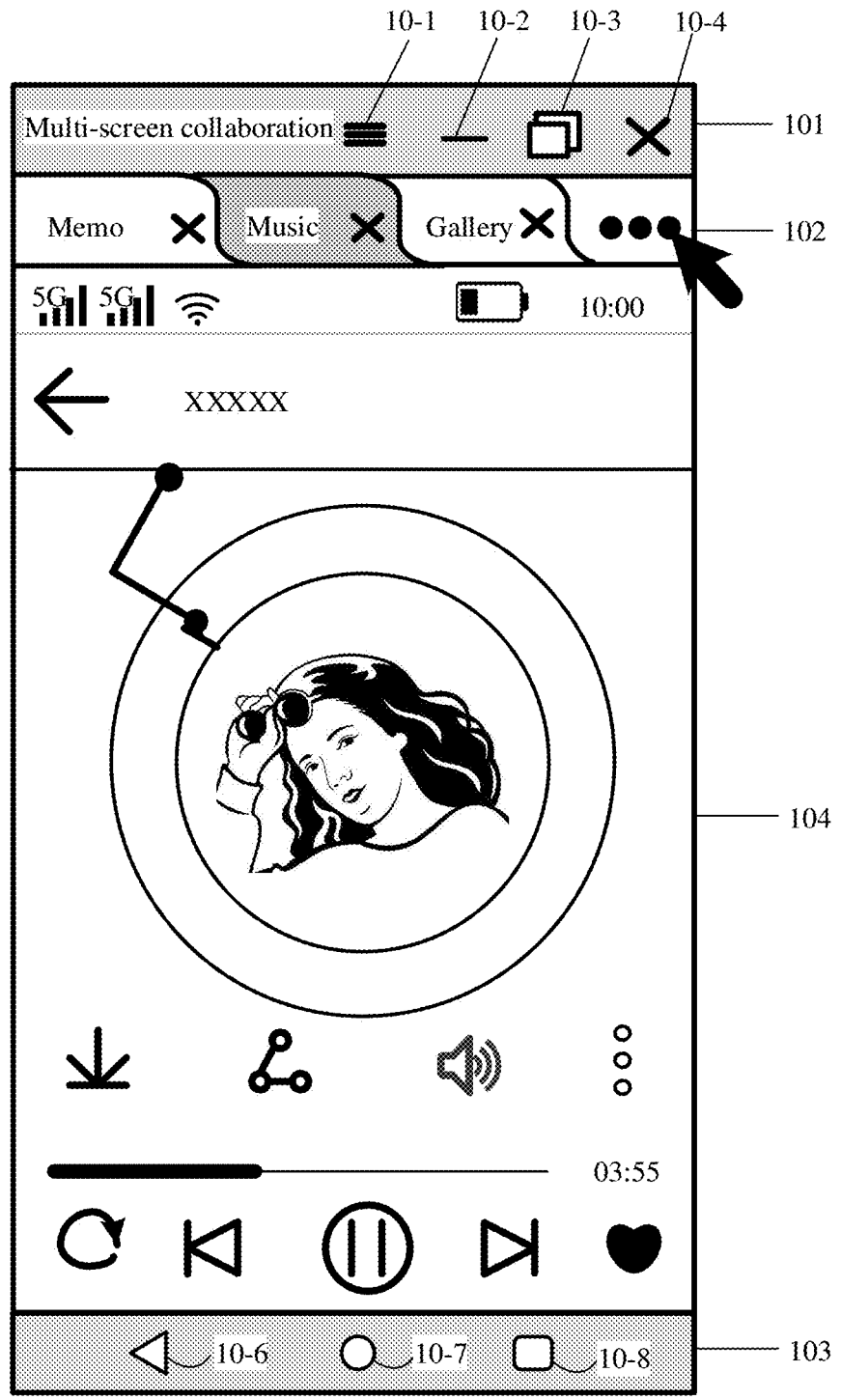

Alternatively, for example, when the multi-screen collaboration window 10 skips to display the main interface of the memo application, the user continues to perform an operation shown in FIG. 4D, that is, clicks a music tab, and in response to the click operation of the user, the multi-screen collaboration window 10 skips to display an interface of the music application shown in FIG. 4E. At the same time, the music tab is displayed in a highlighted status shown in gray, and the memo tab is not highlighted and is in a "non-selected status". Optionally, the interface of the music application may be a secondary interface, namely, a playback interface, of the music application previously enabled by the user. Content of the playback interface is not described herein again.

It should be noted that, in this embodiment of this application, the user operation may be an operation performed by the user through a peripheral input device of the PC 200 such as a mouse or a keyboard, for example, an operation of click, double-click, right-click, or the like performed by the user through a mouse. Alternatively, for the PC 200 having a touch display, the user operation may be a touch operation, a click operation, a slide operation, or the like on the display. A type and a manner of the user operation are not limited in this embodiment of this application. It should be understood that user operations are represented by black arrows shown in FIG. 4B to FIG. 4G in this embodiment of this application. In descriptions of subsequent embodiments, the user operations are not described again.

Figure 4F:
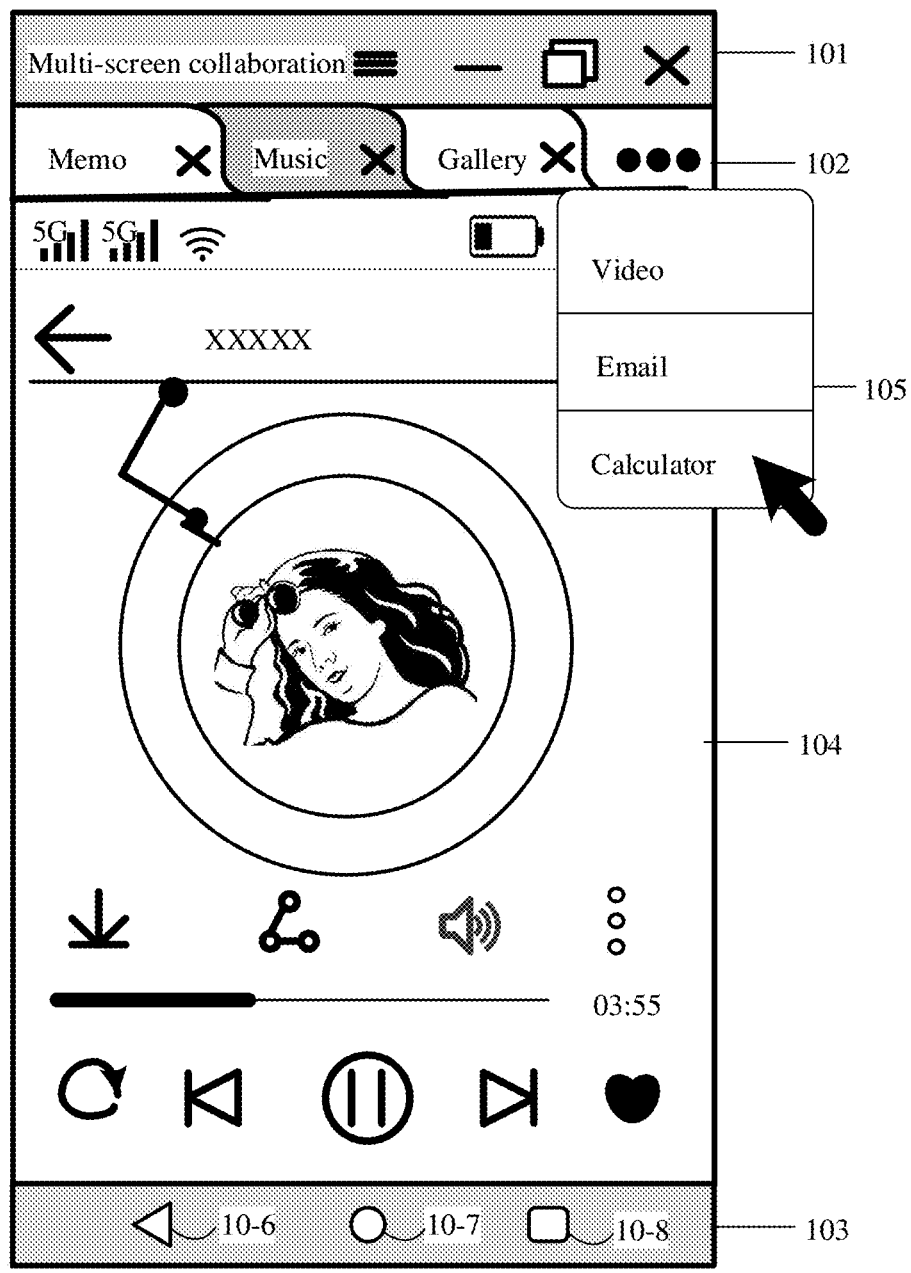

As shown in FIG. 4E, when the multi-screen collaboration window 10 displays the playback interface of the music application, the user clicks the "more" button 10-5, and in response to the click operation of the user, a window 105 shown in FIG. 4F is displayed close to the "more" button 10-5. Optionally, the window 105 displays a plurality of application names in a form of a list, for example, some application names that are not displayed in the tab area 102: "Video", "Email", and "Calculator".

Figure 4G:
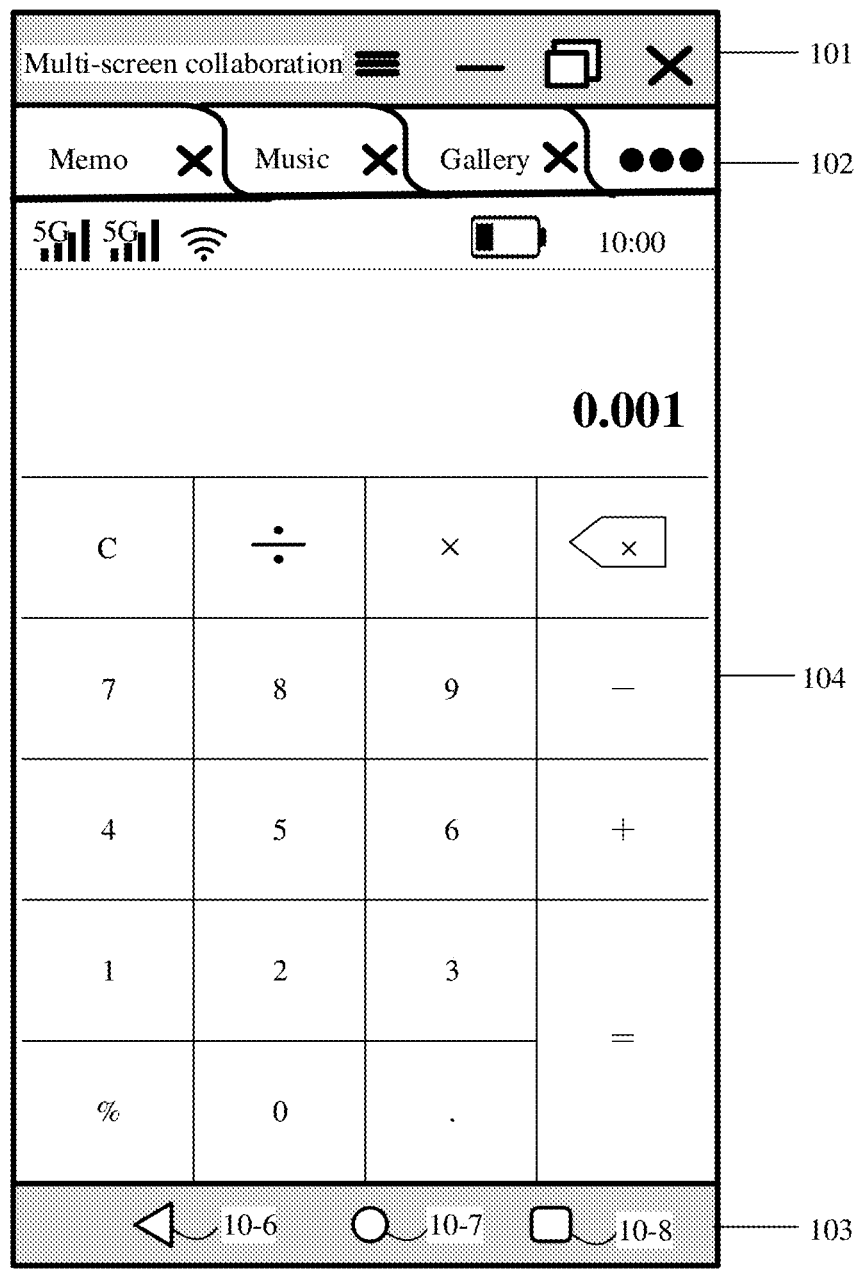

As shown in FIG. 4F, the user clicks the calculator in the list of the window 105, and in response to the click operation of the user, the multi-screen collaboration window 10 skips to display an interface of the calculator application shown in FIG. 4G. At the same time, the music tab is not highlighted and is in a "non-selected status".

According to the foregoing solution, in a multi-screen collaboration process of a mobile phone 100 and a PC 200, a window, namely, a multi-screen collaboration window, is displayed on a display of the PC 200, and one or more applications installed in the mobile phone 100 are enabled and run in the multi-screen collaboration window. In addition, a plurality of applications of the mobile phone may be displayed in the multi-screen collaboration window in a form of tabs, and a user may click a tab of any application, so that the multi-screen collaboration window skips to display a running interface of the application. When a lot of applications 100 run in the background of the mobile phone, tabs of some of the plurality of applications may be alternatively signed in a more button, and the user may click the more button to further display a list of all applications running in the background. A user may quickly switch, through a tab, the list of applications in the more button, or the like, from a currently used application to any other application running in the background, and a running interface of the application selected by the user may be displayed in the multi-screen collaboration window. The method is easy to operate, and a user may quickly switch from a currently used application to another application running in the background, thereby improving operation efficiency and enhancing user experience.

Moreover, the bottom area 103 of the multi-screen collaboration window 10 may include:

(1) An upper-level button 10-6 configured to return to an upper-level interface from a current display interface.

For example, as shown in FIG. 4E, when the multi-screen collaboration window 10 displays a secondary interface of the music application, namely, a playback interface, the user may click the upper-level button 10-6 to return to a primary interface of the music application, namely, a main interface of the music application including a list of a music recommendation, a radio, and music. If the user clicks the upper-level button 10-6 again, the main interface of the mobile phone 100 may be returned.

Optionally, when the multi-screen collaboration window 10 displays the main interface 401 of the mobile phone 100, the upper-level button 10-6 may be displayed in a gray status, to prompt the user that the upper-level button 10-6 cannot be clicked currently. That is, the main interface 401 of the mobile phone 100 may be used as an upper-level interface of a main interface of each application, and the main interface 401 of the mobile phone 100 itself may not have an upper-level interface.

(2) A home button 10-7. When the user clicks the home button 10-7, the multi-screen collaboration window 10 may quickly return to the main interface 401 of the mobile phone 100.

(3) A multi-task button 10-8. When the user clicks the multi-task button 10-8, the multi-screen collaboration window 10 may quickly enter a multi-task switching interface.

Moreover, the multi-screen collaboration window 10 further includes an area 104 used for displaying a mobile phone interface. For example, as shown in FIG. 4B, the area 104 displays the main interface 401 of the mobile phone. If the user performs a click operation on the memo tab, the area 104 displays a main interface of the memo application shown in FIG. 4C. Alternatively, if the user performs a click operation on the music tab, the area 104 displays a playback interface of the music application shown in FIG. 4E. Alternatively, if the user performs a click operation on the calculator hidden in the more button 10-5, the area 104 displays an interface of the calculator application shown in FIG. 4G.

It should be understood that the top function area 101 and the bottom area 103 described above may be interpreted as control areas provided by the PC 200 for the multi-screen collaboration window 10, and all buttons and menus in the control areas are used for controlling the multi-screen collaboration window 10; the tab area 102 is used to switch display interfaces of different applications in the multi-screen collaboration window 10; and the area 104 displays a corresponding interface in response to a switching operation of a user, an operation of enabling an application, or the like.

It should be further understood that division manners of different function areas in the multi-screen collaboration window 10, as well as buttons and the like that may be included in each area, are described above. As an example, the multi-screen collaboration window 10 may further include more or fewer buttons, menus, options, and the like. This is not limited in this embodiment of this application.

A possible multi-screen collaboration window display method provided by an embodiment of this application is described with reference to FIG. 4A to FIG. 4G. Through the multi-screen collaboration window, a user may enable one or more applications on a mobile phone, a plurality of applications of the mobile phone may be displayed in the multi-screen collaboration window in a form of tabs, and the user may click a tab of any application, so that the multi-screen collaboration window skips to display an application interface corresponding to the tab. In an existing multi-screen collaboration process, only a currently running application may be displayed in a multi-screen collaboration window, and if a user needs to switch from a current application to another application of a background, the user may enter a multi-task page of a mobile phone through a multi-task button, and then select a target application desired to be switched, so operation steps are complex and user experience is poor in this process. The method provided in this embodiment of this application is easy to operate, and a user may quickly switch from a currently used application to another application running in a background, thereby improving operation efficiency and enhancing user experience.

In another possible scenario, a user opens a plurality of application windows at the same time and needs to use the plurality of application windows at the same time to obtain interface content of the plurality of applications, or a user desires to better use a large screen of a PC to display an interface of an application such as a video, and to use an application such as a calculator by using an original small multi-screen collaboration window. In this scenario, the user may prefer to display running interfaces of different applications through different windows. Therefore, an embodiment of this application further provides a window switching method, which may help a user quickly open a plurality of applications at the same time in a multi-window form in a process of using multi-screen collaboration.

Figure 5A:
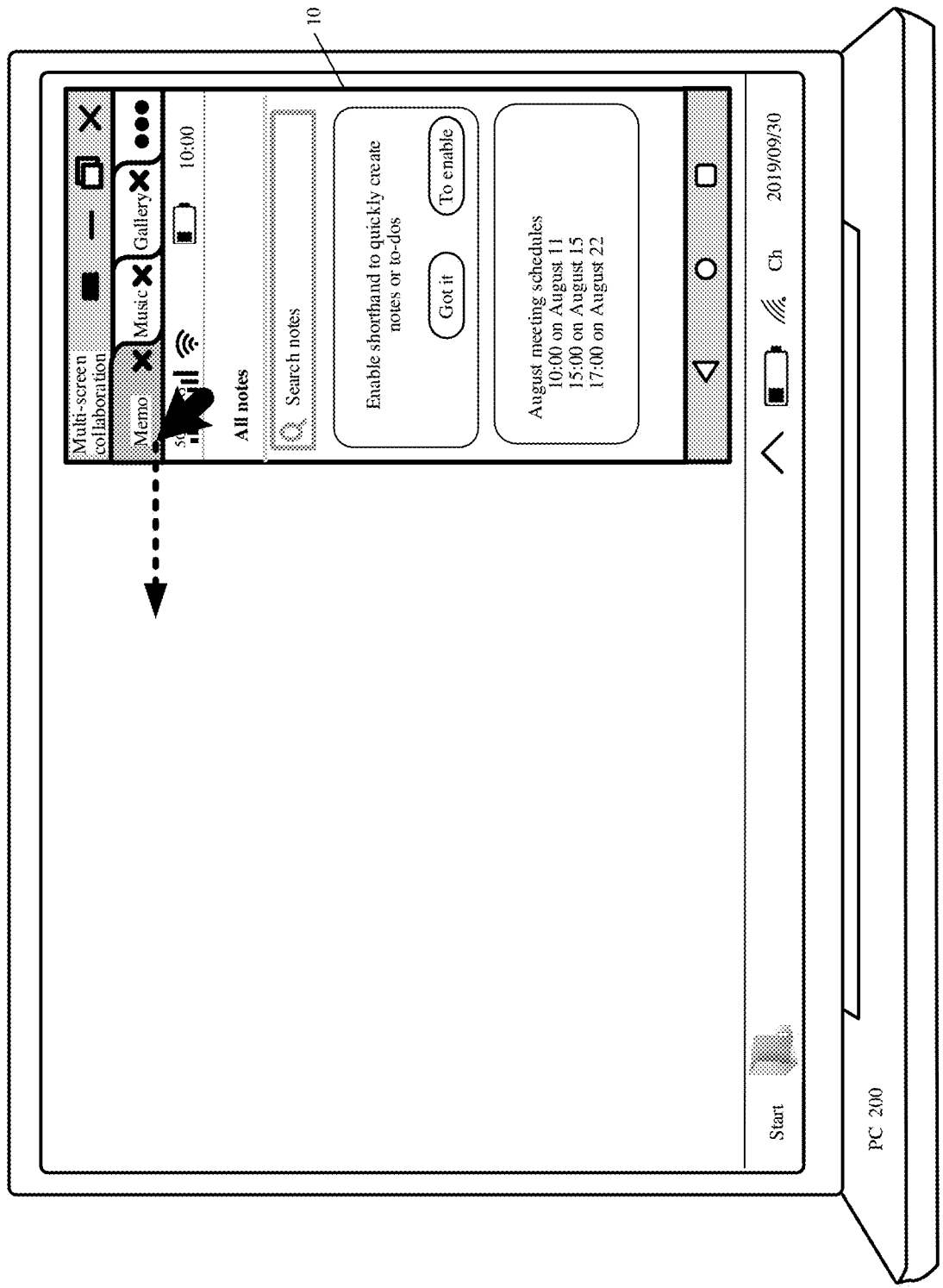
FIG. 5A to FIG. 5E are a schematic diagram of an interface of another PC according to an embodiment of this application.

FIG. 5A to FIG. 5E are a schematic diagram of an interface of another PC according to an embodiment of this application. As shown in FIG. 5A, a multi-screen collaboration window 10 is displayed on an interface of a PC 200, the multi-screen collaboration window 10 currently displays a main interface of a memo application, and a memo tab is displayed in a highlighted status shown in gray.

Figure 5B:
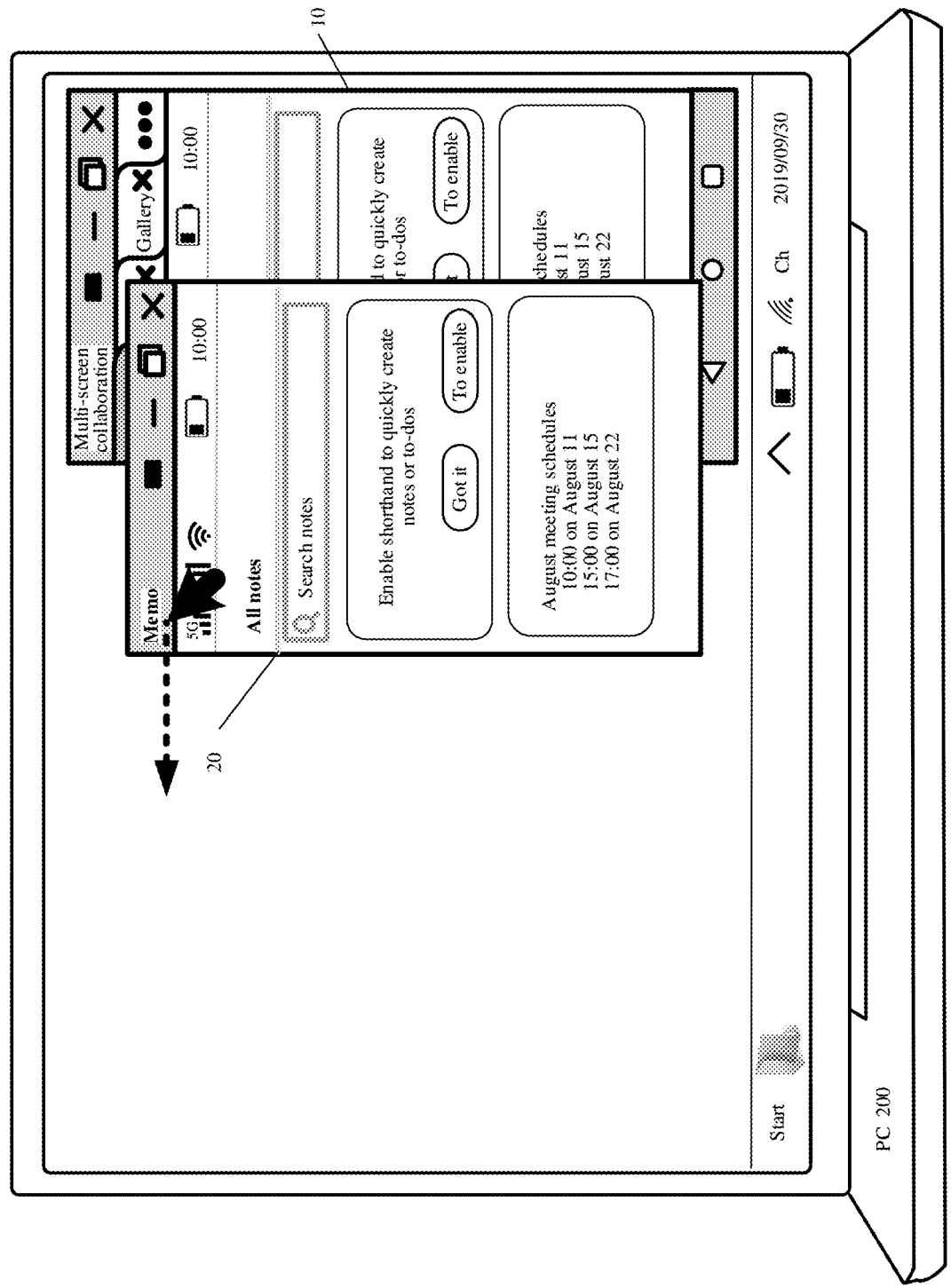

For example, as shown in FIG. 5A, when a user clicks to select the memo tab and drags the memo tab in a direction indicated by a dashed line, in response to the selection and dragging operation of the user, as shown in FIG. 5B, a memo application window 20 is displayed in a form of another floating window on the interface of the PC 200. The memo application window 20 in a floating status may continue to move on the interface of the PC 200 following the dragging direction indicated by the dashed line.

Optionally, the memo application window 20 in the floating status may have a dynamic display effect of gradually changing transparency. For example, from a moment at which the user selects the memo tab and starts to drag, the memo application window 20 in the floating status gradually changes from a transparent status to a semitransparent status in an entire dragging process, with a dynamic display effect of gradually decreasing transparency. This is not limited in this embodiment of this application.

Figure 5C:
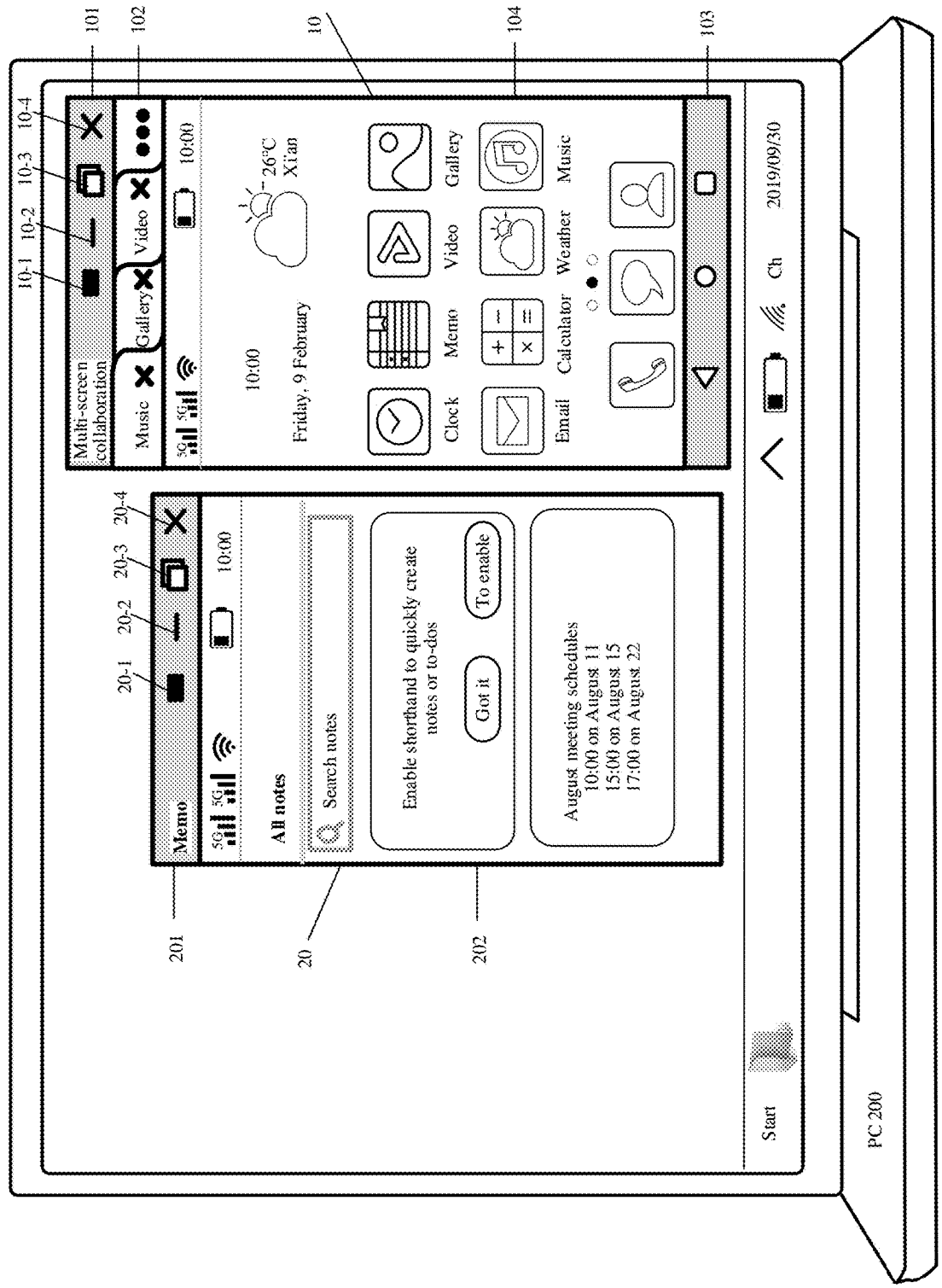

When dragging the selected memo application window 20 to a position outside an area where the multi-screen collaboration window 10 is located on the PC 200, the user releases the memo application window 20, and in response to the release operation of the user, as shown in FIG. 5C, a running interface of the memo application is displayed in another window different from the multi-screen collaboration window 10 on the PC 200. In addition, in the multi-screen collaboration window 10, the tab area 102 does not include the memo tab, and tabs of a music application and a gallery application are sequentially moved according to an arrangement order of the tabs to supplement an original position of the memo tab. A video application hidden in a more button may also be displayed in the tab area 102 in a form of a tab. That is, the user may switch the memo application from a main window to an independent sub-window in a manner of selecting and dragging the memo tab, and a running interface of a memo is displayed in the independent sub-window.

Optionally, when the user releases the memo application window 20, and the memo application is displayed on the interface of the PC 200 through an independent memo application window 20, the memo application window 20 may be displayed in a highlighted status (or referred to as a "focus status"), that is, the memo application window 20 is displayed at a first level of the PC 200, which is alternatively referred to as an uppermost level.

Optionally, when the user releases the memo application window 20, the memo application window 20 may be displayed at a position that is infinitely close to the multi-screen collaboration window 10 and that does not overlap the multi-screen collaboration window 10; or the memo application window 20 is displayed at a position where the user releases the memo application window 20 as a center; or with reference to display content on the PC 200, the content is preferentially displayed in a blank area of a display of the PC 200 without affecting a window of a web page, a document, or the like opened by the user on the PC 200. This is not limited in this embodiment of this application.

In a possible display manner, in the multi-screen collaboration window 10, a main interface 401 of a mobile phone 100 may continue to be displayed, and a music tab, a gallery tab, and a video tab are displayed in a non-selected status.

Alternatively, in the multi-screen collaboration window 10, a running interface of a music application corresponding to the music tab arranged after the memo tab may be displayed, the music tab is in a highlighted status, and the gallery tab and the video tab are displayed in a non-selected status. This is not limited in this embodiment of this application.

Figure 5D:
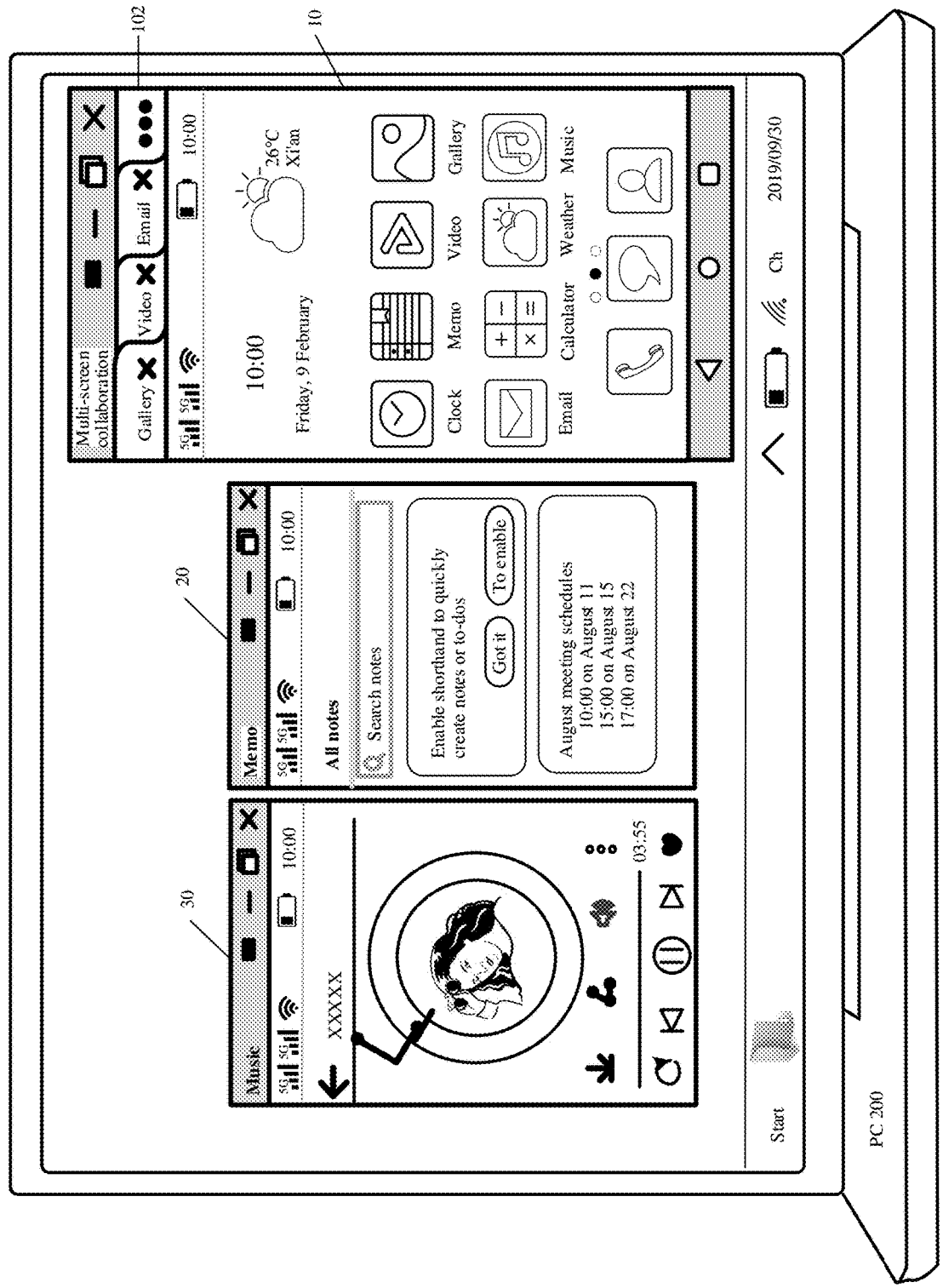

Similarly, the user may select and drag the music tab. As shown in FIG. 5D, on the interface of the PC 200, a running interface of the music application is displayed in another window, namely, a music application window 30, different from the multi-screen collaboration window 10 and the memo application window 20. In addition, in the multi-screen collaboration window 10, the tab area 102 does not include the music tab, and the gallery tab and the video tab are sequentially moved according to an arrangement order of the tabs to supplement a position of the music tab. An email application hidden in a "more" button may also be displayed in the tab area 102 in a form of a tab.

According to the foregoing solution, a user may switch, in a manner of selecting and dragging any application tab in a tab area, an application corresponding to the tab from a main window to an independent sub-window, and a running interface of the application may be displayed in the independent sub-window. The method is easy to operate, and may quickly implement switching from "a single window" to "a plurality of windows", better use a large screen of the PC in a display manner of "a main window+a plurality of sub-windows" on the PC, and provide a user with experience of using mobile phone applications on the PC. Moreover, during switching of a window, a process of a running application is not interrupted, thereby improving user experience.

In still another possible display manner, the quantity of sub-windows may be limited by a preset number, that is, a maximum number. For example, if the PC 200 supports display of three mobile phone windows, the PC 200 may support display of two sub-windows.

Figure 5E:
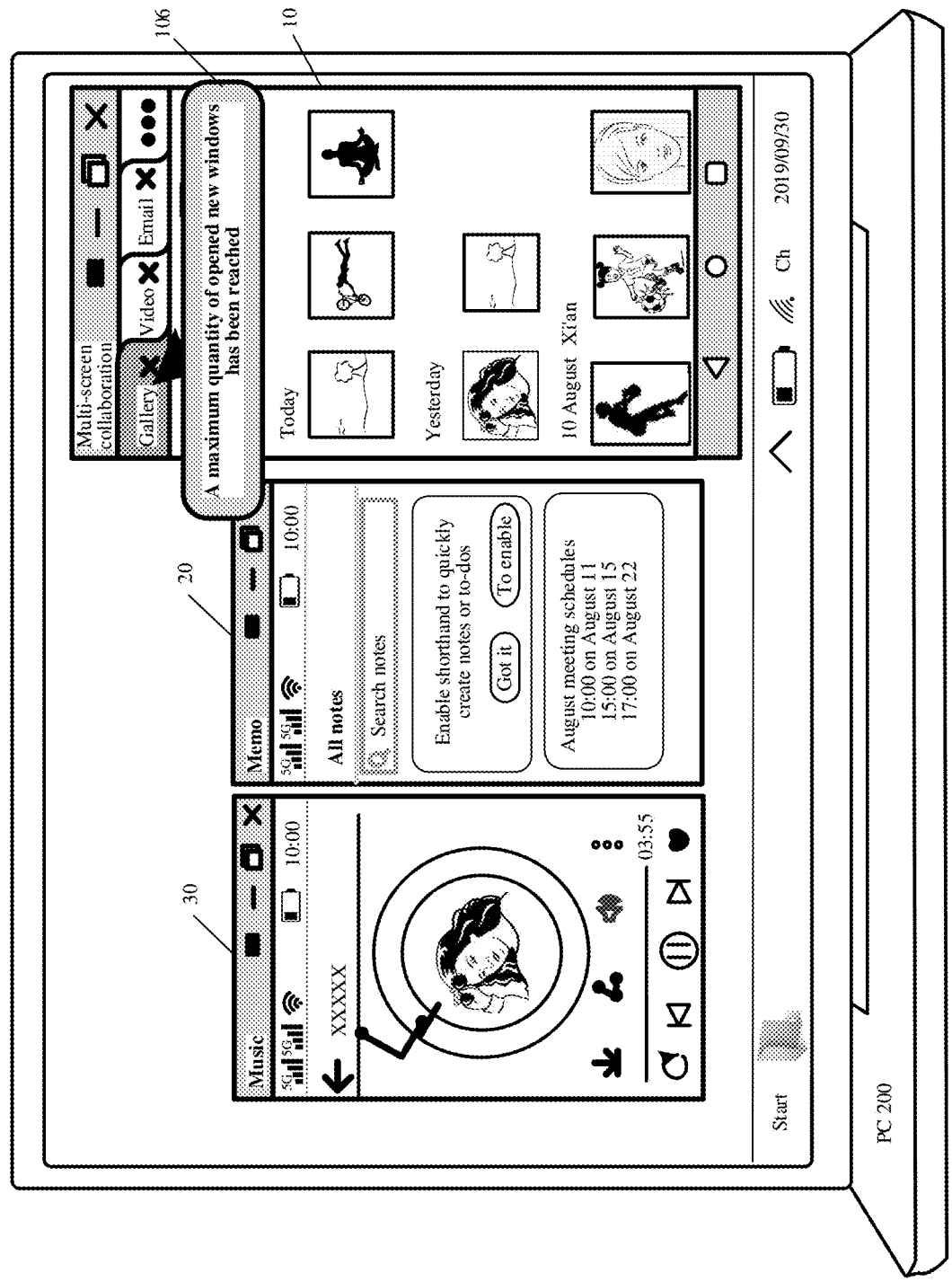

For example, as shown in FIG. 5E, three windows are displayed on the interface of the PC 200: a multi-screen collaboration window 10, a memo application window 20, and a music application window 30.

When the user selects and drags a gallery tab in the multi-screen collaboration window 10, a reminder window 106 may be automatically displayed on the interface of the PC 200, to remind a user of "A maximum quantity of opened new windows has been reached". The user cannot separate, according to the foregoing selection and dragging operation, a gallery application window corresponding to the gallery tab. Details are not described herein again.

Optionally, the reminder window 106 may automatically disappear after the user releases the gallery tab, or automatically disappear after display for duration (for example, 5 seconds). Details are not described in this embodiment of this application.

In still another possible display manner, the memo application window 20, as an independent sub-window, may have a different style from the main window, namely the multi-screen collaboration window 10.

For example, as shown in FIG. 5C, the multi-screen collaboration window 10 is used as a main window, the memo application window 20 and the music application window 30 are used as sub-windows, and the main window and the sub-window have different styles. With reference to the foregoing description in FIG. 4A to FIG. 4G that the multi-screen collaboration window 10 may include a function area 101, a tab area 102, a bottom area 103, and a middle area 104 used for displaying a mobile phone interface, the memo application window 20 may optionally include a function area 201 and an area 202 for displaying an application interface as shown in FIG. 5C. Gray buttons included in the function area 201 may be the same as buttons included in the function area 101 of the main window, for example, a button 20-1, a minimize button 20-2, a maximize button 20-3, and a close button 20-4.

Optionally, a same button included in function areas of the main window and the sub-window may have different functions or a same function.

In a possible manner, some buttons in the main window may have functions of controlling the main window and the sub-window, and the buttons in the sub-window have only functions of controlling the sub-window. Alternatively, for a same button, the button in the main window and the button in the sub-window have a same function.

Figure 6A:
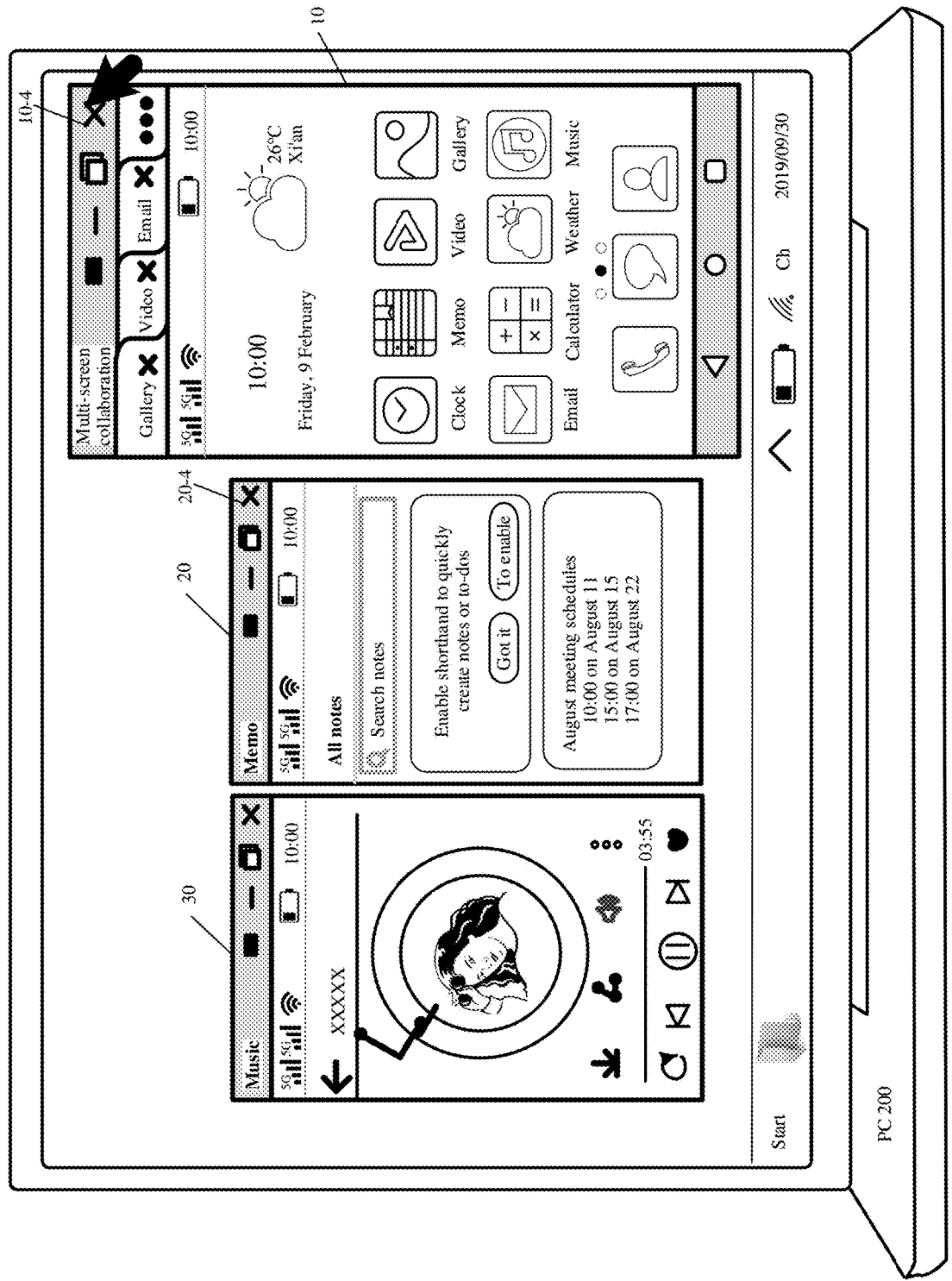
FIG. 6A to FIG. 6E are a schematic diagram of an interface of another PC according to an embodiment of this application.

For example, FIG. 6A to FIG. 6E are a schematic diagram of an interface of another PC according to an embodiment of this application. As shown in FIG. 6A, a multi-screen collaboration window 10, a memo application window 20, and a music application window 30 are displayed on an interface of a PC 200.

Figure 6B:
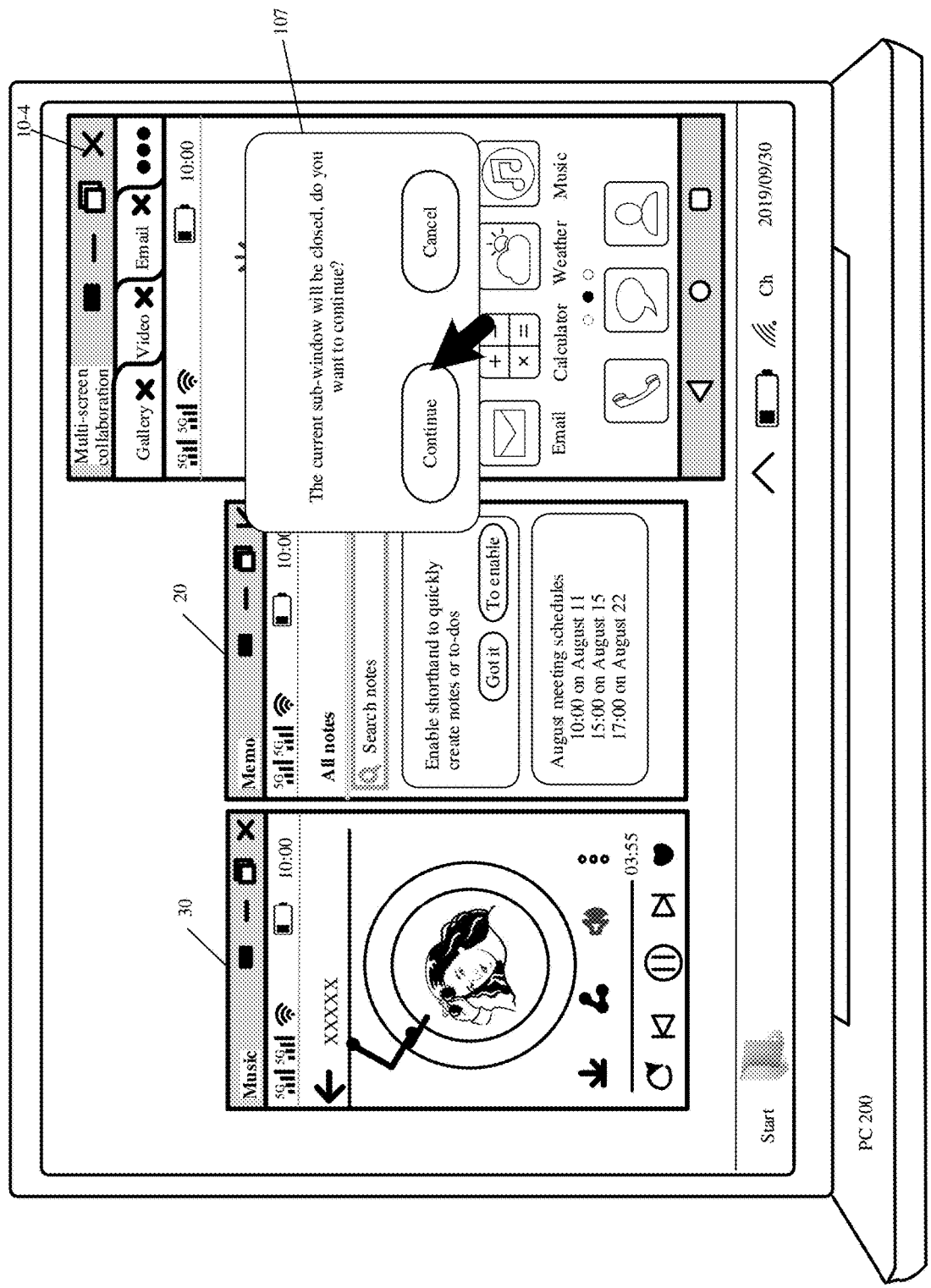
Figure 6C:
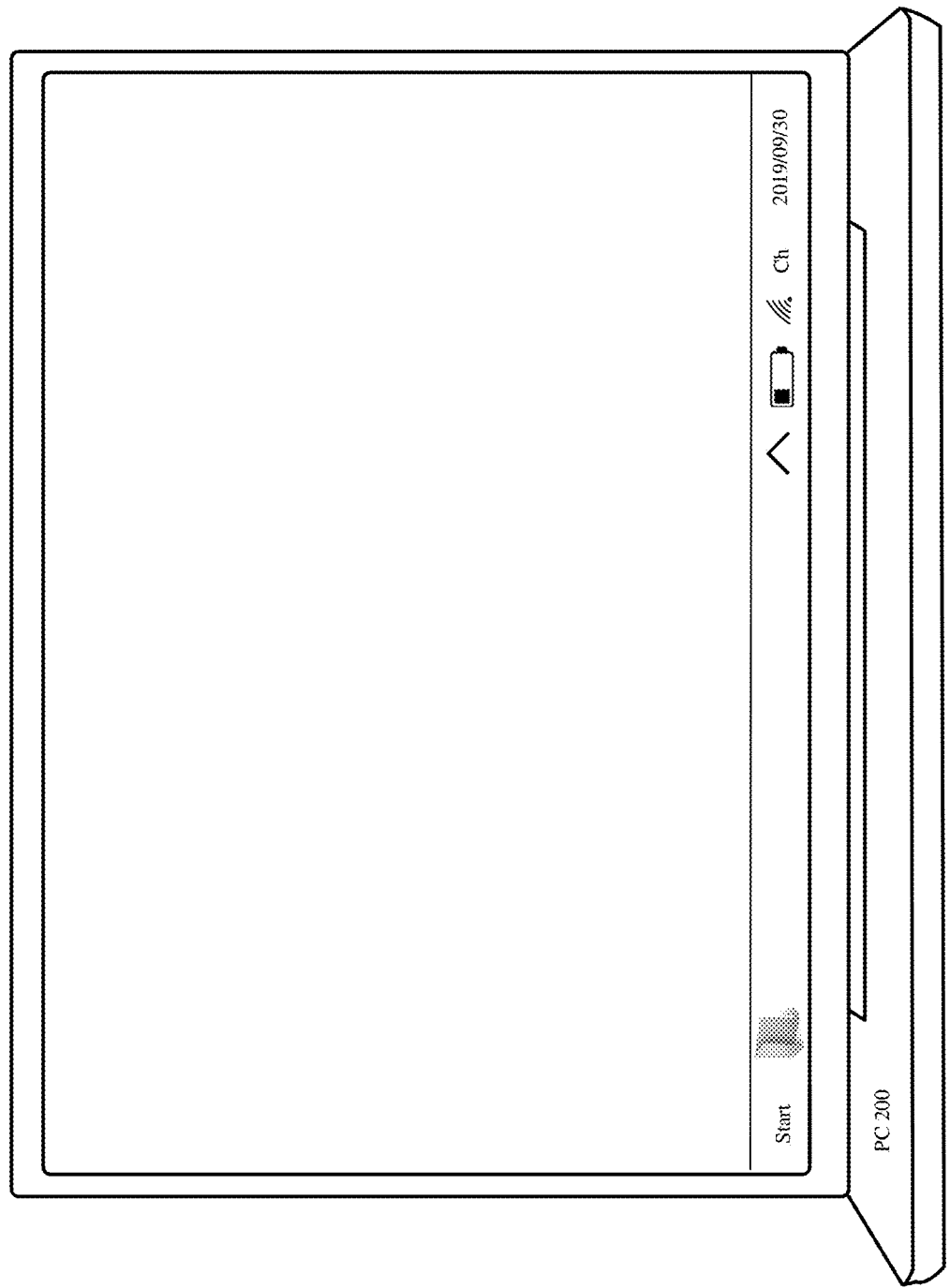

As shown in FIG. 6A, if a user clicks a close button 10-4 of the multi-screen collaboration window 10, in response to the click operation of the user, a reminder window 107 shown in FIG. 6B is displayed on the PC 200. The reminder window 107 may be used for prompting the user that "The current sub-window will be closed, do you want to continue". If the user clicks a "Continue" button, in response to the click operation of the user, an interface shown in FIG. 6C is displayed on the PC 200, that is, the multi-screen collaboration window 10, the memo application window 20, and the music application window 30 on the PC 200 are closed at the same time.

Figure 6D:
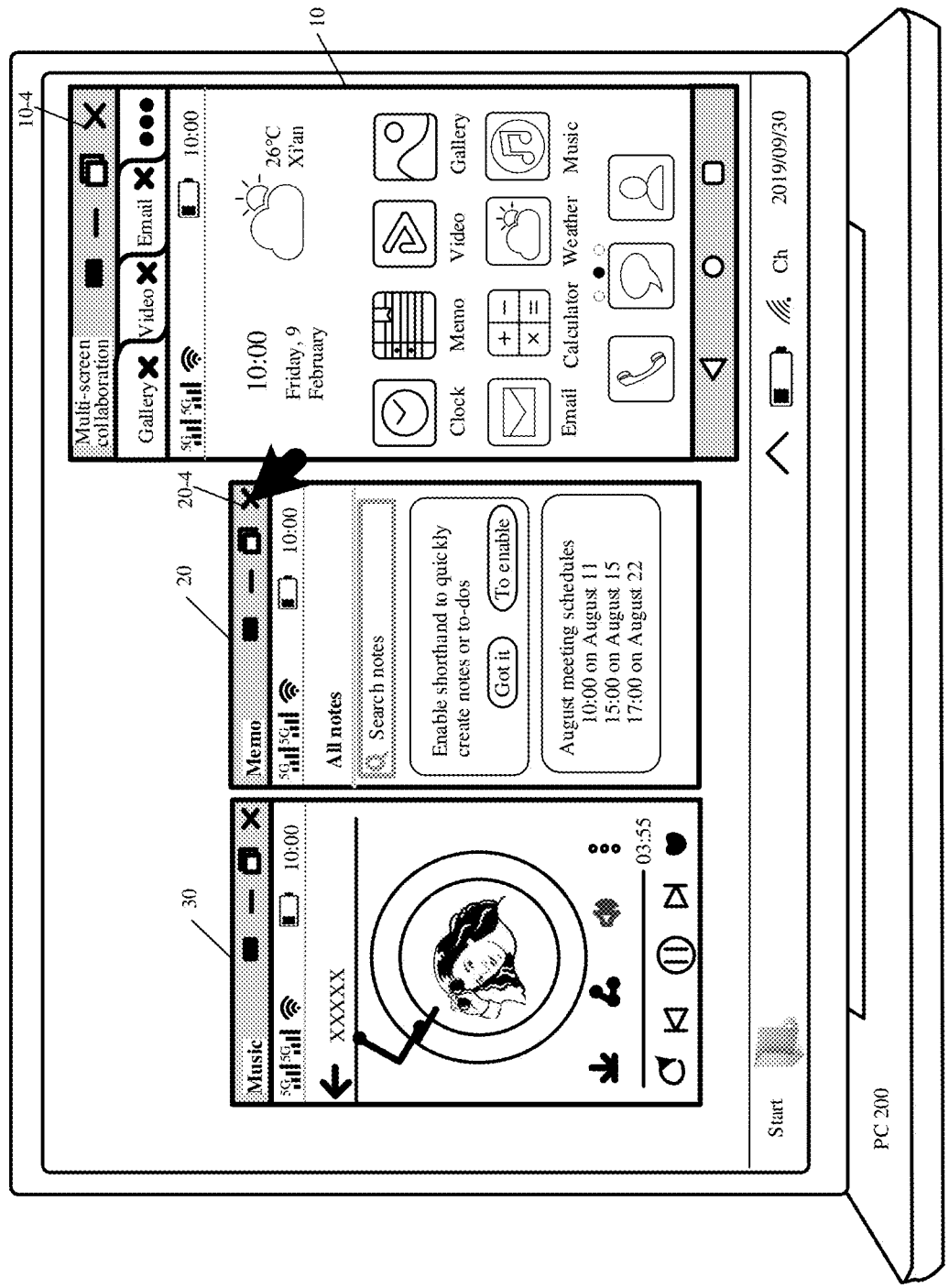
Figure 6E:
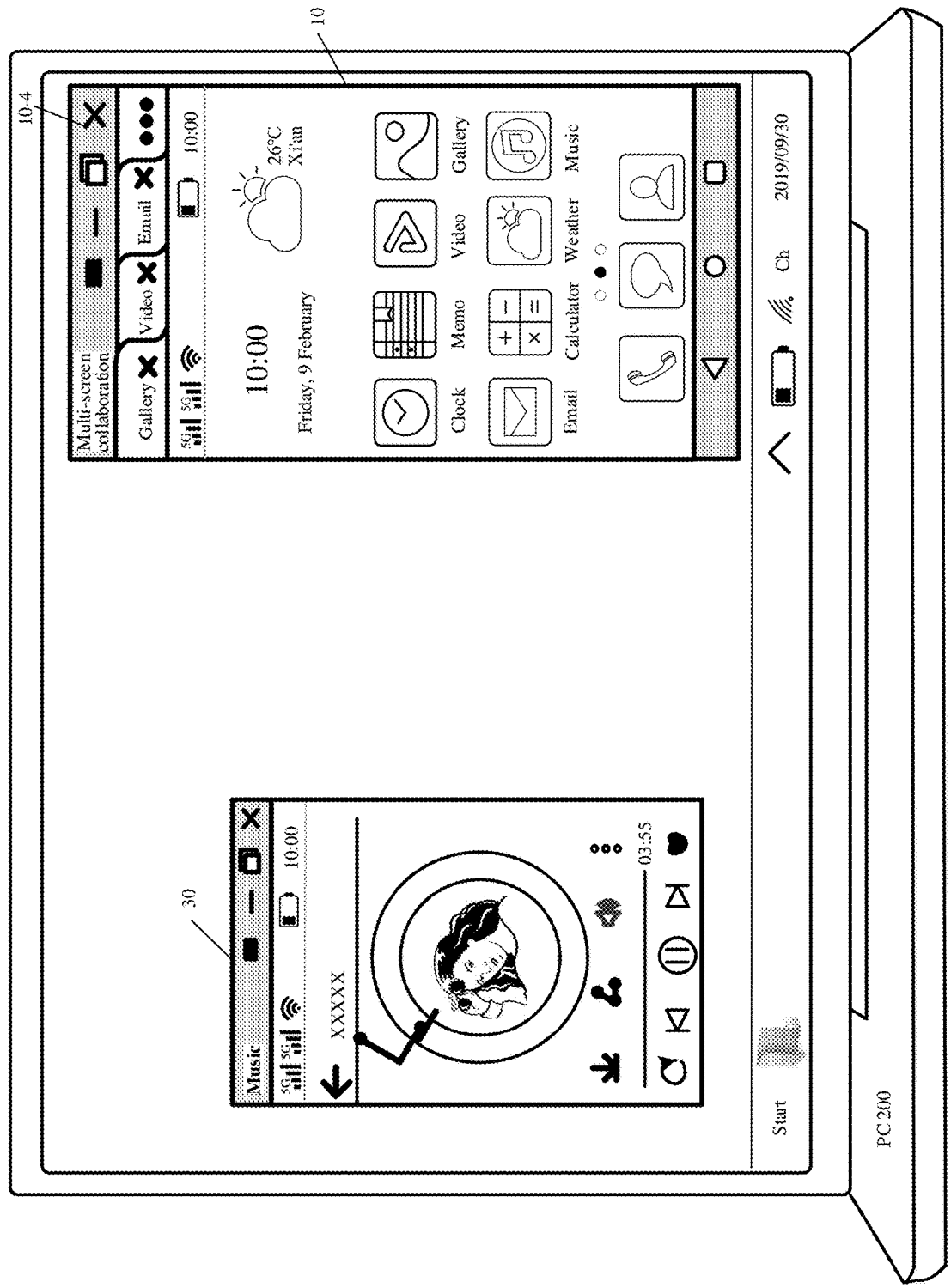

In another possible manner, as shown in FIG. 6D, if the user clicks a close button 20-4 of the memo application window 20, in response to the click operation of the user, the PC 200 displays an interface shown in FIG. 6E, only the memo application window 20 is closed, and display of the multi-screen collaboration window 10 and the music application window 30 is not affected. Details are not described herein again.

It should be understood that the "close" button is used as an example to describe different functions of the close button in the main window and the sub-window. Other buttons may be similar to the "close" button, and have different control functions.

Alternatively, the maximize button of the multi-screen collaboration window 10 may have only a function of controlling maximized display of the multi-screen collaboration window 10, and does not have a function of controlling maximized display of other sub-windows. Details are not described in this embodiment of this application.

A plurality of possible styles of the multi-screen collaboration window 10, a plurality of different buttons included, and the like are described above with reference to the accompanying drawings. In addition, the multi-screen collaboration window and each independent application window may further include different buttons.

Figure 7A:
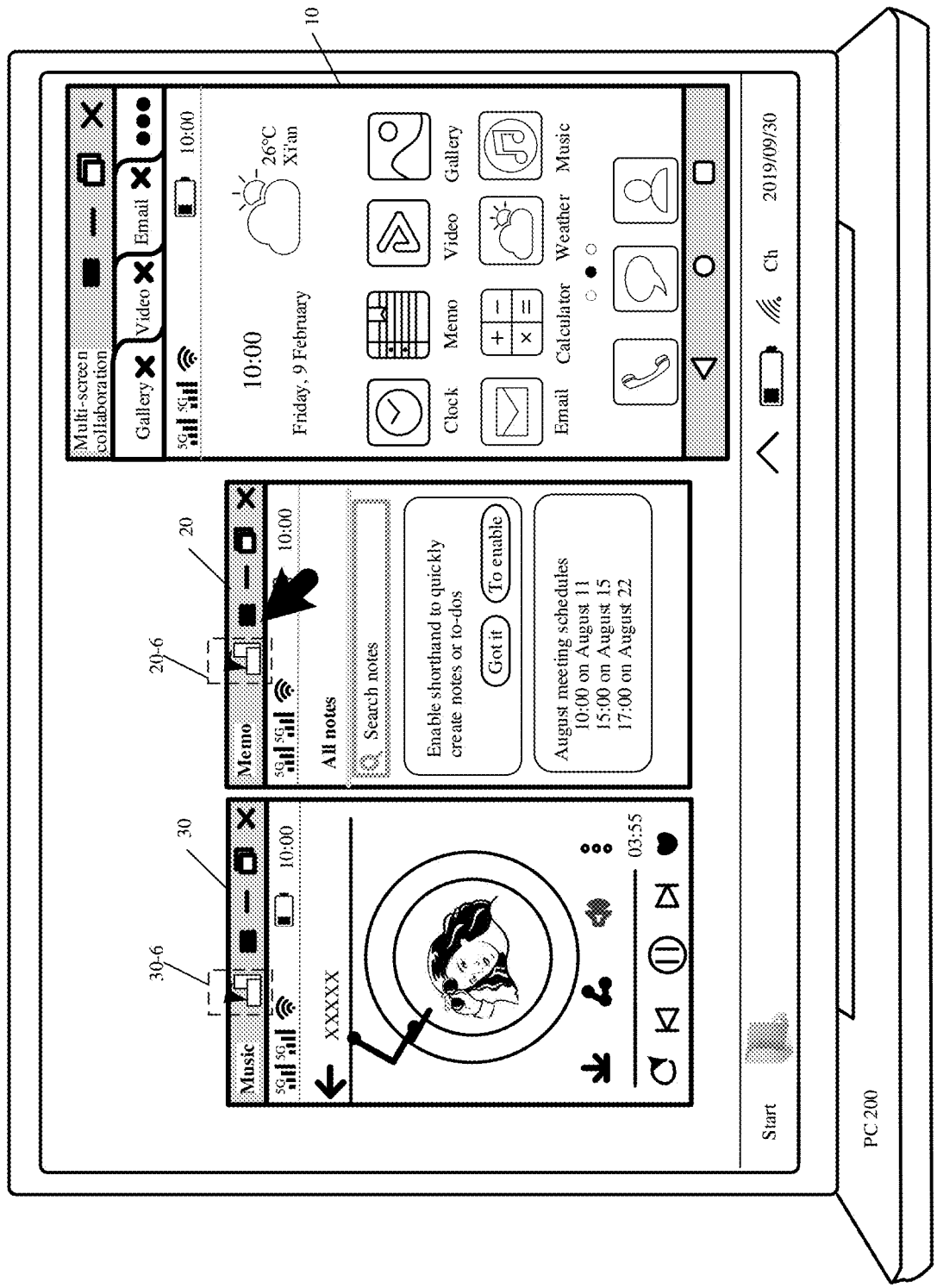
FIG. 7A and FIG. 7B are a schematic diagram of an interface of another PC according to an embodiment of this application.
Figure 7B:
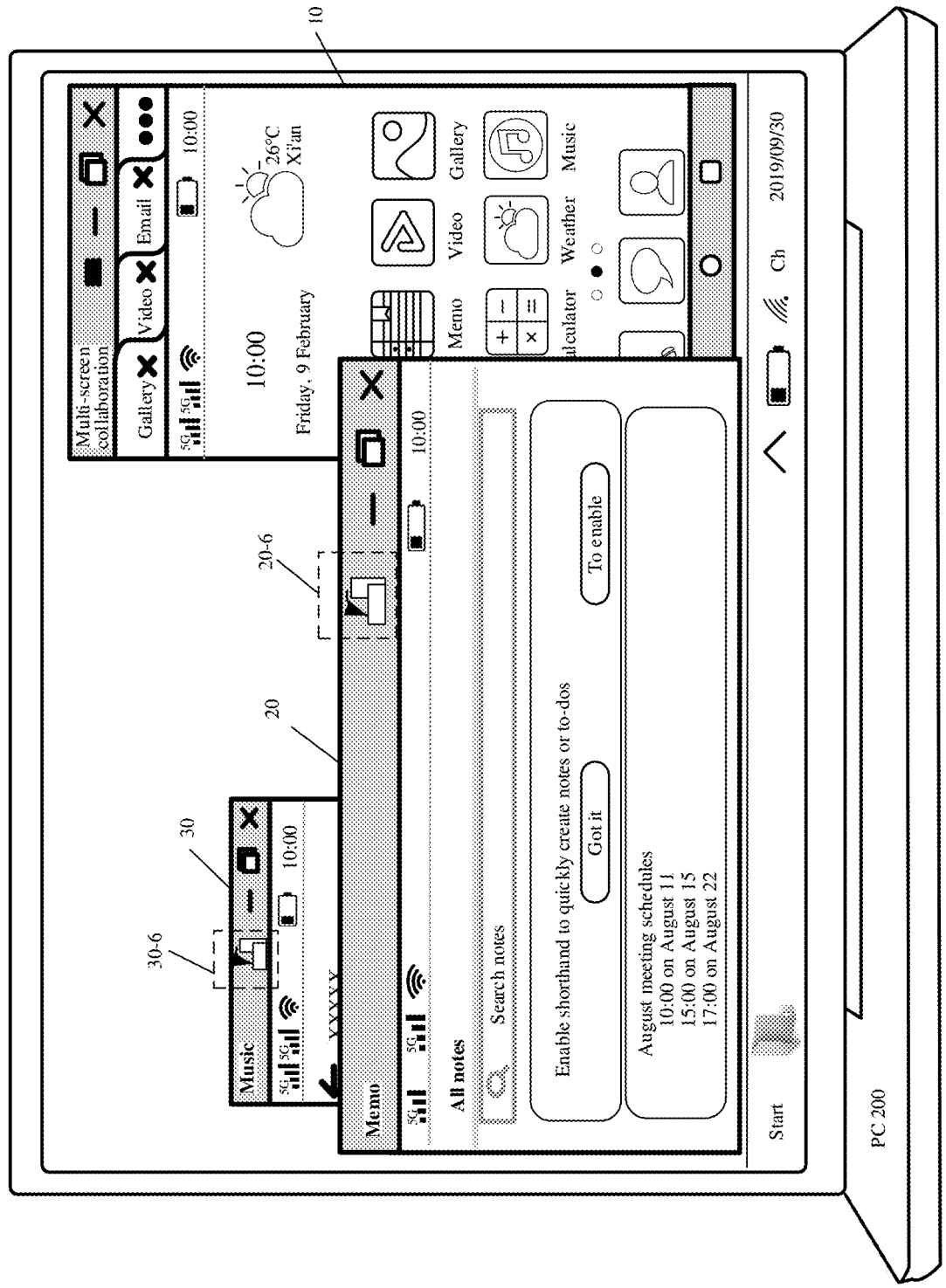

FIG. 7A and FIG. 7B are a schematic diagram of an interface of another PC according to an embodiment of this application. As shown in FIG. 7A, a multi-screen collaboration window 10, a memo application window 20, and a music application window 30 are displayed on an interface of a PC 200. The multi-screen collaboration window 10 displays a main interface of a mobile phone 100. It is assumed that at least a plurality of applications such as a memo application, a music application, a gallery application, a video application, and an email application run in a background of the mobile phone. A gallery tab, a video application, and an email tab are correspondingly displayed in a tab area of the multi-screen collaboration window 10, and the gallery tab, the video application, and the email tab are all in a non-selected status.

Optionally, rotation buttons, for example, a rotation button 20-6 and a rotation button 30-6 shown in FIG. 7A, may be included in the independent memo application window 20 and the independent music application window 30.

For example, as shown in FIG. 7A, when a user clicks the rotation button 20-6 of the memo application window 20, in response to the click operation of the user, the memo application window 20 displays a running interface of the memo application horizontally as shown in in FIG. 7B. In addition, the operation does not affect display of the music application window 30 and the multi-screen collaboration window 10 on the PC 200.

Optionally, in a process of switching from "a single window" to "a plurality of windows" on the PC, if a user's operation of rotating the mobile phone is detected, in response to the rotation operation of the user, the sub-window switched out is displayed in a style after the user rotates the mobile phone.

It should be understood that sizes of horizontal display and vertical display of each application window may be adapted according to to-be-displayed interface content of the application, a size of a display of the PC 200, and the like. This is not limited in this embodiment of this application.

According to the foregoing method, the user may switch an independent sub-window out of the multi-screen collaboration window of the mobile phone displayed on the PC, and a running interface of an application is displayed in the independent sub-window, so as to better use a large screen of the PC in a display manner of "a main window+a plurality of sub-windows" on the PC. Moreover, for each sub-window, the user may independently perform operations such as closing, maximizing, minimizing, and hiding; and the user may further perform an operation of controlling all sub-windows in the main window. The method is easy and convenient to operate, and the user may use a plurality of applications of the mobile phone at the same time with reference to a current use requirement, thereby enhancing office efficiency and improving user experience.

Furthermore, in addition to the method described in FIG. 5A to FIG. 5E, the user may further separate, through the "more" button, an application window hidden in the "more" button.

Figure 8A:
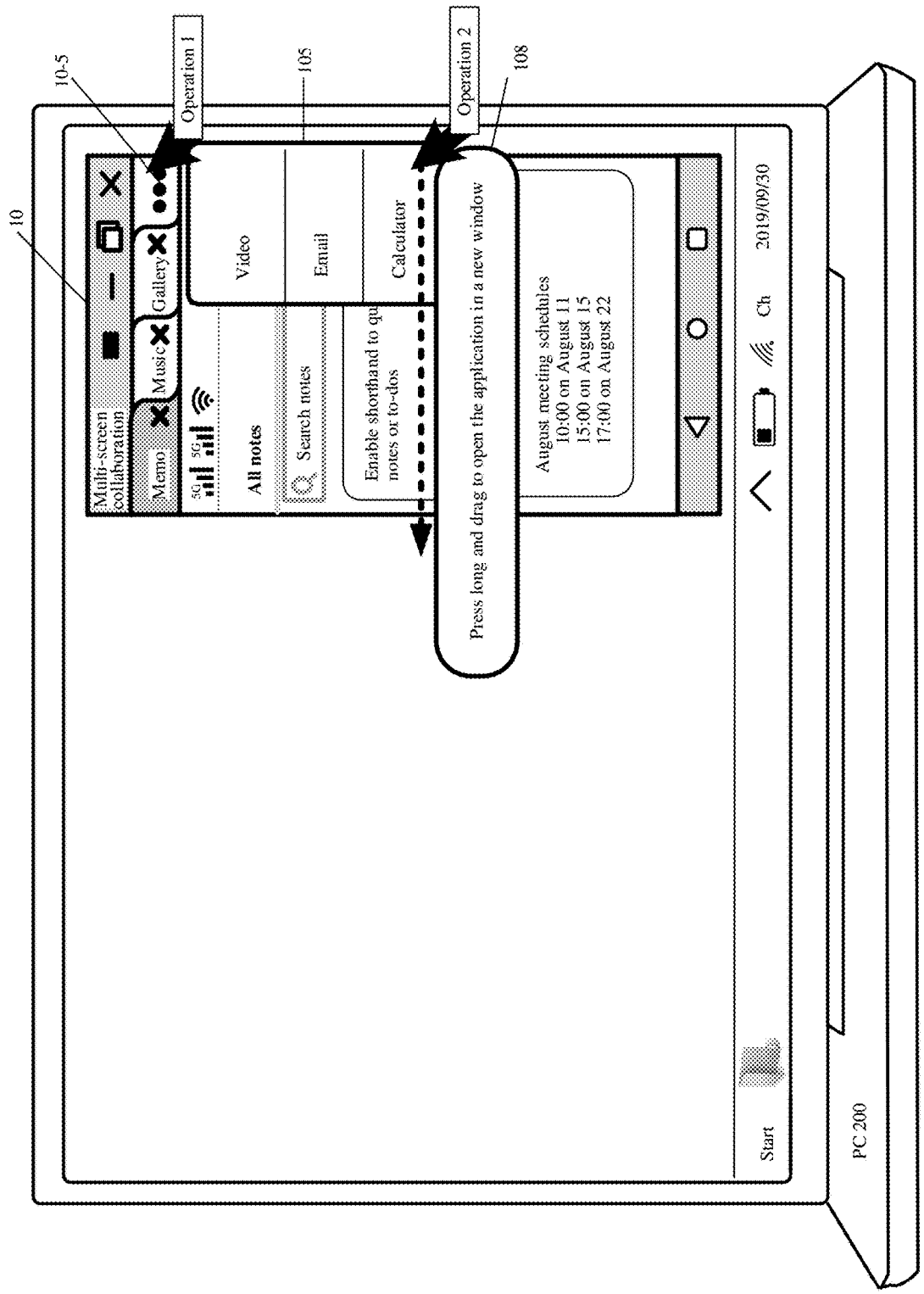
FIG. 8A to FIG. 8D are a schematic diagram of an interface of another PC according to an embodiment of this application.

FIG. 8A to FIG. 8D are a schematic diagram of an interface of another PC according to an embodiment of this application. As shown in FIG. 8A, a multi-screen collaboration window 10 is displayed on an interface of a PC 200, the multi-screen collaboration window 10 currently displays a main interface of a memo application, and a memo tab is displayed in a highlighted status shown in gray.

For example, when a user performs an operation 1 shown in FIG. 8A, that is, clicks a "more" button 10-5, a window 105 is displayed close to the "more" button 10-5 in response to the click operation of the user. The window 105 displays a list of some applications that are not displayed in a tab area 102, where the application list includes: a video, an email, and a calculator.

Figure 8B:
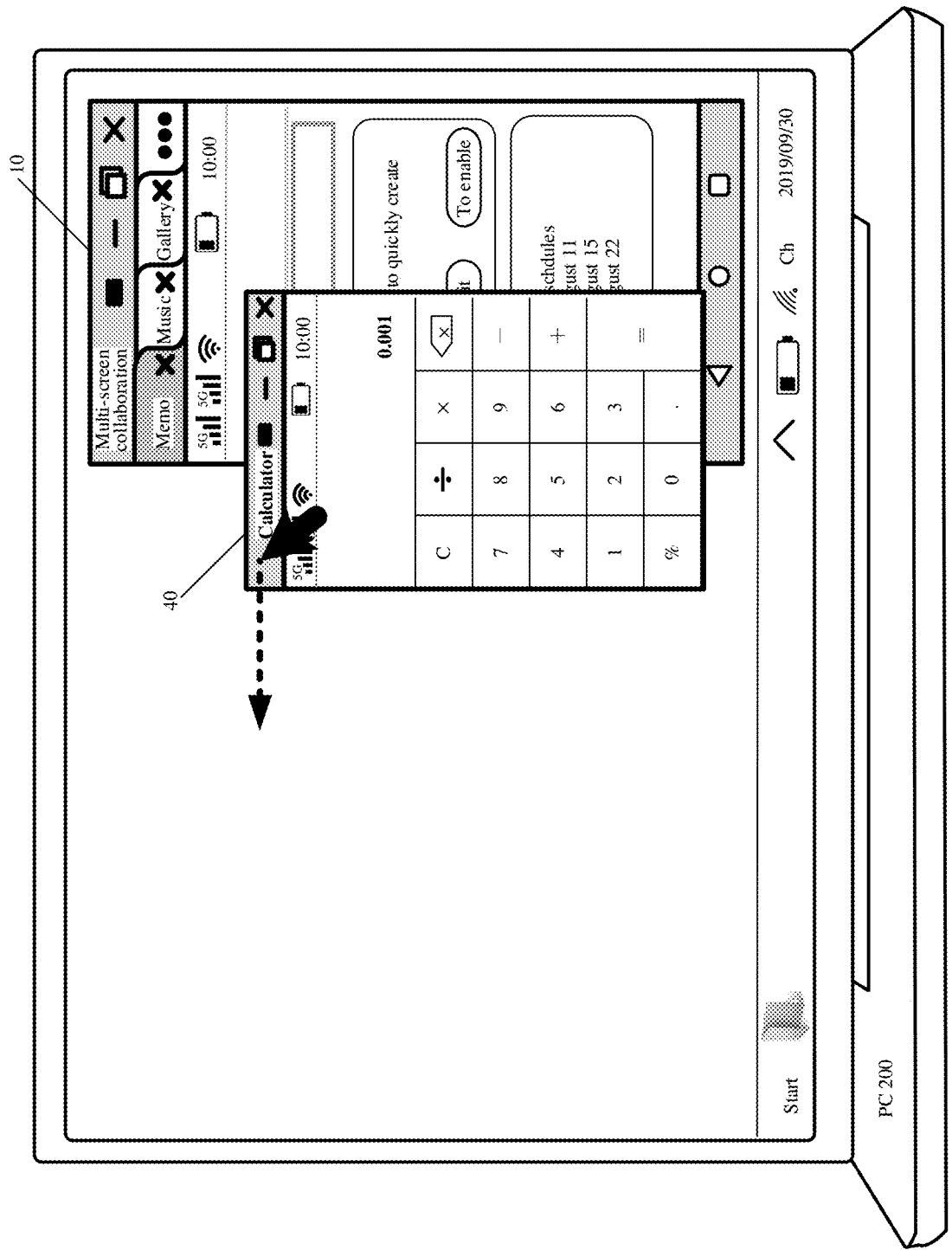

For example, the user performs an operation by using a mouse. When the user places the mouse on a "Calculator" application, a reminder window 108 may be automatically displayed on the interface of the PC 200, to remind the user "Press long and drag to open the application in a new window". The user may perform, according to an instruction of the reminder window 108, an operation 2 shown in FIG. 8A, select a menu where the "Calculator" application in the window 105 is located, and drag the menu in a direction indicated by a dashed line. In response to the selection and dragging operation of the user, as shown in FIG. 8B, a calculator application window 40 is displayed in a form of another floating window on the interface of the PC 200. The calculator application window 40 in a floating status may continue to move on the interface of the PC 200 following the dragging direction indicated by the dashed line.

Figure 8C:
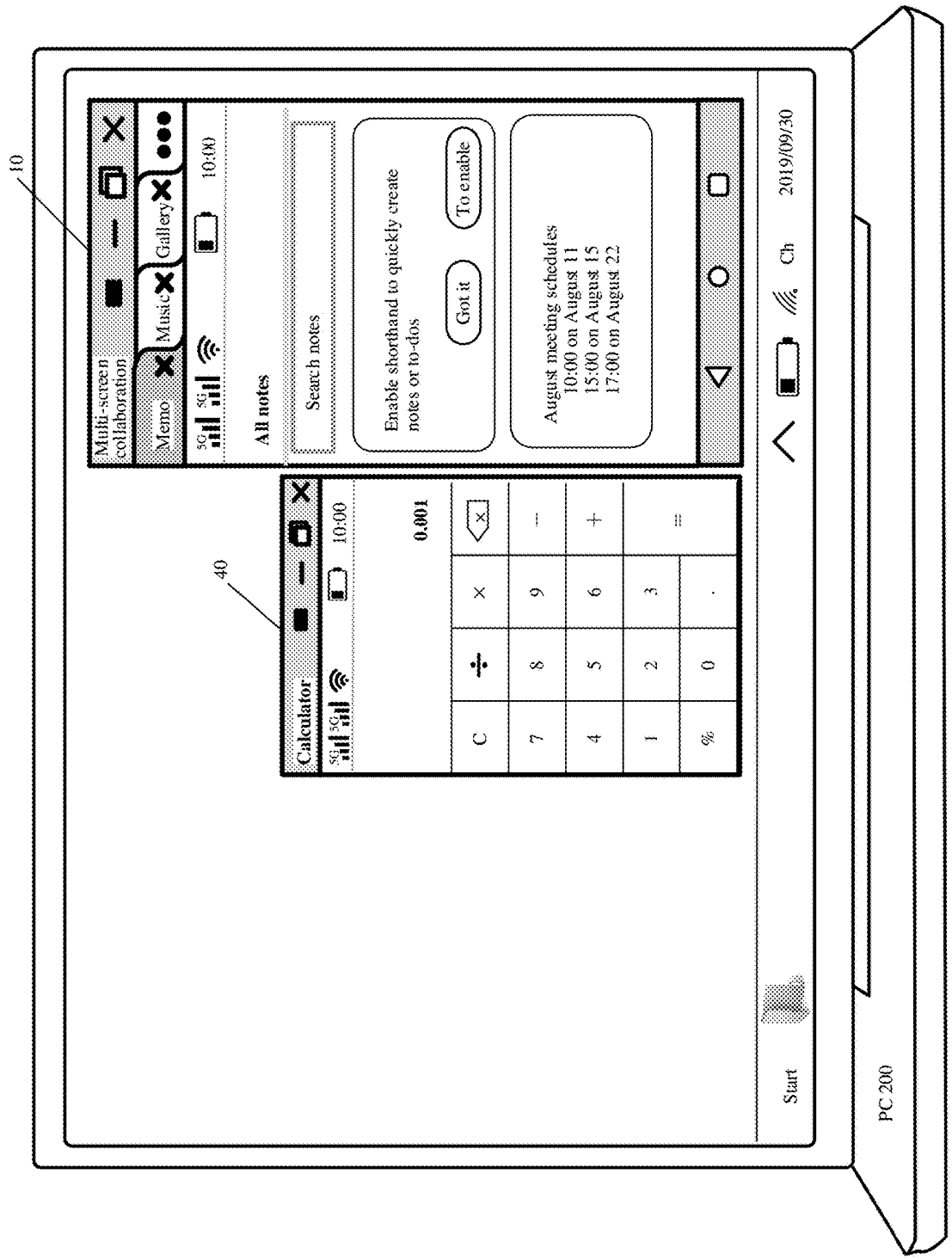

When dragging the selected calculator application window 40 to a position outside an area where the multi-screen collaboration window 10 is located on the PC 200, the user releases the calculator application window 40, and in response to the release operation of the user, as shown in FIG. 8C, a running interface of the calculator application is displayed in another window different from the multi-screen collaboration window 10 on the PC 200.

It should be understood that, a process of switching a sub-window from the "more" button 10-5 does not affect a display status of the multi-screen collaboration window 10. For example, as shown in FIG. 8C, the display status of the multi-screen collaboration window 10 is consistent with that shown in FIG. 8A, that is, a running interface of a memo application is displayed, and a memo tab is displayed in a highlighted status shown in gray.

It should be further understood that, in this case, the window 105 invoked by the "more" button in the multi-screen collaboration window 10 does not include the calculator application. That is, for the calculator application that runs in the background and is hidden in the "more" button, the user may switch the calculator application from a main window to an independent sub-window in a manner of selecting and dragging the calculator application, and a running interface of a calculator is displayed in the independent sub-window.

For simplicity, for a display effect, a display position, a display level, and the like in the window switching process, refer to related descriptions in FIG. 5A to FIG. 5E. Details are not described herein again.

Figure 8D:
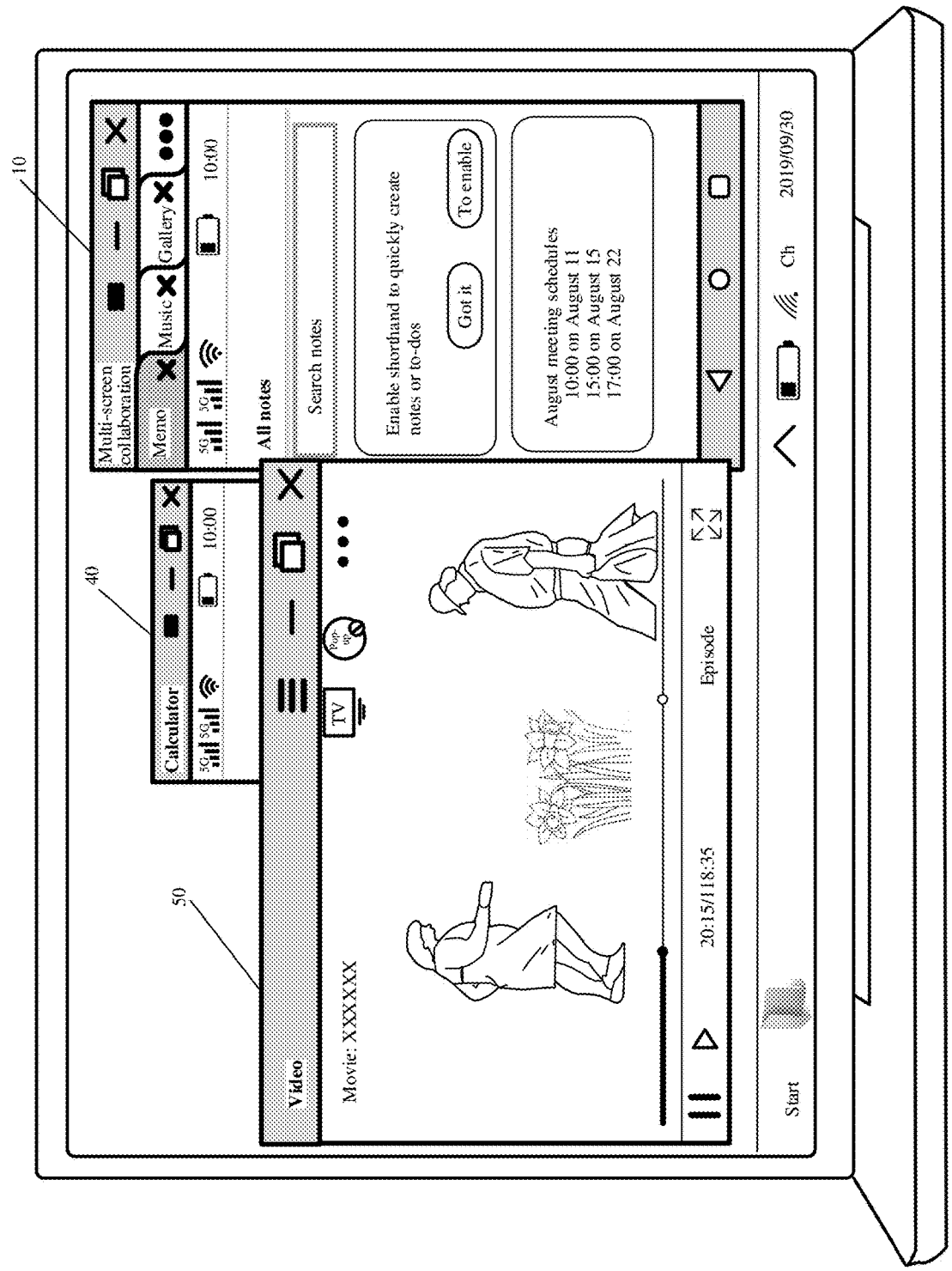

Similarly, the user may further select and drag a video application hidden in the "more" button 10-5. As shown in FIG. 8D, on the interface of the PC 200, a running interface of the video application is displayed in another window, namely, a video application window 50, different from the multi-screen collaboration window 10 and the calculator application window 40. In this case, the window 105 invoked by the "more" button 10-5 in the multi-screen collaboration window 10 does not include the video application. Interface content of a button, a control, and the like included in the video application window 50 is not limited in this embodiment of this application.

According to the foregoing solution, a user may select and drag a tab in a tab area, or select and drag an application name hidden in a "more" button, to display, in a form of an independent sub-window, any application running in a background on the interface of the PC. The method is easy to operate, and may quickly implement switching from "a single window" to "a plurality of windows", better use a large screen of the PC in a display manner of "a main window+a plurality of sub-windows" on the PC, and provide a user with experience of using mobile phone applications on the PC. Moreover, during switching of a window, a process of a running application is not interrupted, thereby improving user experience.

Figure 9A:
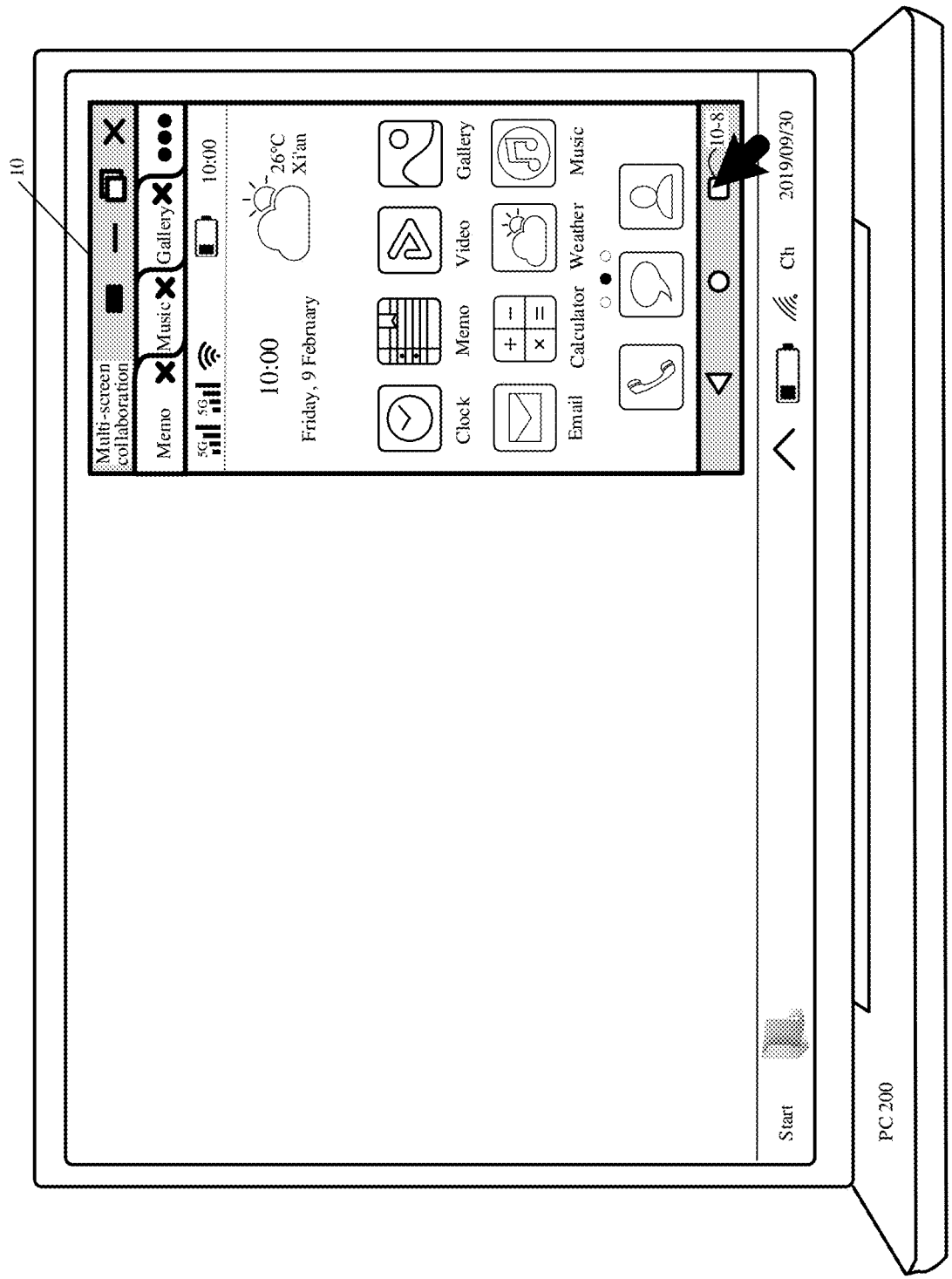
FIG. 9A to FIG. 9F are a schematic diagram of an interface of another PC according to an embodiment of this application.

FIG. 9A to FIG. 9F are a schematic diagram of an interface of still another PC according to an embodiment of this application. As shown in FIG. 9A, a multi-screen collaboration window 10 is displayed on an interface of a PC 200, the multi-screen collaboration window 10 displays a main interface of a mobile phone 100, and a plurality of applications such as a memo application, a music application, and a gallery application of the mobile phone 100 run in a background. When the multi-screen collaboration window 10 displays the main interface of the mobile phone 100, the memo application, the music application, and the gallery application displayed in a tab area 102 are all in a non-selected status.

Figure 9B:
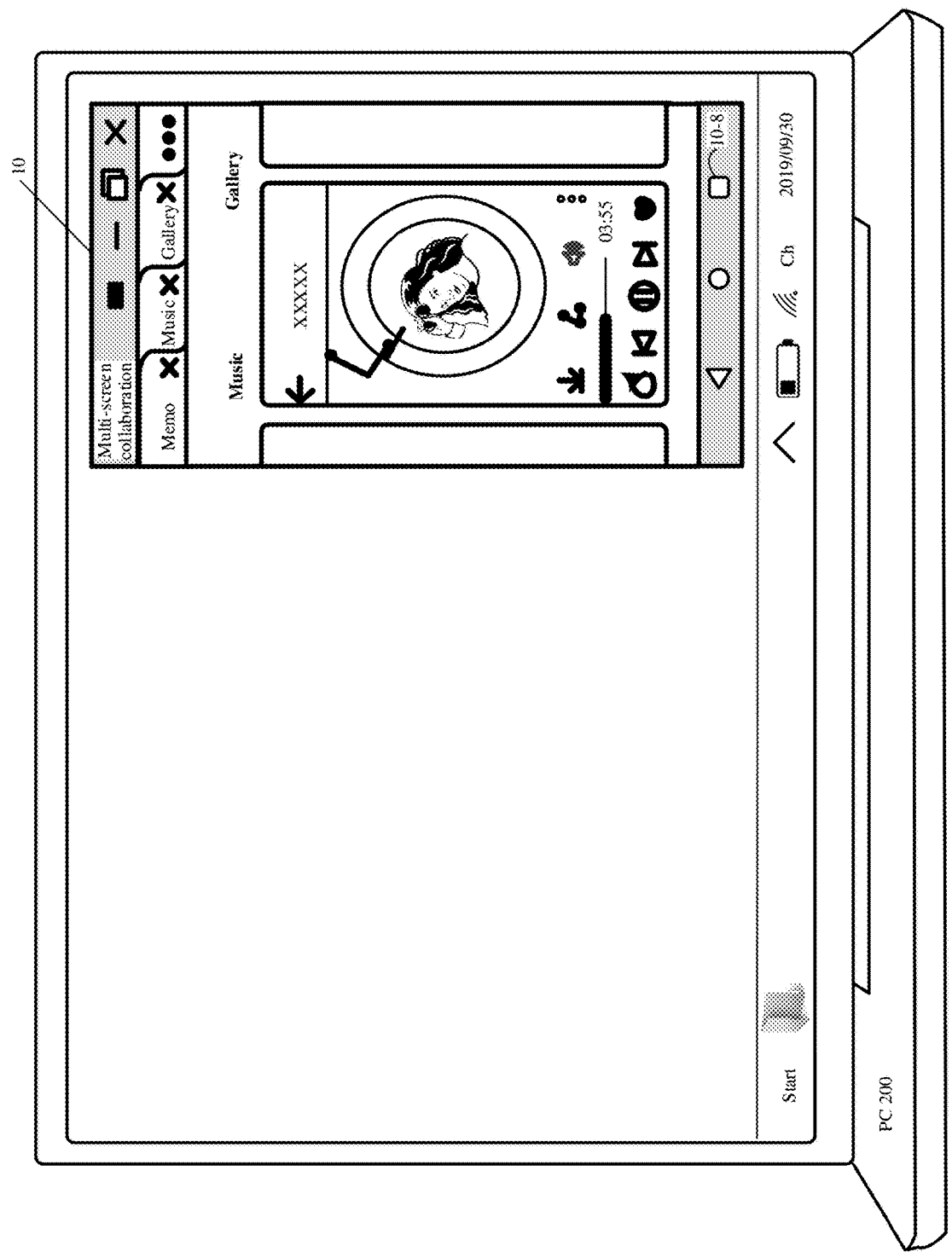

For example, as shown in FIG. 9A, a user clicks a multi-task button 10-8 in a bottom area 103 of the multi-screen collaboration window 10, and in response to the click operation of the user, the multi-screen collaboration window 10 displays a multi-task switching interface shown in FIG. 9B. The multi-task switching interface displays, in a form of cards, thumbnail interfaces of the music application, the gallery application, and the memo application running in the background. The user may view other applications running in the background in a manner such as sliding left or sliding right. Details are not described herein.

When the user places a mouse on the music application card in the multi-task switching interface, a reminder window 109 may be automatically displayed, to prompt the user "Press long and drag to open the application in a new window". The user may select the music application card according to the prompt of the reminder window 109 and drag the music application card in a direction indicated by a dashed line. As shown in FIG. 9D, in response to the selection and dragging operation of the user, a music application window 30 is displayed in a form of another floating window on the interface of the PC 200. The music application window 30 in a floating status may continue to move on the interface of the PC 200 following the dragging direction indicated by the dashed line.

Figure 9C:
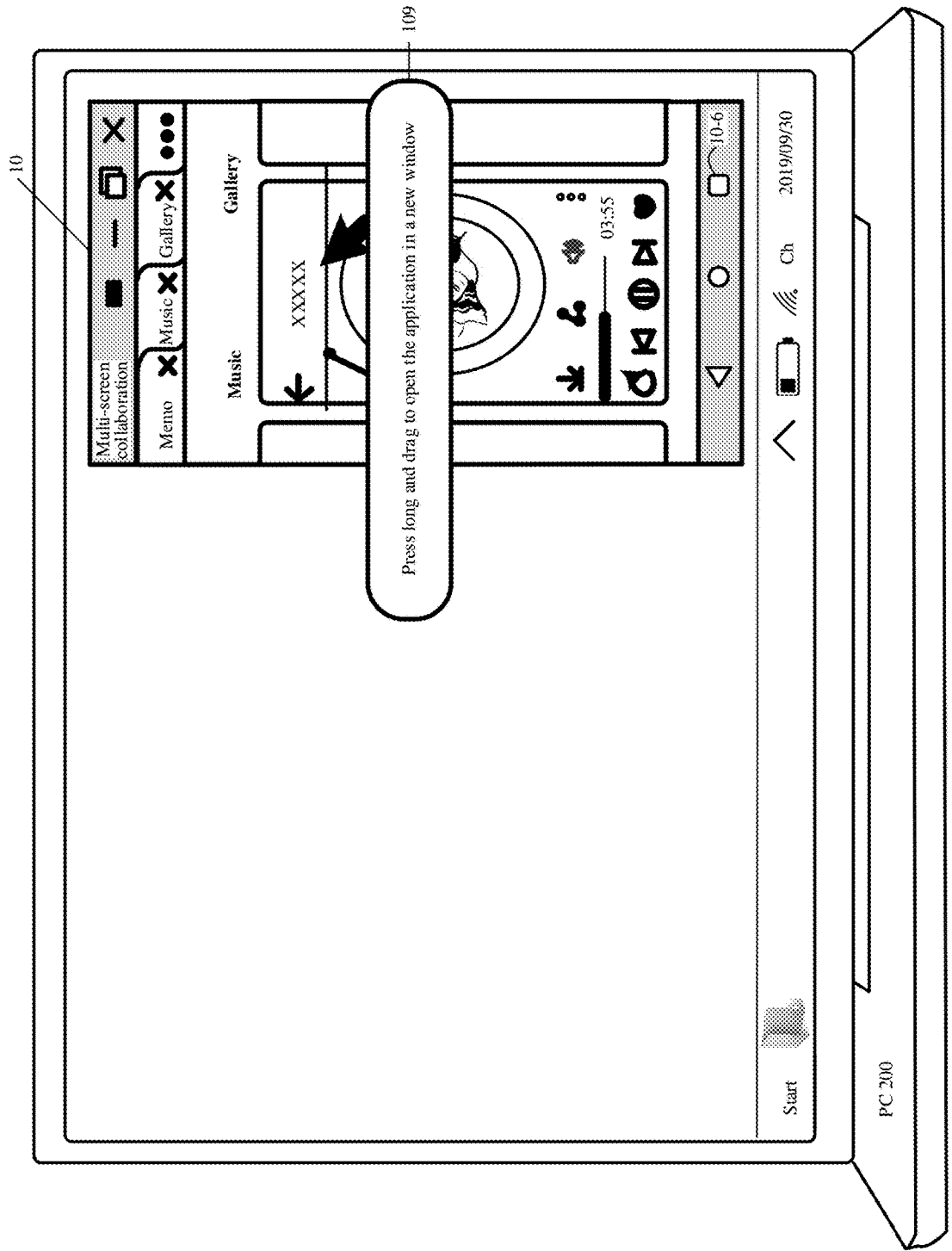
Figure 9D:
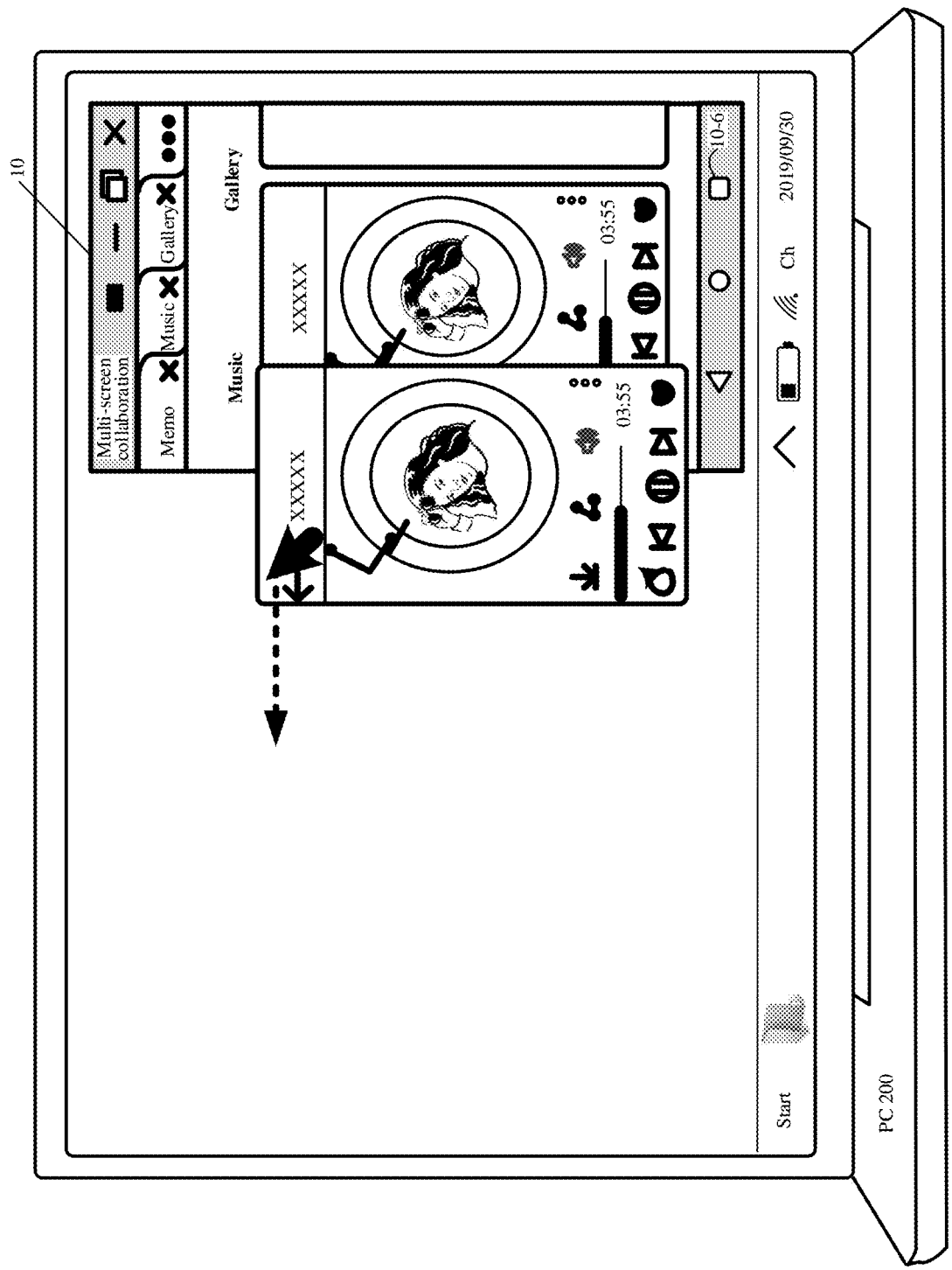
Figure 9E:
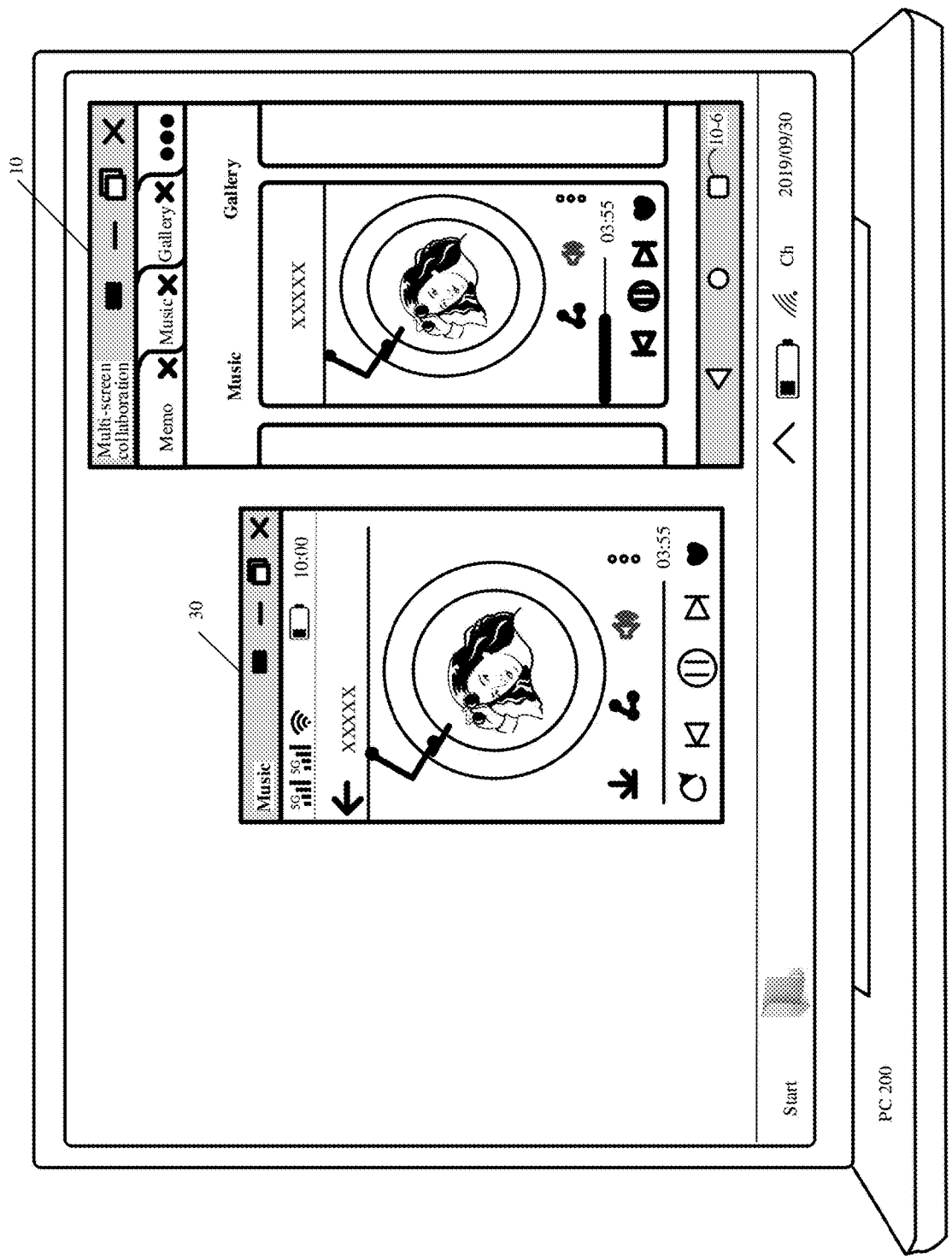

When dragging the selected music application window 30 to a position outside an area where the multi-screen collaboration window 10 is located on the PC 200, the user releases the music application window 30, and in response to the release operation of the user, as shown in FIG. 9E, a running interface of the music application is displayed in another window different from the multi-screen collaboration window 10 on the PC 200. In addition, in the multi-screen collaboration window 10, the multi-task switching interface still displays, in a form of cards, thumbnail interfaces of applications running in the background.

It should be understood that, in this case, although the music application has been displayed in a form of an independent sub-window, the music application is still an application running in the background of the mobile phone. Therefore, in the multi-screen collaboration window 10 shown in FIG. 9E, the multi-task switching interface still includes the music application card.

Figure 9F:
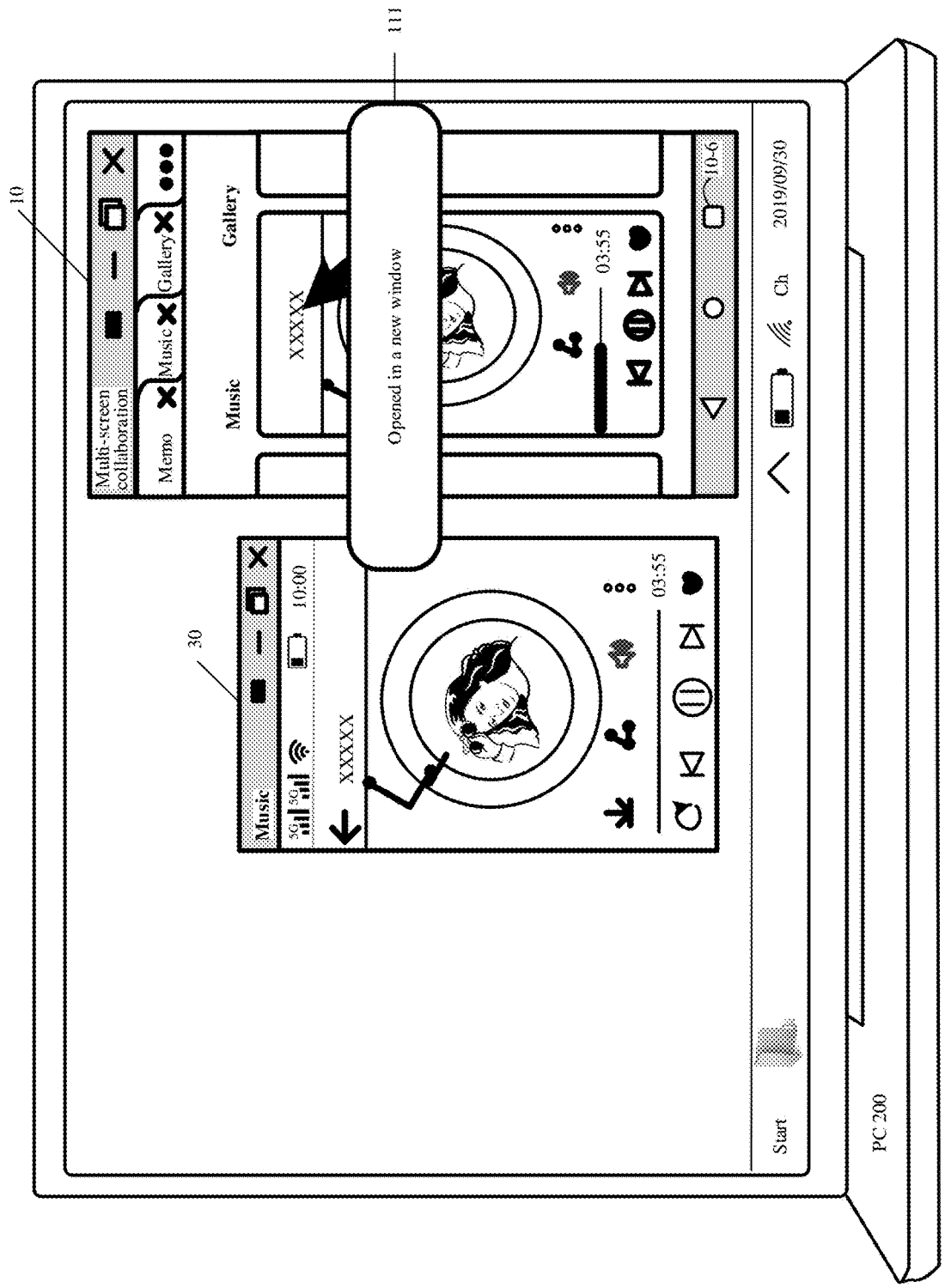

In a possible scenario, when the user places the mouse again on the music application card in the multi-task switching interface, as shown in FIG. 9F, another reminder window 111 may be automatically displayed, to prompt the user "Opened in a new window". That is, for an application that has been opened in an independent sub-window, when the user opens the application again by using a same method, the user may be prompted, in a manner of a reminder window, that the window has been displayed in a new window. The method may avoid a misoperation of a user, thereby improving user experience.

With reference to FIG. 9A to FIG. 9F, the foregoing describes a manner of selecting and dragging any application card on a multi-task interface, an application corresponding to the card is switched from a main window to an independent sub-window, and a running interface of the application is displayed in the independent sub-window. The method is easy to operate, and may quickly implement switching from "a single window" to "a plurality of windows", better use a large screen of the PC in a display manner of "a main window+a plurality of sub-windows" on the PC, and provide a user with experience of using mobile phone applications on the PC. Moreover, during switching of a window, a process of a running application is not interrupted, thereby improving user experience.

In another possible scenario, when the user enables one or more applications in the multi-screen collaboration window 10, the multi-screen collaboration window 10 may not display, in a form of tabs, a plurality of applications running in the background. For this scenario, an embodiment of this application further provides another window switching method, which may also quickly implement switching from "a single window" to "a plurality of windows".

Figure 10A:
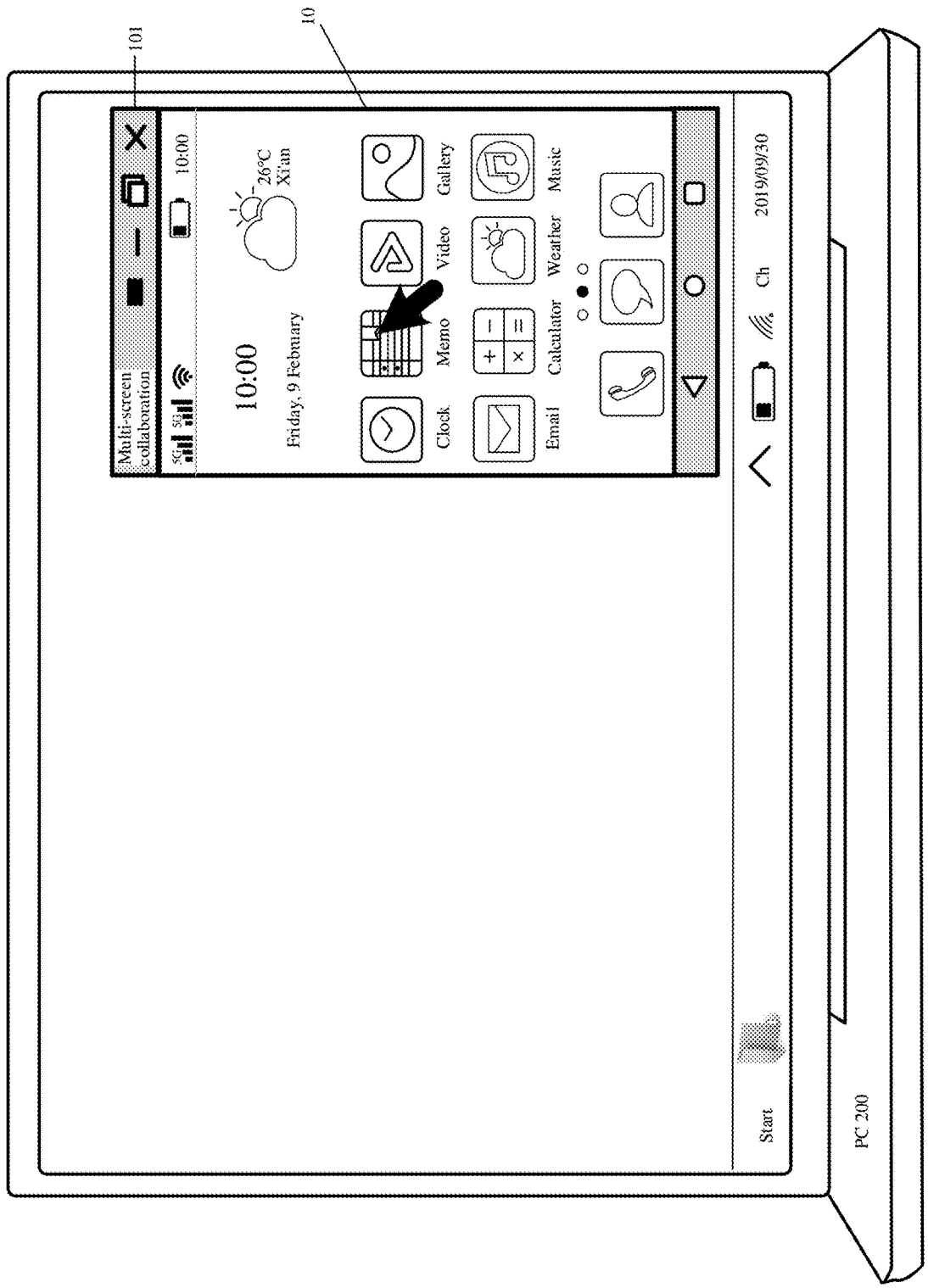
FIG. 10A to FIG. 10C are a schematic diagram of an interface of another PC according to an embodiment of this application.
Figure 10B:
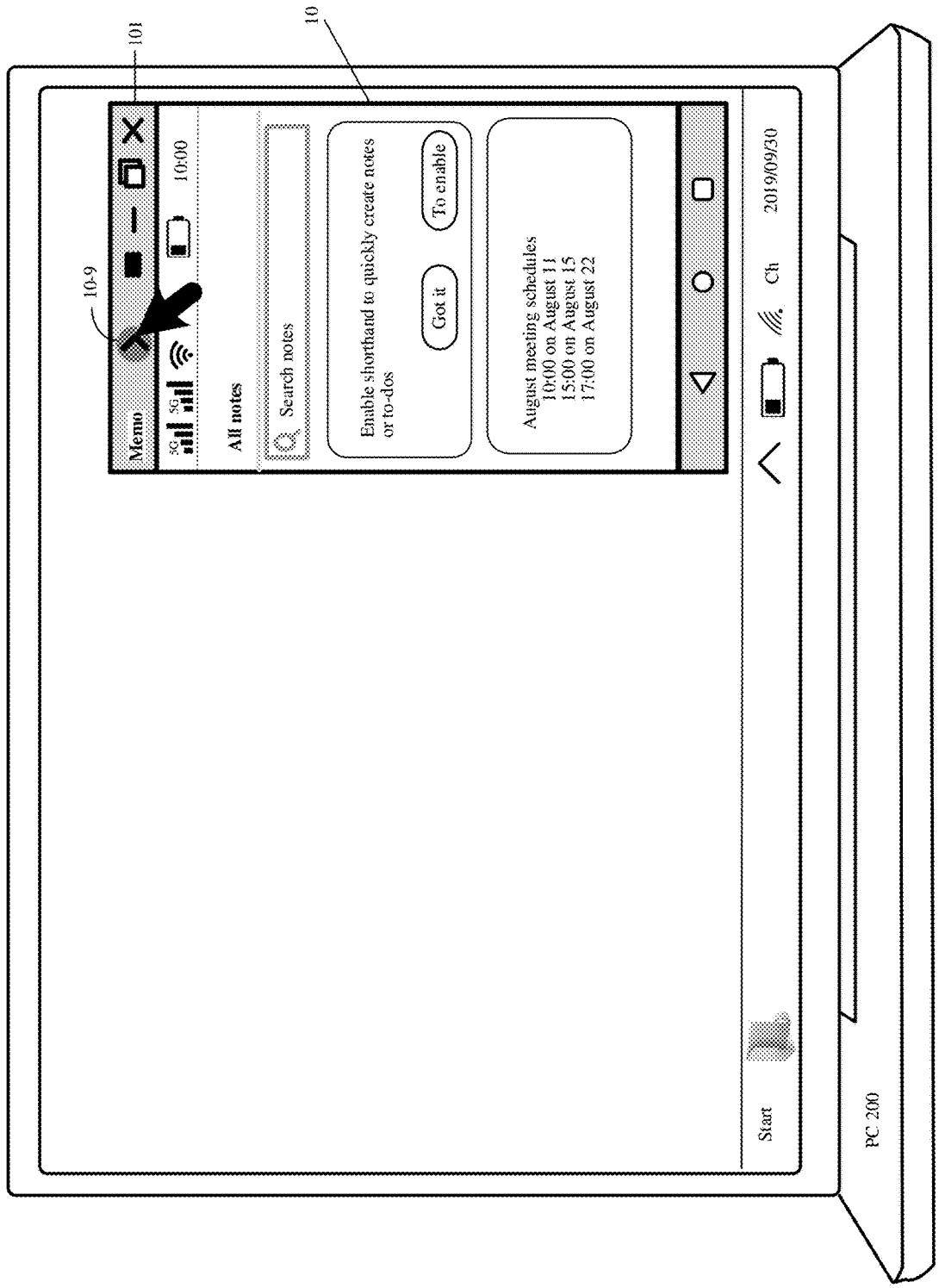
Figure 10C:
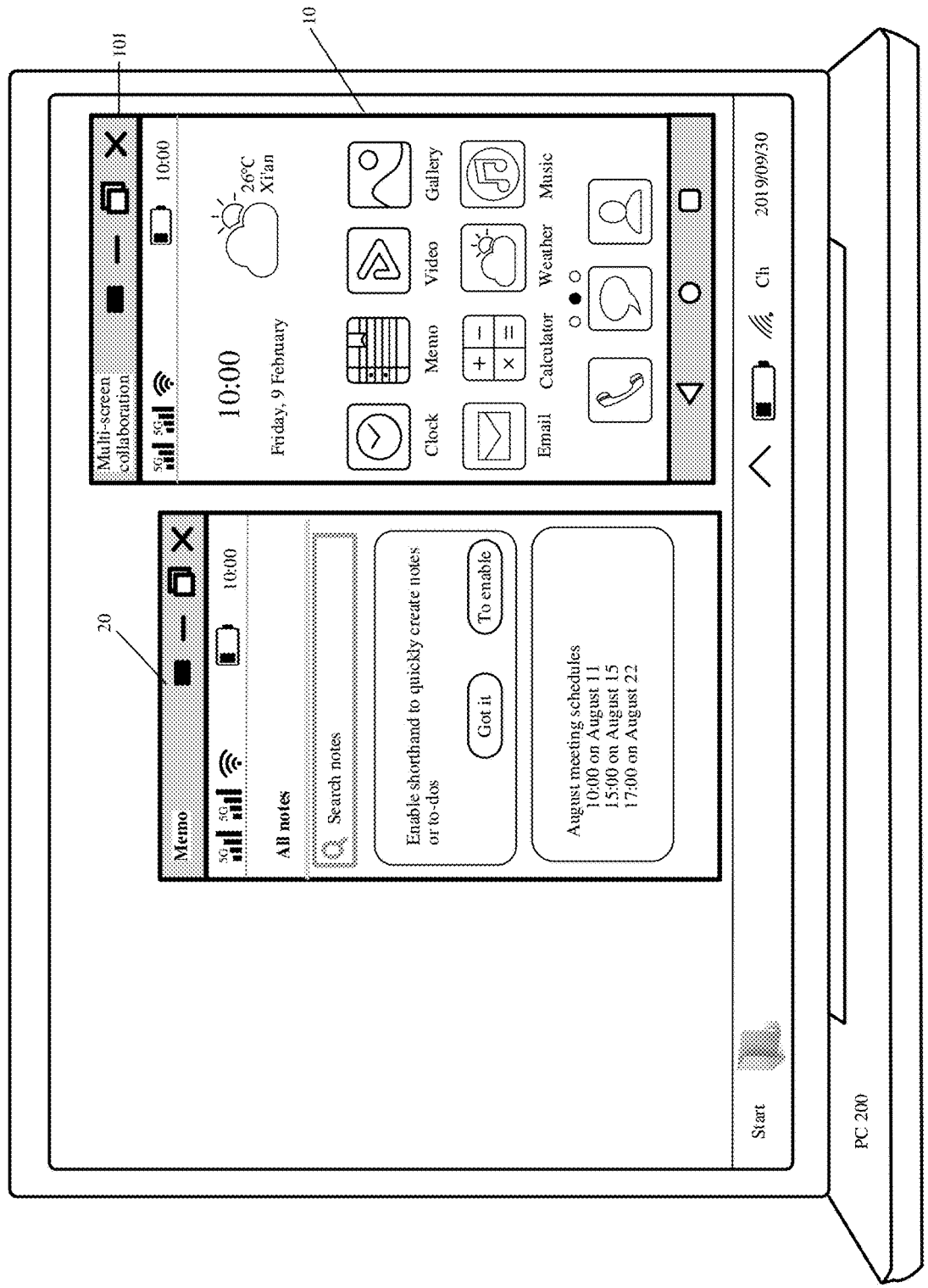

FIG. 10A to FIG. 10C are a schematic diagram of an interface of another PC according to an embodiment of this application. As shown in FIG. 10A, a multi-screen collaboration window 10 is displayed on an interface of a PC 200, the multi-screen collaboration window 10 displays a main interface of a mobile phone 100, and the multi-screen collaboration window 10 does not include a tab area.

For example, as shown in FIG. 10A, a user clicks (not limited to an operation such as single-click or double-click) a memo application icon for enabling the multi-screen collaboration window 10, and in response to the click operation of the user, the multi-screen collaboration window 10 displays an interface shown in FIG. 10B. On the interface shown in FIG. 10B, a title of a function area 101 changes from "Multi-screen collaboration" to an application, namely, "Memo", to which the current interface belongs. In addition, a button 10-9 is included next to the application name "Memo" of the function area 101. The button 10-9 is used as a shortcut key to quickly display a current application in a form of an independent sub-window.

As shown in FIG. 10B, the user clicks the button 10-9, and in response to the click operation of the user, the PC 200 displays an interface shown in FIG. 10C, and automatically switches the memo application to an independent sub-window, namely, a memo application window 20. The multi-screen collaboration window 10 restores to display the main interface of the mobile phone 100, and the title of the function area 101 changes from "Memo" to "Multi-screen collaboration". It should be understood that when the title of the function area 101 displays "Multi-screen collaboration", the button 10-9 is not included.

Figure 11A:
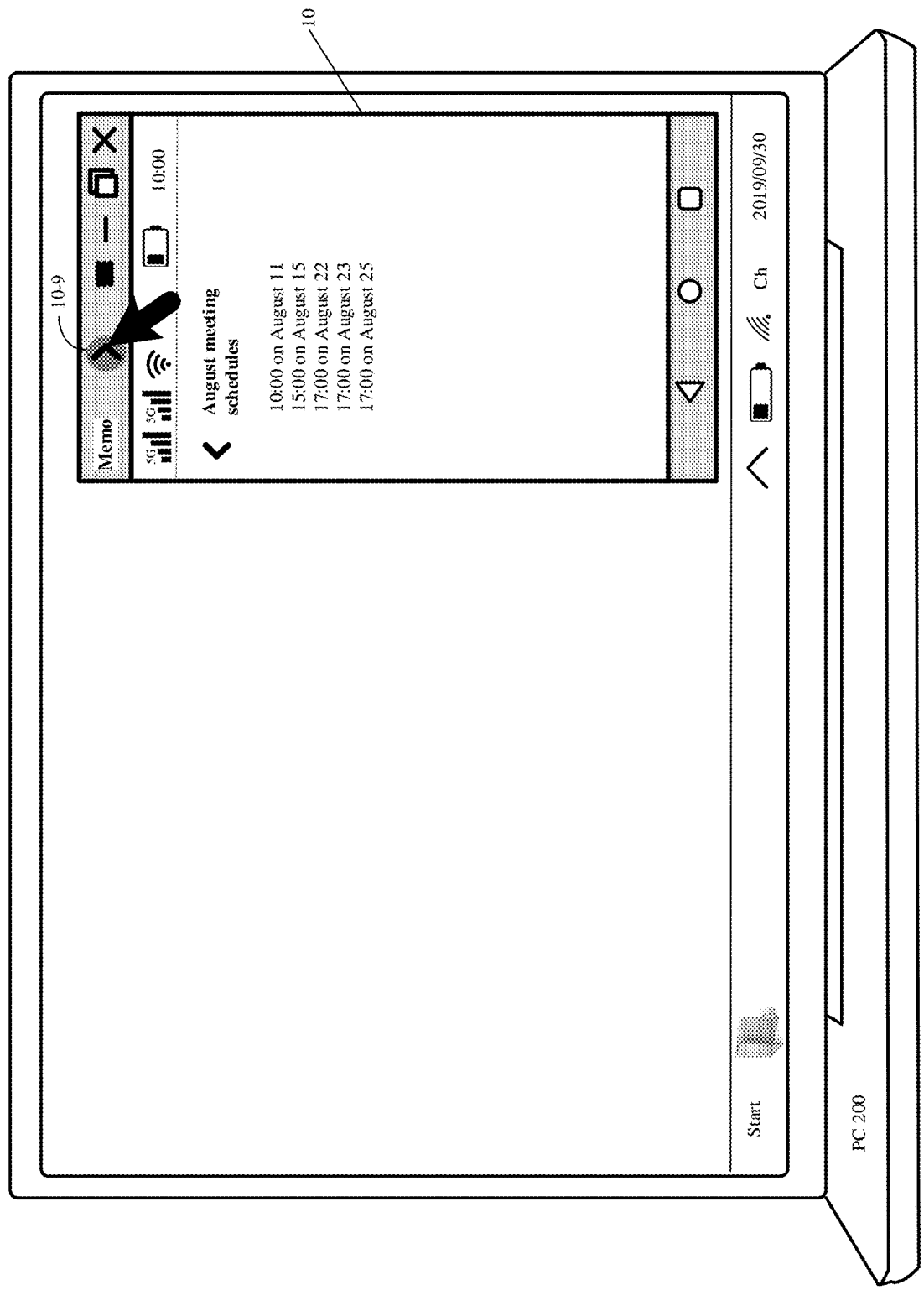
FIG. 11A to FIG. 11C are a schematic diagram of an interface of another PC according to an embodiment of this application.
Figure 11B:
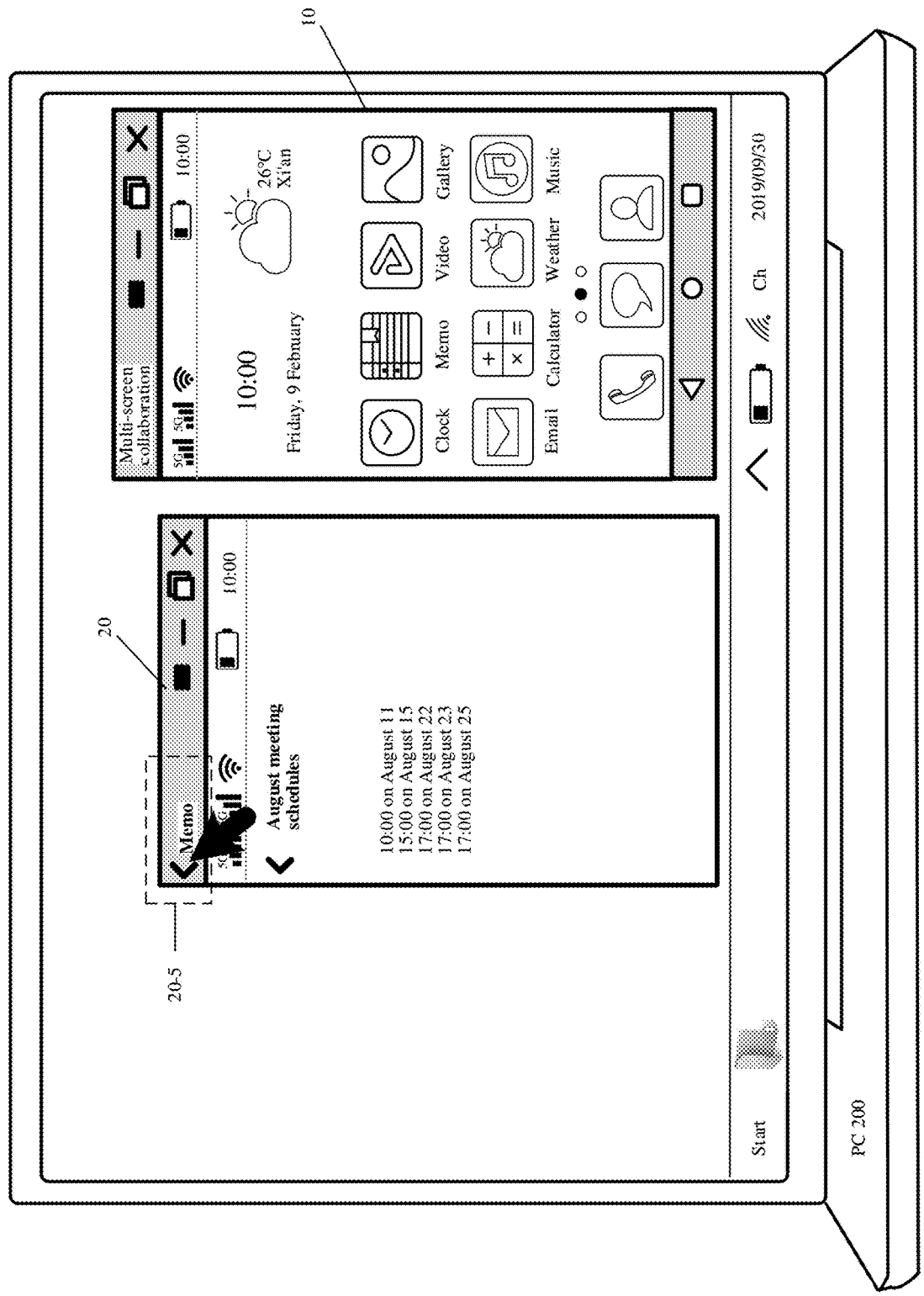
Figure 11C:
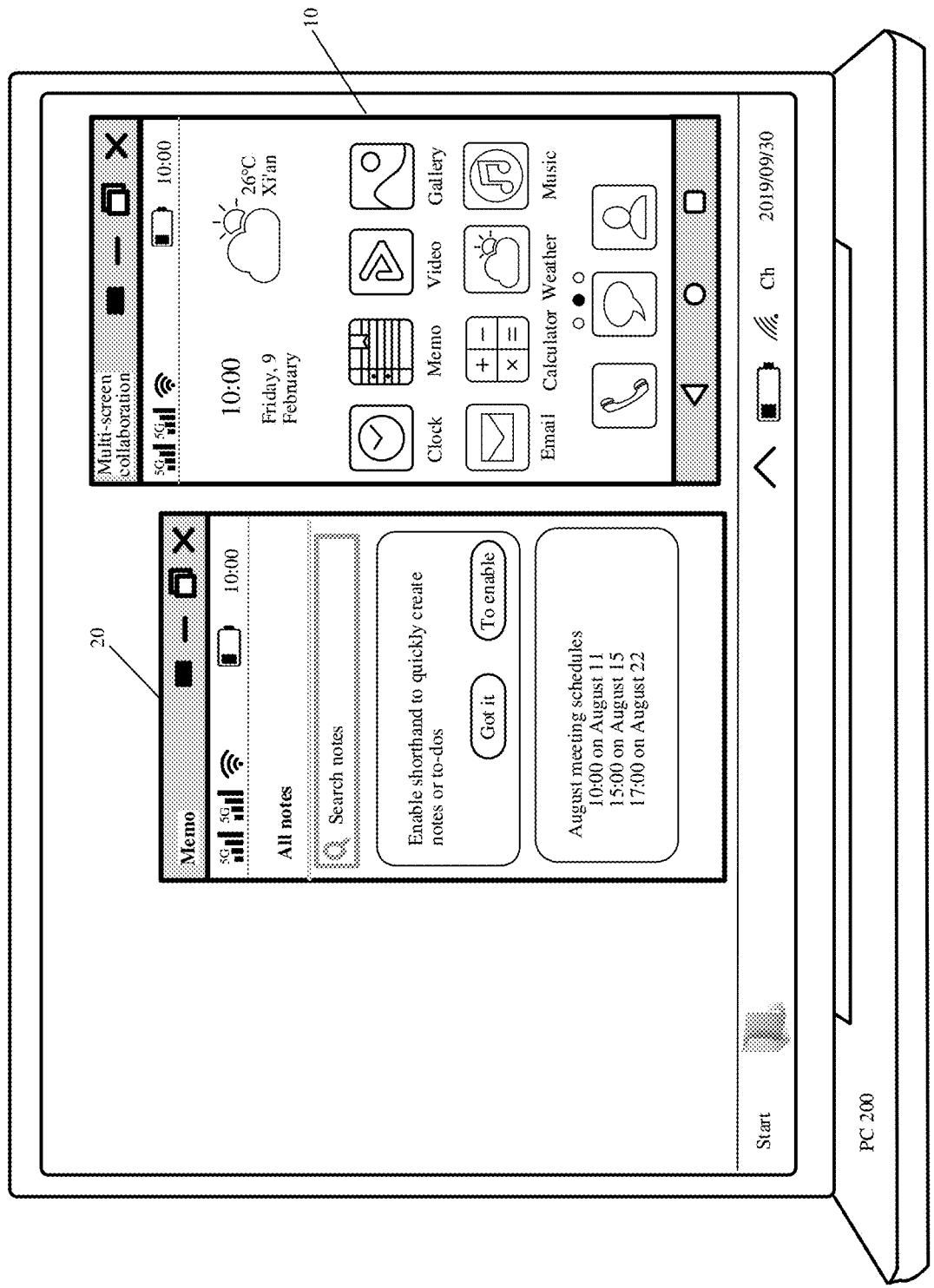

FIG. 11A to FIG. 11C are a schematic diagram of an interface of another PC according to an embodiment of this application. As shown in FIG. 11A, it is assumed that a secondary interface of a memo application of a mobile phone 100 is displayed in a multi-screen collaboration window 10 on an interface of a PC 200. For example, an "August meeting schedules" interface shown in FIG. 11A may be a secondary interface entered after a user clicks a menu, namely, August meeting schedules, on a main interface of running the memo application shown in FIG. 10A.

For example, as shown in FIG. 11A, regardless of whether the multi-screen collaboration window 10 displays the main interface of running the memo application or the secondary interface of the memo application, an application name "Memo" of the function area 101 and buttons included in the function area 101 remain unchanged. For example, a button 10-9 is included next to the application name "Memo".

As shown in FIG. 11A, the user clicks the button 10-9, and in response to the click operation of the user, the PC 200 displays an interface shown in FIG. 11B, and automatically switches the memo application to an independent sub-window, namely, a memo application window 20. The multi-screen collaboration window 10 restores to display the main interface of the mobile phone 100, the title of the function area 101 changes from the "Memo" to "Multi-screen collaboration", and the button 10-9 disappears.

As shown in FIG. 11B, display content of the memo application window 20 is consistent with that of the secondary interface of the memo application displayed by the multi-screen collaboration window 10 in FIG. 11A. That is, when an application is switched from a main window to a sub-window for independent display, an interface is consistent with a running interface of the application in the original main window.

Moreover, by comparing FIG. 10C with FIG. 11B, when the memo application window 20 displays the secondary interface of the memo application, as shown in FIG. 11B, a "back to previous level" button 20-5 may be included next to the application name, namely memo, and in FIG. 10C, when the memo application window 20 displays the primary interface (main interface) of the memo application, the "back to previous level" button 20-5 is not included.

As shown in FIG. 11B, when the user clicks the "back to previous level" button 20-5, in response to the click operation of the user, the memo application window 20 returns to the main interface of the memo application shown in FIG. 11C, and the "back to previous level" button 20-5 disappears. Details are not described herein again.

Figure 12A:
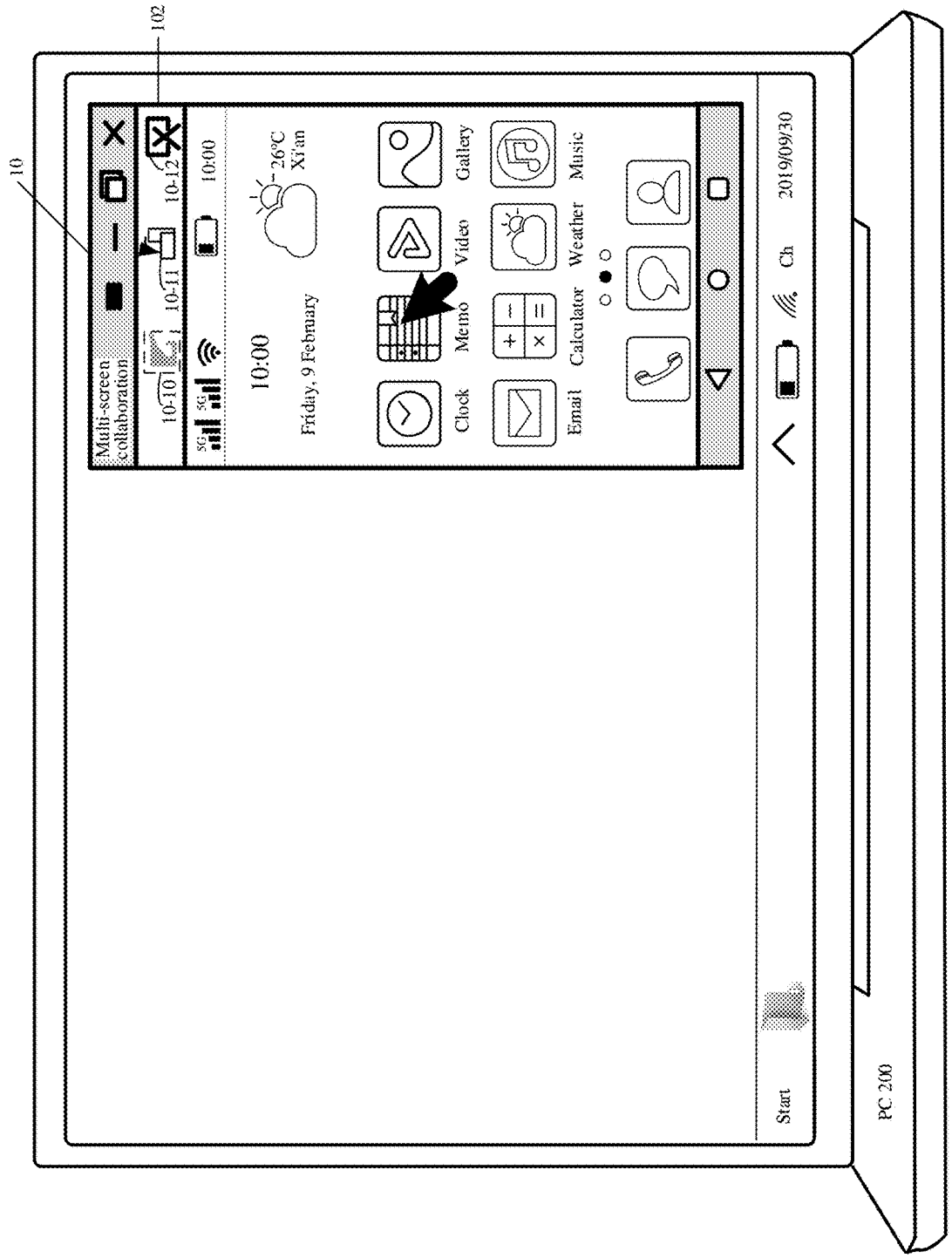
FIG. 12A to FIG. 12D are a schematic diagram of an interface of another PC according to an embodiment of this application.

FIG. 12A to FIG. 12D are a schematic diagram of an interface of another PC according to an embodiment of this application. As shown in FIG. 12A, a multi-screen collaboration window 10 is displayed on an interface of a PC 200, and the multi-screen collaboration window 10 displays a main interface of a mobile phone 100. An area 102 of the multi-screen collaboration window 10 may be used as a tab of no longer displaying an application, and a plurality of shortcut buttons are provided in the area in this embodiment of this application.

For example, as shown in FIG. 12A, the area 102 may include:

(1) A sub-window switch button 10-10 configured to switch an interface displayed in a current window to an independent sub-window for display, that is, quickly switch from "a single window" to "a plurality of windows".

(2) A rotation button 10-11 configured to change the current window from vertical display to horizontal display, or change the current window from horizontal display to vertical display.

(3) A screenshot button 10-12 configured to capture a display image on a screen. Optionally, the screenshot button 10-12 may be configured to capture an image of a main window, or may be configured to capture an image of a screen on which the screenshot button 10-12 is located. This is not limited in this embodiment of this application.

It should be understood that the area 102 may include more other buttons, or include some of the foregoing buttons. This is not limited in this embodiment of this application.

It should also be understood that the area 102 may be used as a control area provided by the PC 200 for the multi-screen collaboration window 10, is not affected by interface content displayed in the multi-screen collaboration window 10, and is always in a display status.

Optionally, as shown in FIG. 12A, when the multi-screen collaboration window 10 displays the main interface of the mobile phone 100, the sub-window switch button 10-10 in the area 102 is displayed in a gray-out status, indicating that the sub-window switch button 10-10 cannot be clicked, that is, the currently displayed main interface of the mobile phone 100 cannot be displayed in a form of an independent sub-window.

Figure 12B:
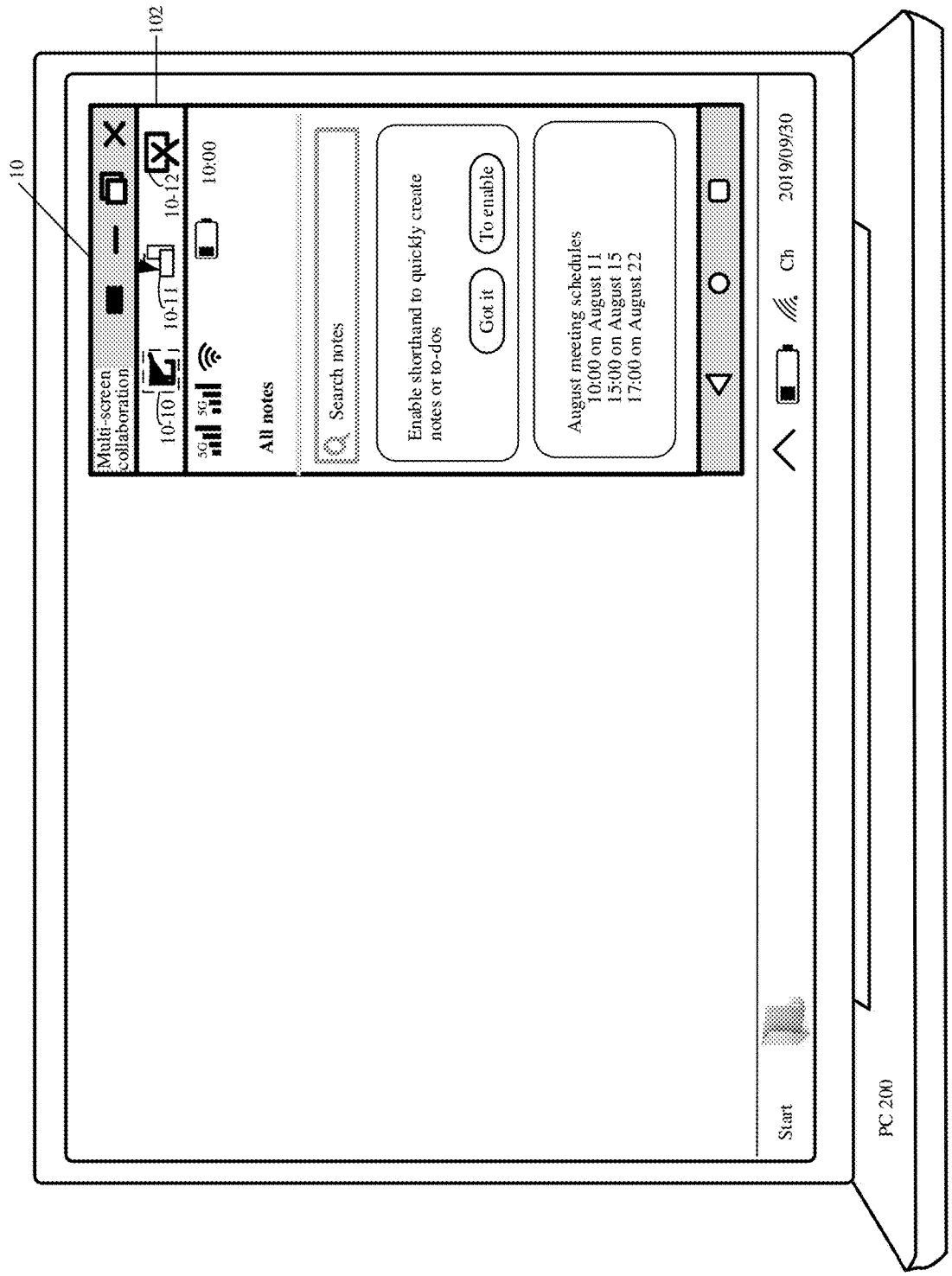

For example, as shown in FIG. 12A, a user clicks (not limited to an operation such as single-click or double-click) a memo application icon for enabling the multi-screen collaboration window 10, and in response to the click operation of the user, the multi-screen collaboration window 10 displays a main running interface of a memo application shown in FIG. 12B. In addition, in the multi-screen collaboration window 10, the area 102 may be used as a control area provided by the PC 200 for the multi-screen collaboration window 10, is not affected by interface content displayed in the multi-screen collaboration window 10, and is always in a display status.

Optionally, as shown in FIG. 12A, when the multi-screen collaboration window 10 displays the main running interface of the memo application, the sub-window switch button 10-10 in the area 102 is displayed in a black highlighted status, indicating that the sub-window switch button 10-10 may be clicked, that is, the currently displayed main running interface of the memo application may be displayed in a form of an independent sub-window.

Figure 12C:
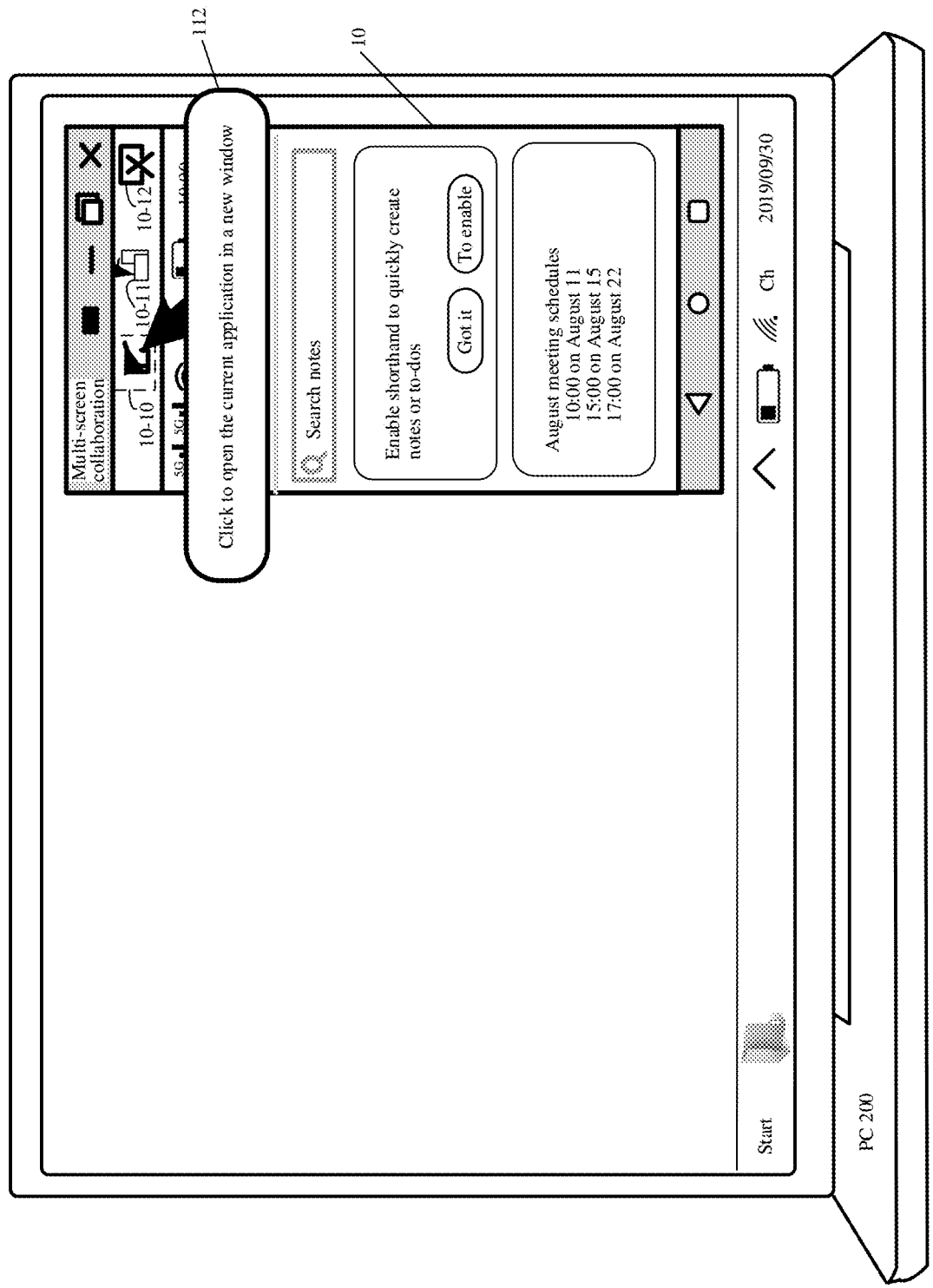
Figure 12D:
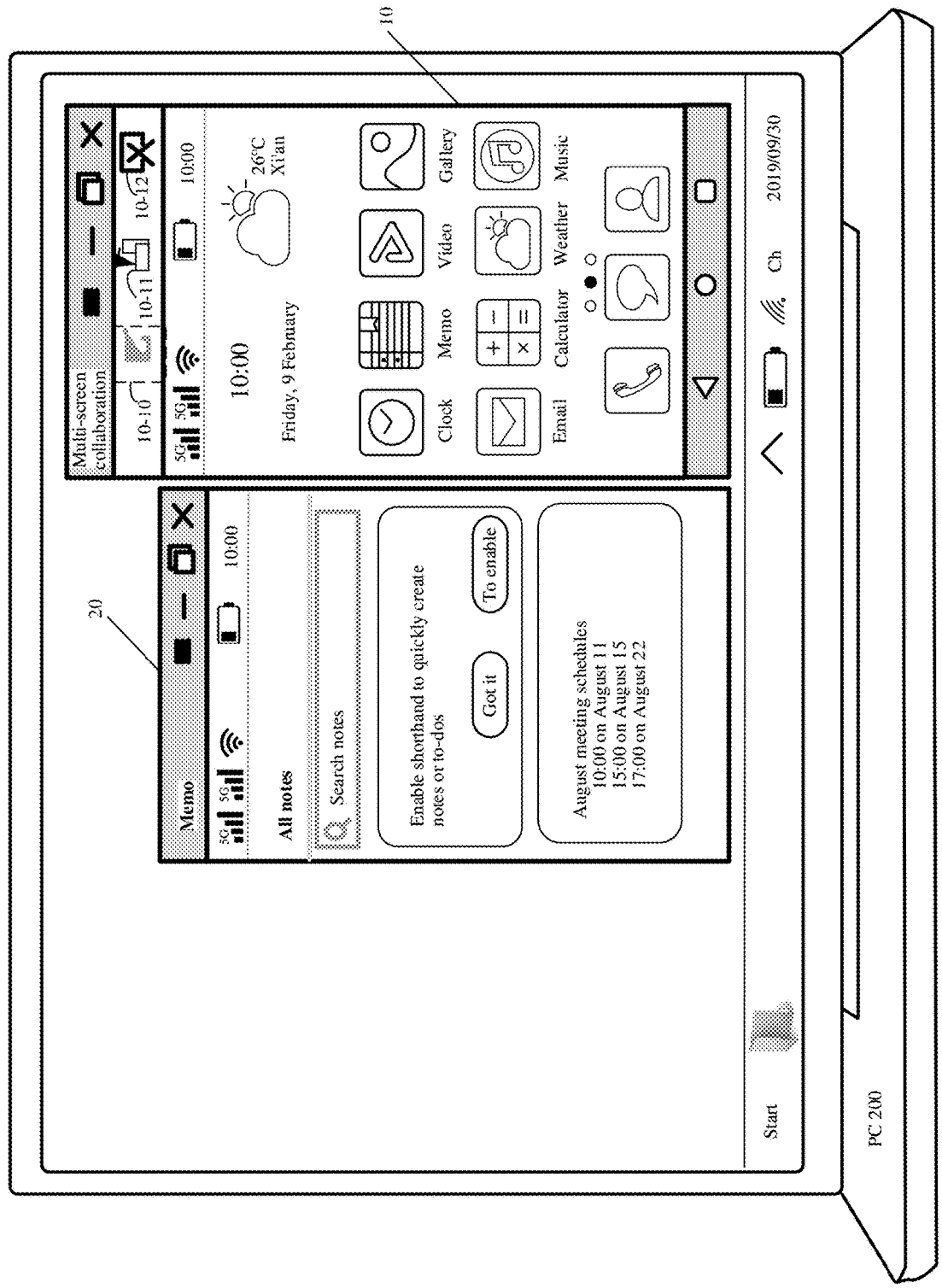

As shown in FIG. 12C, the user places a mouse at a position of the sub-window switch button 10-10, and the PC 200 displays a reminder window 112 close to a position of a mouse cursor, to prompt the user "Click to open the current application in a new window". The user may click the sub-window switch button 10-10 according to the prompt of the reminder window 112, and in response to the click operation of the user, the PC 200 displays an interface shown in FIG. 12D, and automatically switches the memo application to an independent sub-window, namely, a memo application window 20. The multi-screen collaboration window 10 restores to display the main interface of the mobile phone 100, and the sub-window switch button 10-10 in the area 102 changes to a gray-out status.

With reference to FIG. 10A to FIG. 10C, FIG. 11A to FIG. 11C, and FIG. 12A to FIG. 12D, the foregoing describes a case in which the user may implement switching from "a single window" to "a plurality of windows" by using the shortcut button. An embodiment of this application further provides another window switching method, which may also quickly implement switching from "a single window" to "a plurality of windows".

Figure 13A:
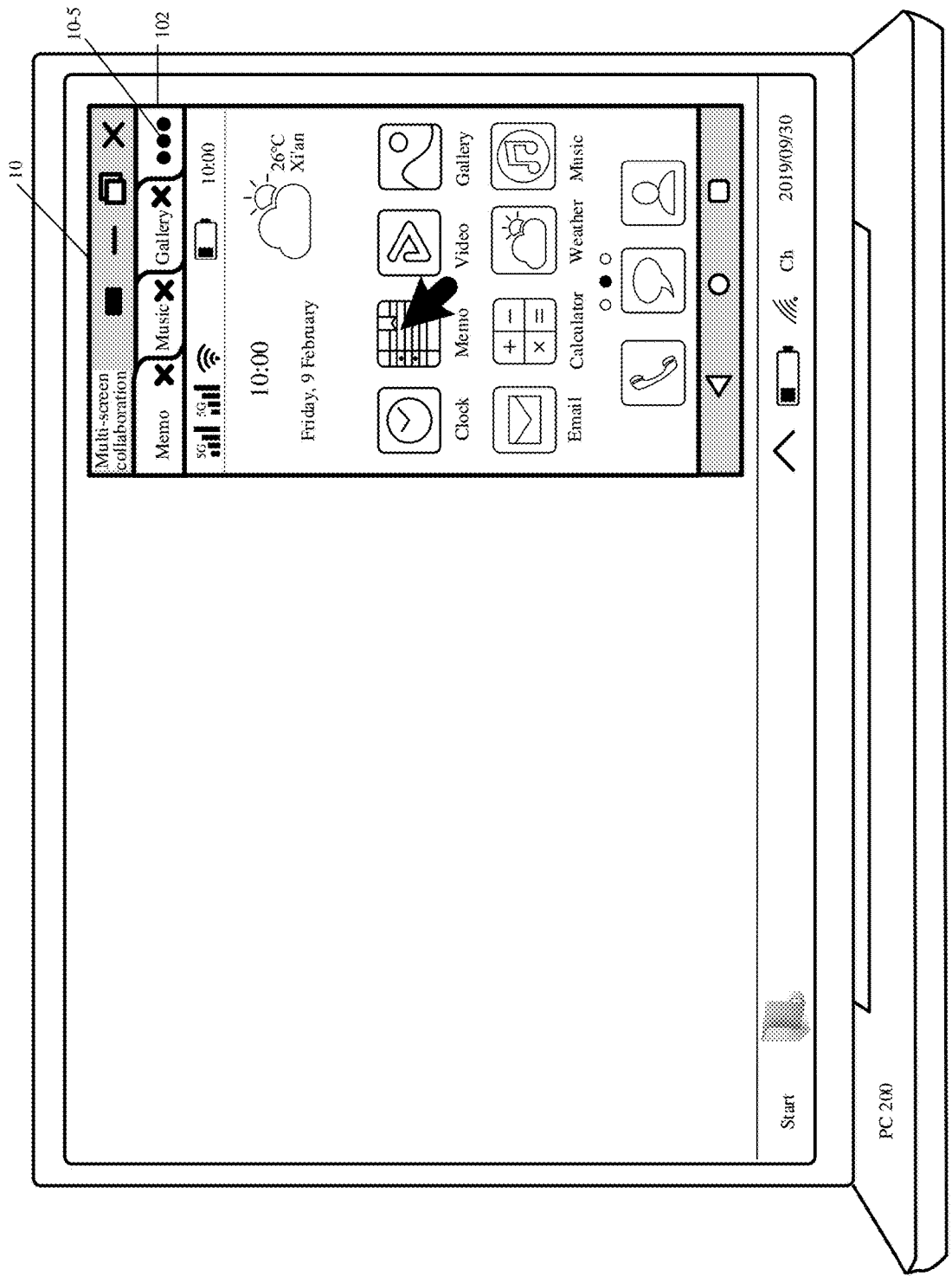
FIG. 13A to FIG. 13C are a schematic diagram of an interface of another PC according to an embodiment of this application.
Figure 13B:
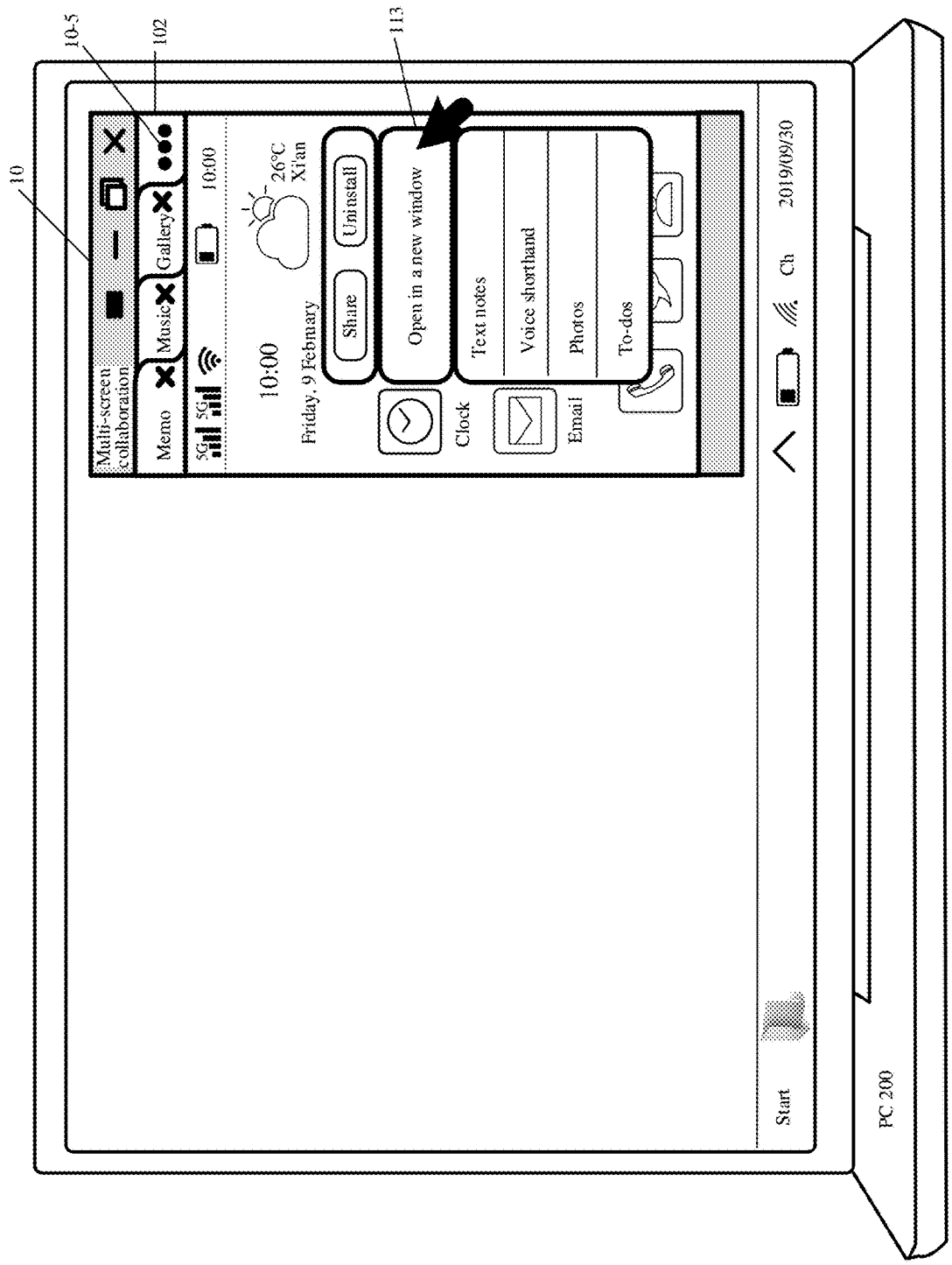
Figure 13C:
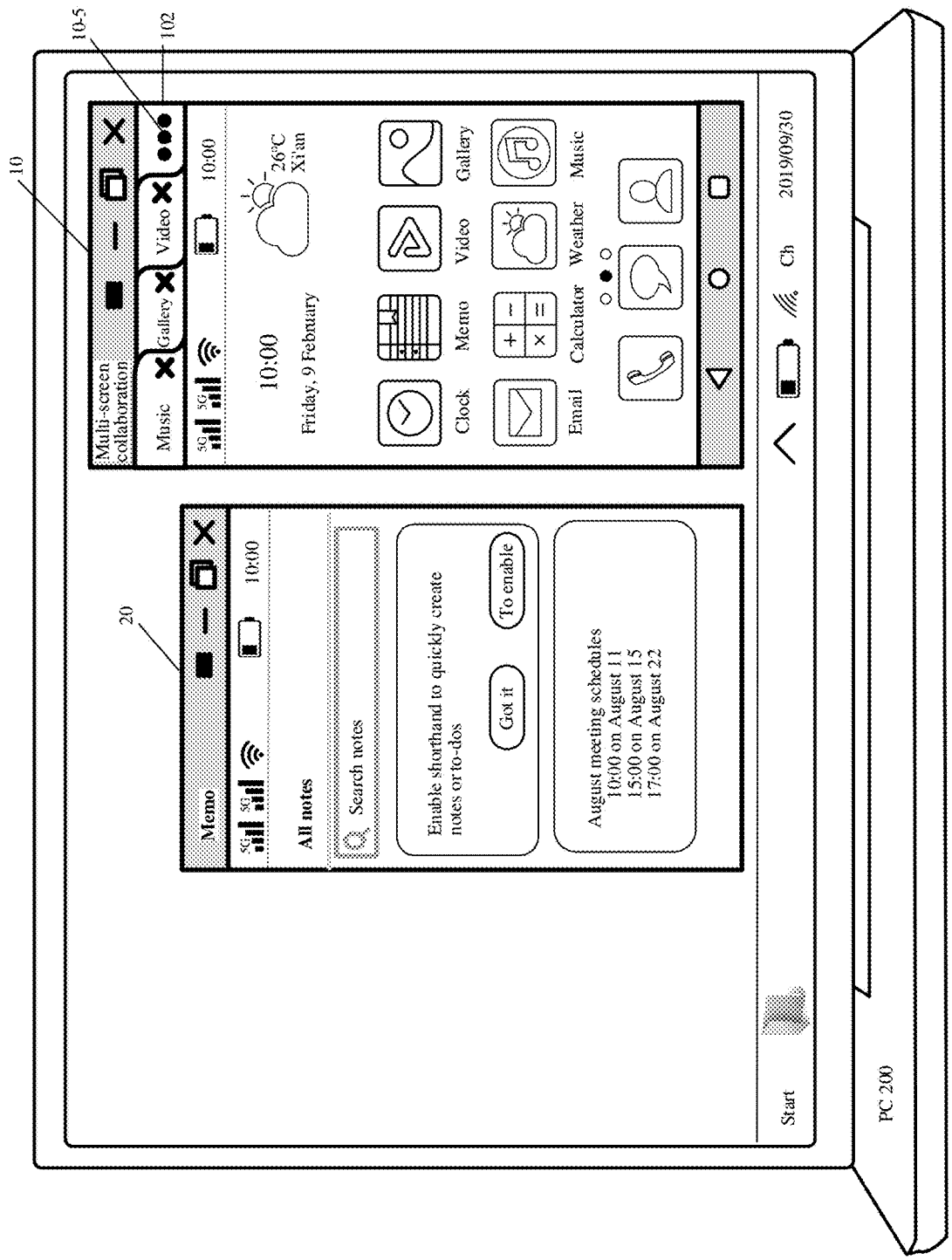

FIG. 13A to FIG. 13C are a schematic diagram of an interface of another PC according to an embodiment of this application. As shown in FIG. 13A, a multi-screen collaboration window 10 is displayed on an interface of a PC 200, and the multi-screen collaboration window 10 displays a main interface of a mobile phone 100. It is assumed that at least a plurality of applications such as a memo application, a music application, a gallery application, and a video application run in a background of the mobile phone. A memo tab, a music tab, and a gallery tab are correspondingly displayed in a tab area of the multi-screen collaboration window 10, the video application is hidden in a "more" button, and the memo tab, the music tab, and the gallery tab are all in a non-selected status.

For example, as shown in FIG. 13A, a user clicks right a memo application icon on the multi-screen collaboration window 10, and in response to the click operation of the user, the multi-screen collaboration window 10 displays a window 113 shown in FIG. 13B. The window 113 includes a plurality of menus corresponding to different operations, for example, a plurality of menu options such as "Share", "Uninstall", "Text notes", "Voice shorthand", "Photos", and "To-dos". For a function of each menu option, refer to the prior art. Details are not described in this embodiment of this application.

In this embodiment of this application, a menu "open in a new window" is added in the window 113, and the user may implement switching from "a single window" to "a plurality of windows" through the added menu.

For example, as shown in FIG. 13B, the user clicks the menu "Open in a new window" in the window 113. In response to the click operation of the user, the PC 200 displays an interface shown in FIG. 13C, and automatically switches the memo application to an independent sub-window, namely, a memo application window 20. The multi-screen collaboration window 10 restores to display the main interface of the mobile phone 100, and the tab area of the multi-screen collaboration window 10 no longer displays the memo tab. The music tab, the gallery tab, and the video tab are displayed according to a running sequence in the background, and the music tab, the gallery tab, and the video tab are all in a non-selected status.

The foregoing describes a plurality of possible methods to implement switching from "a single window" to "a plurality of windows". Regardless of the selection and dragging operation of the user or the manner of a shortcut key or a menu, an application may be switched from a main window to an independent sub-window, and a running interface of the application is displayed in the independent sub-window. The method is easy to operate, and may quickly implement switching from "a single window" to "a plurality of windows", and better use a large screen of the PC in a display manner of "a main window+a plurality of sub-windows" on the PC, thereby improving user experience.

Moreover, when sub-windows of a plurality of different applications have been displayed on the interface of the PC 200 in the display manner of "a main window+a plurality of sub-windows", if the user performs different operations, display of the PC 200 is also different in response to the different operations of the user. Several possible implementations are described below with reference to the accompanying drawings.

In a possible implementation, when the user clicks again to enable an application that has been displayed in an independent sub-window manner, in response to the operation of the user, the independent sub-window of the application may prompt, in a form of dynamic blinking, highlighting, or the like, the user with a display position, a display interface, and the like of the independent sub-window of the application.

Figure 14A:
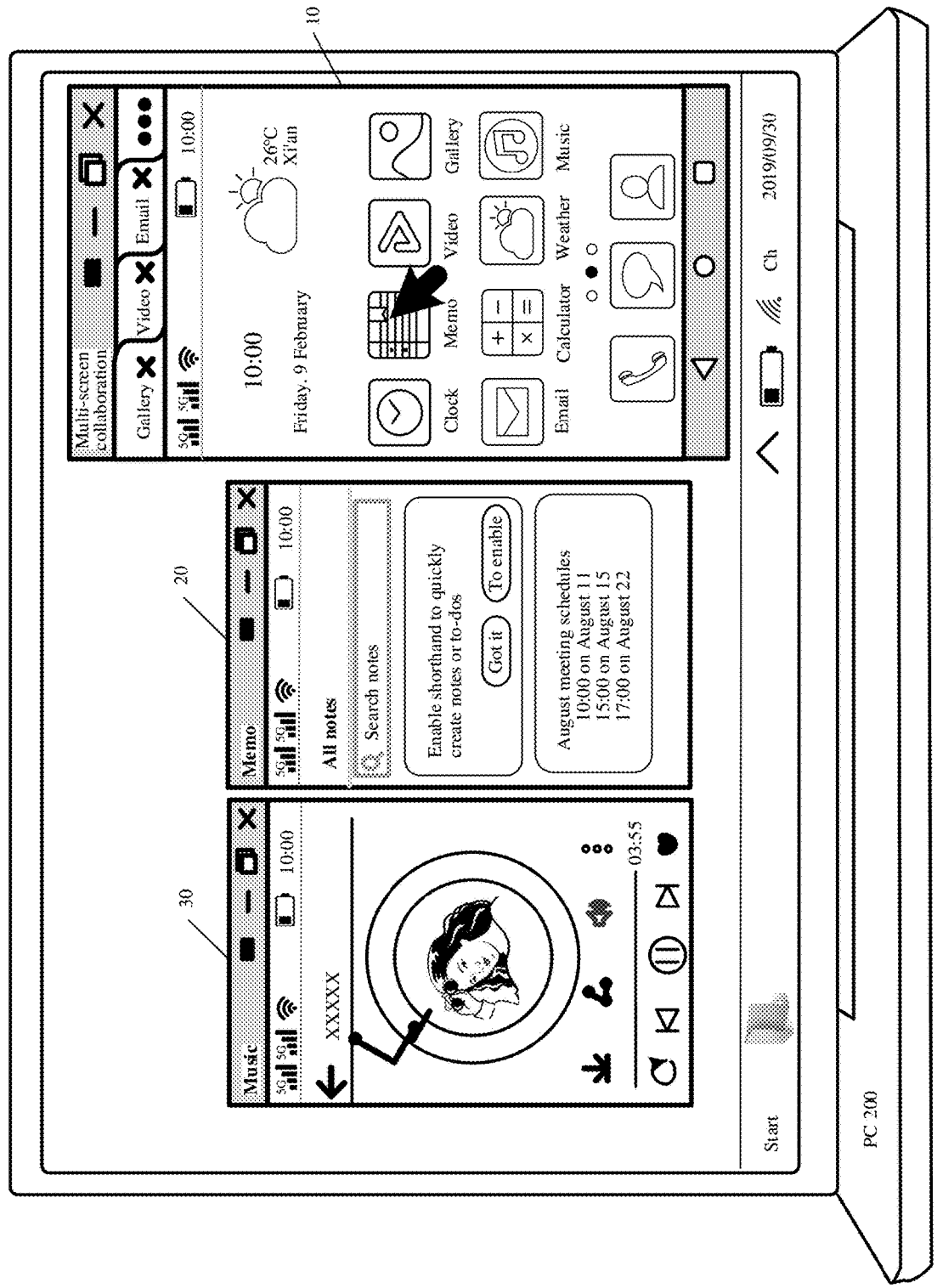
FIG. 14A and FIG. 14B are a schematic diagram of an interface of another PC according to an embodiment of this application.
Figure 14B:
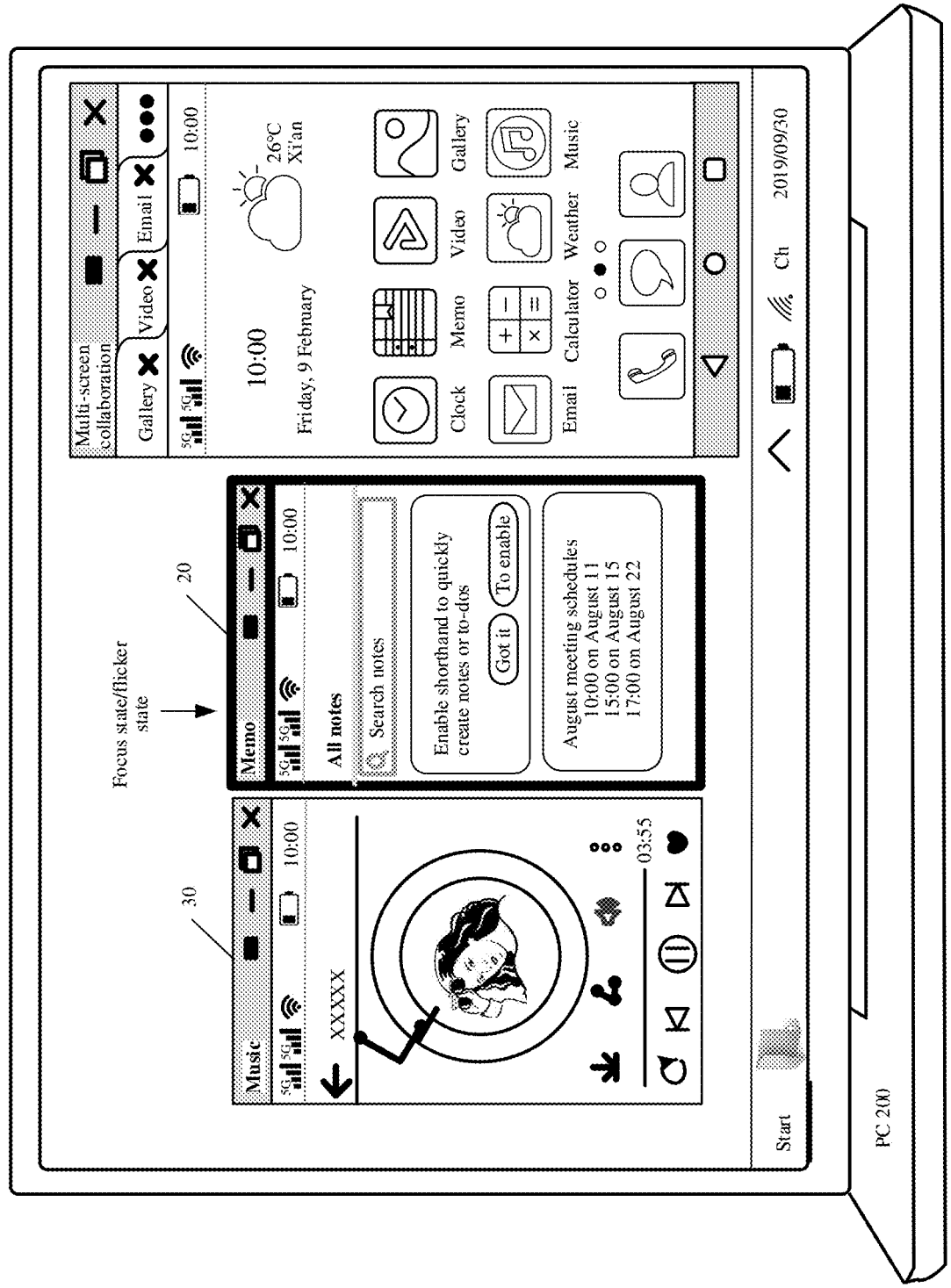

FIG. 14A and FIG. 14B are a schematic diagram of an interface of another PC according to an embodiment of this application. As shown in FIG. 14A, a multi-screen collaboration window 10 is displayed on an interface of a PC 200, and the multi-screen collaboration window 10 displays a main interface of a mobile phone 100. It is assumed that at least a plurality of applications such as a memo application, a music application, a gallery application, a video application, and an email application run in a background of the mobile phone, and a memo application window 20 and a music application window 30 are displayed on the interface of the PC 200 by using independent sub-windows. A gallery tab, a video application tab, and an email tab are correspondingly displayed in a tab area of the multi-screen collaboration window 10, and the gallery tab, the video application tab, and the email tab are all in a non-selected status.

For example, as shown in FIG. 14A, a memo application window 20 independent of the multi-screen collaboration window 10 is already displayed on an interface of the PC 200. When a user clicks a memo application icon for enabling the multi-screen collaboration window 10, in response to the click operation of the user, the memo application window 20 displays a highlighted status shown in FIG. 14B, or dynamically flickers on the PC 200, or displays a focus status in which a cursor of a mouse is located.

Moreover, interface display content of the multi-screen collaboration window 10 does not change, and display of the main interface of the mobile phone 100 is kept. This manner can avoid simultaneous opening and running of a same application in a plurality of independent sub-windows on the interface of the PC 200 due to a user operation, thereby reducing power consumption of the PC 200 and better conforming to an operation result expected by the user.

In still another possible implementation, when the user clicks again to enable an application displayed in a manner of a tab, in response to the operation of the user, the multi-screen collaboration window 10 skips to display an application interface corresponding to the tab, and the application tab is displayed in a selected status.

Figure 15A:
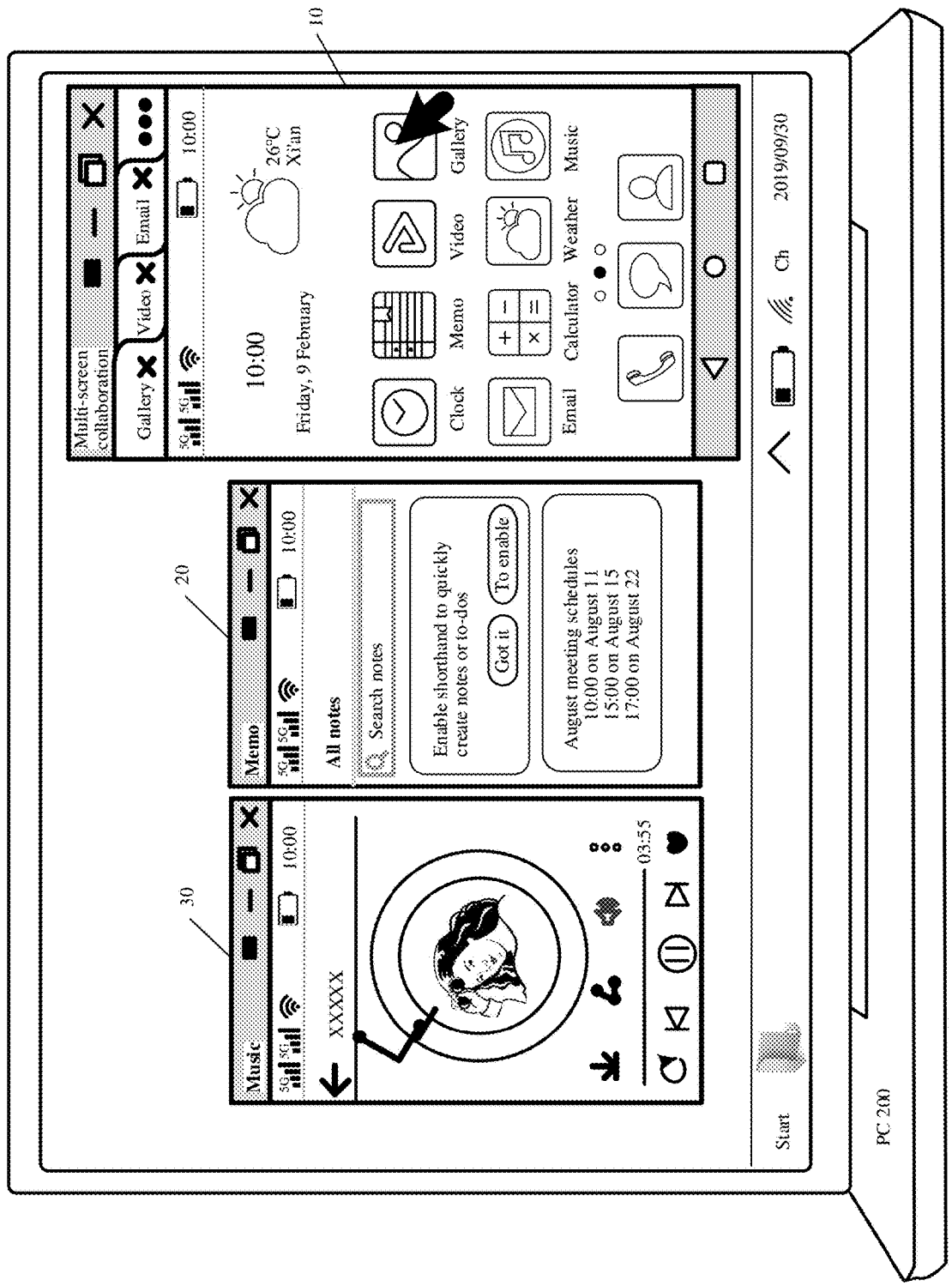
FIG. 15A and FIG. 15B are a schematic diagram of an interface of another PC according to an embodiment of this application.
Figure 15B:
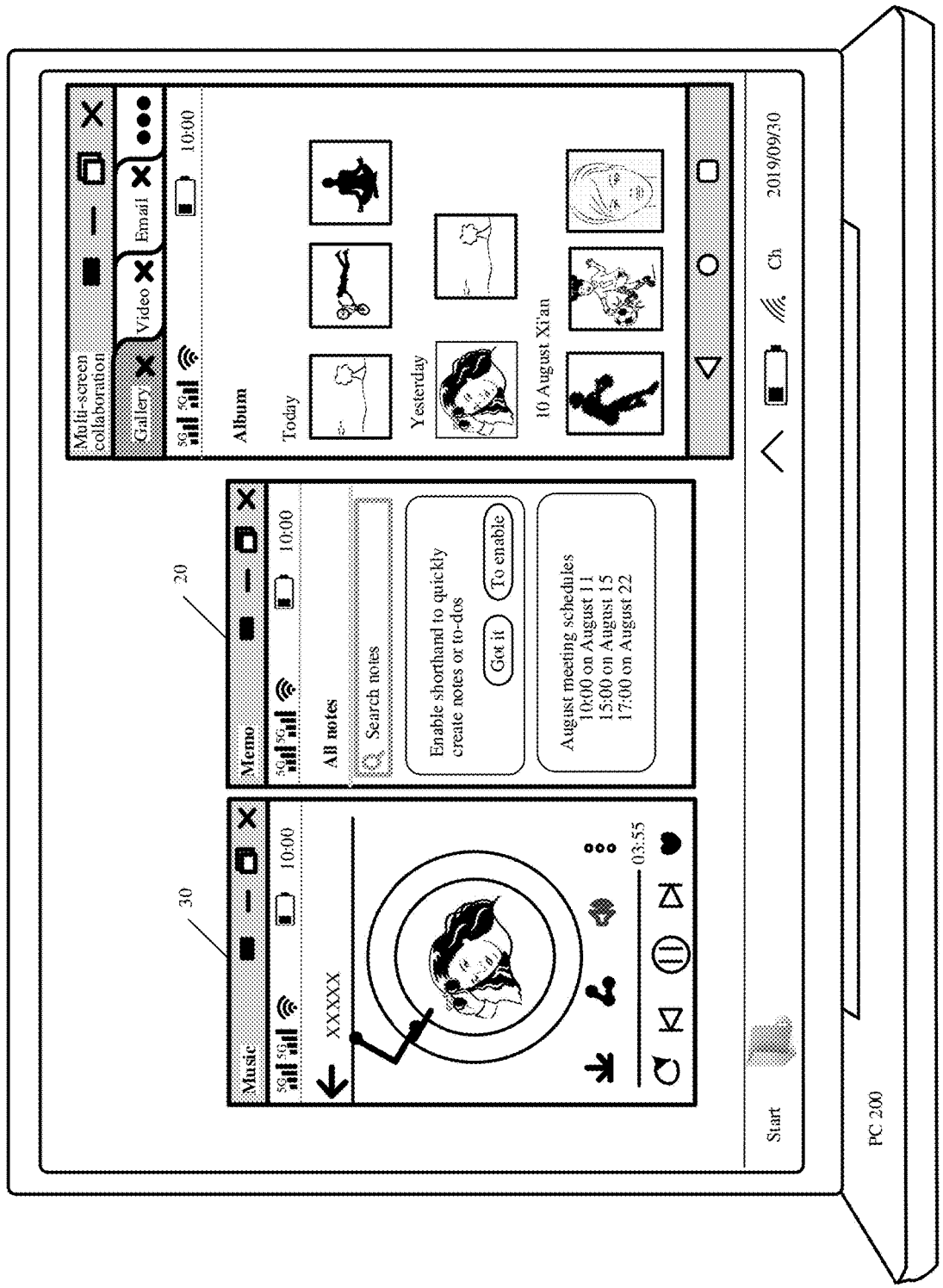

FIG. 15A and FIG. 15B are a schematic diagram of an interface of another PC according to an embodiment of this application. As shown in FIG. 15A, a multi-screen collaboration window 10 is displayed on an interface of a PC 200, and the multi-screen collaboration window 10 displays a main interface of a mobile phone 100. It is assumed that at least a plurality of applications such as a memo application, a music application, a gallery application, a video application, and an email application run in a background of the mobile phone, and a memo application window 20 and a music application window 30 are displayed on the interface of the PC 200 by using independent sub-windows. A gallery tab, a video application tab, and an email tab are correspondingly displayed in a tab area of the multi-screen collaboration window 10, and the gallery tab, the video application tab, and the email tab are all in a non-selected status.

For example, as shown in FIG. 15A, when a user clicks a gallery application icon for enabling the multi-screen collaboration window 10, in response to the click operation of the user, the multi-screen collaboration window 10 skips to display a main interface of the gallery application, and the gallery tab is displayed in a selected status, that is, an application currently expected by the user to be enabled is pinned on top. This manner more conforms to an operation result expected by the user.

In another possible implementation, when the user clicks again to enable an application displayed in a manner of a tab, in response to the operation of the user, the application corresponding to the tab may display a running interface of the application in an independent sub-window manner, and the multi-screen collaboration window 10 does not include the application tab.

Figure 16A:
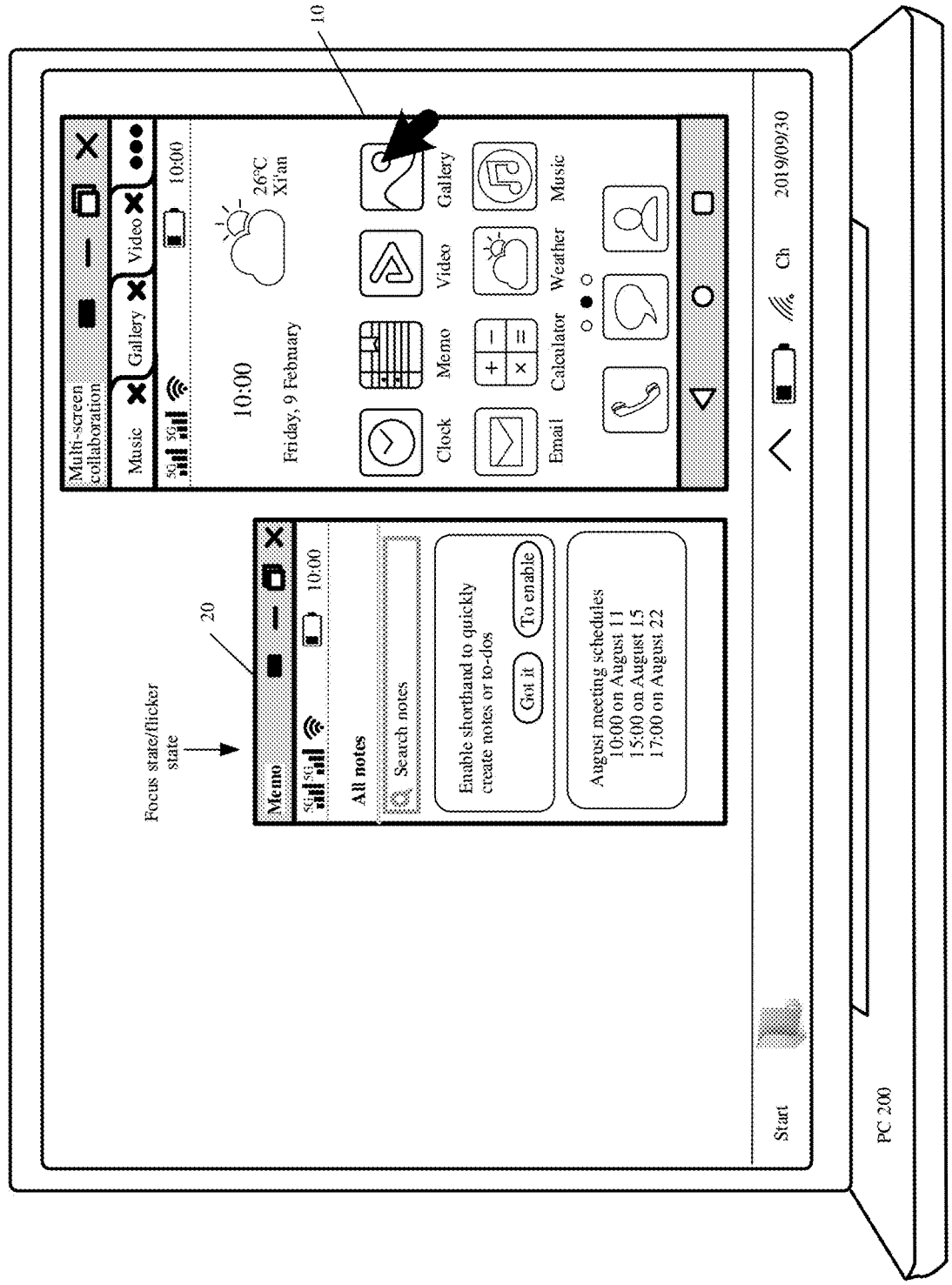
FIG. 16A and FIG. 16B are a schematic diagram of an interface of another PC according to an embodiment of this application.
Figure 16B:
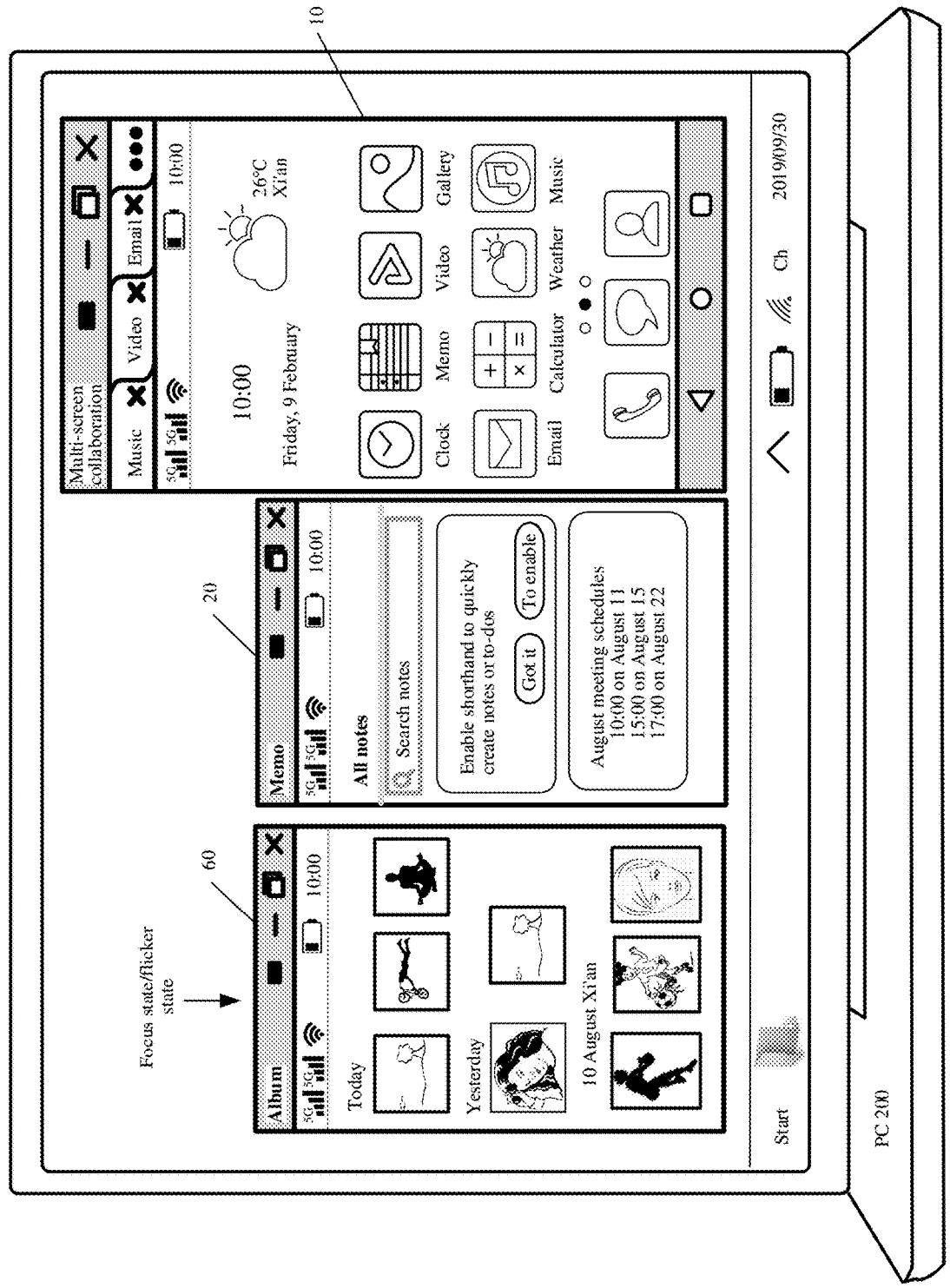

FIG. 16A and FIG. 16B are a schematic diagram of an interface of another PC according to an embodiment of this application. As shown in FIG. 16A, a multi-screen collaboration window 10 and an independent memo application window 20 are displayed on an interface of a PC 200. The multi-screen collaboration window 10 displays a main interface of a mobile phone 100. It is assumed that at least a plurality of applications such as a music application, a gallery application, a video application, and an email application further run in a background of the mobile phone. A music tab, a gallery tab, and the video application are correspondingly displayed in a tab area of the multi-screen collaboration window 10, and the music tab, the gallery tab, and the video application are all in a non-selected status. The email application is hidden in a "more" button.

For example, as shown in FIG. 16A, when a user clicks a gallery application icon for enabling the multi-screen collaboration window 10, in response to the click operation of the user, the gallery application is switched to be displayed in a form of an independent sub-window. The independent sub-window may display a gallery application window 60 shown in FIG. 16B, and the gallery application window 60 is in a dynamic blinker or highlighted selected status.

In addition, the multi-screen collaboration window 10 continues to display the main interface of the mobile phone 100, and the tab area of the multi-screen collaboration window 10 does not include the gallery tab. The music tab, the video tab, and the email tab are displayed in the tab area of the multi-screen collaboration window 10 according to a running sequence of applications in the background, and the music tab, the video tab, and the email tab are all in a non-selected status.

In still another possible implementation, when the user clicks again to enable an application that has been displayed in a manner of an independent sub-window, in response to the operation of the user, the independent sub-window of the application may further restore to display an interface of the application in a form of a tab in the main window and the like.

Figure 17A:
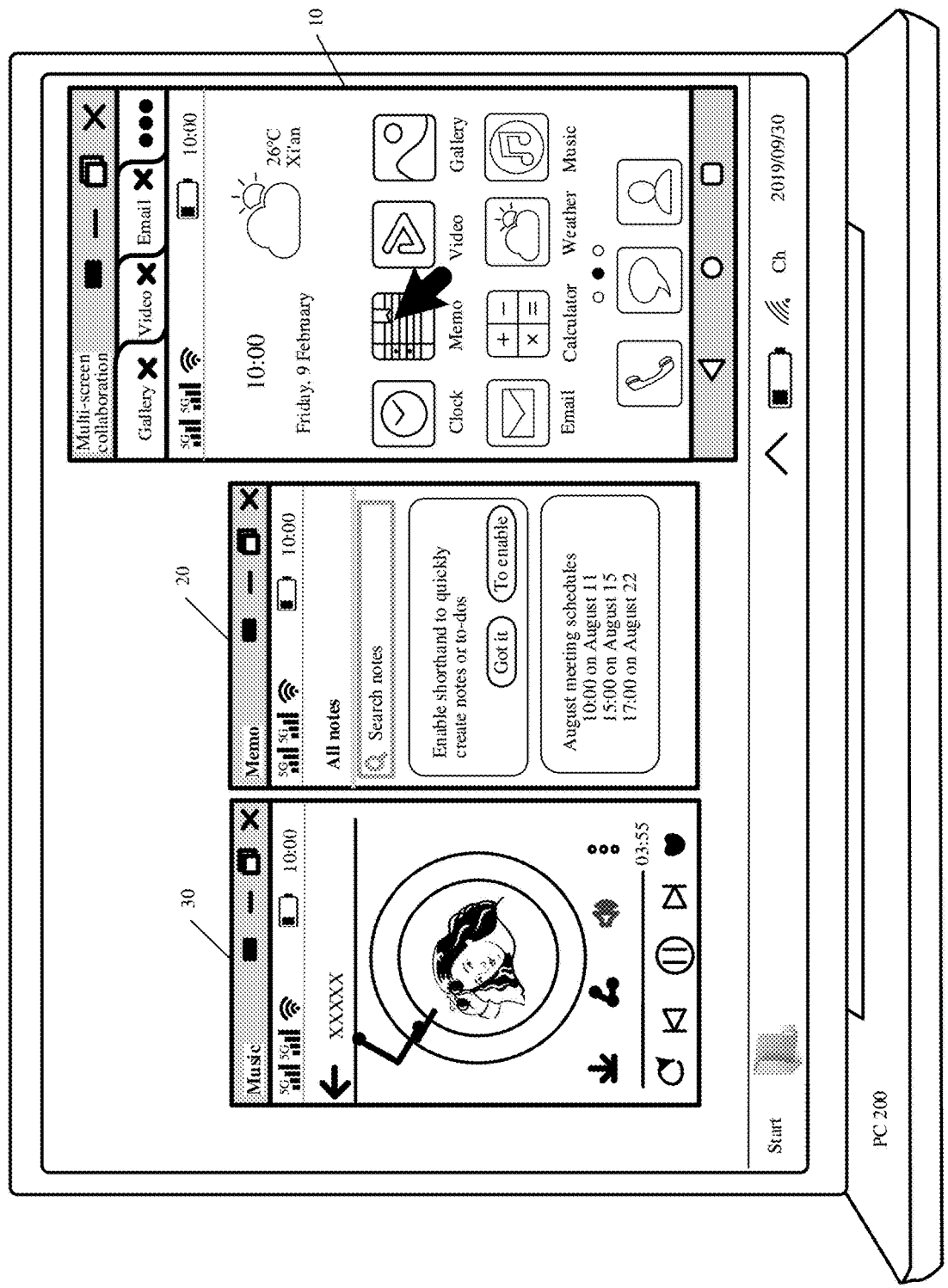
FIG. 17A and FIG. 17B are a schematic diagram of an interface of another PC according to an embodiment of this application.
Figure 17B:
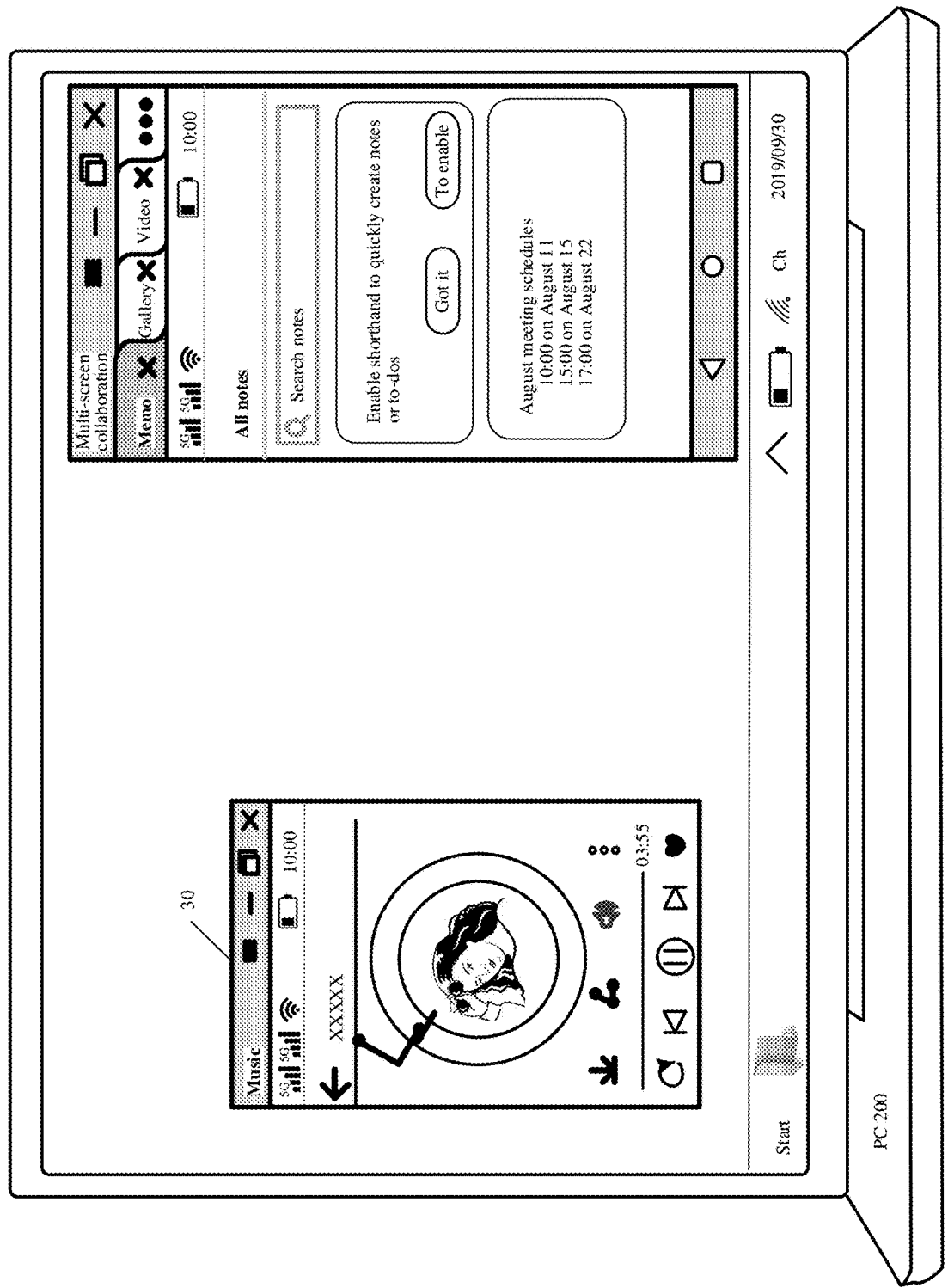

FIG. 17A and FIG. 17B are a schematic diagram of an interface of another PC according to an embodiment of this application. As shown in FIG. 17A, a multi-screen collaboration window 10, a memo application window 20, and a music application window 30 are displayed on an interface of a PC 200. The multi-screen collaboration window 10 displays a main interface of a mobile phone 100. It is assumed that at least a plurality of applications such as a memo application, a music application, a gallery application, a video application, and an email application run in a background of the mobile phone. A gallery tab, a video application, and an email tab are correspondingly displayed in a tab area of the multi-screen collaboration window 10, and the gallery tab, the video application, and the email tab are all in a non-selected status.

For example, as shown in FIG. 17A, when a user clicks a memo application icon for enabling the multi-screen collaboration window 10, in response to the click operation of the user, the interface of the PC 200 is shown in FIG. 17B, the memo application window 20 disappears, a display interface of the memo application window 20 restores to the multi-screen collaboration window 10 for continued display, and a memo tab in the multi-screen collaboration window 10 restores to a background running order of a first place and is displayed in a selected status. That is, in this scenario, the system determines that the user currently expects to restore display of the interface of the memo application through a main window.

According to the foregoing embodiments in FIG. 14A, FIG. 14B, FIG. 15A, FIG. 15B, FIG. 16A, FIG. 16B, FIG. 17A, and FIG. 17B, for a plurality of different scenarios, the background of the mobile phone may obtain a user operation, distinguish, according to the operation of the user, an operation object, namely, an application which performs the corresponding operation, and then determine a running status of the application and a window display status, so as to obtain an operation result that better conforms to an expectation of the user. For example, the application may be an application that has run in the background, or an application that has not run in the background. When the application is an application that has run in the background, in this embodiment of this application, an interface of the application or an independent sub-window of the application is skipped to. When the application has not run in the background, in this embodiment of this application, a running interface of the application may be further displayed in the multi-screen collaboration window 10, or a running interface of the application is displayed in an independent sub-window. This is not limited in this embodiment of this application.

The foregoing embodiments mainly describe a process of displaying a multi-screen collaboration window on a PC 200, a process of switching between a single window and a plurality of windows, and the like. It should be understood that, in the process, the user may use, on the PC 200, each application installed on the mobile phone 100, the application runs in the background of the mobile phone 100, and the mobile phone 100 may not display a running interface of each application. In a multi-screen collaboration process, in a possible manner, the user may also perform an operation on the mobile phone 100, that is, the operation comes from the mobile phone 100. In this case, the PC 200 connected to the mobile phone 100 also has a plurality of possible display policies.

In a possible scenario, when the user performs an operation on an application from the mobile phone 100, the multi-screen collaboration window 10 (main window) of the PC 200 may be consistent with the interface of the mobile phone 100. When the PC 200 further displays sub-windows of one or more different applications, display of the sub-windows is not affected by user's operations on the mobile phone 100.

Figure 18A:
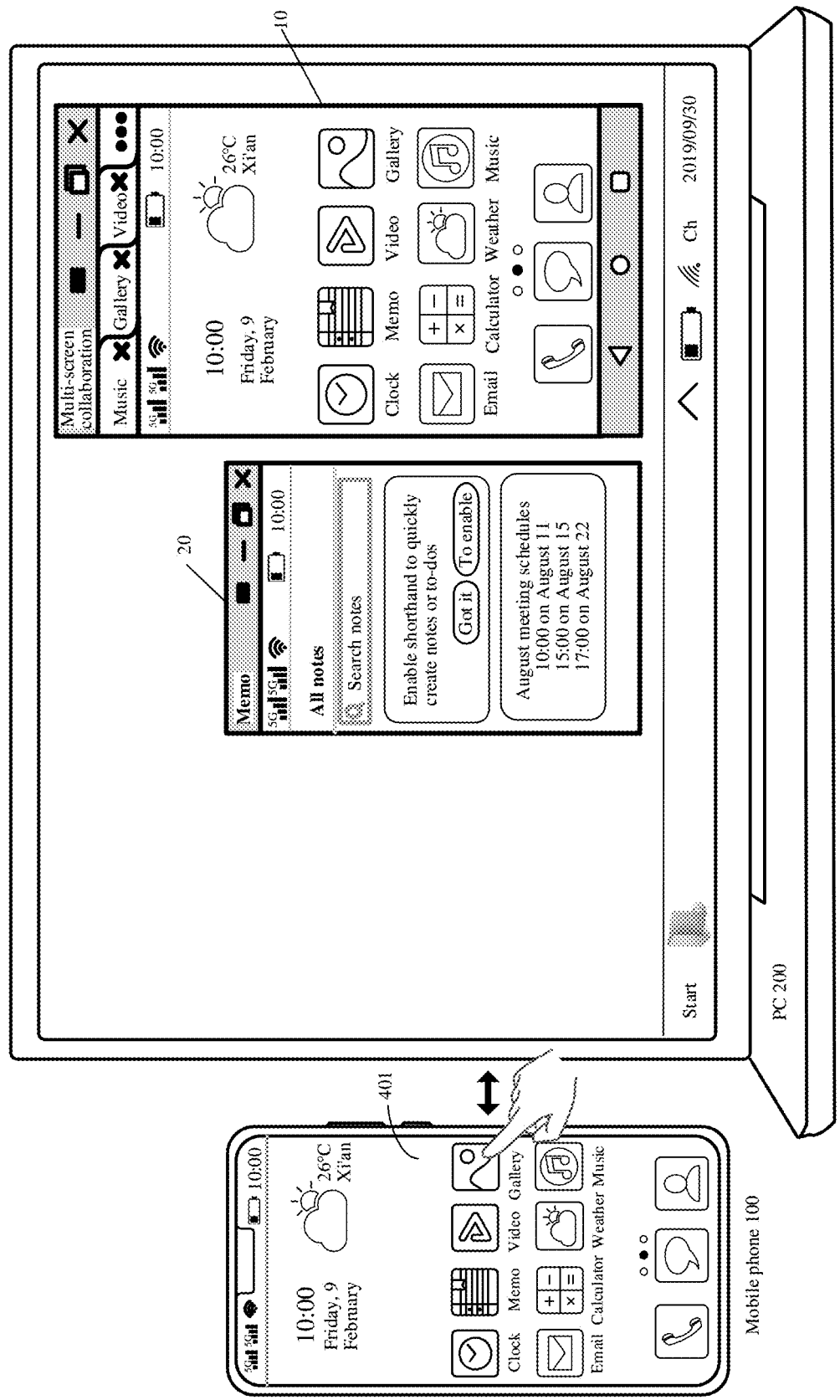
FIG. 18A and FIG. 18B are a schematic diagram of an interface of multi-screen collaboration between a mobile phone and a PC according to an embodiment of this application.
Figure 18B:
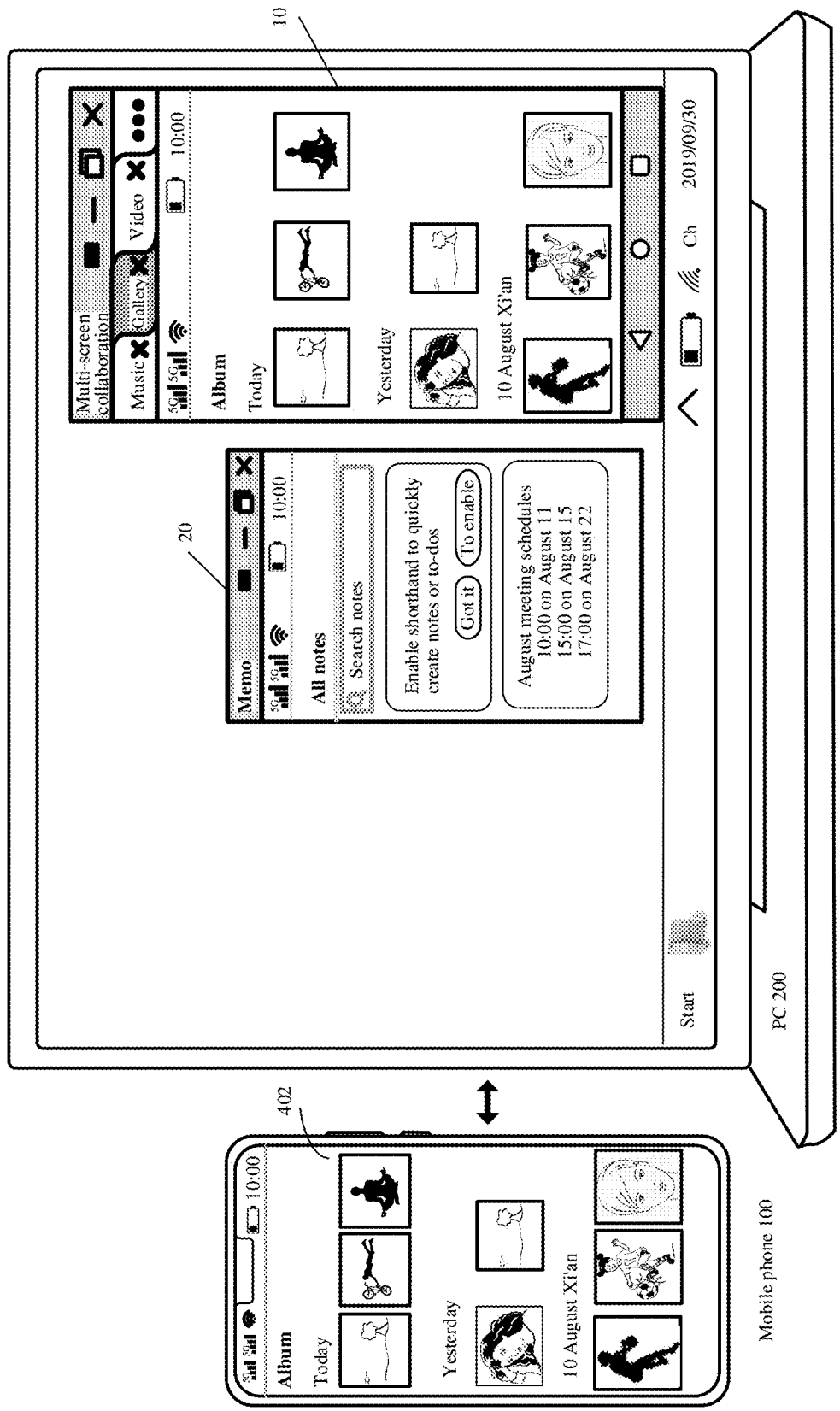

FIG. 18A and FIG. 18B are a schematic diagram of an interface of multi-screen collaboration between a mobile phone and a PC according to an embodiment of this application. As shown in FIG. 18A, a mobile phone 100 displays a main interface 401 unlocked, and an interface of a PC 200 displays a multi-screen collaboration window 10 and an independent memo application window 20. The multi-screen collaboration window 10 displays the main interface of the mobile phone 100. It is assumed that at least a plurality of applications such as a music application, a gallery application, a video application, and an email application further run in a background of the mobile phone. A music tab and a gallery tab are correspondingly displayed in a tab area of the multi-screen collaboration window 10, and the music tab, the gallery tab, and the video application are all in a non-selected status.

For example, as shown in FIG. 18A, when a user clicks the gallery application on the main interface 401 of the mobile phone 100, in response to the click operation of the user, the mobile phone 100 displays a main interface 402 of the gallery application shown in FIG. 18B.

Optionally, the multi-screen collaboration window 10 on the interface of the PC 200 may synchronously display the main interface 402 of the gallery application on the mobile phone 100. As shown in FIG. 18B, the multi-screen collaboration window 10 skips to the main interface of the gallery application, and the gallery tab in the tab area of the multi-screen collaboration window 10 is displayed in a highlighted selected status. Details are not described in this embodiment of this application.

In still another possible scenario, when a user performs a screen lock operation on the mobile phone 100, the multi-screen collaboration window 10 (main window) of the PC 200 and all application windows displayed in a form of independent sub-windows enter a screen lock status.

Figure 19:
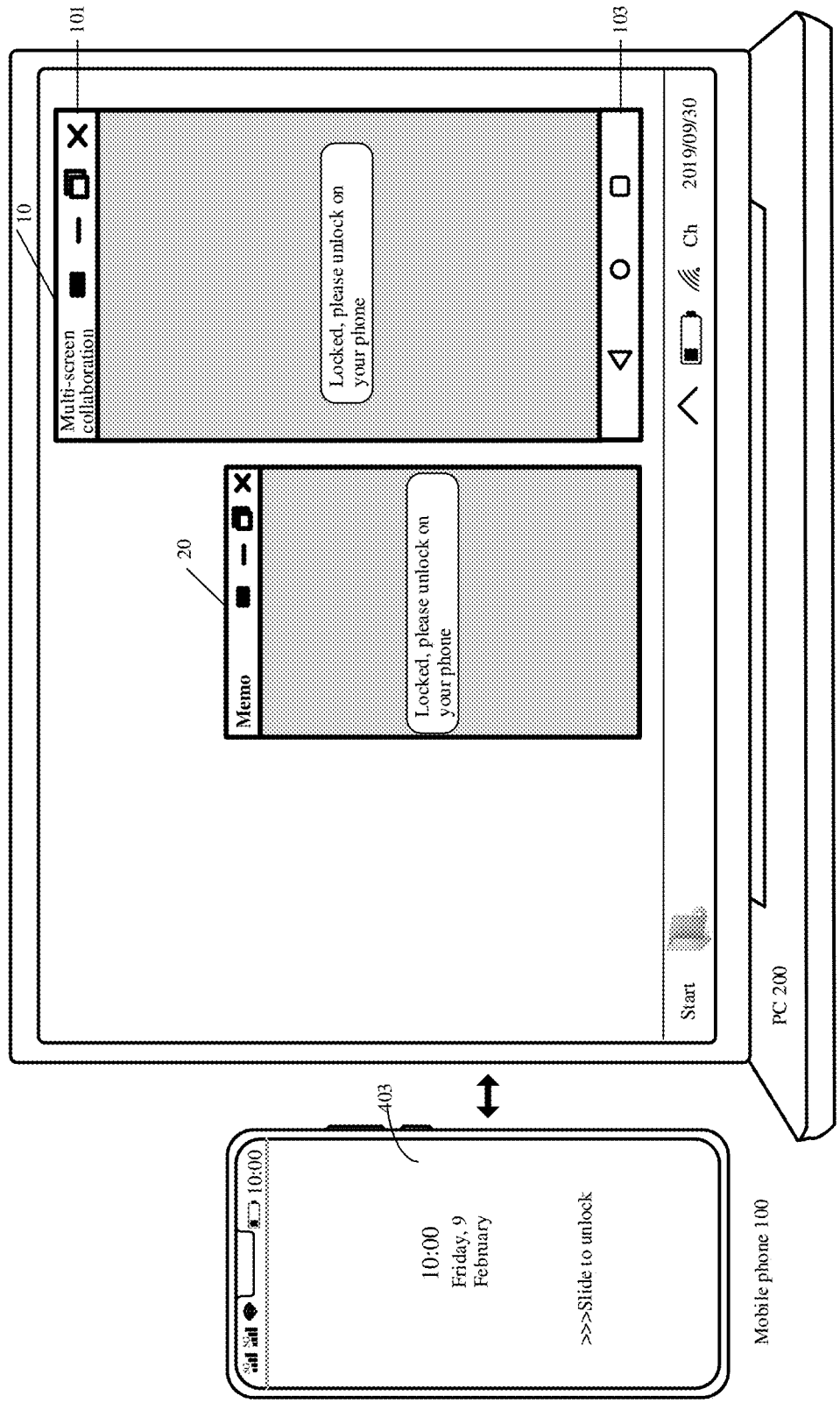
FIG. 19 is a schematic diagram of an interface of another multi-screen collaboration between a mobile phone and a PC according to an embodiment of this application.

FIG. 19 is a schematic diagram of an interface of another multi-screen collaboration between a mobile phone and a PC according to an embodiment of this application. As shown in FIG. 19, after a user unlocks a mobile phone 100, the mobile phone 100 displays a screen lock interface 403. The screen lock interface 403 may include a date, a time, and the like, as well as sliding unlock prompt information.

Correspondingly, as shown in FIG. 19, both a multi-screen collaboration window 10 of a PC 200 and an independent memo application window 20 enter a screen lock status. Optionally, the multi-screen collaboration window 10 and the memo application window 20 may display prompt information for a user: Locked, please unlock on your phone.

Optionally, that the multi-screen collaboration window 10 and the memo application window 20 enter a screen lock status may be understood as that only a mobile phone interface is displayed or an area of an application interface of the mobile phone is locked, and control areas of the multi-screen collaboration window 10 and the memo application window 20 are in an operable status.

For example, as shown in FIG. 19, the control area in the multi-screen collaboration window 10 includes a top function area 101 and a bottom area 103, and the top function area 101 and the bottom area 103 are normally displayed, that is, all buttons such as a maximize button, a minimize button, and a close button in the areas may be clicked, and a corresponding operation may be performed. For the memo application window 20, a top function area is normally displayed. Details are not described herein.

According to the foregoing method, when the user performs a screen lock operation on the mobile phone 100, the multi-screen collaboration window of the PC 200 and all application interfaces displayed in independent sub-windows enter a screen lock status. For a multi-screen collaboration scenario such as a company meeting, the method prevents files, data, and the like from being stolen by other PC users when the user leaves the PC 200 midway, thereby improving security of a multi-screen collaboration process.

A process of displaying windows of a mobile phone on a PC 200 and a process of switching from "a single window" to "a plurality of windows" on the PC 200 provided in embodiments of this application are described with reference to the foregoing accompanying drawings. For different processes, a specific underlying implementation flow is described below with reference to the software architecture in FIG. 3A and FIG. 3B.

Figure 20A:
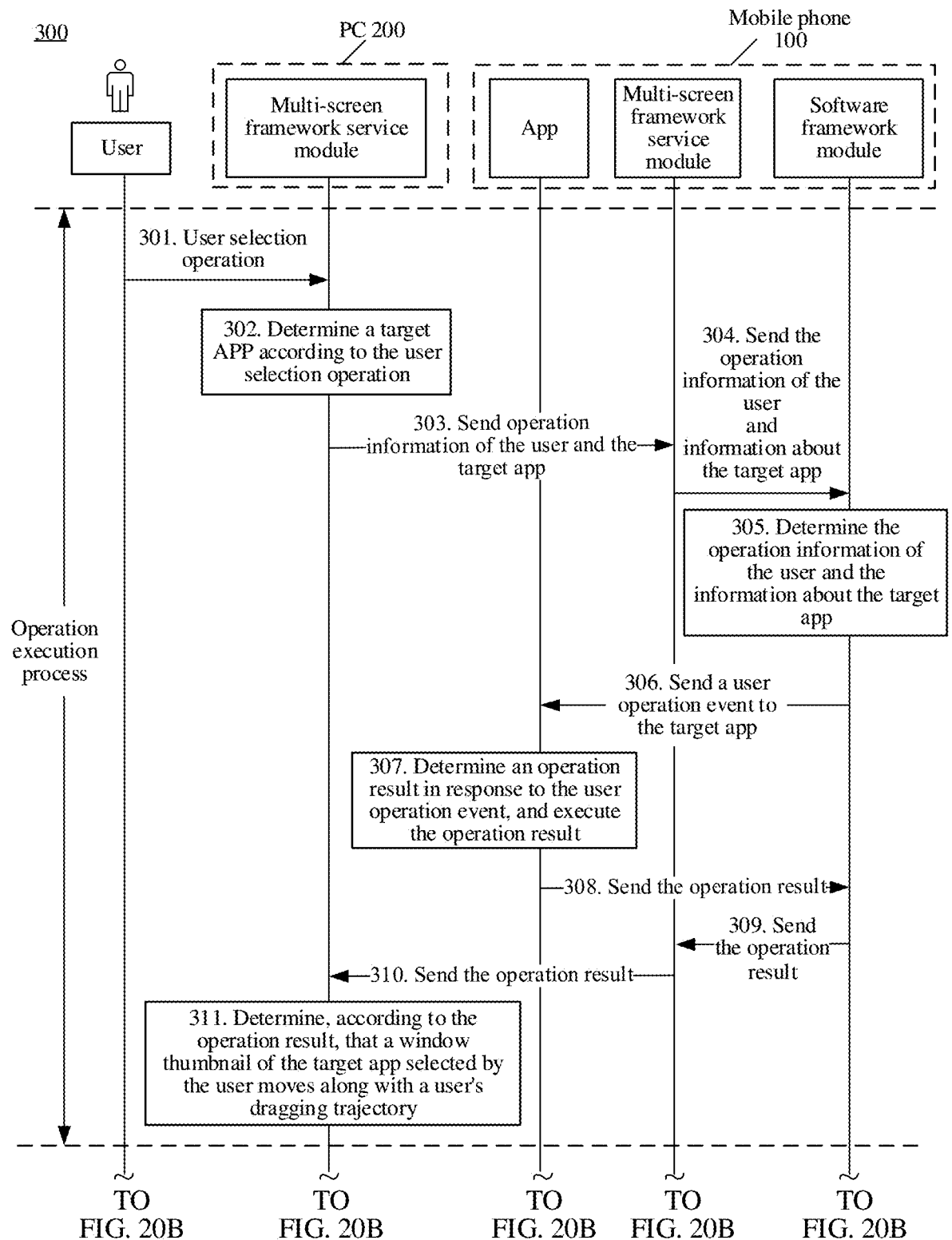
FIG. 20A and FIG. 20B are a schematic flowchart of a window display process according to an embodiment of this application.
Figure 20B:
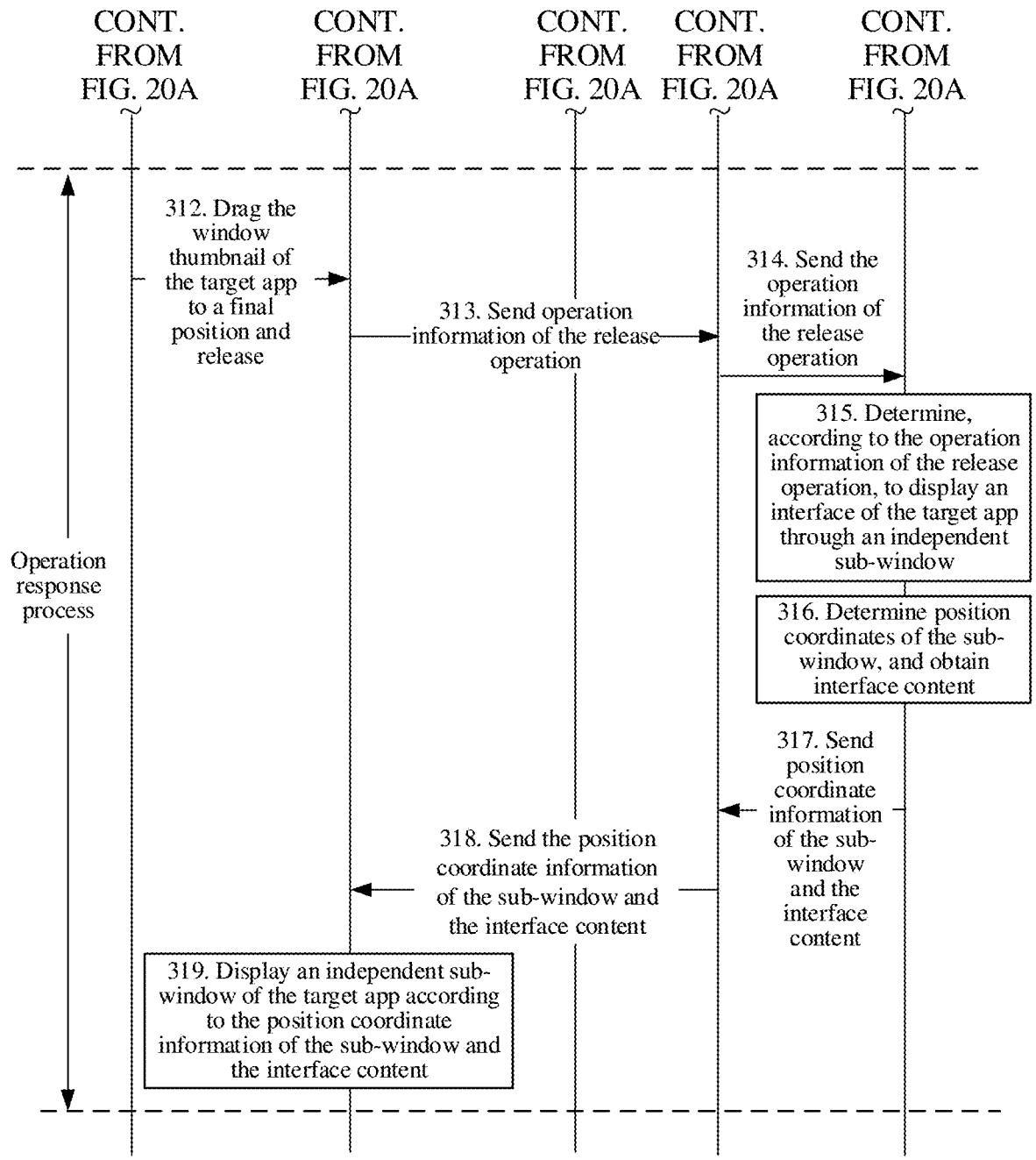

FIG. 20A and FIG. 20B are a schematic flowchart of a window display process according to an embodiment of this application. It should be understood that a method 300 may be performed by a processor of a mobile phone. Specifically, the method 300 is jointly performed by a plurality of software modules described in FIG. 3A and FIG. 3B. As shown in FIG. 20A and FIG. 20B, the method 300 may be divided into the following two stages:

Stage 1: Operation Execution Process

It should be understood that the operation execution process in the first stage may correspond to an interaction process between a PC 200 and a mobile phone 100 when a user triggers, in a multi-screen collaboration window 10 on the PC 200, switching from "a single window" to "a plurality of windows". Specifically, the operation execution process includes the following steps.

301. A user performs a selection operation on a PC 200.

For example, for the PC 200, the user may perform an operation through a peripheral input device such as a mouse or a keyboard. Alternatively, if the PC 200 is a device having a touchscreen, the user may perform an operation by touching, clicking, pressing, or the like. For the operation of the user and the like, refer to the foregoing corresponding descriptions. Details are not described herein again.

302. A multi-screen framework service module of the PC 200 determines, according to the selection operation of the user, a target app selected by the user.

303. The multi-screen framework service module of the PC 200 sends operation information of the user and information about the target app to a multi-screen framework service module of a mobile phone 100.

Optionally, the operation of the user herein may be an operation event ("touch event"). The multi-screen framework service module of the PC 200 may determine operation information according to the "touch event". Specifically, the operation information may be the "touch event". In addition, the information about the target app may include at least one kind of information such as a name, an ID, and an icon of the target app operated by the user. This is not limited in this embodiment of this application.

304. The multi-screen framework service module of the mobile phone 100 sends the operation information of the user and the information about the target app to a software framework module of the mobile phone 100.

Optionally, with reference to the software architecture shown in FIG. 3A and FIG. 3B, the software framework module of the mobile phone 100 may include a plurality of modules at different layers, for example, a plurality of software modules that participate in the process at an application framework layer. Details are not described herein again.

305. The software framework module of the mobile phone 100 determines the operation information of the user and the information about the target app.

306. A software framework of the mobile phone 100 sends a user operation event to a target app at an application layer.

307. The target app determines an operation result in response to the user operation event, and executes the operation result.

308. The target app sends the operation result to the software framework of the mobile phone 100.

309. The software framework of the mobile phone 100 sends the operation result to the multi-screen framework service module.

310. The multi-screen framework service module of the mobile phone 100 sends the operation result to the multi-screen framework service module of the PC 200.

311. The multi-screen framework service module of the PC 200 determines, according to the operation result, that a window thumbnail of the target app selected by the user moves along a user's dragging trajectory.

For example, the operation execution process in the first stage may correspond to FIG. 5A. The user selects a memo tab, and the multi-screen framework service module of the PC 200 may determine, according to the user's operation of selecting the memo tab, that the target app selected by the user is a memo application.

For example, the operation execution process in the first stage may alternatively correspond to FIG. 8A. The user selects a "Calculator" name in the "more" button 10-5, and the multi-screen framework service module of the PC 200 may determine, according to the user's operation of selecting the "Calculator" name, that the target app selected by the user is a calculator application.

For example, the operation execution process in the first stage may alternatively correspond to FIG. 9C. The user selects a music application card from the multi-task interface, and the multi-screen framework service module of the PC 200 may determine, according to the user's operation of selecting the music application card, that the target app selected by the user is a music application.

Stage 2: Operation Response Process

It should be understood that the operation execution process in the second stage may correspond to an interaction process between the PC 200 and the mobile phone 100 in a process in which the user drags a tab or an application card, and the PC 200 switches from "single-window" display to "multi-window" display. Specifically, the operation response process includes the following steps:

312. The user drags the window thumbnail of the target app to a final position and releases the window thumbnail.

313. The multi-screen framework service module of the PC 200 sends operation information of the release operation to the multi-screen framework service module of the mobile phone 100.

314. The multi-screen framework service module of the mobile phone 100 sends the operation information of the release operation to the software framework module of the mobile phone 100.

315. The software framework module of the mobile phone 100 determines, according to the operation information of the release operation, to display an interface of the target app through an independent sub-window.

316. The software framework module of the mobile phone 100 determines position coordinates of the sub-window, and obtains interface content of the target app.

317. The software framework module of the mobile phone 100 sends position coordinate information of the sub-window and the interface content to the multi-screen framework service module.

318. The multi-screen framework service module of the mobile phone 100 sends the position coordinate information of the sub-window and the interface content to the multi-screen framework service module of the PC 200.

319. The multi-screen framework service module of the PC 200 displays an independent sub-window of the target app according to the position coordinate information of the sub-window and the interface content.

For example, the operation execution process in the second stage may correspond to FIG. 5B and FIG. 5C. The user selects and drags a memo tab, a floating window of the memo application is displayed on the PC 200 in the dragging process, and finally an independent memo application window 20 is displayed.

For example, the operation execution process in the second stage may alternatively correspond to FIG. 8B. The user selects and drags a "Calculator" name, a floating window of the calculator application is displayed on the PC 200 in the dragging process, and finally an independent calculator application window 40 is displayed.

For example, the operation execution process in the second stage may alternatively correspond to FIG. 9D and FIG. 9E. The user selects and drags a music application card from the multi-task interface, a floating window of the music application is displayed on the PC 200 in the dragging process, and finally an independent music application window 30 is displayed.

It should be further understood that the foregoing process may further correspond to processes in FIG. 10A to FIG. 19 and the like. In an interaction process between the PC 200 and the mobile phone 100 after the user clicks a button or menu in the multi-screen collaboration window 10 on the PC 200 or in any independent application sub-window, the PC 200 may transfer each operation of the user back to the mobile phone 100, the mobile phone 100 determines an operation result and further transfers the operation result or information such as a change of a display interface to the PC 200, and the PC 200 updates related display according to an instruction of the mobile phone 100. Details are not described herein.

When the PC displays, in a form of a main window and a plurality of sub-windows, a plurality of application interfaces running in the background of the mobile phone, file sharing may be performed between different windows and between the PC 200 and the mobile phone 100.

Figure 21A:
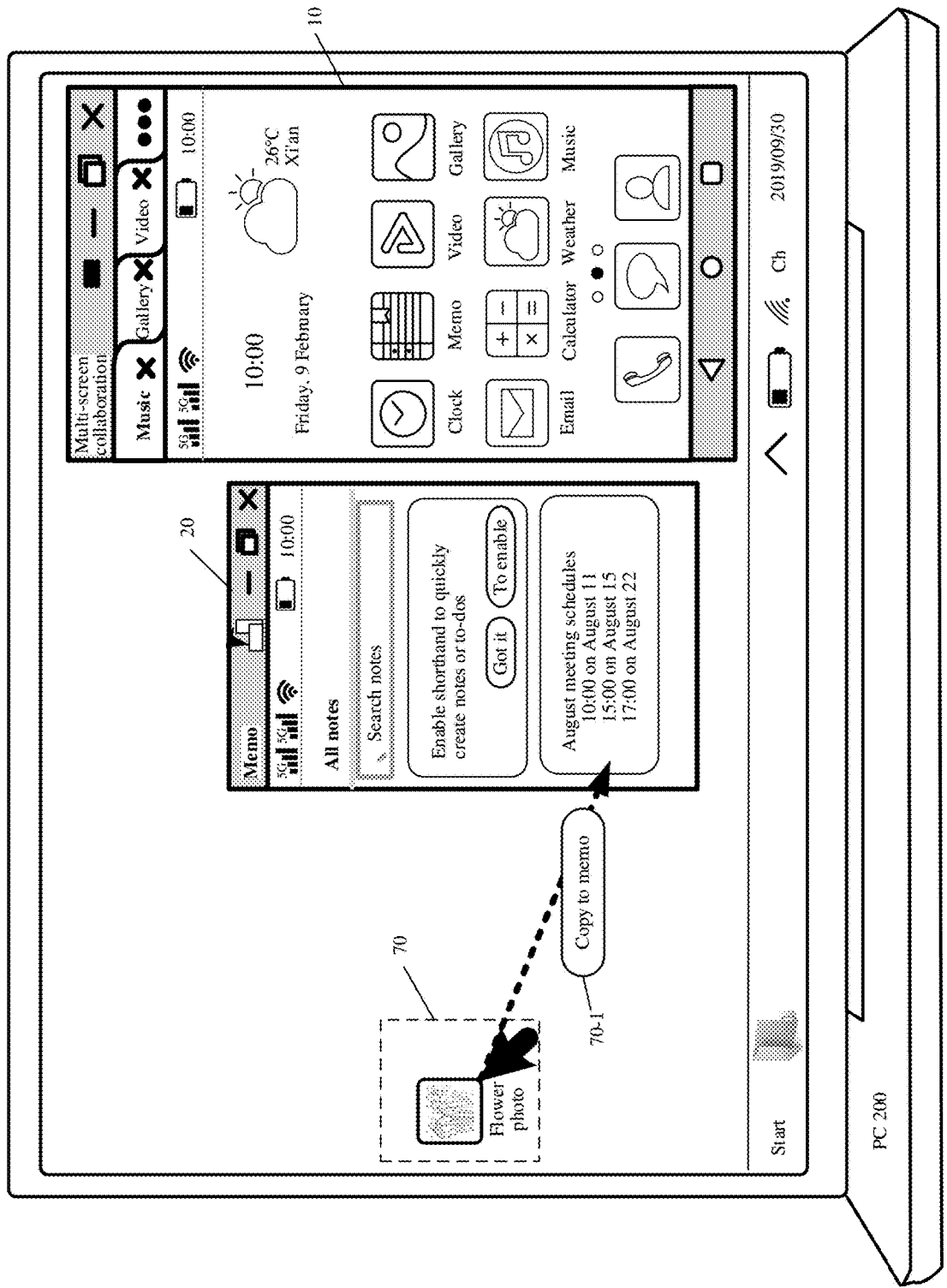
FIG. 21A and FIG. 21B are a schematic diagram of an interface of still another PC according to an embodiment of this application.
Figure 21B:
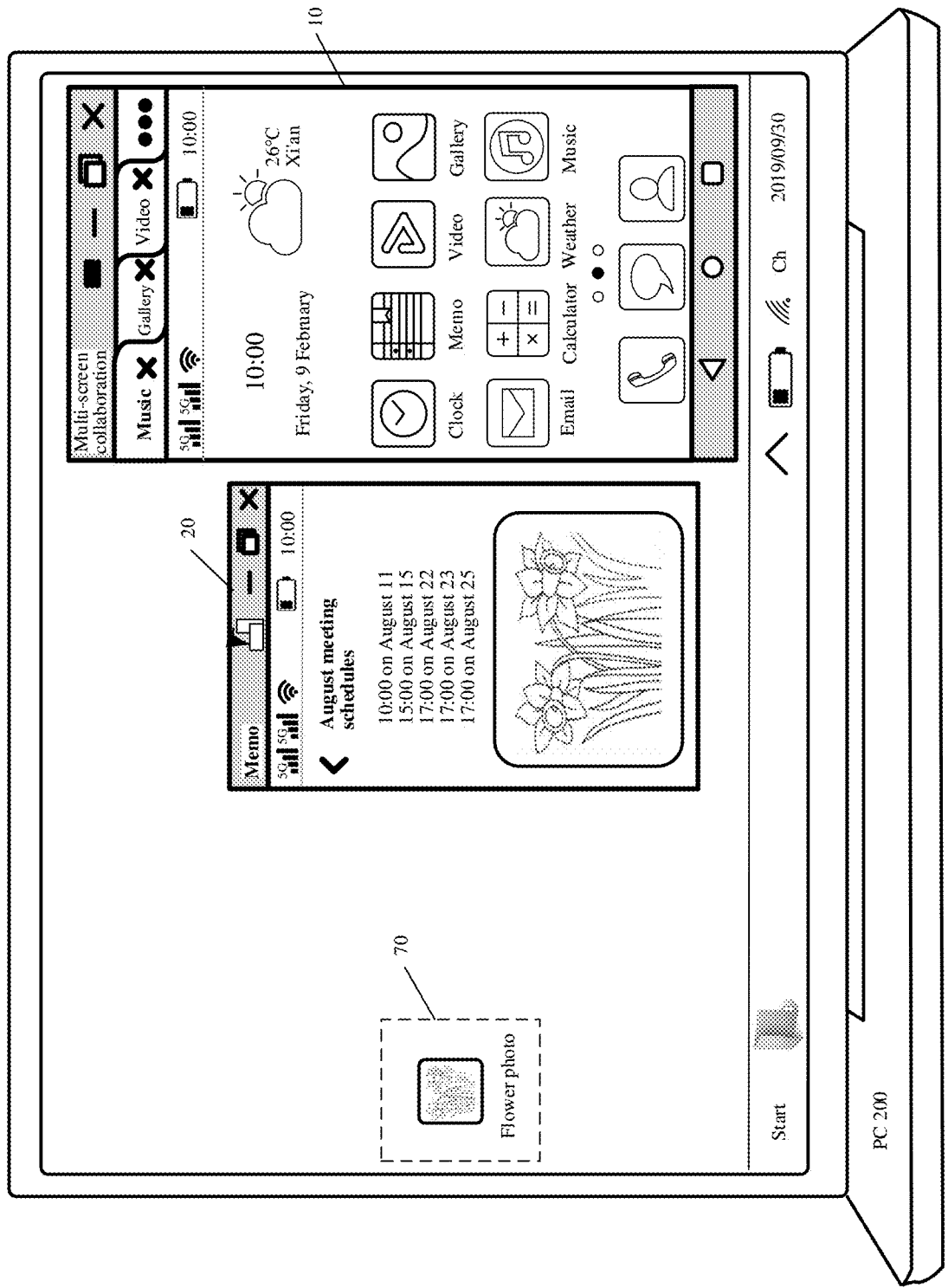

FIG. 21A and FIG. 21B are a schematic diagram of an interface of still another PC according to an embodiment of this application. As shown in FIG. 21A, a multi-screen collaboration window 10 and a memo application window 20 are displayed on an interface of a PC 200. The multi-screen collaboration window 10 currently displays a main interface of a mobile phone 100, and the memo application window 20 displays a running interface of a memo application. It is assumed that a desktop of the PC 200 includes a flower photo 70. A user may drag the flower photo 70 to a target position by selecting and dragging the flower photo 70.

For example, as shown in FIG. 21A, when the user clicks and selects the flower photo 70, drags the flower photo 70 in a direction indicated by a dashed line, and releases the flower photo 70 until the flower photo 70 is dragged to a position of an "August meeting schedules" menu in the memo application window 20, in response to the selection and dragging operation of the user, as shown in FIG. 21B, the memo application window 20 skips to display a secondary interface of the memo application, namely, an interface of the August meeting schedule menu, and the flower photo 70 is copied to the interface of "August meeting schedules".

Optionally, in the process that the user selects and drags the flower photo 70, reminder information shown in FIG. 21B may be displayed on the interface of the PC 200, to prompt the user to "Copy to memo", that is, the operation currently performed by the user may copy the flower photo 70 to the memo application.

Figure 22A:
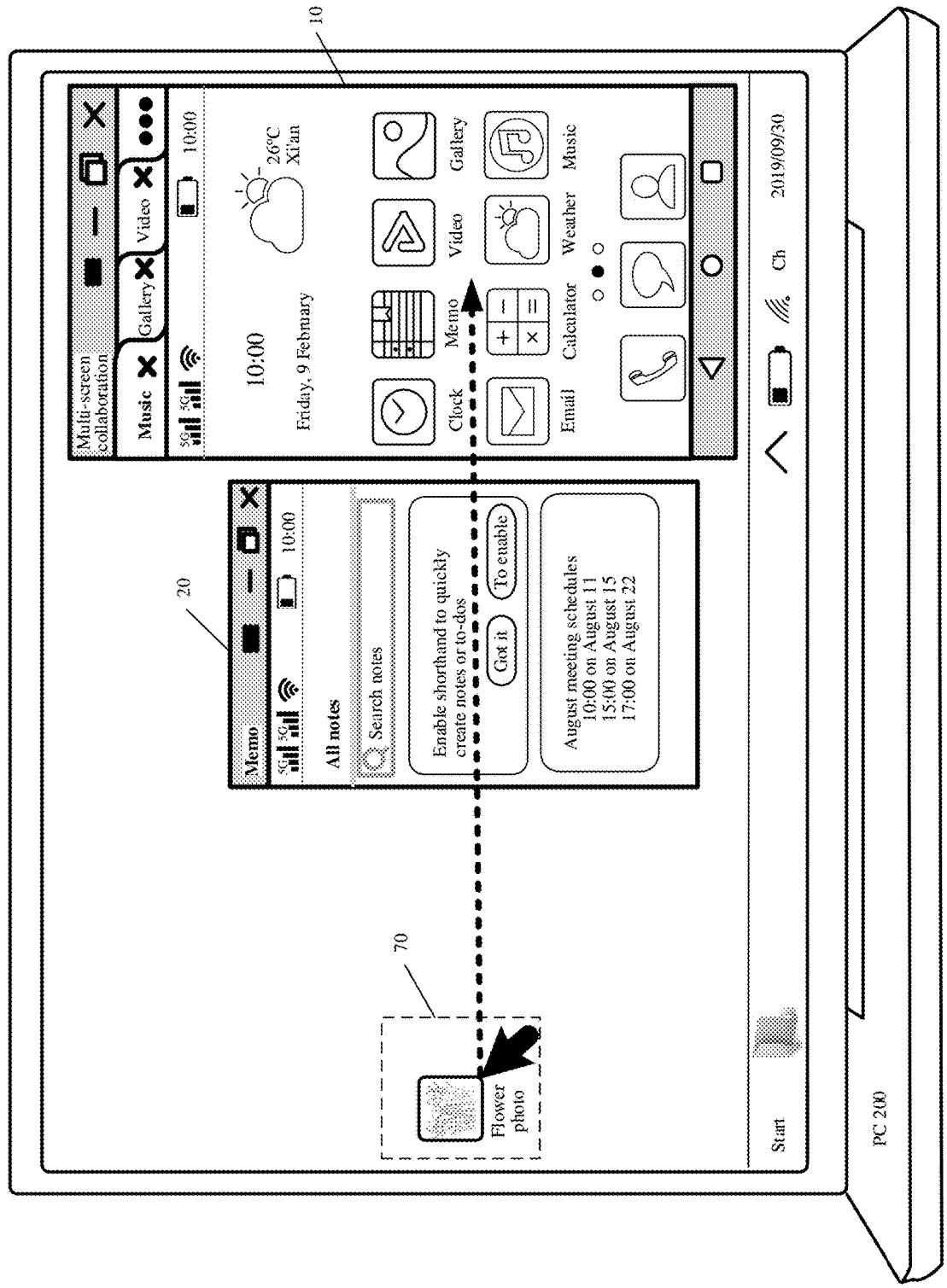
FIG. 22A and FIG. 22B are a schematic diagram of an interface of still another PC according to an embodiment of this application.
Figure 22B:
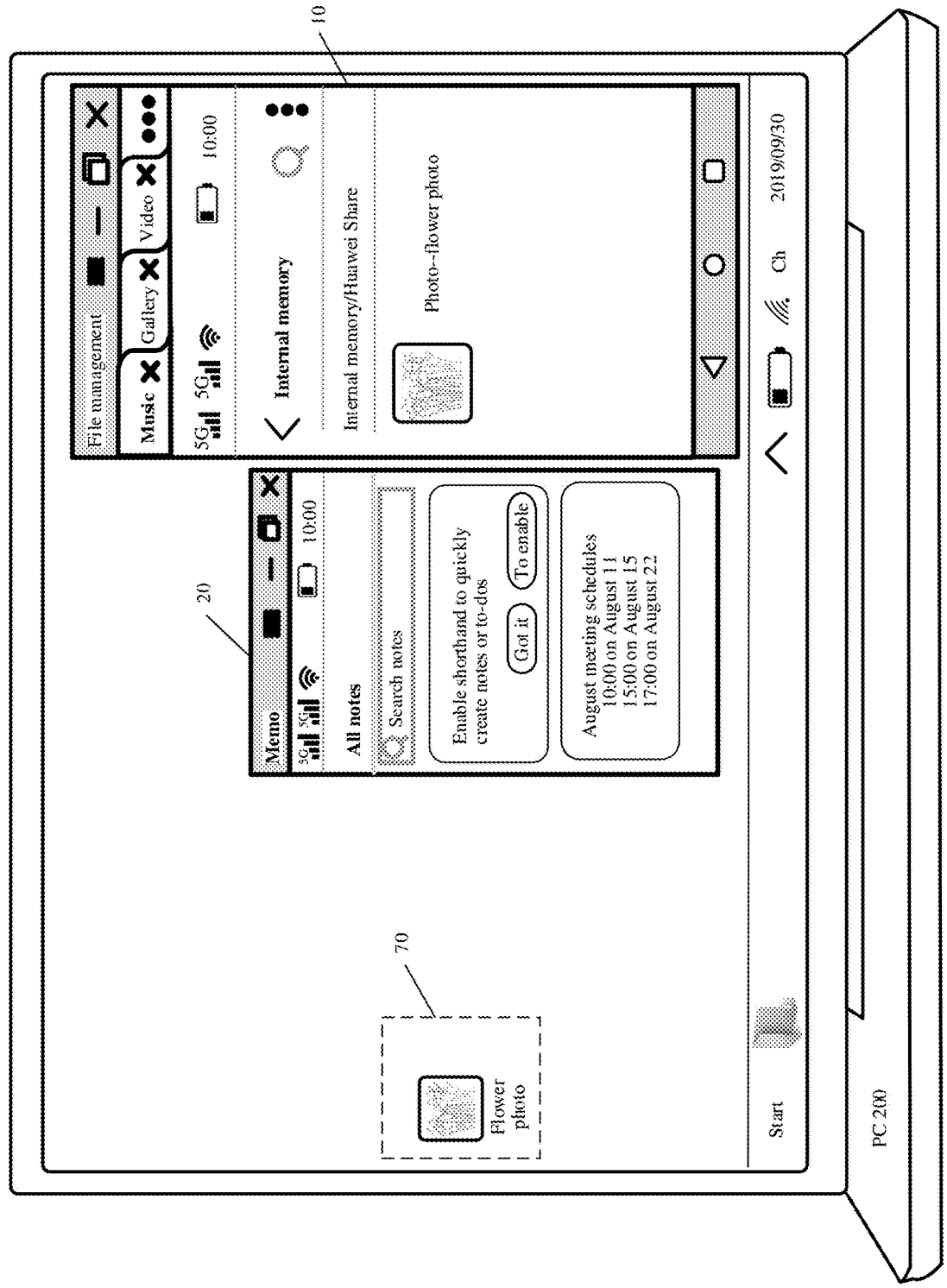

FIG. 22A and FIG. 22B are a schematic diagram of an interface of still another PC according to an embodiment of this application. As shown in FIG. 22A, a multi-screen collaboration window 10 and a memo application window 20 are displayed on an interface of a PC 200. The multi-screen collaboration window 10 currently displays a main interface of a mobile phone 100, and the memo application window 20 displays a running interface of a memo application.

For example, as shown in FIG. 22A, when a user clicks and selects a flower photo 70 and drags the flower photo 70 in a direction indicated by a dashed line, the flower photo 70 is dragged to any position on the main interface of the mobile phone 100 in the multi-screen collaboration window 10 and released. In response to the selection and dragging operation of the user, as shown in FIG. 22B, the multi-screen collaboration window 10 skips to display a file management interface of the mobile phone 100. A storage position of the flower photo in the mobile phone 100 is displayed on the file management interface.

Optionally, when the photo is dragged from the PC 200 to the main interface of the mobile phone 100 of the multi-screen collaboration window 10, the photo may be stored in a directory of a file share (for example, Huawei Share) stored in the mobile phone 100. For example, as shown in FIG. 22B, after the user releases the flower photo 70, the flower photo 70 is displayed in a file list of Huawei Share.

Moreover, the file may alternatively be shared between a plurality of windows displayed on the PC 200, that is, shared between different applications.

Figure 23A:
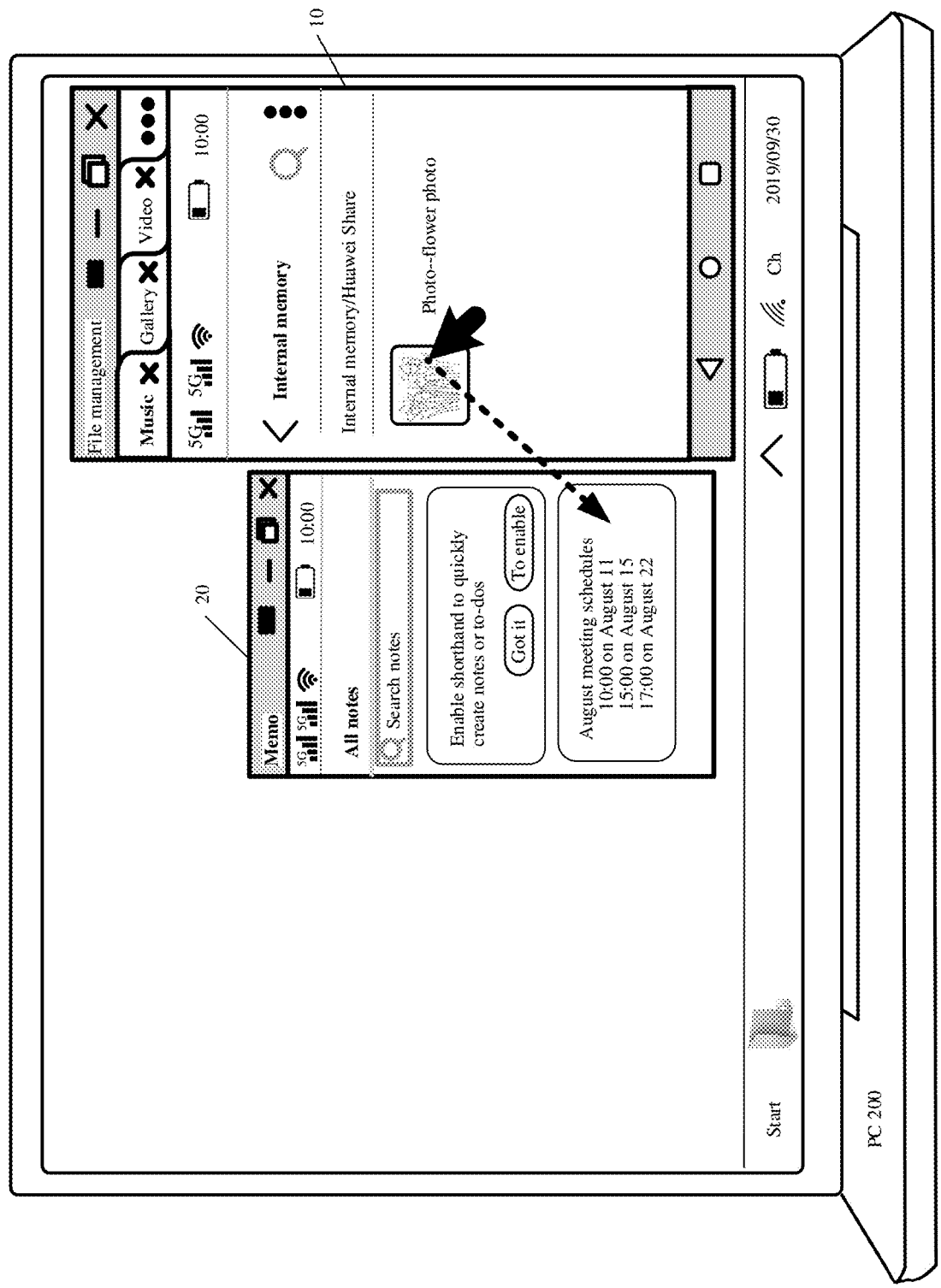
FIG. 23A to FIG. 23C are a schematic diagram of an interface of still another PC according to an embodiment of this application.
Figure 23B:
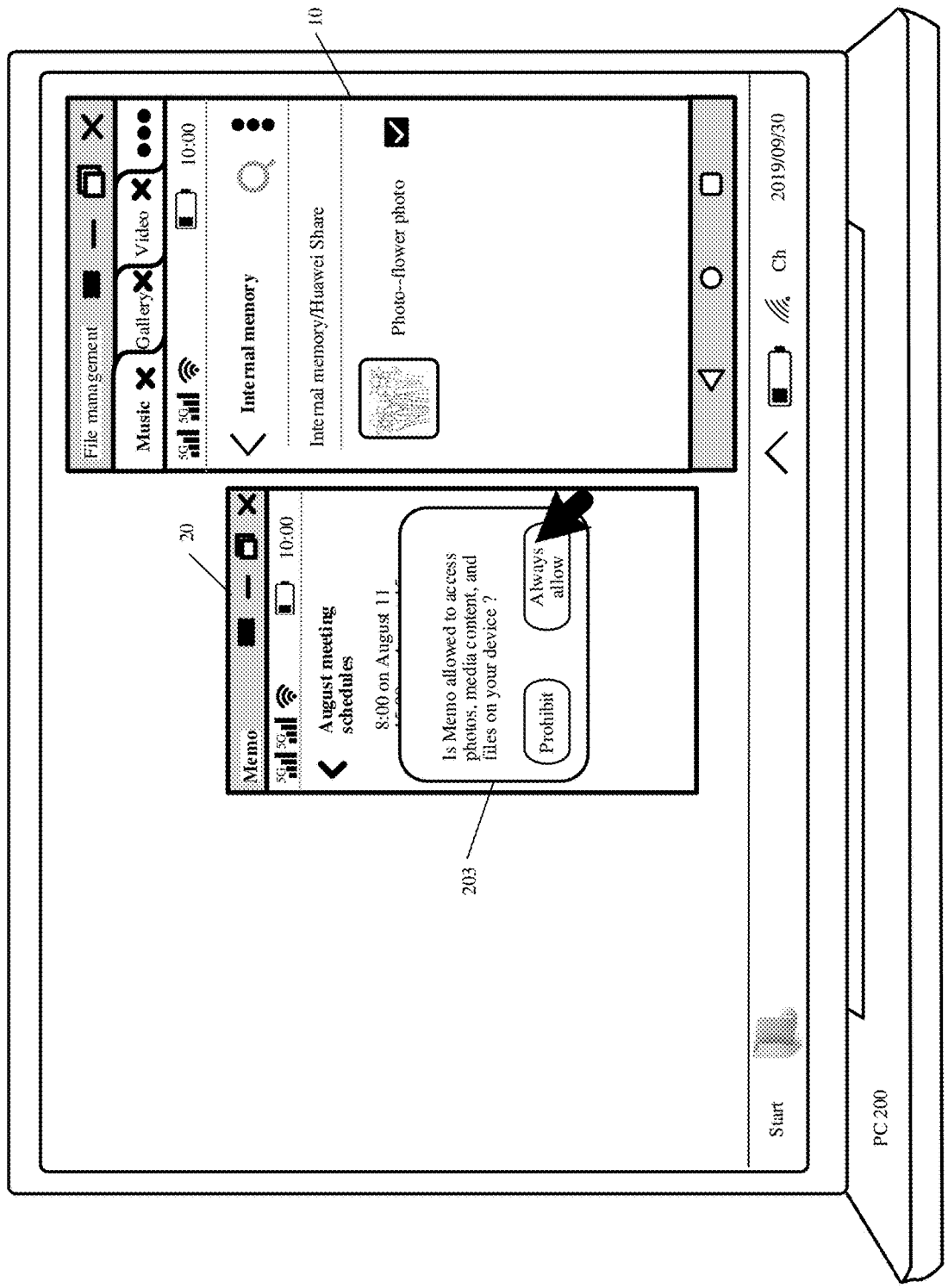
Figure 23C:
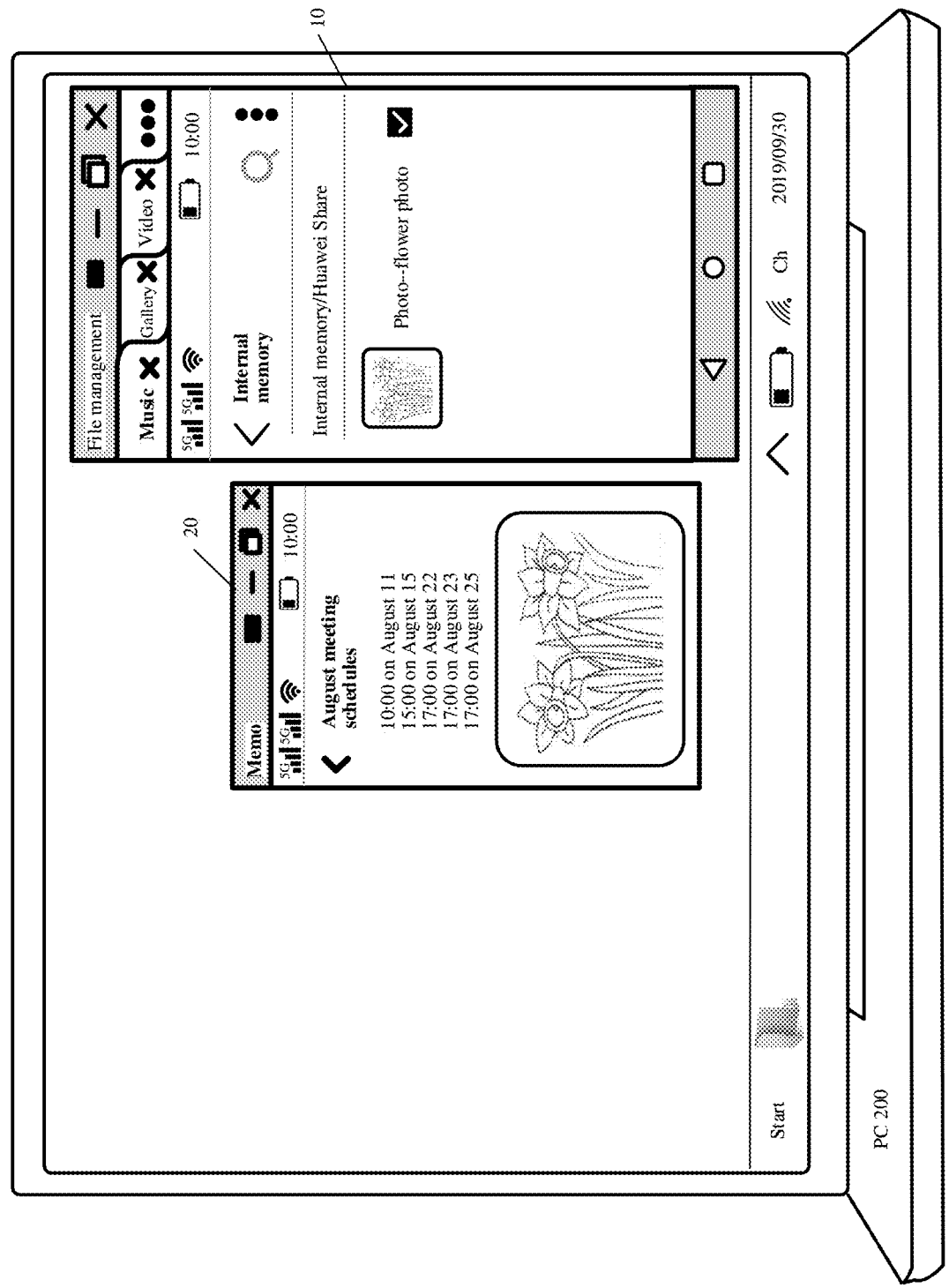

FIG. 23A to FIG. 23C are a schematic diagram of an interface of still another PC according to an embodiment of this application. As shown in FIG. 23A, a multi-screen collaboration window 10 and a memo application window 20 are displayed on an interface of a PC 200. The multi-screen collaboration window 10 currently displays a file management interface of a mobile phone 100. The file management interface includes a flower photo in a directory of a file share (for example, Huawei Share) stored in the mobile phone 100. The memo application window 20 displays a running interface of a memo application.

For example, as shown in FIG. 23A, when the user clicks and selects the flower photo stored in the directory of Huawei Share, and drags the flower photo in a direction indicated by a dashed line, the flower photo is released after being dragged to a position of an "August meeting schedules" menu in the memo application window 20. In response to the selection and dragging operation of the user, as shown in FIG. 23B, the memo application window 20 skips to display a secondary interface of the memo application, namely, an interface of the August meeting schedule menu, and displays a reminder window 203 on the interface of the August meeting schedule menu, to prompt the user "Is Memo allowed to access photos, media content, and files on your device". The user may authorize or forbid, according to an instruction, the memo application to access a photo, media content, a file, and the like on the mobile phone 100.

For example, as shown in FIG. 23B, after the user clicks and selects an always allow button, and authorizes the memo application to access a photo, media content, and a file on the mobile phone 100, in response to the authorization operation of the user, as shown in FIG. 21B, the flower photo has been copied to the memo application on the secondary interface of the memo application displayed in the memo application window 20, that is, the flower photo is displayed in the interface of "August meeting schedules".

Optionally, in the process that the user selects and drags the flower photo, reminder information shown in FIG. 23B may be displayed on the interface of the PC 200, to prompt the user to "Copy to memo", that is, the operation currently performed by the user may copy the flower photo to the memo application. Details are not described in this embodiment of this application.

Figure 24A:
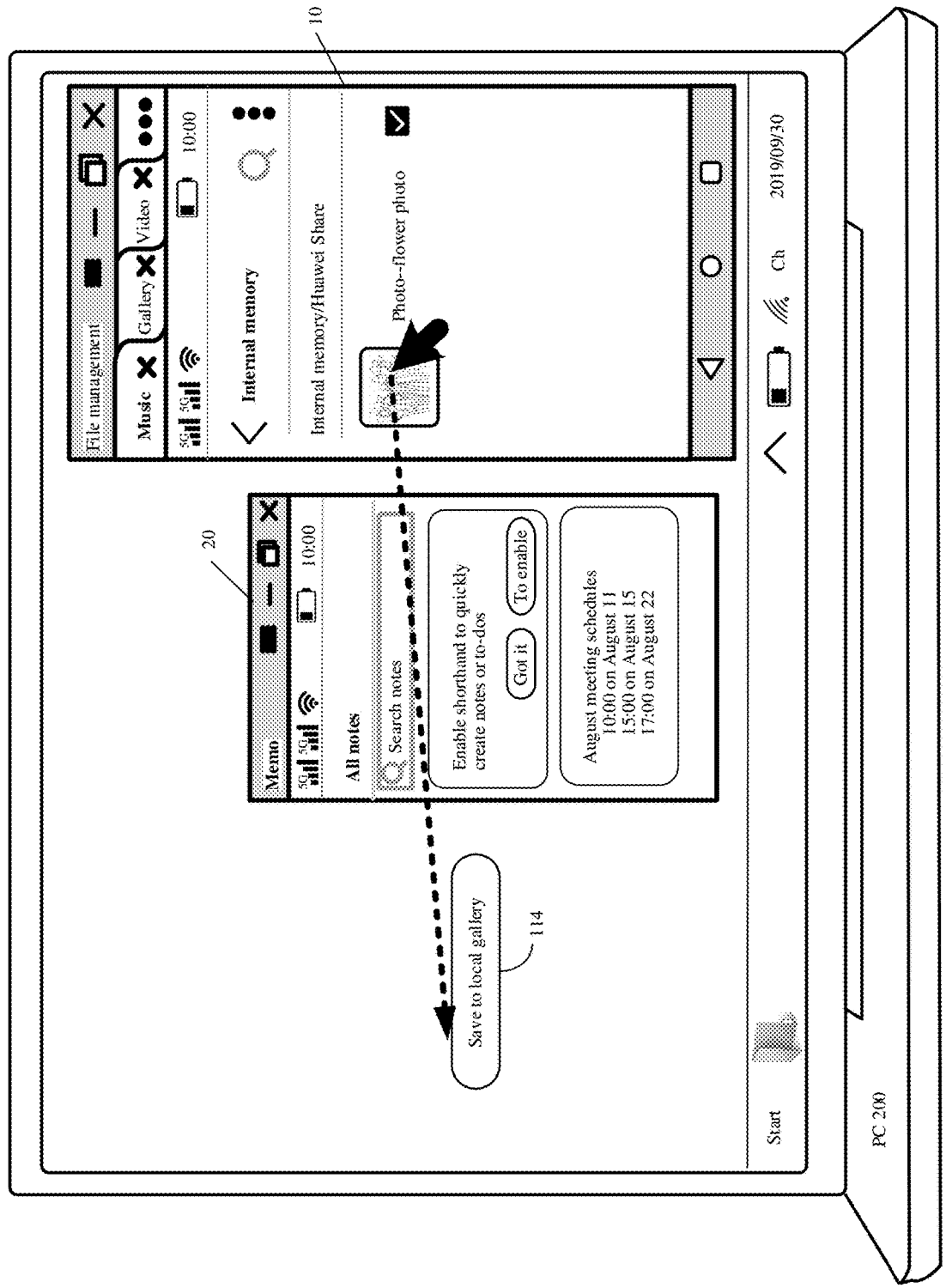
FIG. 24A and FIG. 24B are a schematic diagram of an interface of still another PC according to an embodiment of this application.
Figure 24B:
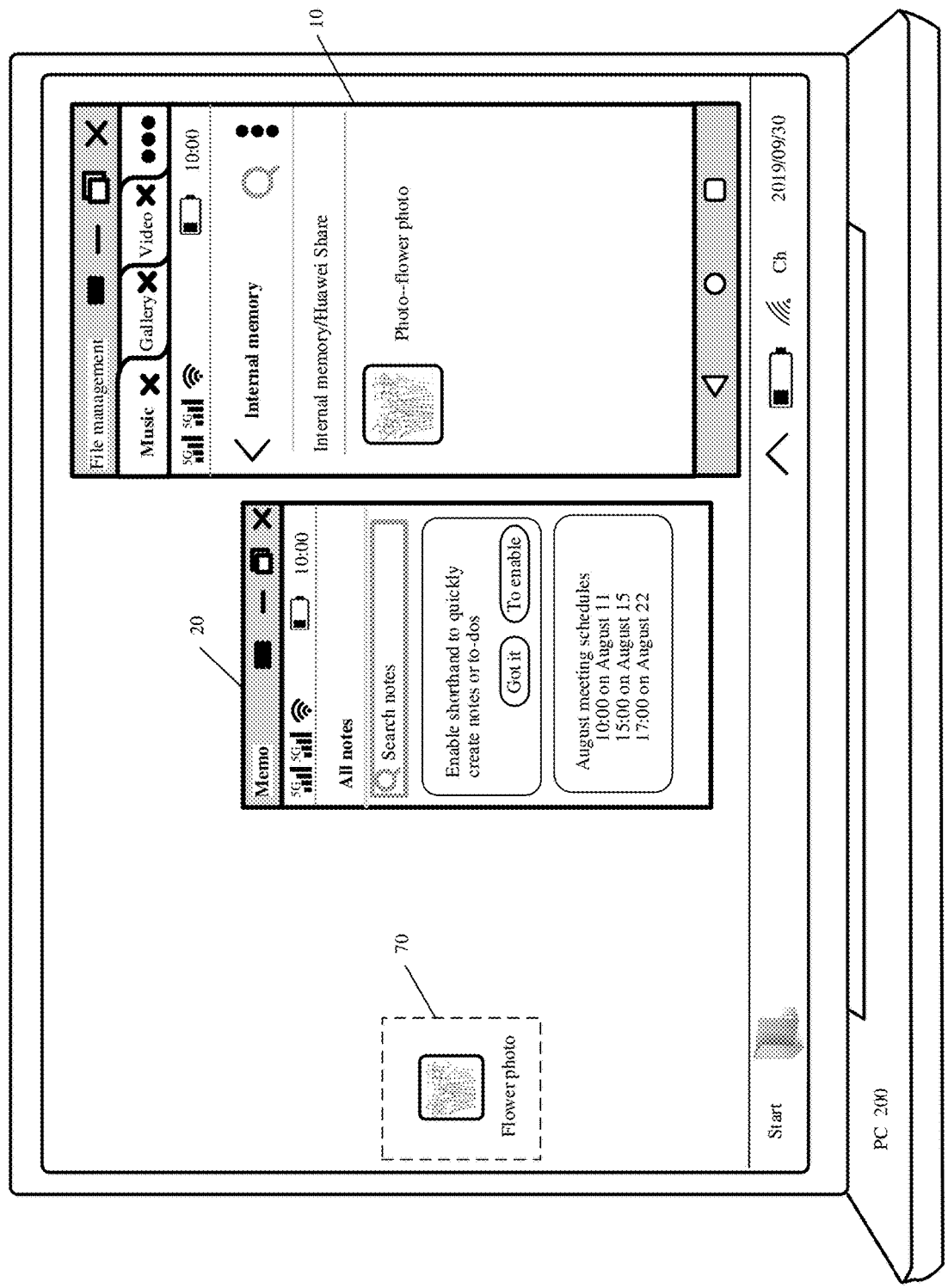

FIG. 24A and FIG. 24B are a schematic diagram of an interface of still another PC according to an embodiment of this application. As shown in FIG. 24A, a multi-screen collaboration window 10 and a memo application window 20 are displayed on an interface of a PC 200. The multi-screen collaboration window 10 currently displays a file management interface of a mobile phone 100. The file management interface includes a flower photo in a directory of a file share (for example, Huawei Share) stored in the mobile phone 100. The memo application window 20 displays a running interface of a memo application.

For example, as shown in FIG. 24A, when the user clicks and selects the flower photo stored in the directory of Huawei Share, and drags the flower photo in a direction indicated by a dashed line, the flower photo is released after being dragged to any position on the interface of the PC 200 where any application window of the mobile phone is not displayed. In response to the selection and dragging operation of the user, as shown in FIG. 24B, the flower photo is copied to a desktop of the PC 200. The display position may be a final position of a user's dragging trajectory, or may be arranged on the interface of the PC 200 according to a preset rule and is actually stored in storage space of the PC 200. This is not limited in this embodiment of this application.

Optionally, in the process that the user selects and drags the flower photo, reminder information shown in FIG. 24A may be displayed on the interface of the PC 200, to prompt the user to "save to local gallery", that is, the operation currently performed by the user may save the flower photo to local storage space of the PC 200. If the user does not want to save the flower photo to the local gallery, the dragging process may be immediately terminated. Details are not described in this embodiment of this application.

It should be understood that FIG. 24A and FIG. 24B describe a process of sharing a file on a PC 200 from a multi-screen collaboration window 10 (main window) to the PC 200. Similarly, a process of sharing a file from an independent application window (sub-window) to the PC 200 may alternatively refer to the process. For example, for a scenario shown in FIG. 23C, the interface of "August meeting schedules" displayed in the memo application window 20 on the PC 200 includes a flower photo. The user may select the flower photo from the interface of "August meeting schedules", drag the flower photo to the main interface of the PC 200, and save the flower photo to the storage space of the PC 200. Details are not described in this embodiment of this application.

Figure 25A:
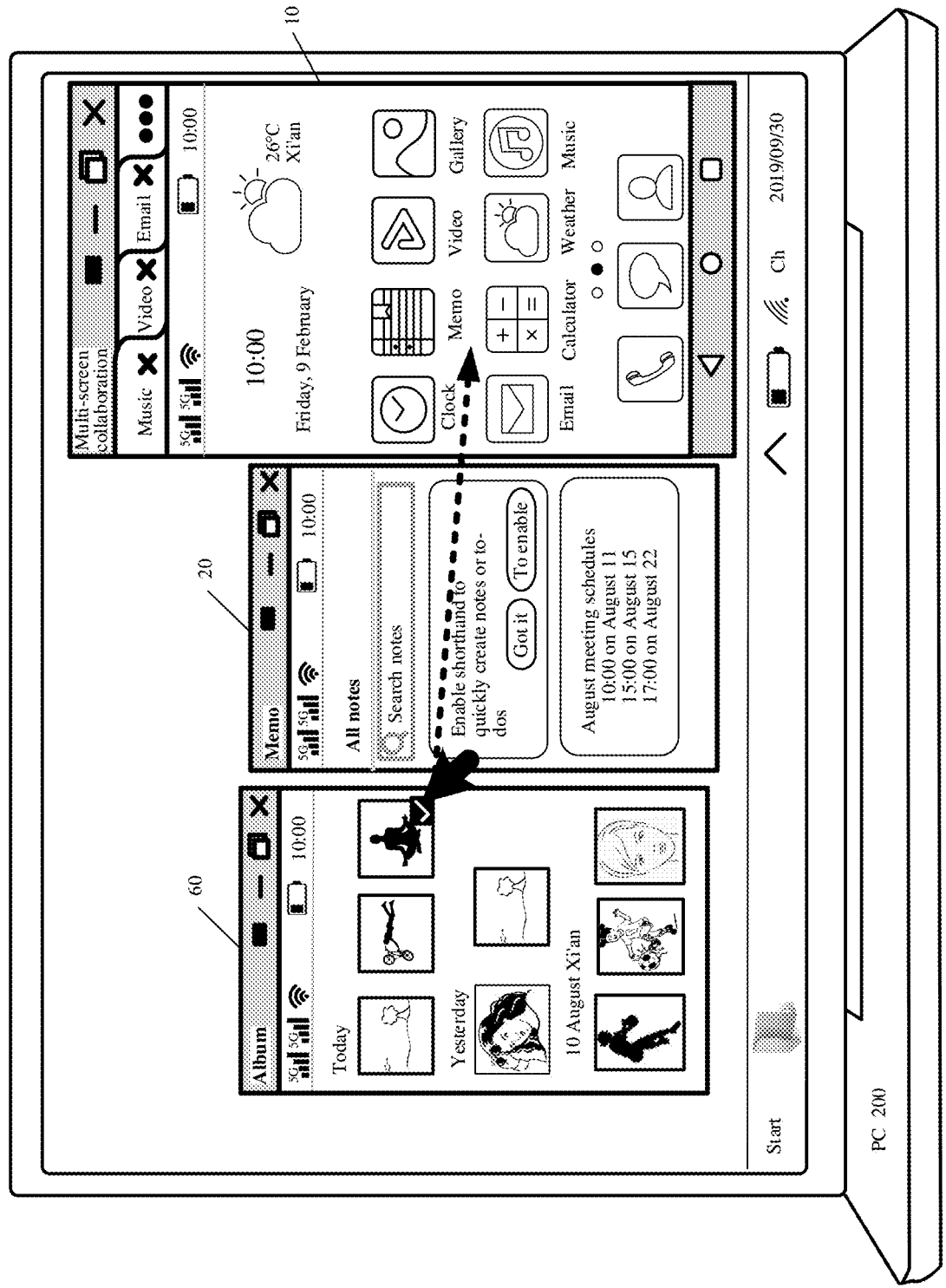
FIG. 25A and FIG. 25B are a schematic diagram of an interface of still another PC according to an embodiment of this application.
Figure 25B:
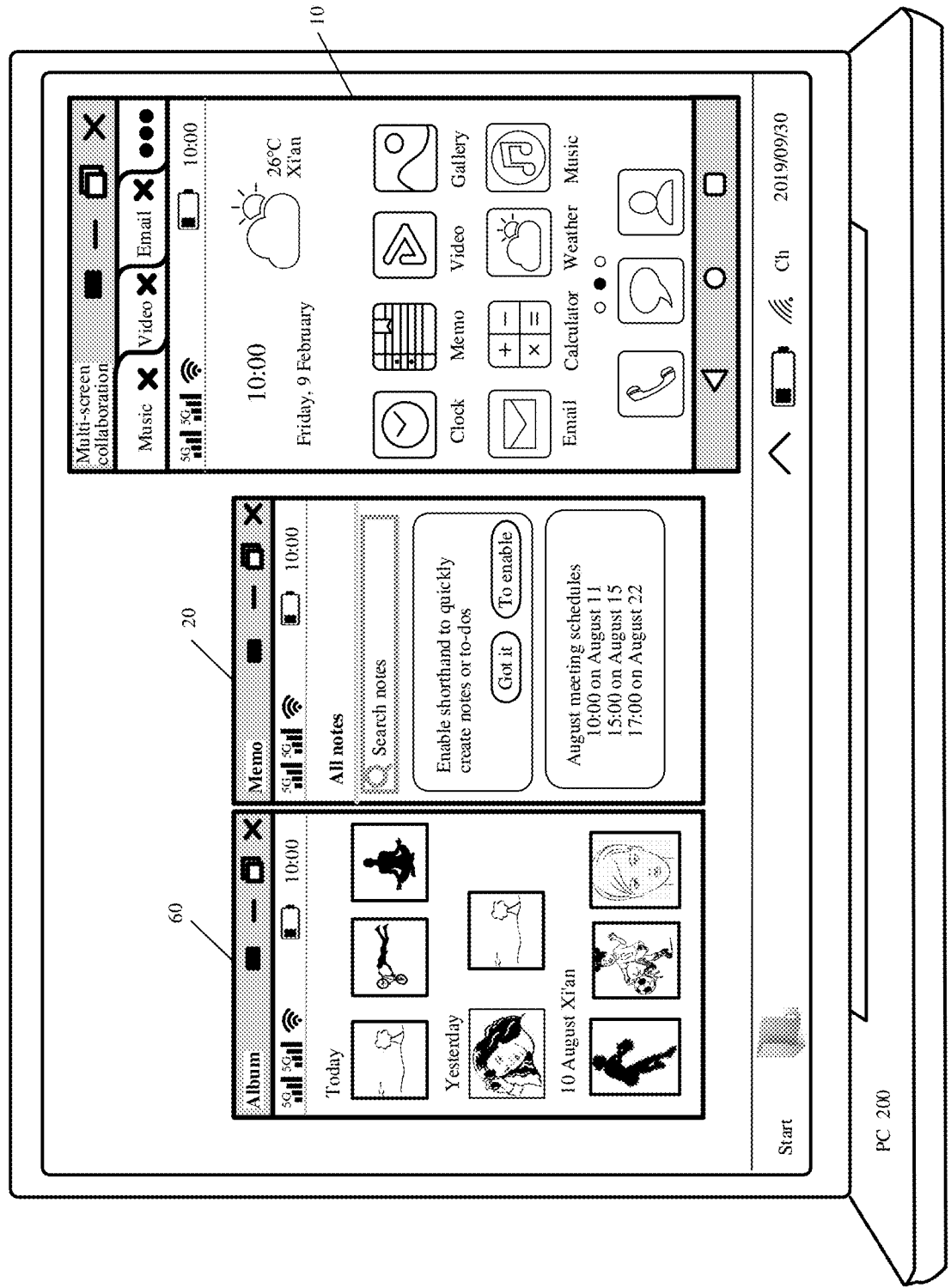

FIG. 25A and FIG. 25B are a schematic diagram of an interface of still another PC according to an embodiment of this application. As shown in FIG. 25A, a multi-screen collaboration window 10, a memo application window 20, and a gallery application window 60 are displayed on an interface of a PC 200. The multi-screen collaboration window 10 currently displays a main interface of a mobile phone 100, the memo application window 20 displays a running interface of a memo application, and the gallery application window 60 displays an interface of a plurality of photos.

For example, as shown in FIG. 25A, when a user clicks and selects one or more photos in the gallery application window 60 and drags the one or more photos in a direction indicated by a dashed line, the one or more photos are dragged to any position on the main interface of the mobile phone 100 in the multi-screen collaboration window 10 and released. For a user operation in this scenario, as shown in FIG. 25B, display of the multi-screen collaboration window 10, the memo application window 20, and the gallery application window 60 does not change.

It should be understood that, in this process, the operation performed by the user may be understood as copying the selected one or more photos of a gallery application to the mobile phone 100. However, the one or more photos selected by the user are stored in local storage space of the mobile phone 100. Therefore, for the operation shown in FIG. 25A, display of a main window and all sub-windows on the PC 200 may not change.

Optionally, when the user selects a photo, the photo may display a selected corner mark shown in FIG. 25A. Similarly, when the user selects two or more photos, the photos may display selected corner marks shown in FIG. 25A, and in the user's dragging process, the photos may be displayed as a thumbnail of a photo. Details are not described in this embodiment of this application.

Figure 26A:
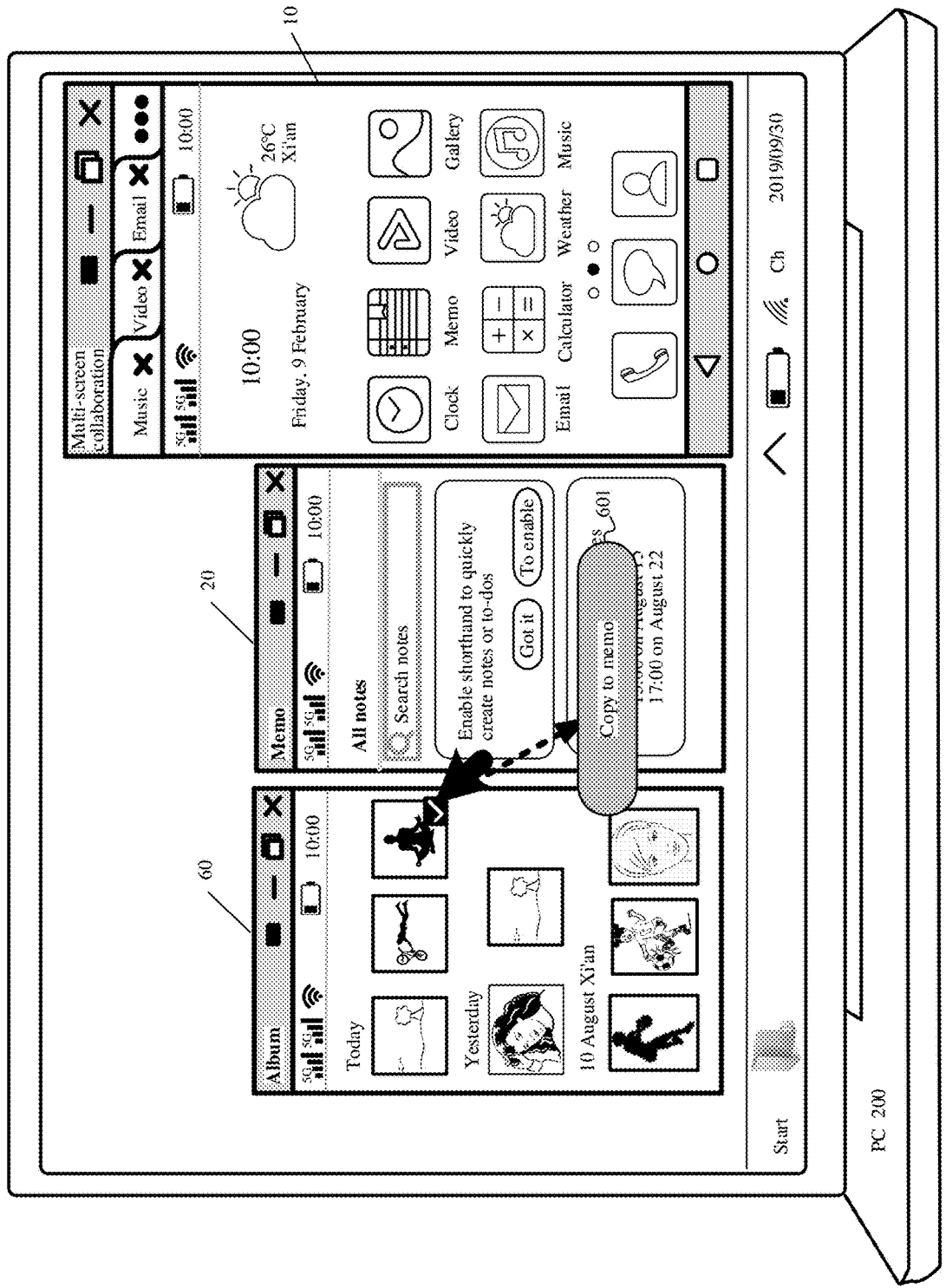
FIG. 26A and FIG. 26B are a schematic diagram of an interface of still another PC according to an embodiment of this application.
Figure 26B:
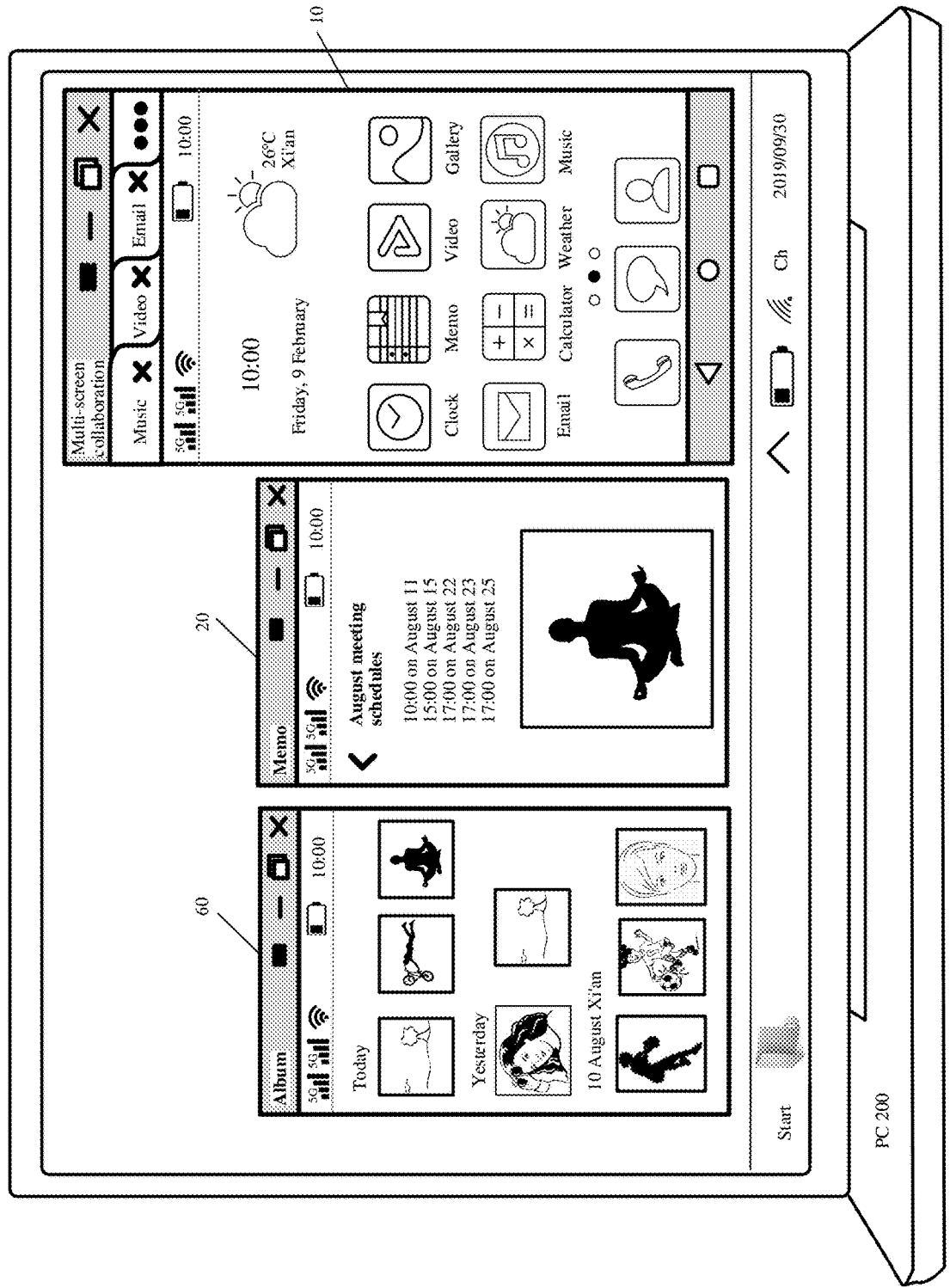

FIG. 26A and FIG. 26B are a schematic diagram of an interface of still another PC according to an embodiment of this application. As shown in FIG. 26A, a multi-screen collaboration window 10, a memo application window 20, and a gallery application window 60 are displayed on an interface of a PC 200. The multi-screen collaboration window 10 currently displays a main interface of a mobile phone 100, the memo application window 20 displays a running interface of a memo application, and the gallery application window 60 displays an interface of a plurality of photos.

For example, as shown in FIG. 26A, when a user clicks and selects one or more photos in the gallery application window 60 and drags the one or more photos in a direction indicated by a dashed line, the one or more photos are released after being dragged to a position of an "August meeting schedules" menu in the memo application window 20. In response to the selection and dragging operation of the user, as shown in FIG. 26B, the memo application window 20 skips to display a secondary interface of the memo application, namely, an interface of an August meeting schedule menu, and copies the photo selected by the user to the memo application, that is, the photo selected by the user is displayed in the interface of "August meeting schedules".

Optionally, in the process that the user selects and drags the flower photo, reminder information shown in FIG. 26B may be displayed on the interface of the PC 200, to prompt the user to "Copy to memo", that is, the operation currently performed by the user may copy the photo selected by the user to the memo application. Details are not described in this embodiment of this application.

It should be understood that the foregoing describes a display process when the user selects one photo. The user may alternatively click and select a plurality of photos, and perform a drag operation at the same time. Alternatively, the user may select a plurality of different types of files such as a photo, a document, and a table, and perform a drag operation at the same time. Types and a quantity of files selected by the user are not limited in this embodiment of this application.

In conclusion, a file sharing method provided in some embodiments of this application is described through processes in FIG. 21A to FIG. 26B. The method may implement file sharing between a mobile phone and a PC and between different applications of the mobile phone, and the process is easy to operate. A file, a photo, or the like may be transferred by a simple drag operation. Users such as white collars and students who often use both a PC and a mobile phone may focus only on a screen of the PC and access data of the mobile phone through the PC in a use process, without frequently switching between the PC and the mobile phone. This greatly improves user's working and learning efficiency.

With reference to FIG. 21A to FIG. 26B, the foregoing embodiments describe a process of sharing a file between different windows on the PC 200 according to embodiments of this application. For different processes, a specific underlying implementation is described below with reference to the software architecture in FIG. 3A and FIG. 3B.

Figure 27A:
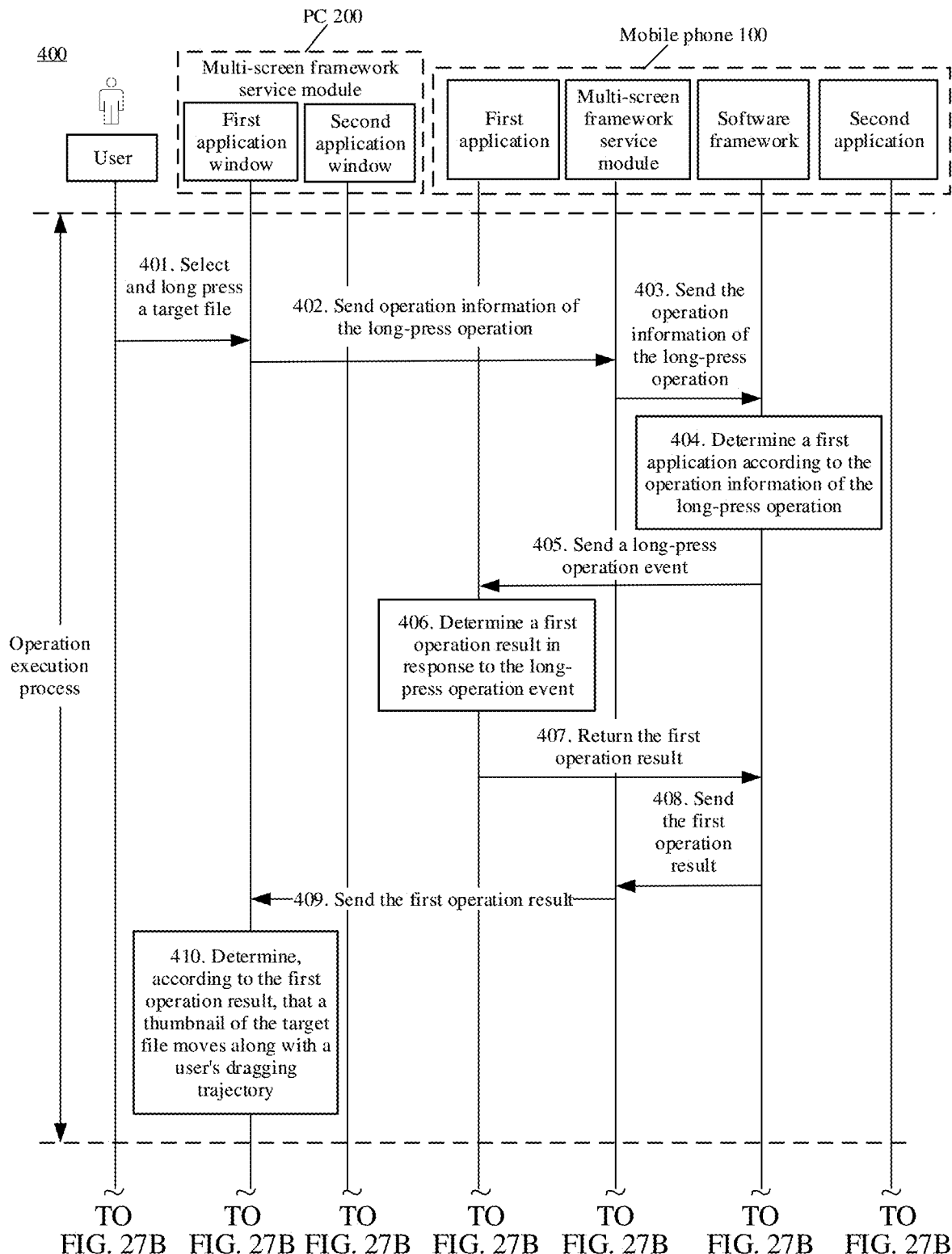
FIG. 27A and FIG. 27B are a schematic flowchart of a window display process according to an embodiment of this application.
Figure 27B:
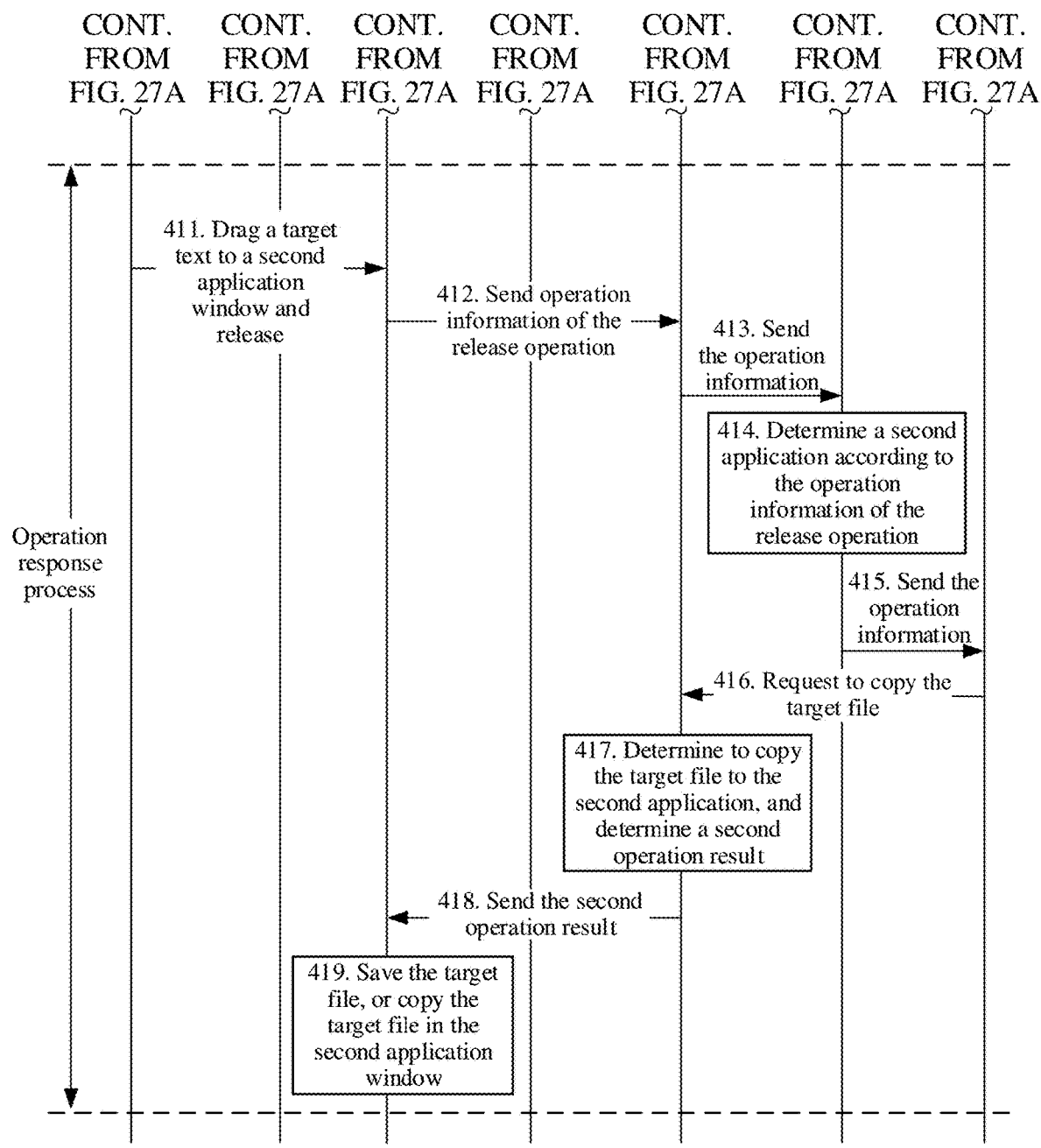

FIG. 27A and FIG. 27B are a schematic flowchart of another window display process according to an embodiment of this application. It should be understood that a method 400 may be performed by a processor of a mobile phone. Specifically, the method 400 is jointly performed by a plurality of software modules described in FIG. 3A and FIG. 3B. As shown in FIG. 27A and FIG. 27B, the method 400 may be divided into the following two stages:

Stage 1: Operation Execution Process

It should be understood that the operation execution process in the first stage may correspond to an interaction process between a PC 200 and a mobile phone 100 after a user selects a to-be-shared target file. Specifically, the operation execution process includes the following steps.

401. A user selects and long presses a target file in a first application window.

For example, the target file may be a file such as a photo, a document, or a text. This is not limited in this embodiment of this application.

402. A multi-screen framework service module of a PC 200 sends, according to the long-press operation of the user in the first application window, operation information of the long-press operation to a multi-screen framework service module of a mobile phone 100.

403. The multi-screen framework service module of the mobile phone 100 sends the operation information of the long-press operation to a software framework.

404. A software framework of the mobile phone 100 determines a first application according to the operation information of the long-press operation.

405. The software framework of the mobile phone 100 sends a long-press operation event to the first application.

406. The first application determines a first operation result in response to the long-press operation event.

407. The first application returns the first operation result to the software framework.

408. The software framework of the mobile phone 100 sends the first operation result to the multi-screen framework service module of the mobile phone 100.

409. The multi-screen framework service module of the mobile phone 100 sends the first operation result to the multi-screen framework service module of the PC 200.

410. The multi-screen framework service module of the PC 200 determines, according to the first operation result, that a thumbnail of the target file in the first application window moves along a user's dragging trajectory.

For example, the operation execution process in the first stage may alternatively correspond to FIG. 23A or FIG. 24A. The user selects, in the multi-screen collaboration window, a flower photo in the directory of Huawei Share, and the multi-screen framework service module of the PC 200 may determine, according to the long-press operation of the user, that the user selects the flower photo locally stored in the mobile phone 100.

For example, the operation execution process in the first stage may correspond to FIG. 25A or FIG. 26A. The user long presses a target photo in the gallery application window 60, and the multi-screen framework service module of the PC 200 may determine, according to the long-press operation of the user, that the user selects the photo in the gallery application.

It should be understood that the first application window is an application window of the mobile phone 100 as an example to describe an implementation process of file sharing herein. Optionally, the first application window may be a window of the PC 200. For example, the first application window is a main window displayed on the display of the PC 200. This is not limited in this embodiment of this application. For example, the operation execution process in the first stage may alternatively correspond to FIG. 21A or FIG. 22A. The PC 200 may determine, according to the long-press operation of the user, that the user selects the flower photo locally stored on the desktop of the PC 200.

Stage 2: Operation Response Process

411. The user drags a target text to a second application window and releases the target text.

412. The multi-screen framework service module of the PC 200 sends, according to the release operation of the user in the second application window, operation information of the release operation to the multi-screen framework service module of the mobile phone 100.

413. The multi-screen framework service module of the mobile phone 100 sends the operation information to the software framework.

414. The software framework of the mobile phone 100 determines a second application according to the operation information of the release operation.

415. The software framework of the mobile phone 100 sends the operation information of the release operation to the second application.

416. The second application requests the multi-screen framework service module of the mobile phone 100 to copy the target file.

417. The multi-screen framework service module of the mobile phone 100 determines a second operation result according to the request. It should be understood that, in the process of 417, the multi-screen framework service module may determine whether the target file may be copied to the second application.

Specifically, in step 417, in a process that a user shares a file through a drag operation, the mobile phone 100 may first determine, according to a source position and a destination position of the target file selected by the user, that the source position of the target file is the PC 200 or the mobile phone 100. When the source position of the target file is the mobile phone 100, it may be further determined that the source position of the target file is the first application, the second application, a local storage of the mobile phone, or the like. Moreover, it may be further determined that the destination position of sharing is the PC 200 or the mobile phone 100. When the destination position is the mobile phone 100, it may be further determined that the destination position is the first application, the second application, the local storage of the mobile phone, or the like, and an operation result of the drag operation may be determined.

Figure 28:
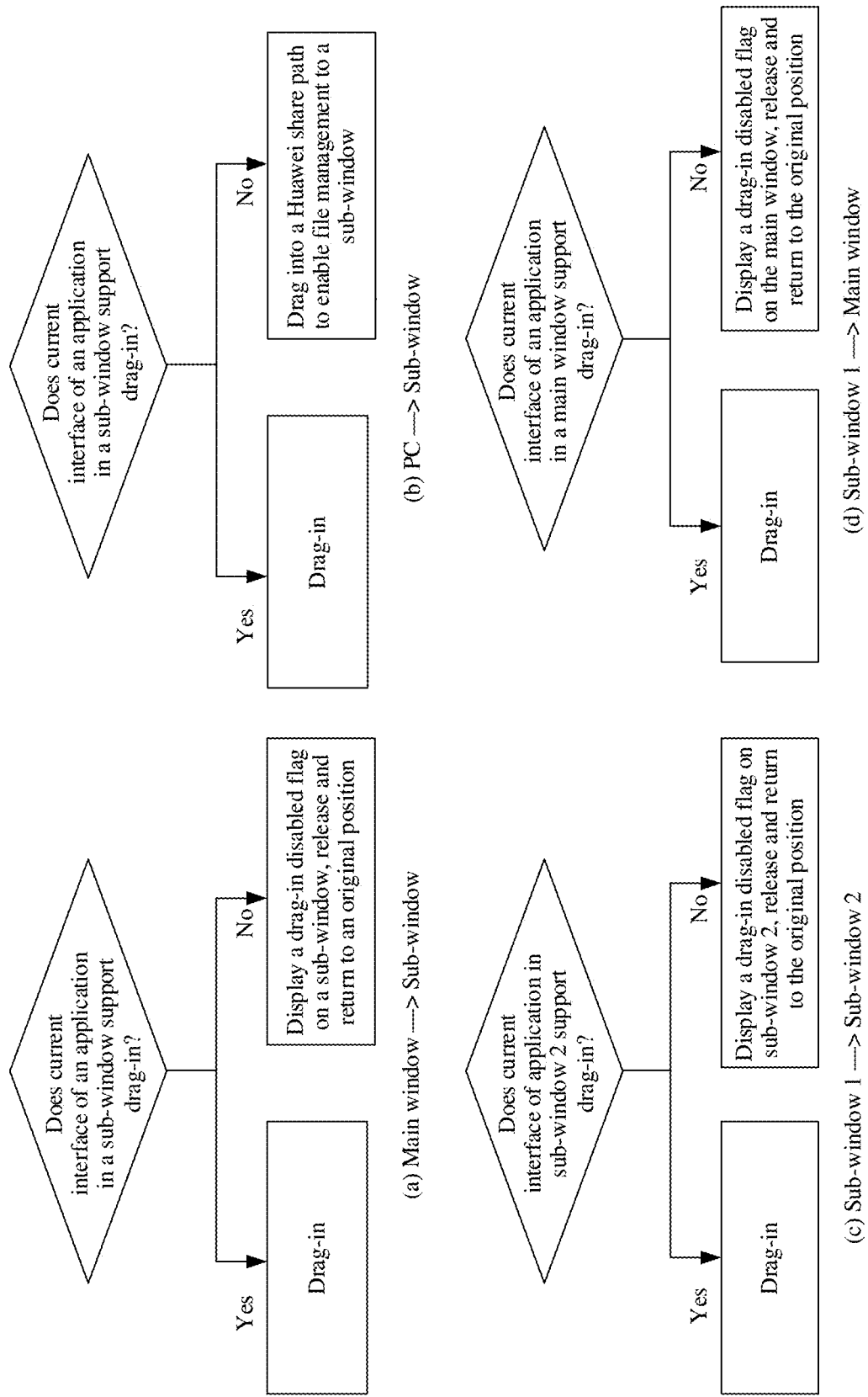
FIG. 28 is a schematic diagram of a drag policy according to an embodiment of this application.

For example, FIG. 28 is a schematic diagram of a drag policy according to an embodiment of this application. Drag policies of a mobile phone 100 may include:

As shown in (a) in FIG. 28, if a drag operation of a user from a main window to an independent sub-window is identified, the mobile phone 100 needs to determine whether a current interface of an application in the sub-window supports drag-in. When the application displayed in the sub-window supports an operation of dragging a target file in, subsequent step 418 and the like continue to be performed. When the application displayed in the sub-window does not support an operation of dragging a target file in, a drag-in disabled flag may be displayed on the sub-window, and the dragged target file returns to an original position after the user releases the target file.

As shown in (b) in FIG. 28, if a drag operation of a user from a PC 200 to an independent sub-window is identified, the mobile phone 100 needs to determine whether a current interface of an application in the sub-window supports drag-in. When the application displayed in the sub-window supports an operation of dragging a target file in, subsequent step 418 and the like continue to be performed. When the application displayed in the sub-window does not support an operation of dragging a target file in, the target file may be dragged in a Huawei Share interface in a file management path of the mobile phone 100. After the user releases the target file, the sub-window is switched to the Huawei Share interface in the file management path, and the dragged target file is saved in the local storage of the mobile phone.

As shown in (c) in FIG. 28, if a drag operation of a user from an independent sub-window 1 to a sub-window 2 is identified, the mobile phone 100 needs to determine whether a current interface of an application in the sub-window 2 supports drag-in. When the application displayed in the sub-window 2 supports an operation of dragging a target file in, subsequent step 418 and the like continue to be performed. When the application displayed in the sub-window 2 does not support an operation of dragging a target file in, a drag-in disabled flag may be displayed on the sub-window 2, and the dragged target file returns to an original position of the sub-window 1 after the user releases the target file.

As shown in (d) in FIG. 28, if a drag operation of a user from an independent sub-window 1 to a main window is identified, the mobile phone 100 needs to determine whether a current interface of an application in the main window supports drag-in. When the application displayed in the main window supports an operation of dragging a target file in, subsequent step 418 and the like continue to be performed. When the application displayed in the main window does not support an operation of dragging a target file in, a drag-in disabled flag may be displayed on the main window, and the dragged target file returns to an original position of the independent sub-window 1 after the user releases the target file.

Optionally, the second operation result may also be not to execute an instruction of copying the target file or saving the target file. For example, as shown in FIG. 25A, the user long presses the target photo in the gallery application window 60, and the mobile phone 100 determines that the target position of copying by the user is the main screen of the mobile phone 100. However, the target photo itself is stored in the local storage space of the mobile phone 100. Therefore, for the operation shown in FIG. 25A, the returned second operation result is not to execute an instruction of copying the target file or saving the target file, that is, display of the main window and all sub-windows on the PC 200 may not change. Details are not described herein again.

418: The multi-screen framework service module of the mobile phone 100 sends the second operation result to the multi-screen framework service module of the PC 200.

419: The multi-screen framework service module of the PC 200 determines, according to the second operation result, to save the target file, or copy the target file in the second application window.

For example, the operation execution process in the second stage may correspond to FIG. 23A to FIG. 23C. The user selects and drags, in the multi-screen collaboration window, a flower photo in the directory of Huawei Share. A thumbnail of the flower photo is displayed on the PC 200 in the dragging process, and finally the flower photo is copied at a position of user release, namely, in the memo application window 20.

Alternatively, for example, the operation execution process in the second stage may correspond to FIG. 24A and FIG. 24B. The user selects and drags, in the multi-screen collaboration window, a flower photo in the directory of Huawei Share. A thumbnail of the flower photo is displayed on the PC 200 in the dragging process, and finally the user releases the flower photo to the desktop of the PC 200. Therefore, the flower photo is saved in the local storage of the PC 200.

The foregoing operation execution process in the first stage may alternatively correspond to the processes in FIG. 10A to FIG. 19. In an interaction process between the PC 200 and the mobile phone 100 after the user clicks a button or menu in the multi-screen collaboration window 10 on the PC 200 or in any independent application sub-window, the PC 200 may transfer each operation of the user back to the mobile phone 100, the mobile phone 100 determines an operation result and further transfers the operation result or information such as a change of a display interface to the PC 200, and the PC 200 updates related display according to an instruction of the mobile phone 100.

Processes shown in FIG. 7A and FIG. 7B are used as an example. A rotation button 20-6 and a rotation button 30-6 shown in FIG. 7A may be included in the independent memo application window 20 and the independent music application window 30. When the user performs an operation of clicking a rotation button, the mobile phone 100 also needs to determine whether a current application supports rotation. Several determining policies of the mobile phone 100 are described below.

Figure 29:
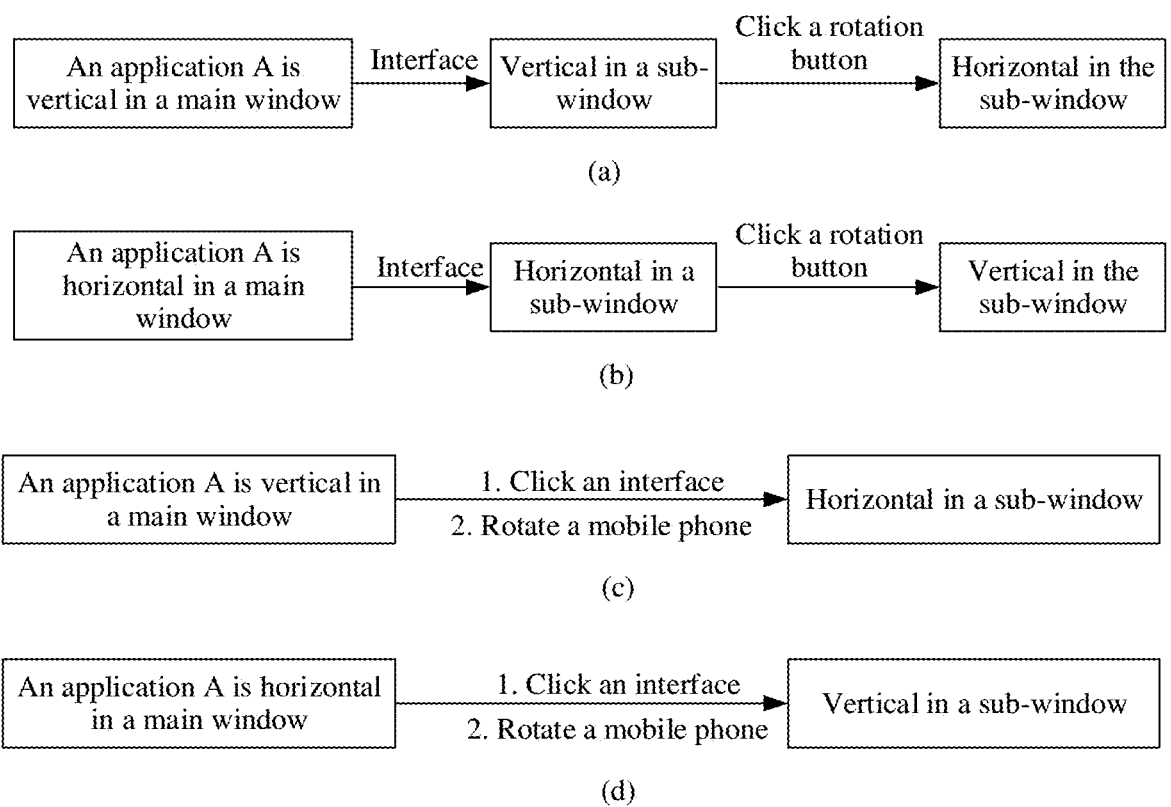
FIG. 29 is a schematic diagram of an implementation of window rotation display according to an embodiment of this application.

FIG. 29 is a schematic diagram of an implementation of window rotation display according to an embodiment of this application. In the implementation process, display policies of the PC 200 may include the following:

(1) As shown in (a) in FIG. 29, if an application A is displayed vertically in a main window, when the application A is switched from the main window to an independent sub-window, the application A may also be displayed vertically in the sub-window. When a user's operation of clicking a rotation button is detected in the sub-window, the sub-window changes to horizontal display.

(2) As shown in (b) in FIG. 29, if the application A is displayed horizontally in the main window, when the application A is switched from the main window to an independent sub-window, the application A may also be displayed horizontally in the sub-window. When a user's operation of clicking a rotation button is detected in the sub-window, the sub-window changes to vertical display.

(3) As shown in (c) in FIG. 29, if the application A is displayed vertically in the main window, when the application A is switched from the main window to an independent sub-window, and it is detected that the user rotates the mobile phone 100, the sub-window changes to horizontal display.

(4) As shown in (d) in FIG. 29, if the application A is displayed horizontally in the main window, when the application A is switched from the main window to an independent sub-window, and it is detected that the user rotates the mobile phone 100, the sub-window changes to vertical display.

According to the foregoing implementation process, a user operation may be detected in a process of switching from "a single window" to "a plurality of windows" on the PC. If it is detected that the user performs an operation of rotating the mobile phone, or the user performs an operation of clicking a rotation button of a sub-window, the sub-window switched out on the PC 200 is displayed in a style after the user rotates the mobile phone. The user may change a display style according to a display requirement of the user, and an operation is simple, thereby improving user experience.

It should be understood that, in another possible implementation, in a multi-screen collaboration process of the mobile phone and the PC, switching from "a single window" to "a plurality of windows" may alternatively be automatically performed on the PC.

Figure 30A:
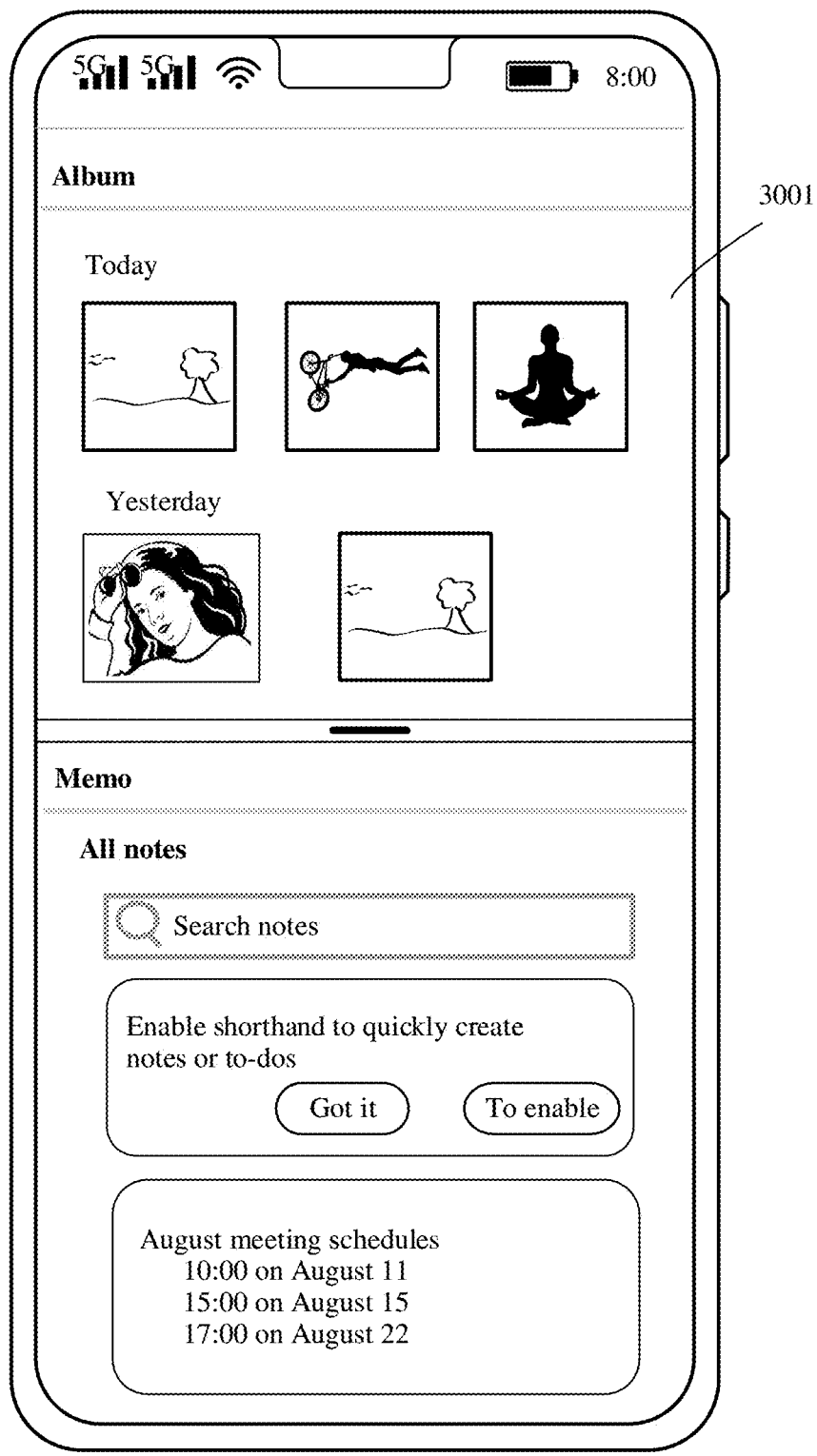
FIG. 30A and FIG. 30B are a schematic diagram of a scenario of automatically switching windows according to an embodiment of this application.
Figure 30B:
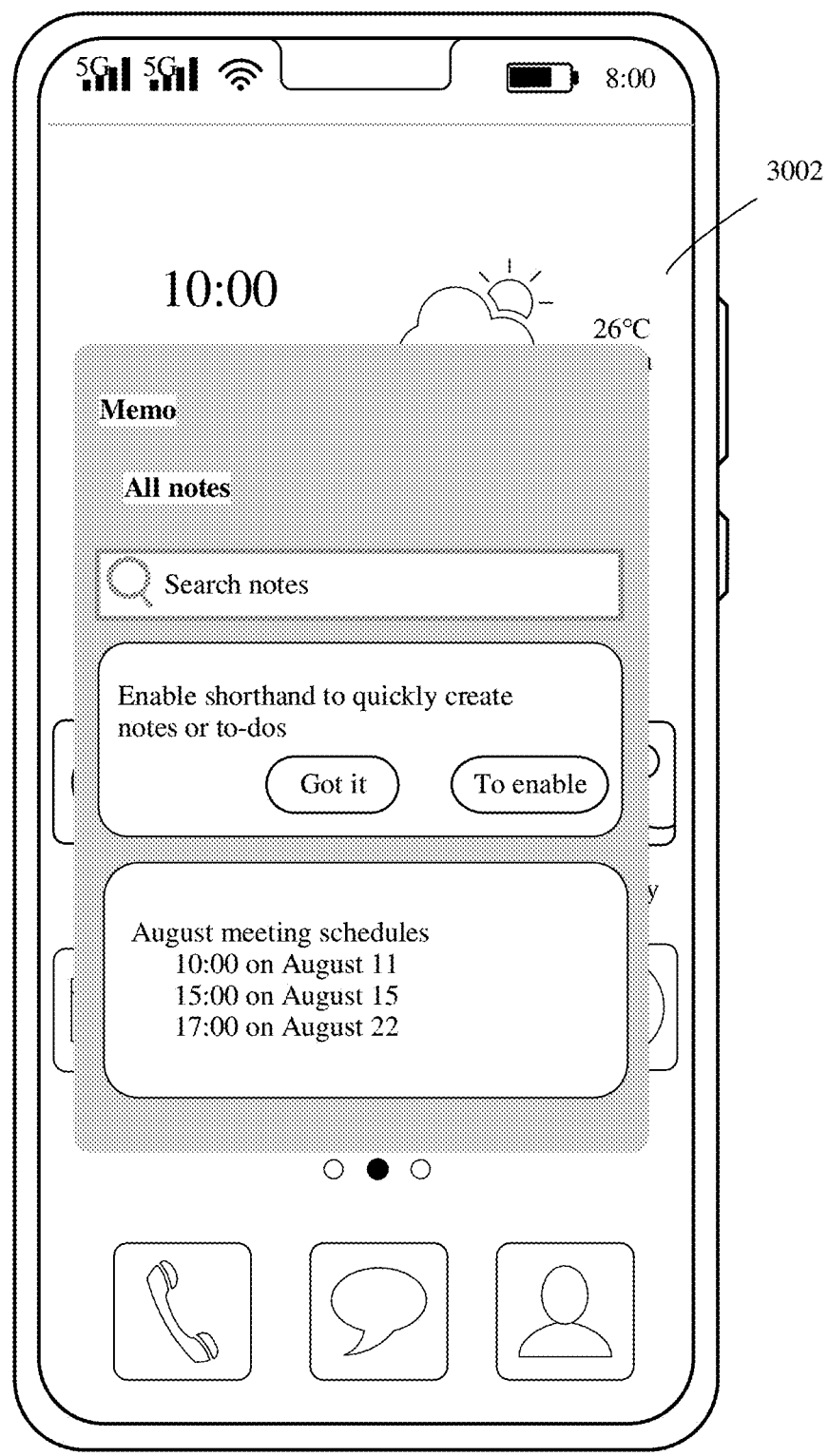

FIG. 30A and FIG. 30B are a schematic diagram of a scenario of automatically switching windows according to an embodiment of this application.

In a possible scenario, as shown in FIG. 30A, during multi-screen collaboration between a mobile phone and a PC, if a user performs an operation on the mobile phone 100 to make the mobile phone 100 display interfaces of two applications on split screens, display, in two windows on the PC 200, of the interfaces of the at least two applications displayed on split screens may be automatically triggered.

Optionally, the two windows may include a main window and a sub-window. For example, in the split-screen display scenario shown in FIG. 30A, the multi-screen collaboration window 10 on the PC 200 may display an interface of a gallery application that is first enabled, and a sub-window, namely, a memo application window 20 is automatically separated out for displaying an interface of a memo application that is enabled later. This is not limited in this embodiment of this application.

Alternatively, the two windows may include two independent sub-windows. For example, in the split-screen display scenario shown in FIG. 30A, the multi-screen collaboration window 10 on the PC 200 may display a main interface of the mobile phone 100, and a first sub-window, namely, a gallery application window 60, is automatically switched out to display the interface of the gallery application that is first enabled; and then a second sub-window, namely, a memo application window 20, is switched out to display the interface of the memo application that is enabled later. This is not limited in this embodiment of this application.

In another possible scenario, as shown in FIG. 30A, during multi-screen collaboration between a mobile phone and a PC, if a user performs an operation on the mobile phone 100 to make the mobile phone 100 display an interface of another application in a form of a floating window, display of two different interfaces in two windows on the PC 200 may be automatically triggered.

Optionally, the two windows may include a main window and a sub-window. For example, for a floating window display scenario shown in FIG. 30B, the multi-screen collaboration window 10 on the PC 200 may display a main interface of the mobile phone 100, and a sub-window, namely, a memo application window 20 is automatically separated out for displaying an interface of a memo application that is enabled later. This is not limited in this embodiment of this application.

Alternatively, the two windows may include two independent sub-windows. For example, in the floating window display scenario shown in FIG. 30B, if the main interface of the mobile phone 100 displays an interface of a gallery application, the multi-screen collaboration window 10 on the PC 200 may display a main interface of the mobile phone 100, and a first sub-window, namely, a gallery application window 60 is automatically switched out to display the interface of the gallery application that is first enabled; and then a second sub-window, namely, a memo application window 20, is switched out to display the interface of the memo application that is enabled later. This is not limited in this embodiment of this application.

In conclusion, embodiments of this application describe a plurality of methods for displaying a multi-screen collaboration window. Through the multi-screen collaboration window, a user may enable one or more applications on a mobile phone, a plurality of applications of the mobile phone may be displayed in the multi-screen collaboration window in a form of tabs, and the user may click a tab of any application, so that the multi-screen collaboration window skips to display an application interface corresponding to the tab. Compared with an existing multi-screen collaboration process, only a currently running application may be displayed in a multi-screen collaboration window, and if a user needs to switch from a current application to another application of a background, the user may enter a multi-task page of a mobile phone through a multi-task button, and then select a target application desired to be switched, so operation steps are complex and user experience is poor in this process. The method provided in this embodiment of this application is easy to operate, and a user may quickly switch from a currently used application to another application running in a background, thereby improving operation efficiency and enhancing user experience.

Moreover, this embodiment of this application further provides a window switching method. A user may select and drag a tab in a tab area, or select and drag an application name hidden in a "more" button, or select and drag any application card on a multi-task interface, to display any application of a mobile phone on an interface of a PC in a form of an independent sub-window The method is easy to operate, and may quickly implement switching from "a single window" to "a plurality of windows", better use a large screen of the PC in a display manner of "a main window+a plurality of sub-windows" on the PC, and provide a user with experience of using mobile phone applications on the PC. Moreover, during switching of a window, a process of a running application is not interrupted, thereby improving user experience.

Furthermore, in a multi-screen collaboration process, for a plurality of different scenarios in which a user performs an operation on a mobile phone and a PC separately, the background of the mobile phone may obtain the operation of the user, distinguish, according to the operation of the user, an operation object, namely, an application which performs the corresponding operation, and then determine a running status of the application and a window display status, so as to obtain an operation result that better conforms to an expectation of the user.

Finally, this embodiment of this application further provides a file sharing method. The method may implement file sharing between a mobile phone and a PC and between different applications of the mobile phone, and the process is easy to operate. A file, a photo, or the like may be transferred by a simple drag operation. Users such as white collars and students who often use both a PC and a mobile phone may focus only on a screen of the PC and access data of the mobile phone through the PC in a use process, without frequently switching between the PC and the mobile phone. This greatly improves user's working and learning efficiency.

It may be understood that, to implement the foregoing functions, an electronic device includes corresponding hardware and/or software modules for performing the functions. Algorithm steps in the examples described with reference to embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In this embodiment, the electronic device may be divided into function modules based on the foregoing method examples. For example, each function module corresponding to each function may be obtained through division, or two or more functions may be integrated into one processing module. The foregoing integrated module may be implemented in a form of hardware. It should be noted that, in embodiments, division into the modules is an example, and is merely logical function division. During actual implementation, another division manner may be used.

When each function module is obtained through division based on each corresponding function, the electronic device may include a display unit, a detection unit, and a processing unit.

It should be noted that all related content of the steps in the foregoing method embodiments may be cited in function description of corresponding function modules. Details are not described herein again.

The electronic device provided in this embodiment is configured to perform the foregoing window display method, window switching method, or method for sharing a file, and therefore can achieve a same effect as the foregoing implementation method.

When an integrated unit is used, the electronic device may include a processing module, a storage module, and a communications module. The processing module may be configured to control and manage actions of the electronic device, for example, may be configured to support the electronic device in performing the steps performed by the display unit, the detection unit, and the processing unit. The storage module may be configured to support the electronic device to store program code, data, and the like. The communications module may be configured to support communications between the electronic device and another device.

The processing module may be a processor or a controller. The processor may implement or execute various example logical blocks, modules, and circuits described with reference to content disclosed in this application. The processor may be alternatively a combination for implementing a computing function, for example, a combination including one or more microprocessors or a combination of a digital signal processor (digital signal processor, DSP) and a microprocessor. The storage module may be a memory. The communications module may be specifically a device, for example, a radio frequency circuit, a Bluetooth chip, or a Wi-Fi chip, that interacts with another electronic device.

In an embodiment, when the processing module is a processor and the storage module is a memory, the electronic device in this embodiment may be a device having the structure shown in FIG. 1 or FIG. 2.

An embodiment further provides a computer-readable storage medium. The computer-readable storage medium stores computer instructions. When the computer instructions are run on an electronic device, the electronic device is enabled to perform the foregoing related method steps, to implement the window display method, the window switching method, or the method for sharing a file in the foregoing embodiments.

An embodiment of this application further provides a computer program product. When the computer program product is run on a computer, the computer is enabled to perform the foregoing related steps, to implement the window display method, the window switching method, or the method for sharing a file in the foregoing embodiments.

In addition, an embodiment of this application further provides an apparatus. The apparatus may be specifically a chip, a component, or a module. The apparatus may include a processor and a memory that are connected. The memory is configured to store computer execution instructions. When the apparatus runs, the processor may execute the computer execution instructions stored in the memory, to enable the chip to perform the window display method, the window switching method, or the method for sharing a file in the foregoing method embodiments.

The electronic device, the computer-readable storage medium, the computer program product, or the chip provided in embodiments is configured to perform the corresponding method provided above. Therefore, for beneficial effects that can be achieved, refer to the beneficial effects in the corresponding method provided above. Details are not described herein again.

Based on the foregoing descriptions of the implementations, a person skilled in the art may understand that for the purpose of convenient and brief description, division into the foregoing function modules is merely used as an example for illustration. During actual application, the foregoing functions can be allocated to different function modules for implementation based on a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip or the like) or a processor (processor) to perform all or some of the steps of the methods described in embodiments of this application. The foregoing storage medium includes any medium that can store program code, for example, a U disk, a removable hard disk, a read only memory (read only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    displaying, by a first electronic device, a first window, wherein the first window comprises a first tab and a second tab;
    receiving, by the first electronic device, first interface information of a first application that is sent by a second electronic device;
    displaying, by the first electronic device, a first interface in the first window according to the first interface information, wherein the first interface information corresponds to the first tab;
    when displaying the first interface in the first window, receiving, by the first electronic device, a first operation on the second tab;
    in response to receiving the first operation on the second tab, receiving, by the first electronic device, second interface information of a second application that is sent by the second electronic device; and
    displaying, by the first electronic device, a second interface in the first window according to the second interface information, wherein the first application and the second application run on the second electronic device.

2. The method according to claim 1, wherein receiving, by the first electronic device, the first interface information of the first application that is sent by a second electronic device, and displaying, by the first electronic device, the first interface in the first window according to the first interface information, wherein the first interface information corresponds to the first tab, comprises:
    when displaying the second interface in the first window, receiving, by the first electronic device, a second operation on the first tab;
    in response to receiving the second operation on the first tab, receiving, by the first electronic device, the first interface information sent by the second electronic device; and
    displaying, by the first electronic device, the first interface in the first window according to the first interface information.

3. The method according to claim 1, further comprising:
    when displaying the first interface in the first window, receiving, by the first electronic device, a third operation on the first tab; and
    in response to receiving the third operation on the first tab, displaying, by the first electronic device, the second interface in the first window, and displaying the first interface in a second window, wherein the first window and the second window are different windows displayed on the first electronic device.

4. The method according to claim 3, wherein after the first interface is displayed in the second window, the first window does not comprise the first tab.

5. The method according to claim 1, further comprising:
    when displaying the first interface in the first window, receiving, by the first electronic device, a fourth operation on the second tab; and
    in response to receiving the fourth operation on the second tab, displaying, by the first electronic device, the first interface in the first window, and displaying the second interface in a second window, wherein the first window and the second window are different windows displayed on the first electronic device.

6. The method according to claim 5, wherein after the second interface is displayed in the second window, the first window does not comprise the second tab.

7. The method according to claim 1, wherein the first window comprises a close button, and the method further comprises:
    receiving, by the first electronic device, a click operation on the close button, and closing, by the first electronic device, the first window in response to the click operation on the close button.

8. The method according to claim 7, wherein when the first window is closed, the method further comprises:
    closing, by the first electronic device, a second window.

9. The method according to claim 1, further comprising:
    receiving, by the first electronic device, a fifth operation of moving a first file to a target window, wherein the first file is stored in the first electronic device, and the target window is the first window or a second window; and
    performing the following:
        when an interface displayed in the target window is the first interface, copying, by the first electronic device, the first file to the first application in response to the fifth operation; or
        when an interface displayed in the target window is the second interface, copying, by the first electronic device, the first file to the second application in response to the fifth operation.

10. The method according to claim 1, wherein when the first electronic device displays the first window and a second window, the method further comprises:
    receiving, by the first electronic device, a sixth operation of moving a second file displayed in the first window to the second window; and
    performing the following:
        when an interface displayed in the second window is the first interface, copying, by the first electronic device, the first file to the first application in response to the sixth operation; or
        when an interface displayed in the second window is the second interface, copying, by the first electronic device, the first file to the second application in response to the sixth operation.

11. The method according to claim 1, further comprising:
    displaying, by the first electronic device, a multi-task interface in the first window, wherein the multi-task interface comprises at least one application card, the at least one application card comprises a third application card, and the third application card corresponds to a third application;
    receiving, by the first electronic device, a seventh operation on the third application card;

in response to receiving the seventh operation, receiving, by the first electronic device, third interface information of the third application that is sent by the second electronic device; and displaying, by the first electronic device, a third interface of the third application in a third window according to the third interface information, wherein the third window and the first window are different windows on the second electronic device.

12. The method according to claim 11, wherein when the first electronic device displays the third interface in the first window or a second window, the method further comprises:

displaying, by the first electronic device, prompt information in response to receiving the seventh operation on the third application card, wherein the prompt information prompts a user that the third application has been displayed.

13. A method, comprising:

receiving, by a first electronic device, interface information of a main interface that is sent by a second electronic device;

displaying, by the first electronic device, the main interface in a first window according to the interface information of the main interface, wherein the main interface comprises an application icon of at least one application, and the at least one application is installed on the second electronic device;

receiving, by the first electronic device, a first operation on a first application icon, wherein the application icon of the at least one application comprises the first application icon;

in response to receiving the first operation, displaying, by the first electronic device, an option corresponding to enabling a first application in a second window;

receiving, by the first electronic device, a second operation on the option; and in response to receiving the second operation, displaying, by the first electronic device, an interface of the first application in the second window, wherein the first window and the second window are different windows on the second electronic device.

14. The method according to claim 13, wherein a maximum quantity of windows displayed by the first electronic device is N, wherein N is an integer greater than or equal to 2; and the method further comprises:

when a quantity of windows displayed by the first electronic device is N, displaying, by the first electronic device, prompt information in response to the second operation, wherein the prompt information prompts a user that the quantity of windows displayed in a display area of the first electronic device has reached the maximum quantity.

15. An electronic device, comprising:

one or more processors;

a memory storing a plurality of applications and one or more programs, wherein when the one or more programs are executed by the processor, the electronic device is enabled to perform:

displaying a first window, wherein the first window comprises a first tab and a second tab;

receiving first interface information of a first application that is sent by a second electronic device, wherein the first interface information corresponds to the first tab;

displaying a first interface in the first window according to the first interface information;

when displaying the first interface in the first window, receiving a first operation on the second tab;

in response to receiving the first operation on the second tab, receiving second interface information of a second application that is sent by the second electronic device; and displaying a second interface in the first window according to the second interface information, wherein the first application and the second application run in the second electronic device.

16. The device according to claim 15, wherein receiving the first interface information of the first application that is sent by the second electronic device, wherein the first interface information corresponds to the first tab, and displaying the first interface in the first window according to the first interface information, comprises:

when displaying the second interface in the first window, receiving a second operation on the first tab;

in response to receiving the second operation on the first tab, receiving the first interface information sent by the second electronic device; and displaying the first interface in the first window according to the first interface information.

17. The device according to claim 15, wherein when the one or more programs are executed by the processor, the electronic device is further enabled to perform:

when displaying the first interface in the first window, receiving a third operation on the first tab; and in response to receiving the third operation on the first tab, displaying the second interface in the first window, and displaying the first interface in a second window, wherein the first window and the second window are different windows displayed on the electronic device.

18. The device according to claim 17, wherein after the first interface is displayed in the second window, the first window does not comprise the first tab.

19. The device according to claim 15, wherein the first window comprises a close button, and when the one or more programs are executed by the processor, the electronic device is further enabled to perform:

receiving a click operation on the close button, and closing the first window in response to the click operation on the close button.

20. The device according to claim 19, wherein when the one or more programs are executed by the processor, the electronic device is further enabled to perform when the first window is closed, closing a second window.

* * * * *